(12) United States Patent
Connell et al.

(10) Patent No.: US 12,622,833 B2
(45) Date of Patent: *May 12, 2026

(54) PATIENT SUPPORT WITH DECK WIDTH MONITORING AND CONTROL

(71) Applicant: Stryker Corporation, Kalamazoo, MI (US)

(72) Inventors: Jason J. Connell, London (CA); Joseph Steven David Elku, Tillsonburg (CA); Jeffrey C. Shiery, East Leroy, MI (US); Madhu Thomas, London (CA); Jason J. Cerny, London (CA); Carlos Vicente, St. Thomas (CA); Cory P. Herbst, Shelbyville, MI (US); Alexis Huizar, Portage, MI (US); Mohamad Kashen, Cary, IL (US); Xianyu Shea, Vicksburg, MI (US); Marco Constant, Johnson City, TN (US)

(73) Assignee: Stryker Corporation, Portage, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/772,980

(22) Filed: Jul. 15, 2024

(65) Prior Publication Data

US 2024/0366448 A1    Nov. 7, 2024

Related U.S. Application Data

(63) Continuation of application No. 16/916,660, filed on Jun. 30, 2020, now Pat. No. 12,036,161.

(Continued)

(51) Int. Cl.
*A61G 7/05* (2006.01)
*A47C 19/04* (2006.01)
(Continued)

(52) U.S. Cl.
CPC ............ *A61G 7/0524* (2016.11); *A61G 7/018* (2013.01); *A47C 19/04* (2013.01); *A61G 7/002* (2013.01);
(Continued)

(58) Field of Classification Search
CPC ........ A47C 19/04; A61G 7/002; A61G 7/005; A61G 7/008; A61G 7/012; A61G 7/015;
(Continued)

(56) References Cited

U.S. PATENT DOCUMENTS 160,694 A    3/1875  Michel
921,339 A    5/1909  Atkinson
(Continued)

FOREIGN PATENT DOCUMENTS

AU    2014317772 B2    3/2015
JP    2004-073387 A    3/2004
(Continued)

*Primary Examiner* — Justin C Mikowski
*Assistant Examiner* — Deborah Talitha Gedeon
(74) *Attorney, Agent, or Firm* — Warner Norcross + Judd LLP

(57)    ABSTRACT

A patient support, such as a bed, a cot, a stretcher, or the like, for supporting an occupant includes sensors adapted to detect a status of the patient support, such as the width of the width-adjustable patient support component or the locked or unlocked state of the patient support component. A control system for the patient support is configured to determine if the patient support is in an unacceptable status, such as an unacceptable width configuration or an unlocked state, based on the sensed status. The control system is adapted to issue an alert or take action or prompt a caregiver to take an action if the patient support status is unacceptable.

20 Claims, 85 Drawing Sheets

Related U.S. Application Data

(60) Provisional application No. 62/994,540, filed on Mar. 25, 2020, provisional application No. 62/887,977, filed on Aug. 16, 2019.

(51) Int. Cl.

| | |
|---|---|
| *A61G 7/002* | (2006.01) |
| *A61G 7/018* | (2006.01) |
| *G01B 11/02* | (2006.01) |
| *G01B 11/06* | (2006.01) |

(52) U.S. Cl.
CPC ...... *A61G 2200/16* (2013.01); *A61G 2203/10* (2013.01); *A61G 2203/30* (2013.01); *A61G 2203/40* (2013.01); *G01B 11/026* (2013.01); *G01B 11/0625* (2013.01)

(58) Field of Classification Search
CPC .. A61G 7/018; A61G 7/0524; A61G 2200/16; A61G 2203/10; A61G 2203/30; A61G 2203/40; A61G 2203/34; A61G 2203/44; A61G 2205/10; A61G 2205/60; G01B 11/026; G01B 11/0625
USPC ..... 5/600, 618, 11, 610, 613, 616, 620, 713; 70/344
See application file for complete search history.

(56) References Cited

U.S. PATENT DOCUMENTS

| | | | |
|---|---|---|---|
| 1,096,760 A | | 5/1914 | Rudolph |
| 1,128,808 A | | 2/1915 | Manoogian |
| 1,262,751 A | | 4/1918 | Choma |
| 1,324,576 A | | 12/1919 | Wronowski |
| 3,094,007 A | | 6/1963 | Luhrs |
| 4,669,136 A | | 6/1987 | Waters et al. |
| 5,077,843 A | | 1/1992 | Dale et al. |
| 5,179,744 A | | 1/1993 | Foster et al. |
| 5,261,725 A | | 11/1993 | Rudolph |
| 5,377,370 A | | 1/1995 | Foster et al. |
| 5,404,604 A | | 4/1995 | Has et al. |
| 5,469,588 A | | 11/1995 | DiMatteo et al. |
| 5,682,631 A | | 11/1997 | Weismiller et al. |
| 5,715,548 A | | 2/1998 | Weismiller et al. |
| 5,735,220 A | | 4/1998 | Wang |
| 5,823,621 A | | 10/1998 | Broadhead |
| 5,870,784 A | | 2/1999 | Elliott |
| 6,006,379 A | | 12/1999 | Hensley |
| 6,088,853 A | | 7/2000 | Jansen |
| 6,209,157 B1 | | 4/2001 | Hensley |
| 6,240,582 B1 | | 6/2001 | Reinke |
| 6,276,011 B1 | | 8/2001 | Antinori |
| 6,336,235 B1 | | 1/2002 | Ruehl |
| 6,347,420 B2 | | 2/2002 | Elliott |
| 6,357,065 B1 | | 3/2002 | Adams |
| 6,393,641 B1 | | 5/2002 | Hensley |
| 6,425,635 B1 | | 7/2002 | Pulver |
| 6,499,162 B1 | | 12/2002 | Lu |
| 6,505,365 B1 | | 1/2003 | Hanson et al. |
| 6,516,480 B2 | | 2/2003 | Elliott |
| 6,536,056 B1 | | 3/2003 | Vrzalik et al. |
| 6,615,428 B1 | | 9/2003 | Pattee |
| 6,615,429 B2 | | 9/2003 | Weil et al. |
| 6,694,549 B2 | | 2/2004 | Perez et al. |
| 6,708,358 B2 | | 3/2004 | Hensley |
| 6,751,815 B2 | | 6/2004 | Heimbrock et al. |
| 6,857,148 B2 | | 2/2005 | Van Raemdonck |
| 6,904,631 B2 | | 6/2005 | Vrzalik et al. |
| 6,910,236 B2 | | 6/2005 | René |
| 7,036,166 B2 | | 5/2006 | Kramer et al. |
| 7,086,103 B2 | | 8/2006 | Barthelt |
| 7,150,056 B2 | | 12/2006 | Lemire |
| 7,213,279 B2 | | 5/2007 | Weismiller et al. |
| 7,260,860 B2 | | 8/2007 | Chambers et al. |
| 7,325,265 B2 | | 2/2008 | Hornbach et al. |
| 7,363,663 B2 | | 4/2008 | Chambers et al. |
| 7,386,900 B2 | | 6/2008 | Lemire |
| 7,406,729 B2 | | 8/2008 | Hornbach et al. |
| 7,441,291 B2 | | 10/2008 | Hayes et al. |
| 7,458,119 B2 | | 12/2008 | Hornbach et al. |
| 7,464,425 B2 | | 12/2008 | Chambers et al. |
| 7,559,102 B1 | | 7/2009 | Benzo et al. |
| 7,565,710 B2 | | 7/2009 | Chambers et al. |
| 7,610,638 B2 | | 11/2009 | Kramer et al. |
| 7,676,862 B2 | | 3/2010 | Poulos et al. |
| 7,698,761 B2 | | 4/2010 | Neuenswander et al. |
| 7,699,784 B2 | | 4/2010 | Wan Fong et al. |
| 7,730,562 B2 | | 6/2010 | Hornbach et al. |
| 7,743,441 B2 | | 6/2010 | Poulos et al. |
| 7,784,128 B2 | | 8/2010 | Kramer |
| 7,805,782 B2 | | 10/2010 | Hakamiun et al. |
| 7,834,768 B2 | | 11/2010 | Dixon et al. |
| 7,845,032 B2 | | 12/2010 | Chambers et al. |
| 7,913,336 B2 | | 3/2011 | Morin et al. |
| 8,039,766 B2 | | 10/2011 | Flanagan |
| 8,042,210 B2 | | 10/2011 | Clenet |
| 8,056,163 B2 | | 11/2011 | Lemire et al. |
| 8,065,764 B2 | | 11/2011 | Kramer |
| 8,069,513 B2 | | 12/2011 | Turner et al. |
| 8,069,514 B2 | | 12/2011 | Poulos et al. |
| 8,122,546 B2 | | 2/2012 | Chambers et al. |
| 8,387,184 B2 | | 3/2013 | Turner et al. |
| 8,413,273 B2 | | 4/2013 | Hornbach et al. |
| 8,413,274 B2 | | 4/2013 | Weismiller et al. |
| 8,418,291 B2 | | 4/2013 | Hornbach et al. |
| 8,555,438 B2 | | 10/2013 | Turner et al. |
| 8,601,618 B2 | | 12/2013 | Benzo et al. |
| 8,621,688 B2 | | 1/2014 | Andrienko |
| 8,646,795 B2 | | 2/2014 | Cerreto |
| 8,689,376 B2 | | 4/2014 | Becker et al. |
| 8,701,229 B2 | | 4/2014 | Lemire et al. |
| 8,806,682 B2 | | 8/2014 | Hornbach et al. |
| 8,844,073 B2 | | 9/2014 | Riley et al. |
| 8,844,076 B2 | | 9/2014 | Becker et al. |
| 8,844,078 B2 | | 9/2014 | Hornbach et al. |
| 8,856,987 B2 | | 10/2014 | Hornbach et al. |
| 8,910,329 B2 | | 12/2014 | Turner et al. |
| 8,931,126 B1 | | 1/2015 | Xu |
| 8,955,178 B2 | | 2/2015 | Robertson |
| 8,997,282 B2 | | 4/2015 | Bossingham et al. |
| 9,009,895 B2 | | 4/2015 | Turner et al. |
| 9,060,910 B2 | | 6/2015 | Cerreto |
| 9,149,190 B2 | | 10/2015 | Mayoras, Jr. |
| 9,173,796 B2 | | 11/2015 | Rigsby et al. |
| 9,173,797 B2 | | 11/2015 | Andrienko |
| 9,198,521 B2 | | 12/2015 | Robertson |
| 9,220,650 B2 | | 12/2015 | Bobey et al. |
| 9,241,571 B2 | | 1/2016 | Robertson |
| 9,316,022 B2 * | | 4/2016 | Tyner ..................... E05B 17/22 |
| 9,387,140 B2 | | 7/2016 | Tekulve |
| 9,552,460 B2 | | 1/2017 | Riley et al. |
| 9,572,735 B2 | | 2/2017 | Johnson et al. |
| 9,622,927 B1 | | 4/2017 | Edgerton |
| 9,757,293 B2 | | 9/2017 | Turner et al. |
| 9,763,840 B2 | | 9/2017 | Rigsby et al. |
| 9,788,800 B2 | | 10/2017 | Mayoras, Jr. |
| 9,855,176 B2 | | 1/2018 | Roussy et al. |
| 9,925,102 B2 | | 3/2018 | Turner et al. |
| 10,130,536 B2 | | 11/2018 | Roussy et al. |
| 10,188,569 B2 | | 1/2019 | Elku et al. |
| 10,231,889 B2 | | 3/2019 | Johnson et al. |
| 2002/0174487 A1 | | 11/2002 | Kramer et al. |
| 2002/0178502 A1 | | 12/2002 | Beasley et al. |
| 2003/0227635 A1 | | 12/2003 | Chambers et al. |
| 2005/0125899 A1 | | 6/2005 | Hanson et al. |
| 2006/0010601 A1 | | 1/2006 | Riley et al. |
| 2006/0026768 A1 | | 2/2006 | Chambers et al. |
| 2006/0143829 A1 | | 7/2006 | Kramer et al. |
| 2007/0180619 A1 | | 8/2007 | Hayes et al. |
| 2008/0127415 A1 | | 6/2008 | Ruschke et al. |
| 2009/0044339 A1 | | 2/2009 | Morin et al. |
| 2010/0132118 A1 | | 6/2010 | Robertson |

(56) References Cited

U.S. PATENT DOCUMENTS

| | | | |
|---|---|---|---|
| 2011/0143898 A1* | 6/2011 | Trees | A63B 21/1672 |
| | | | 482/142 |
| 2011/0301432 A1 | 12/2011 | Riley et al. | |
| 2012/0117732 A1 | 5/2012 | O'Keefe | |
| 2012/0304715 A1* | 12/2012 | Gore | G08B 13/04 |
| | | | 70/344 |
| 2013/0145552 A1 | 6/2013 | Bhai et al. | |
| 2013/0298331 A1 | 11/2013 | Bossingham et al. | |
| 2014/0013512 A1 | 1/2014 | Turner et al. | |
| 2014/0026325 A1 | 1/2014 | Guthrie | |
| 2014/0047641 A1 | 2/2014 | Thodupunuri et al. | |
| 2014/0215717 A1 | 8/2014 | Rigsby et al. | |
| 2014/0250600 A1 | 9/2014 | McCarty et al. | |
| 2014/0259409 A1 | 9/2014 | Shih | |
| 2014/0310876 A1 | 10/2014 | Roussy et al. | |
| 2015/0032384 A1 | 1/2015 | Riley et al. | |
| 2016/0022038 A1 | 1/2016 | Cheng | |
| 2016/0022518 A1 | 1/2016 | Shih | |
| 2016/0038360 A1 | 2/2016 | Rigsby et al. | |
| 2016/0095774 A1 | 4/2016 | Bobey et al. | |
| 2016/0113828 A1 | 4/2016 | Jenkins et al. | |
| 2016/0193095 A1* | 7/2016 | Roussy | A61G 7/0509 |
| | | | 5/616 |
| 2016/0220434 A1 | 8/2016 | Li | |
| 2016/0287460 A1 | 10/2016 | Tekulve et al. | |
| 2017/0135881 A1 | 5/2017 | Franceschetti et al. | |
| 2017/0143566 A1* | 5/2017 | Elku | A61G 7/0512 |
| 2017/0161544 A1 | 6/2017 | Fomani et al. | |
| 2017/0252241 A1 | 9/2017 | Furman et al. | |
| 2017/0281440 A1 | 10/2017 | Puvogel et al. | |
| 2017/0340497 A1 | 11/2017 | Rigsby et al. | |
| 2018/0147101 A1 | 5/2018 | Bossingham et al. | |
| 2018/0214326 A1 | 8/2018 | Lacasse et al. | |
| 2018/0353358 A1 | 12/2018 | Lingegård | |
| 2019/0083337 A1 | 3/2019 | Tessmer et al. | |
| 2019/0151171 A1 | 5/2019 | Johnson et al. | |
| 2019/0183702 A1 | 6/2019 | Derenne et al. | |
| 2019/0201264 A1 | 7/2019 | Paul | |

FOREIGN PATENT DOCUMENTS

| | | |
|---|---|---|
| KR | 20020016446 A | 3/2002 |
| WO | 2011079270 A1 | 6/2011 |
| WO | 2014201379 A2 | 12/2014 |
| WO | 2015032003 A1 | 3/2015 |
| WO | 2015135236 A1 | 9/2015 |
| WO | 2015135237 A1 | 9/2015 |
| WO | 2015135238 A1 | 9/2015 |
| WO | 2017051386 A1 | 3/2017 |

* cited by examiner

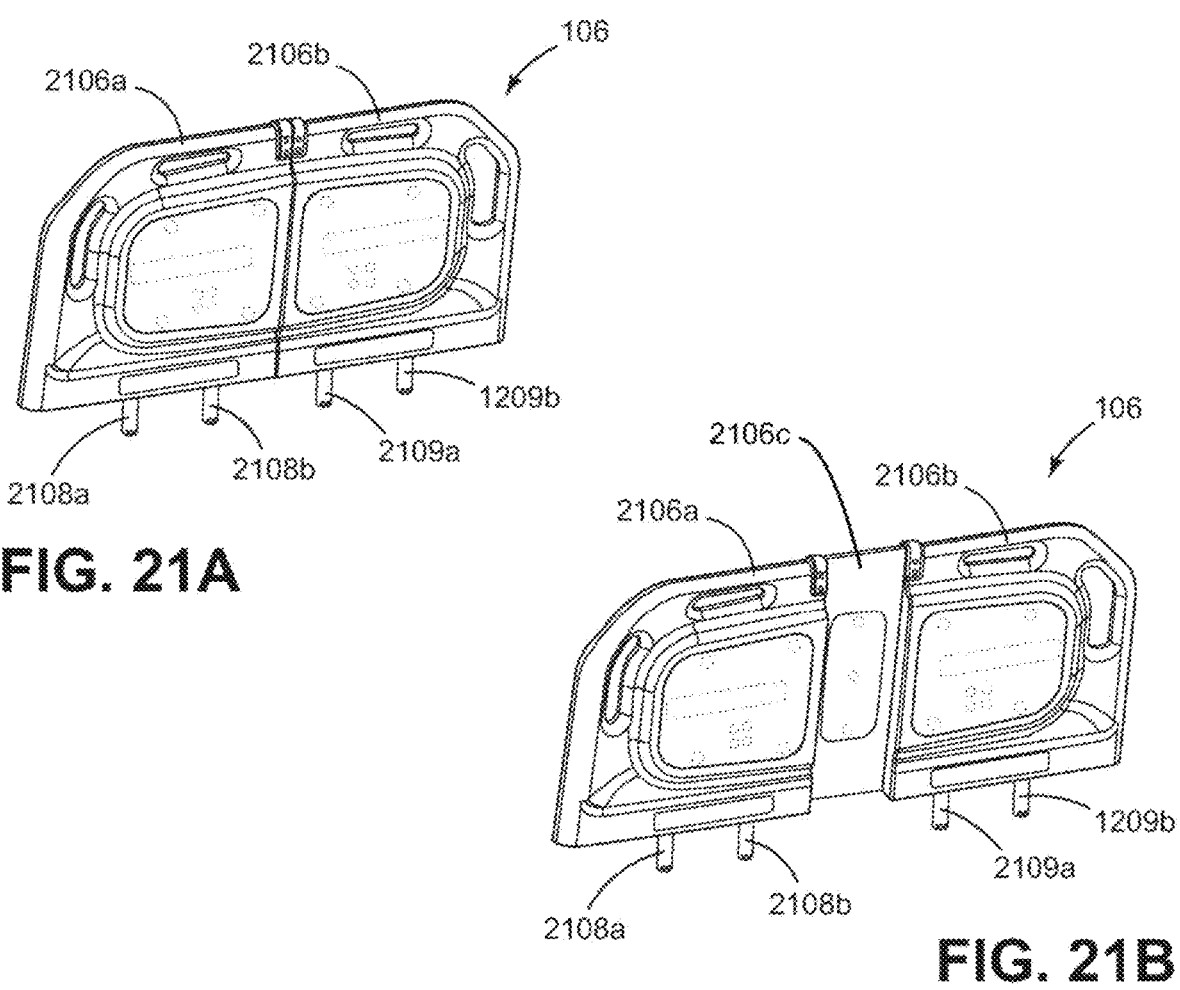
FIG. 21A
FIG. 21B
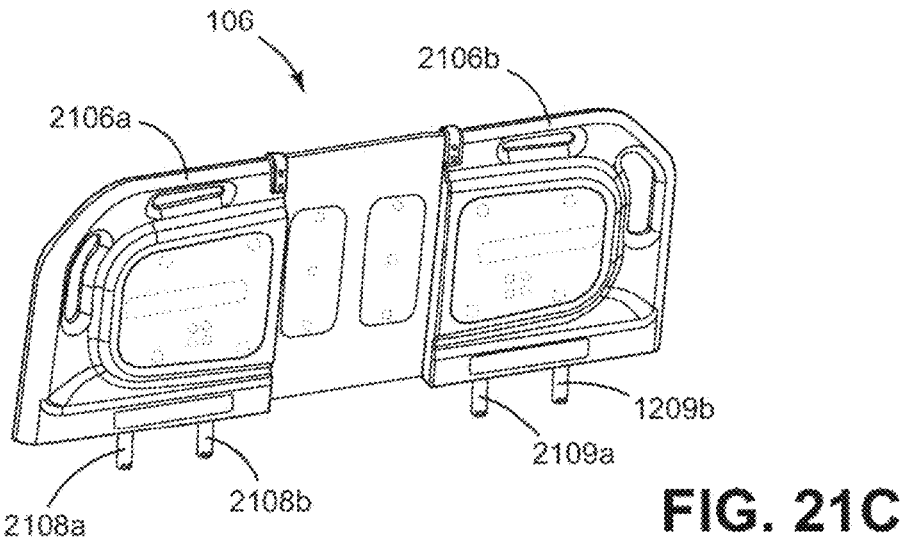
FIG. 21C

| | | Support Deck Width | | | | |
|---|---|---|---|---|---|---|
| Head Sensor | | 36" | 42" | 48" | | Foot Sensor |
| | 36" | A | R | R | 36" | |
| | 42" | R | A | R | 42" | |
| | 48" | R | R | A | 48" | |

Fig. 5B

PATIENT SUPPORT WITH DECK WIDTH MONITORING AND CONTROL

BACKGROUND

This disclosure relates to patient supports, such as hospital beds, and more specifically, adjustable width patient supports. More particularly, the present disclosure relates to adjustable width patient supports that include sensors for sensing the status of the patient support.

Typical hospital beds are designed with numerous functionalities to facilitate patient comfort and safety and to facilitate the ability of caregivers to provide efficient and effective care. However, most hospital beds are designed to accommodate patients of average size and weight. For bariatric patients, i.e., morbidly obese patients having extremely large sizes and whose weights can be as high as 1000 pounds or greater, normal hospital beds are generally too small and lack sufficient structural strength to withstand the load of a bariatric patient. Special bariatric beds have been designed to accommodate bariatric patients, but these beds generally lack the functionalities of regular hospital bed.

SUMMARY OF THE DESCRIPTION

According to various embodiments, a patient support is provided that may be adjusted in height, width, and/or length.

In one embodiment, a patient support includes a patient support deck, a sensor for sensing a status of the patient support deck, and a controller in communication with the sensor. The controller is configured to generate a signal based on the sensor signals, such as the status detected by the sensor.

In one embodiment, the status is an acceptable and/or an unacceptable configuration. In some embodiments, the status includes an unknown status.

In some embodiments, the sensor can detect whether the patient support deck is locked or unlocked, and the status of the patient support deck is related to the locked or unlocked condition of the patient support deck. For example, the unlocked status may represent an unacceptable configuration of the patient support deck.

In other embodiments, the sensor is configured to detect the width, and the status of the patient support deck is related to the width of the patient support deck. Depending on the width of the patient support deck, the width may represent an unacceptable configuration or an acceptable configuration. For example, where the patient support deck includes multiple deck sections, when one of the deck sections has a different width than the other deck section or deck sections, the different width or widths may represent an unacceptable configuration of the patient support deck. In other embodiments, even when all the widths of the deck section are the same, if any of the deck sections are unlocked, then this may represent an unacceptable configuration. In yet other embodiments, even if all the deck section widths are the same, and the deck sections are locked, the controller may take action or prompt a user to take action.

In another embodiment, a patient support includes a patient support deck having an adjustable width and a control system. The control system includes a sensor adapted to sense the width of the patient support deck and a controller in communication with the sensor. Based on the sensor signals, the controller is configured to determine if the patient support deck is in an unacceptable configuration based on the sensed deck support width, and the controller may be configured to generate a signal, such as a signal that generates an alert or a signal that prevents motion of the patient support or a component of the patient support, if the patient support deck is in an unacceptable configuration.

In yet another embodiment, a patient support includes a patient support deck having an adjustable width and a control system. The patient support deck includes a latch to lock the width of the deck. The control system includes a sensor adapted to sense the locked or unlocked status of the latch, and optionally the width of the deck based on a sensed characteristic of the latch mechanism, and a controller in communication with the sensor. Based on the sensor signals, the controller is configured to determine if the patient support deck is in an unacceptable configuration based on the sensed locked or unlocked status, and optionally the width of, the patient support deck, and the control system is configured to generate a signal, such as a signal that generates an alert or a signal that prevents motion of the patient support or a component of the patient support, if the patient support deck is in an unacceptable configuration.

In one embodiment, where the patient support deck includes multiple deck sections, when one of the deck sections has a different width than the other deck section or deck sections, the different width may represent an unacceptable configuration of the patient support deck.

In any of the above embodiments, the signal may generate an alert to a caregiver.

In any of the above embodiments, the signal may generate a prompt to a caregiver to take action.

In any of the above embodiments, the signal may be used to prevent motion of the patient support itself or motion of one or more bed components.

In one embodiment, the controller is configured to prevent the motion of the patient itself when the patient support deck is sensed to be in an unacceptable configuration.

In another or further embodiment, the controller is configured to prevent motion of one or more bed components of the patient support, such as the side rails and/or the deck, when the patient support deck is sensed to be in an unacceptable configuration, or simply when the deck is widened.

In some embodiments, the patient support includes a patient support deck frame having a fixed section and a movable section. Various sensor or switches and their complementary components can be mounted on opposite sections (i.e., fixed or movable sections) of the patient support deck frame in order to sense and monitor movement of the movable section and/or the latch.

In any of the above embodiments, the sensor may comprise a non-contact sensor or a contact sensor and may generate a discrete signal or a continuous signal.

In one embodiment, the sensor senses a readable tag, which are mounted to, for example, the movable section of the deck.

In another embodiment, the sensor is an optical sensor that senses a reflective strip. For example, the strip may have multiple reflective gradient portions. The amount of light reflected by the reflective gradient portions, which correlates to the different patient support deck widths, is sensed by the optical sensor and communicated to the controller. Based on the sensed amount of light, the controller determines at least the approximate corresponding width of the patient support deck. In some embodiments, an additional sensor signal, such as the locked status of the latch mechanism of the patient support deck.

In other embodiments, the sensor is a color sensor that senses the color of a color strip with different colors that correlate to the different patient support deck widths.

In still other embodiments, the sensor is a plurality of magnetic field sensors that sense magnets on the patient support deck frame. For example, the sensor is a hall effect sensor that senses magnets that have different magnetic field strengths. The hall effect sensor can output a voltage in response to the magnetic field strength of the aligned magnet, which the controller is configured to correlate to the different patient support deck widths.

In some embodiments, the sensor is one or more discrete switches that are activated by motion.

In another embodiment, the sensor is a multi-axis switch that includes a joystick that moves in response to contact with a part of the patient support deck.

In still another embodiment, the sensor is a potentiometer, such as a string potentiometer or slide potentiometer, configured to measure the movement of a movable portion of the patient support deck.

In other embodiments, the sensor is a piezoelectric sensor that interacts with a movable portion of the patient support deck.

In yet another embodiment, the sensor is an air pressure sensor that senses an increase or decrease in air pressure in an air chamber. The increase or decrease in the air pressure may correlate to the width of the patient support component, such as the patient support deck.

In another embodiment, the sensor is a proximity sensor that senses the distance between a fixed section and the movable section of the patient support deck.

In other embodiments, the sensor is an RFID reader that reads an RFID code positioned on a moveable section of the patient support. The RFID tag is coded with data corresponding to the width of the patient support component.

In yet another embodiment, the sensor is a bar code reader, such as a QR bar code reader, that reads a bar code label positioned on a moveable section of the patient support deck. The bar code is coded with data corresponding to the width of the patient support component.

In another embodiment, the sensor includes a depth lock sensor that senses a variable profile latch pin, such as a stepped diameter latch pin, that is received at a depth, as allowed by the variable profile (e.g., stepped diameter), in different diameter/size cutouts in the opposite patient support deck frame section. The received depth of the latch pin is then sensed by the deck lock sensor and communicated to the controller, which is used to determine the corresponding width of the patient support deck. The deck lock sensor may also be configured to sense a locked or unlocked condition of the patient support deck.

In still other embodiments, the sensor senses two latch pins that are receivable in cutouts arranged in configurations on the movable portion of the patient support deck, which correlate to the widths of the patient support deck. The position of the latch pins in the cutouts is then communicate to the controller via the sensors, and the controller is then configured to determine the corresponding width of the patient support deck.

In any of the embodiments, the sensor may comprise or additionally include a deck lock sensor configured to detect a state of a locking latch pin that locks the patient support deck. If the locking latch pin is detected to be unlocked, movement of the patient support may then be restricted.

In some embodiments, if the patient support deck is determined to be in an unacceptable width configuration and/or unlocked state, movement of the patient support may then be restricted.

In some embodiments, the controller is configured to restrict a height of the patient support based on the width configuration of the patient support deck.

In some embodiments, each patient support deck section includes a sensor adapted to sense the width of the corresponding patient support deck section. An unacceptable width configuration is determined when the width configuration of each of the patient support deck sections is not the same.

In one embodiment, the patient support deck has a rack and pinion mechanism configured to permit manually adjusting the width of the patient support deck. The patient support deck may include at least two deck extension pans, and the rack and pinion mechanism may connect the deck extension pans. Further, the rack and pinion mechanism may include a latch releasable from either side of the patient support. Releasing the latch may permit manually adjusting the width of the patient support deck. Manually adjusting the width of the patient support deck can therefore be accomplished by simultaneously sliding the deck extension pans by pulling or pushing one of the deck extension pans.

Further features and embodiments will be described or will become apparent in the course of the following detailed description. It should be understood that each feature described herein may be utilized in any combination with any one or more of the other described features, and that each feature does not necessarily rely on the presence of another feature except where evident to one of skill in the art.

BRIEF DESCRIPTION OF THE DRAWINGS

FIG. 21A is perspective views showing an extendible headboard separate from a headboard mounting bracket at a standard first width;

FIG. 21B is perspective views showing an extendible headboard separate from a headboard mounting bracket at an intermediate second width;

FIG. 21C is perspective views showing an extendible headboard separate from a headboard mounting bracket at a third more expanded width;

FIG. 58 is a chart illustrating allowed and restricted conditions for the patient support relative to the patient support deck width;

DETAILED DESCRIPTION

Figure 1A:
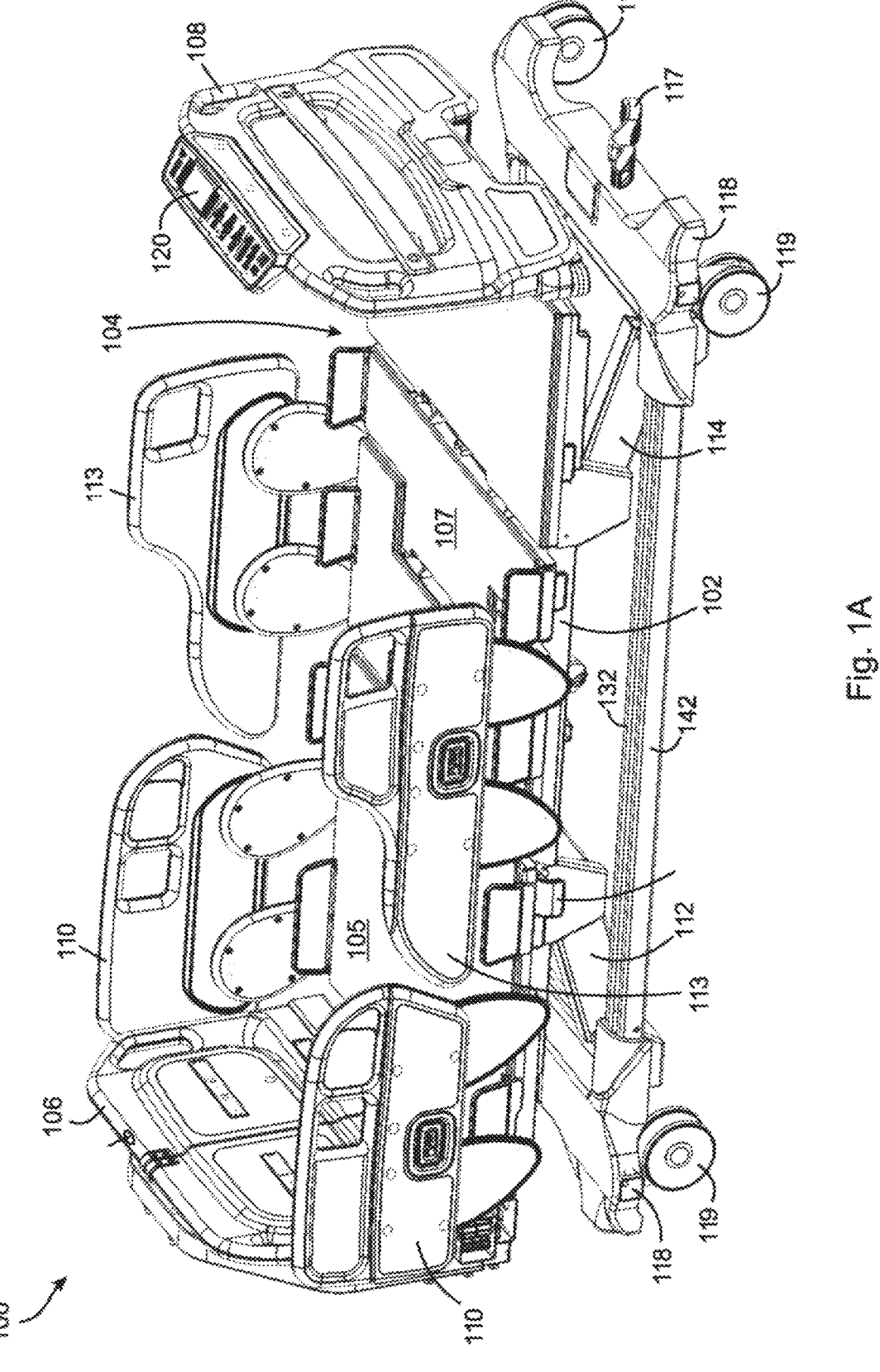
FIG. 1A is a perspective view of a patient support.
Figure 1B:
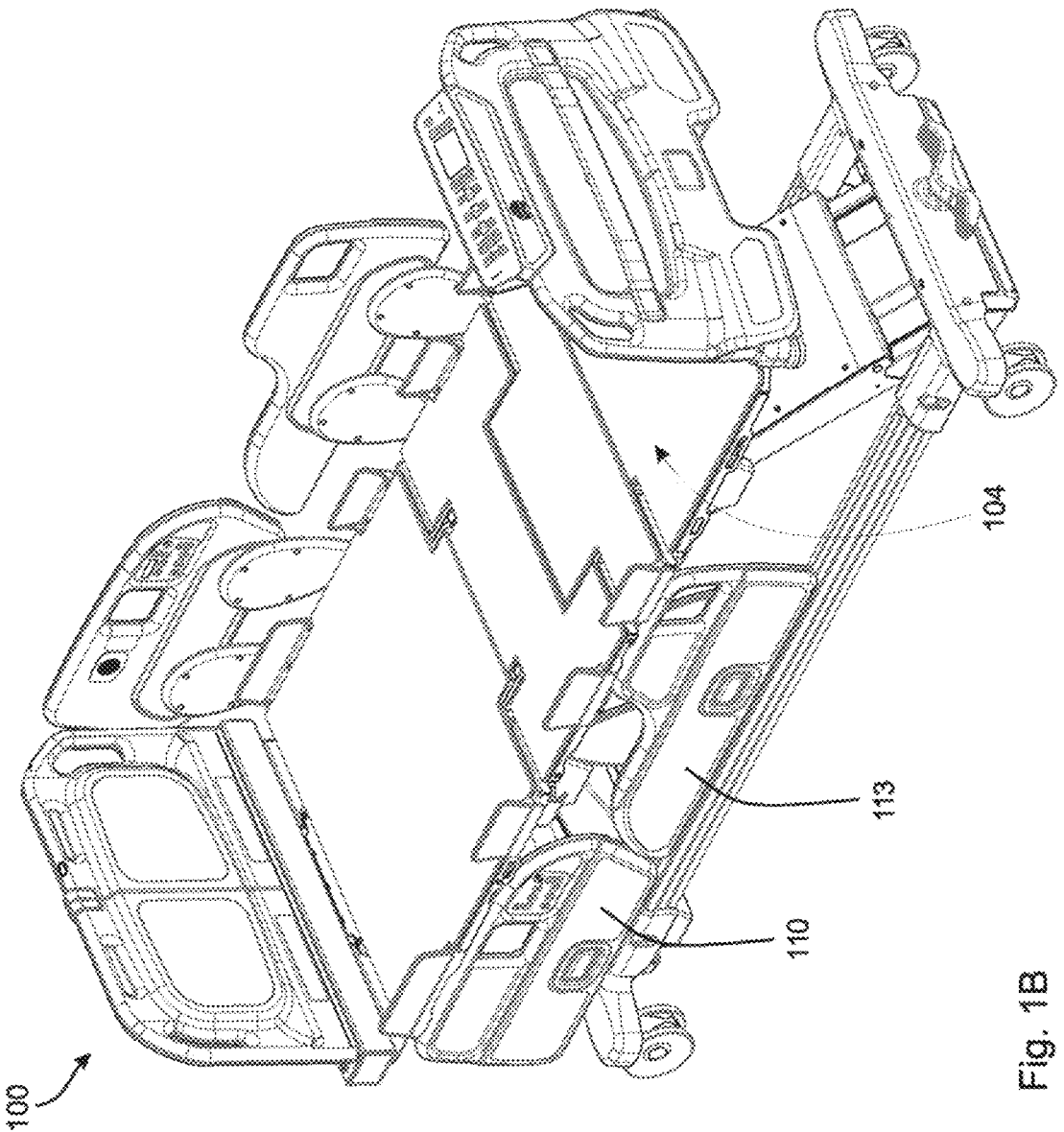
FIG. 1B is a perspective view of the patient support of FIG. 1A with side rails on one side of the patient support tucked under the patient support deck.

Referring to FIGS. 1A and 1B, the numeral 100 generally designates an exemplary patient support that may incorporate one or more aspects of the present disclosure. Although the particular form of patient support 100 illustrated in FIGS. 1A and 1B is a bed adapted for use in a hospital or other medical setting, it will be understood that patient support 100 could, in different embodiments, be a cot, a stretcher, a gurney, a recliner, an operating table, a residential bed, or any other structure capable of supporting a person, whether stationary or mobile and/or whether medical or residential. Further, while the term "patient" is used, the term "patient" is used broadly and intended to refer to any person, such as a hospital patient, long-term care facility resident, or any other occupant of the patient support 100 that may need assistance, including medical treatment or medical attention.

In general, patient support 100 includes an upper frame 102, a lower frame 132, and an adjustable patient support deck 104 (or simply "deck"). The patient support 100 may include a lift mechanism (described below) to raise and lower the upper frame 102 to move patient support deck 104 relative to the lower frame 132 and the ground. The patient support 100 may be width and/or length adjustable to accommodate patients of various sizes and may include a manual user adjustable and selectable width adjustment mechanism, described below, or one or more actuators, such as mechanical or powered actuators, also described below.

The patient support deck 104 may include multiple deck sections, each of which may be independently and separately adjusted and locked in their adjusted or unadjusted configuration. Alternately two or more deck sections may be coupled together so that the two decks sections can be adjusted together and locked optionally using a single latch but independently from the other deck sections. Although in the below embodiment the deck is described in the context of the seat and knee sections of the deck being coupled together, as described in the other embodiments (illustrated in FIGS. 59-67) three or more deck sections or different decks sections may be couple together and adjusted and locked using a single latch mechanism for the coupled deck sections. Similarly, although illustrated with release handles provided in pairs (one for each side of the deck section), a single handle may be used for each deck section. And in the case where all the deck sections are coupled together, a single handle or a single pair of handles may be used to release the one or more latch mechanisms. It should be understood that various combinations and variations may be made—the number and type of deck sections, the number and location of handles, and the number and location of latch mechanisms.

It should be understood that a combination of any two or more decks can be coupled together as described below. Further, as will be more fully described below, the width of the deck sections may be adjusted, for example, between a nominal 36" width, an intermediate 42" width, and an expanded 48" width. However, it should be understood, that the width of the deck sections may be adjusted to other widths, including intermediate values or larger values, such as a 54" width.

In the illustrated embodiment, the deck sections are manually adjusted and may be adjusted with rack and pinion mechanisms, as described below, that allow for bi-directional adjustment of the width of the patient support deck. In other words, when one side of the deck is manually pulled, the other side will be widened at the same time. However, it should be understood that other types of width adjustment mechanisms may be used, as noted below, including mechanical or powered actuators.

Figure 24:
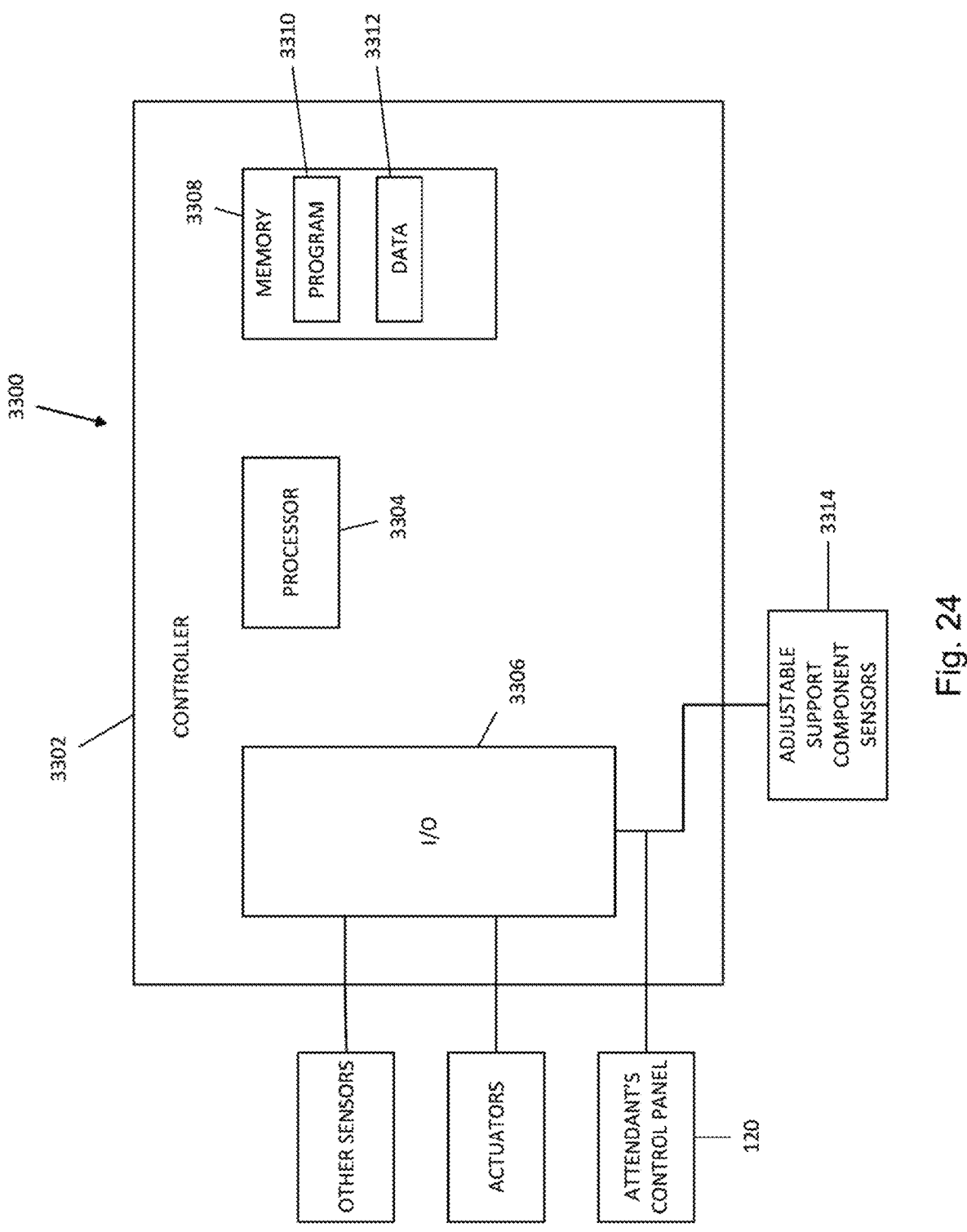
FIG. 24 depicts a block diagram of an embodiment of a control system for a patient support whereby data communication occurs through a port interconnected with a controller via an I/O interface of the controller.
Figure 24A:
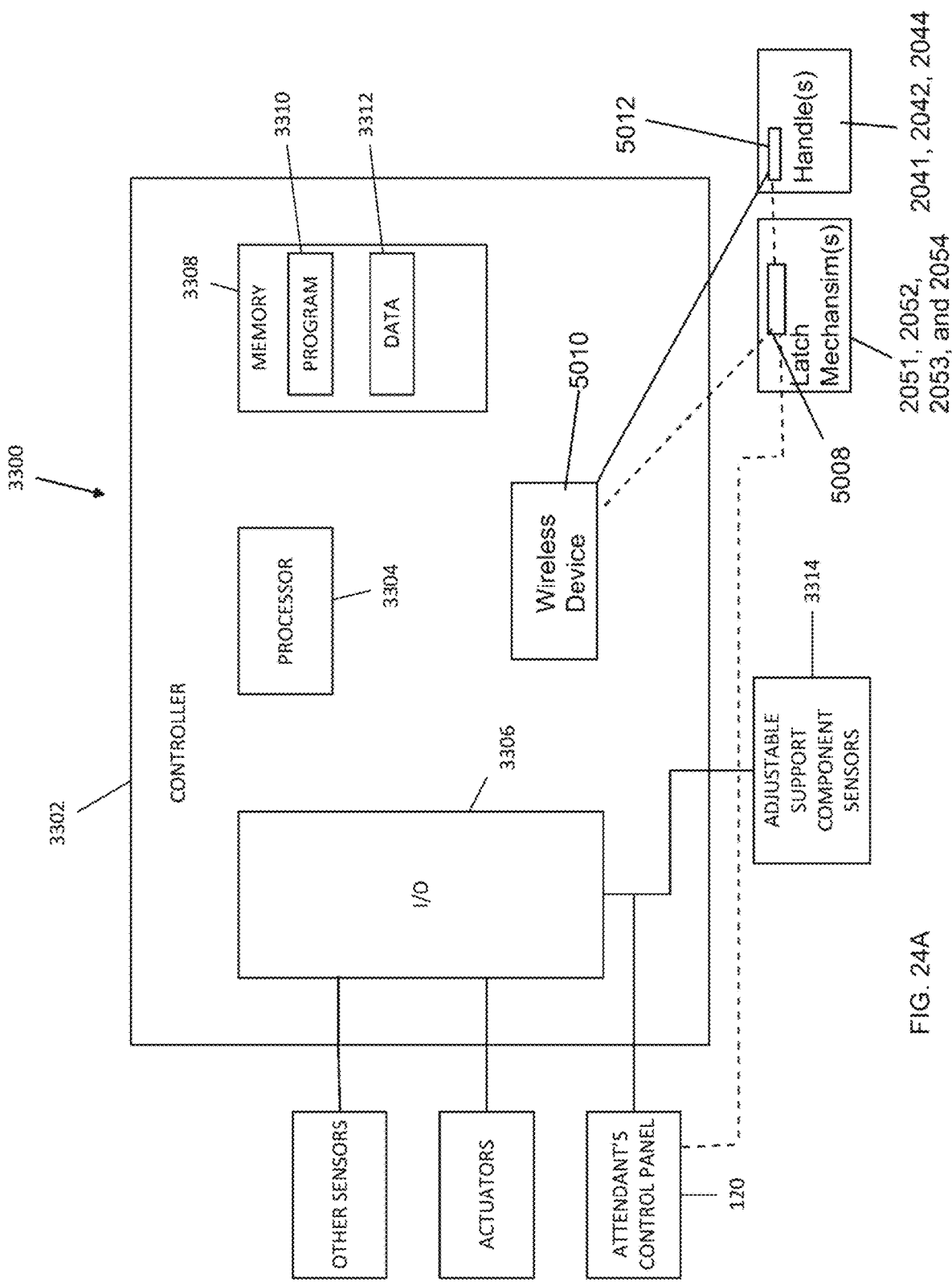
FIG. 24A is a block diagram of an embodiment of a control system for a patient support whereby communication may occur via wireless device mounted to the control board or mounted locally on the patient support, such as at the attendants control panel or in a separate panel or other input device.
Figure 25:
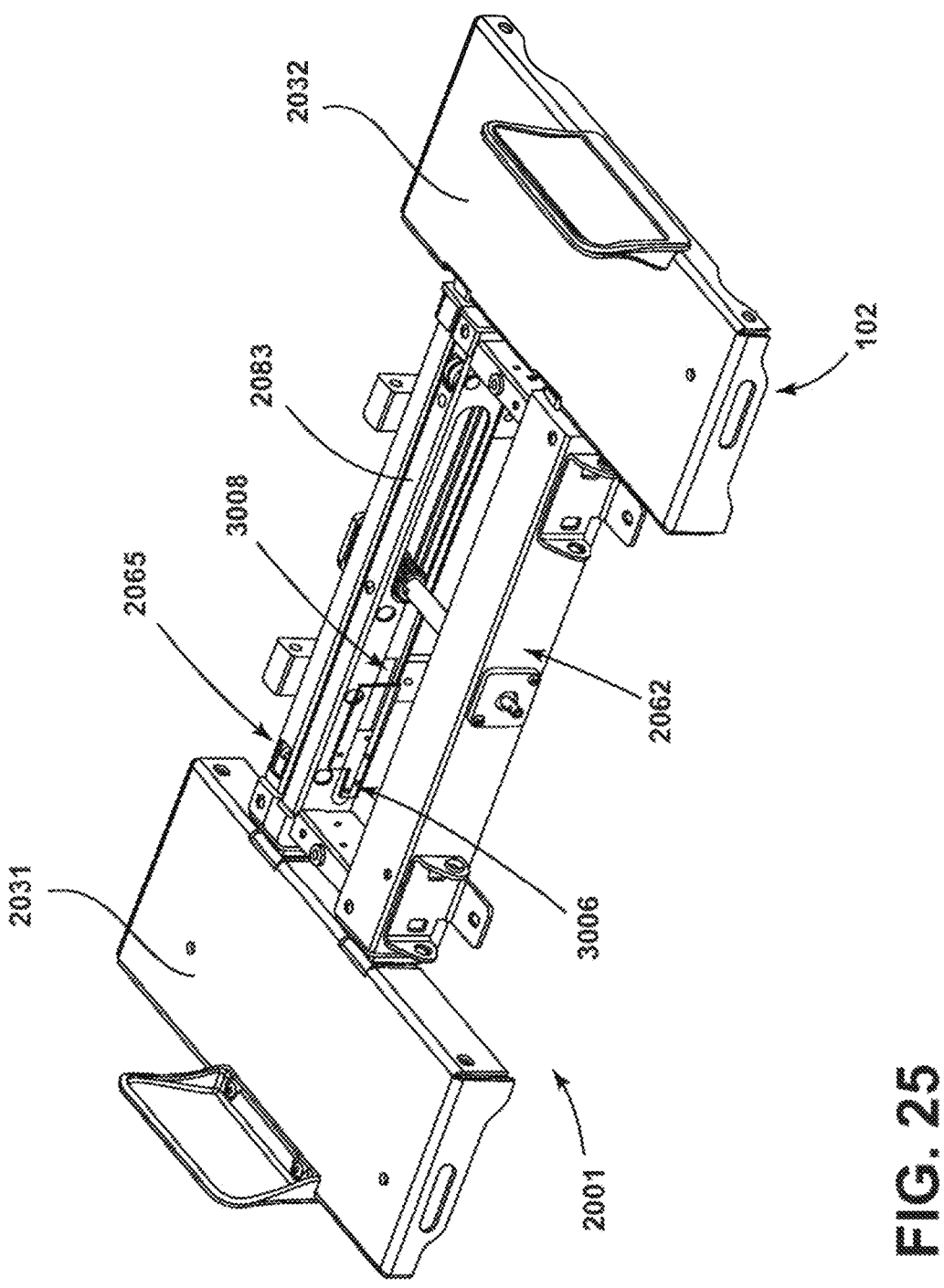
FIG. 25 is a perspective view of a seat deck section of the patient support deck of including an optical sensor for sensing the width of the seat deck section of the adjustable patient support deck.
Figure 26:
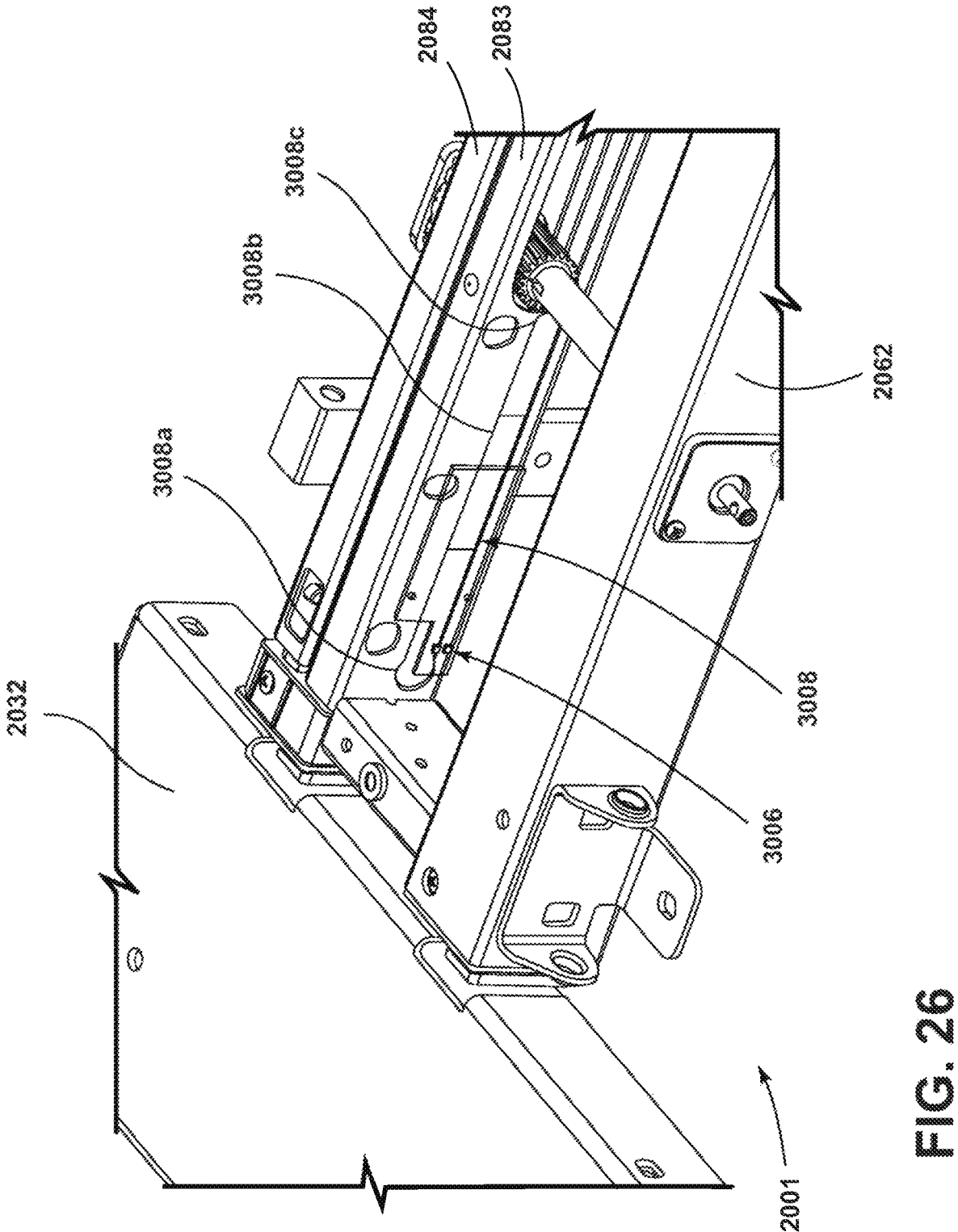
FIG. 26 is an enlarged view of the patient support deck of FIG. 25 at a standard first width.
Figure 27:
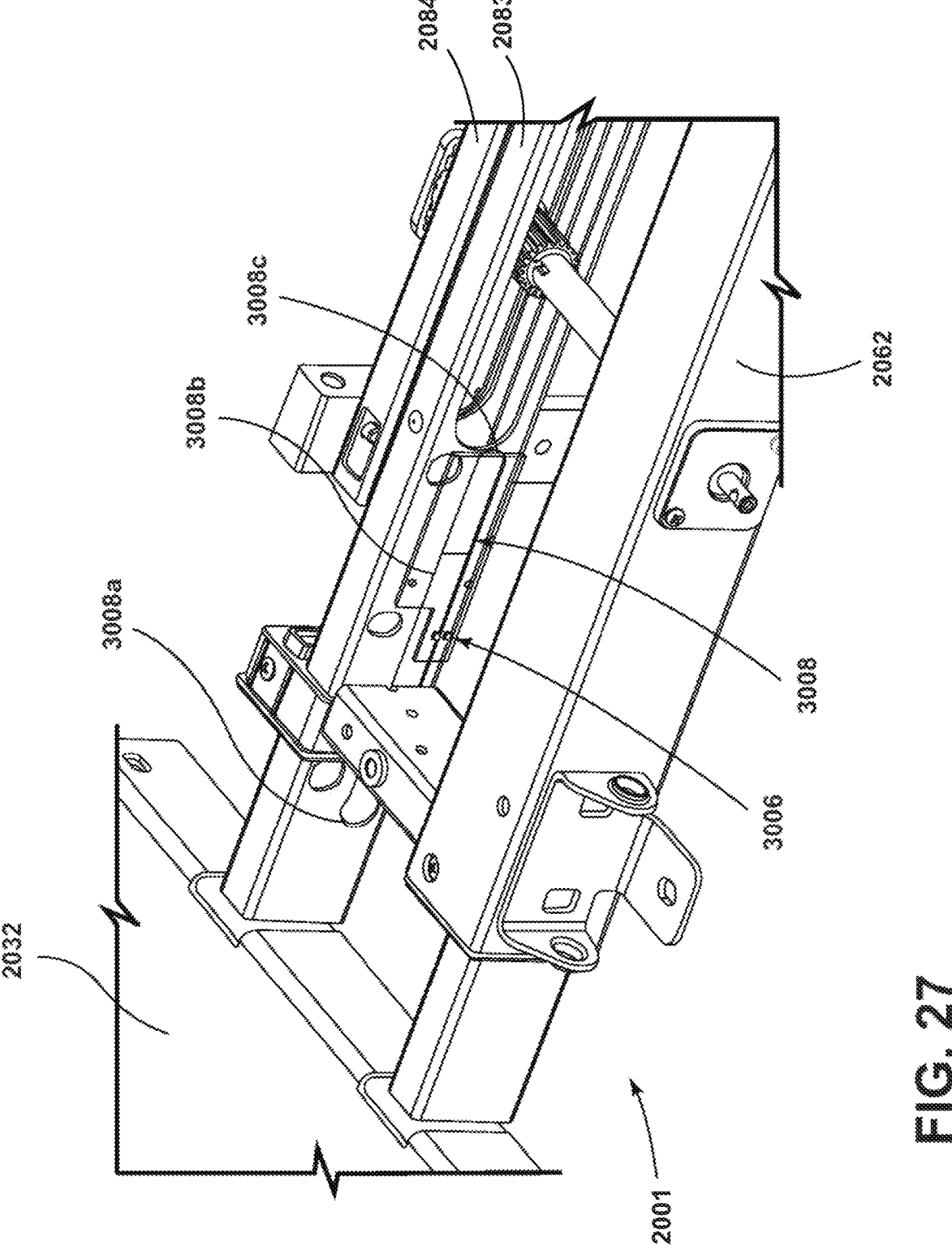
FIG. 27 is an enlarged view of the patient support deck of FIG. 25 at an intermediate second width.

In addition, referring to FIG. 24, patient support 100 includes a control system 3300 for controlling the various actuators at the patient support 100 and, further, for monitoring the status of the patient support 100. For example, control system 3300 may monitor the status of one or more adjustable patient support components, such as the patient support deck 104, the wheeled base (formed by caster frame 142), and/or headboard 106. The status may be the width or length of the deck or the wheeled base or the width of the headboard, and/or the locked status of any of these components. Further, the control system 3300 may monitor the status of other components, such as the deck actuators that articulate the deck sections, the side rails, the lift mechanism, the casters, and/or the drive system (noted below).

In order to reduce the occurrence of pinch points, interference between two or more components of the patient support, interference between the patient support and other structures, such as doorways, and/or possible instability when the patient support configuration, such as width and/or length, is adjusted, control system 3300 detects the status of the patient support and may take one more affirmative actions to avoid pinch points, interference, and/or stability. As described more fully below, these actions may simply include generating a signal to issue an alert, a prompt to a caregiver to take action, and/or to restrict motion of the patient support itself or one or more of its components, such as the lift mechanism and/or deck actuators.

In one embodiment, when the patient support deck is adjusted, and the deck sections are adjusted to and locked at the same width relative to one another, they may be considered by the control system to be in an acceptable or approved deck width configuration. In contrast, when the deck is adjusted, with the deck section moved to different widths relative to one another, they may be considered to be in an unacceptable deck width configuration. Similarly, when the deck sections are unlocked, regardless of their position, they may be considered to be in an unacceptable deck configuration. As more fully described below, therefore, patient support 100 may be configured to detect and monitor the width and/or locked status of each deck section. Further, in some cases, the width may be unknown, which the control system 3300 may treat it as an unacceptable configuration.

When the width of the headboard is increased, the increased width alone may be acceptable but if it is widened and not locked, control system 3300 may be configured to consider it to be in an unacceptable configuration, or in an acceptable configuration when locked. On the other hand, regardless of the width of the headboard, when the headboard is unlocked, control system 3300 may be configured to consider it to be in an unacceptable configuration. Similarly, even when locked in its unexpanded configuration but where the patient support deck 104 is widened, the control system 3300 may be configured to consider the headboard to be in an unacceptable configuration. Likewise, when the headboard 106 is locked and in its expanded configuration, but the patient support deck 104 is no longer widened, the control system 3300 may be configured to consider the headboard to be in an unacceptable configuration.

With regard to the wheeled base, when the base width (or length) is increased, the increased dimension alone may be acceptable, but if it is widened and/or lengthened and not locked, control system 3300 may be configured to consider the base to be in an unacceptable configuration (or in an acceptable configuration when locked). On the other hand, regardless of the width/length of the wheeled base, when the wheeled base is unlocked, control system 3300 may be configured to consider it to be in an unacceptable configuration. Similarly, even when locked in its unexpanded configuration, but where the patient support deck 104 is widened, the control system 3300 may be configured to consider the wheeled base to be in an unacceptable configuration. Likewise, when the base is locked and its expanded configuration, but the patient support deck 104 is no longer widened, the control system 3300 may be configured to consider the wheeled base to be in an unacceptable configuration.

It should be understood that other inputs to the control system may be used to determine when the patient support deck, the headboard, and/or the wheeled base is in an unacceptable configuration. For example, control system 3300 may use inputs, such as the status of the casters (e.g., unlocked or locked), the status of the deck section latch mechanisms (e.g., locked or unlocked) and/or the status of the drive system described below. For example, if a user tries to operate the drive system, control system 3300 may check the status of any of the adjustable width or length components (or locked or unlocked status of the deck section latch mechanisms) prior to allowing the user to operate the drive system, for example, when any of the adjustable components is in a widened and/or lengthened configuration (or the deck section latch mechanisms are unlocked). Or control system 3300 may simply alert the user that the adjustable component(s) is in an unacceptable configuration and/or prompt the user (e.g., with instructions) to take action, for example, to return the adjustable component(s) to is unexpanded and locked configuration.

As noted above, patient support 100 includes upper frame 102 that supports adjustable patient support deck 104, which is positioned thereon to receive a patient support surface (or "mattress") for supporting a patient thereon. For clarity, the mattress is not illustrated. The patient support deck 104 may be an articulatable deck. For example, in the illustrated embodiment, patient support deck 104 includes a head deck section 105 (referred to as the "Fowler" section) capable of tilting up to form a backrest and tilting down to a prone position (prone position shown). At a head end of the patient support 100 may be a headboard 106, while a footboard 108 may be attached to the upper frame 102 at a foot end of the patient support 100. The headboard 106 and footboard 108 may be collectively known as end boards.

Patient support 100 may also include one or more guard structures, such as side rails, including head end side rails 110 and foot end side rails 113, which may be positioned on each side of the patient support 100. Such side rails 110, 113 may be moveable so as to facilitate entry and exit of a patient. In addition, on a width adjustable patient support it may be desirable for the guard structures to be adjustable laterally along with the patient support deck. While guard structures at the head end of the patient support have been mounted on the patient support deck in order to be raised together with the deck when the deck is articulated, guard structures nearer the head end or foot end of the patient support may be mounted on the frame supporting the deck, such as the headboards and footboards.

In FIG. 1A, the side rails 110, 113 are all shown in the raised or guard position, while in FIG. 1B, the side rails 110, 113 on the patient right side of the patient support are shown in the tucked position whereby the rails 110, 113 are shown in ultra-low positions and tucked under the patient support deck 104. Suitable guard structures that may be used in patient support 100 are described in more detail in U.S. application Ser. No. 15/394,111, filed Dec. 29, 2016, entitled "PATIENT SUPPORT USABLE WITH BARIATRIC PATIENTS," the entire content of which is herein incorporated by reference.

Figure 2A:
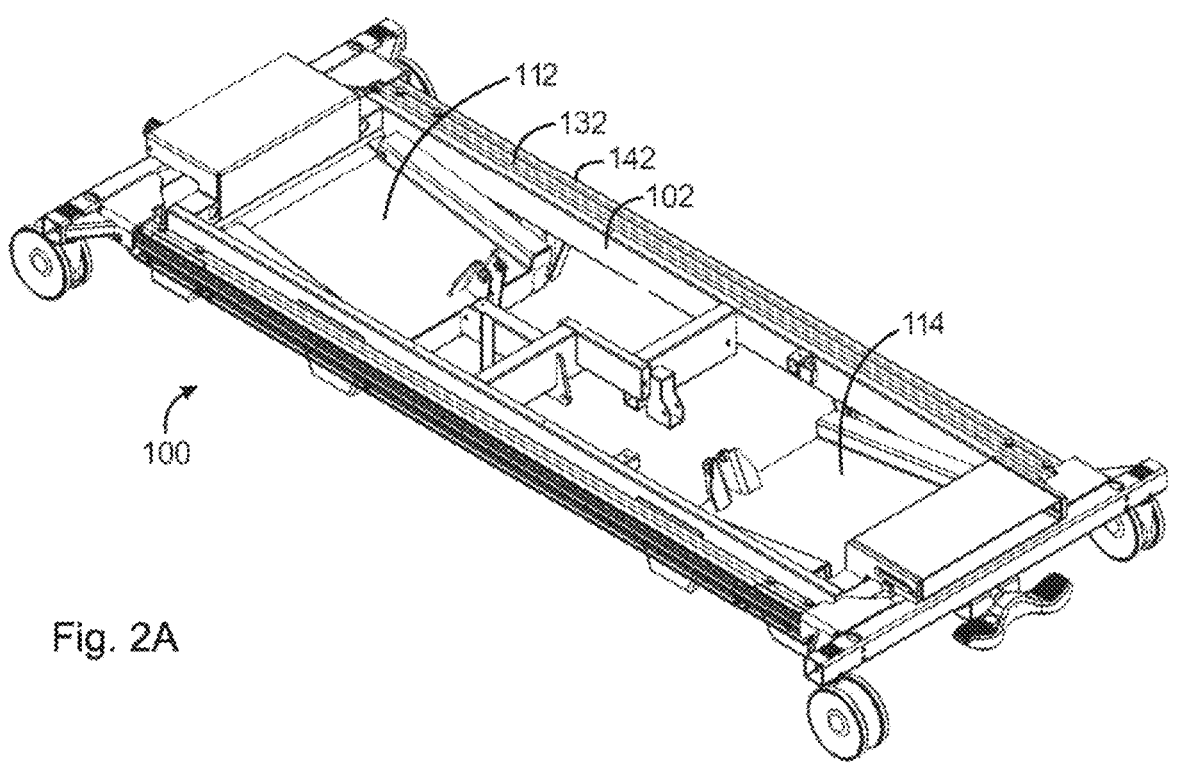
FIG. 2A is a perspective view of one embodiment of a lift mechanism of an adjustable patient support in an ultralow position shown in context with an upper frame, lower frame and caster frame of the patient support.
Figure 2B:
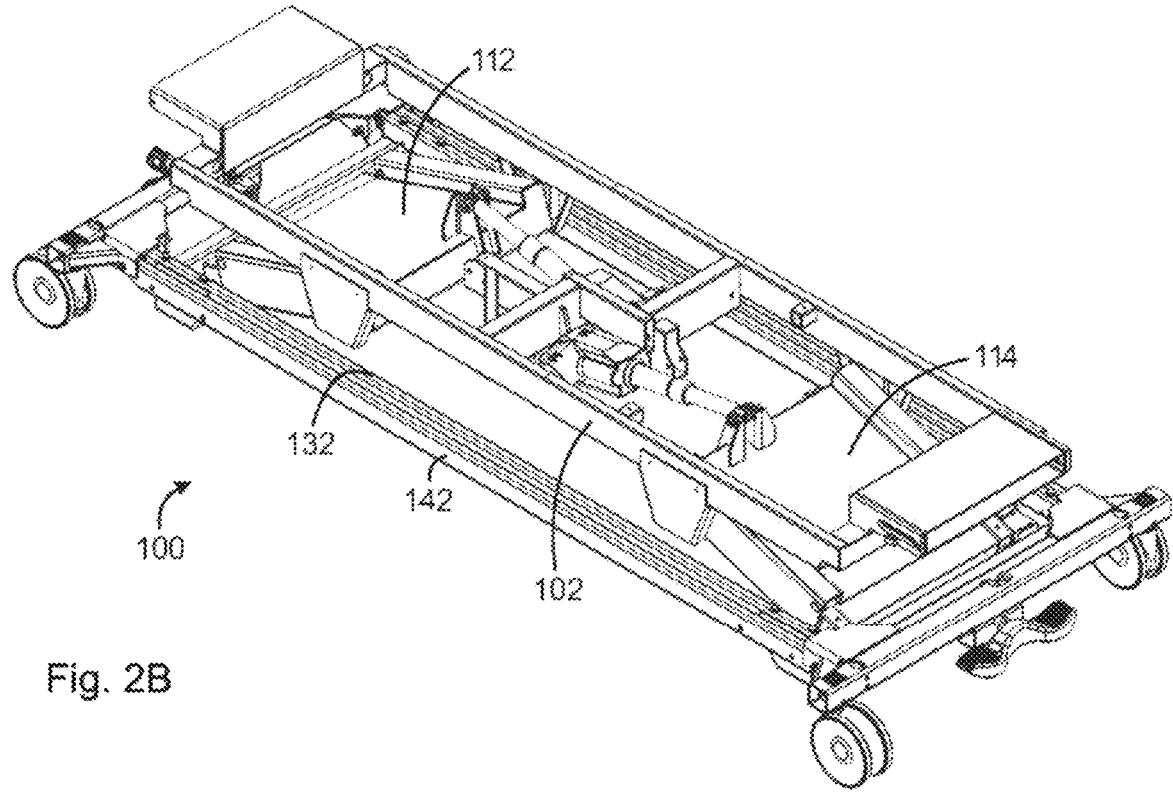
FIG. 2B the adjustable patient support of FIG. 2A in a low position including upper leg lift actuators.
Figure 7:
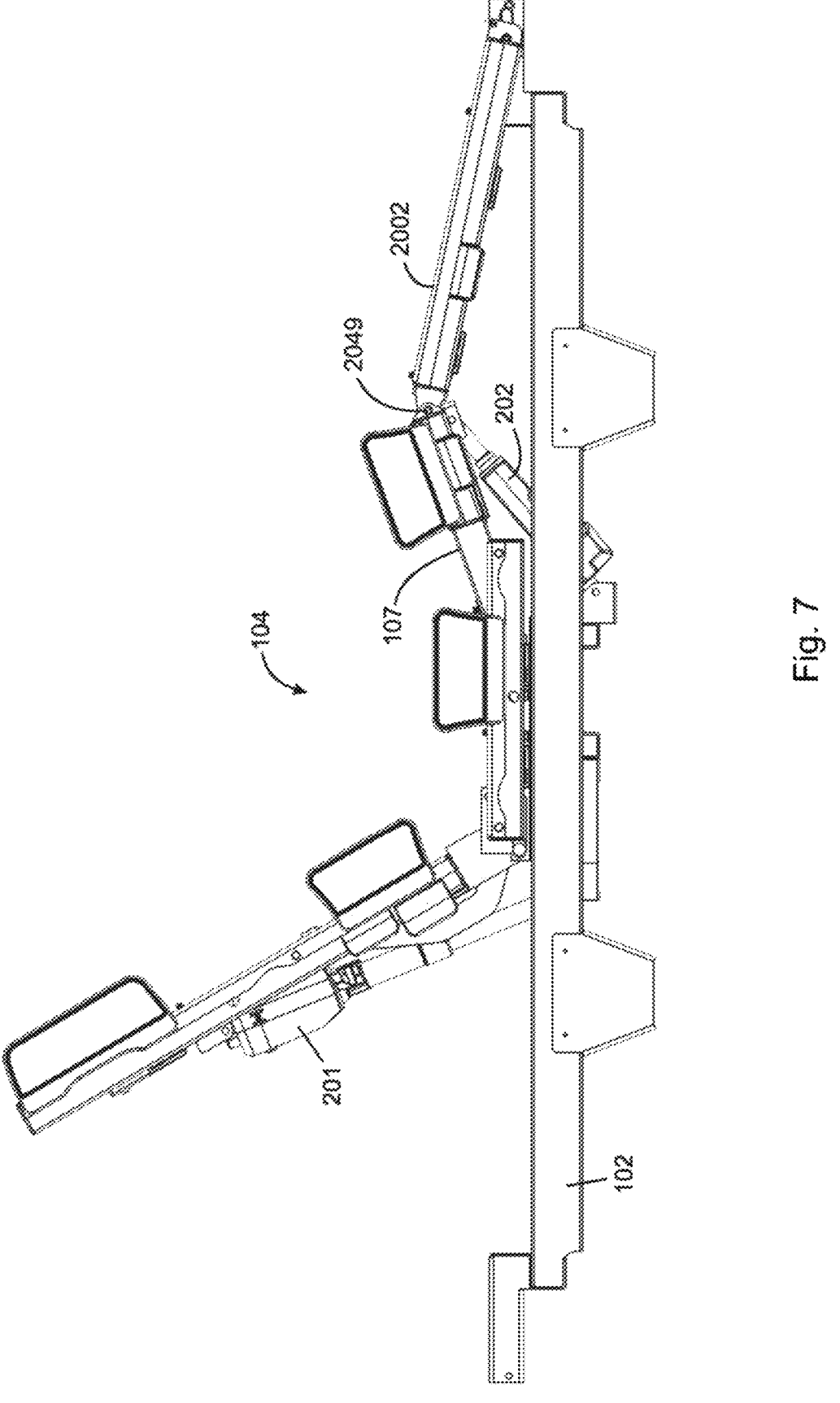
FIG. 7 is a side view of FIG. 6.
Figure 8:
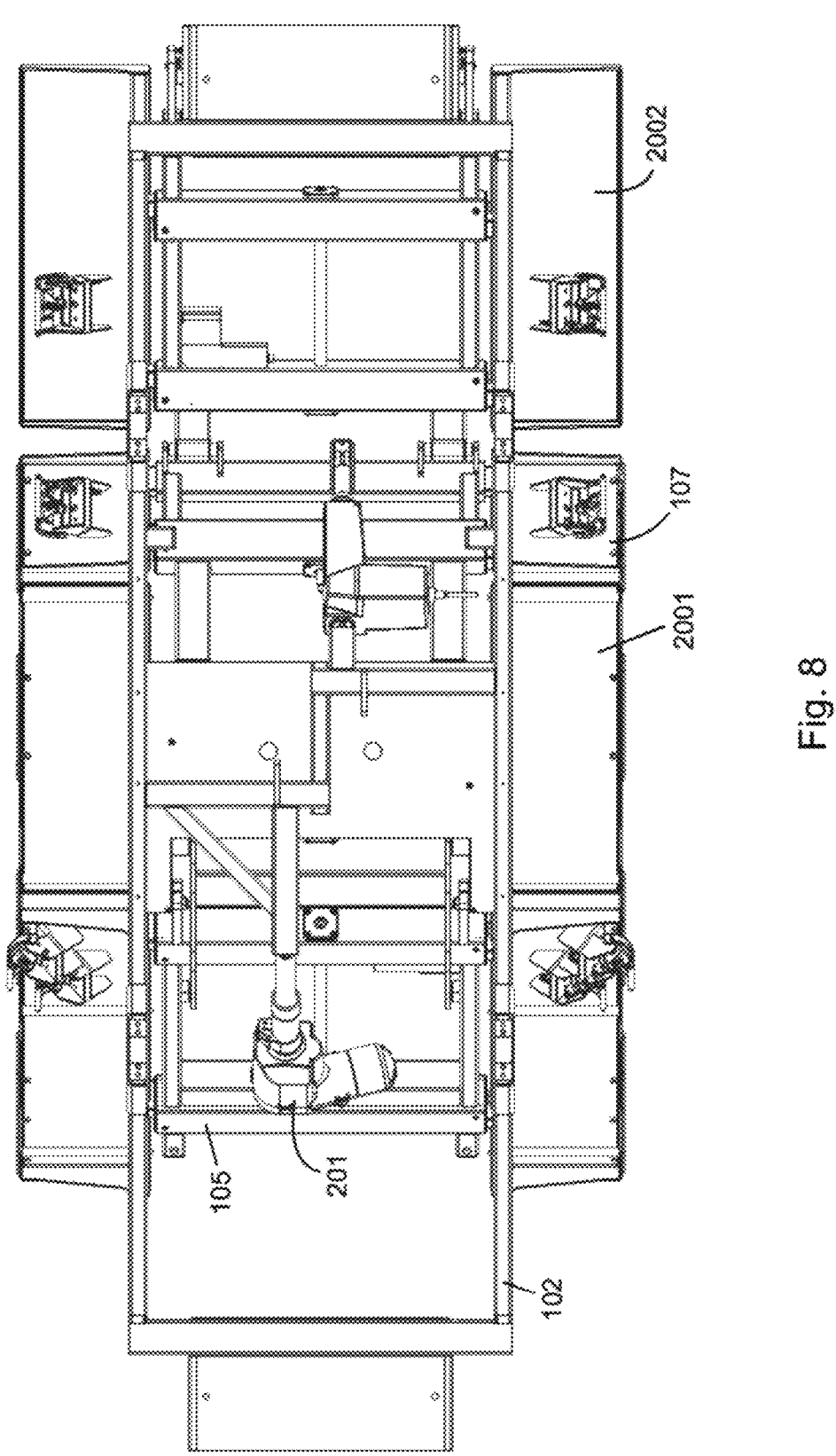
FIG. 8 is a bottom view of FIG. 6.

The patient support 100 may include a lift mechanism for raising or lowering upper frame 102 and deck 104. In the illustrated embodiment, and referring to FIGS. 2A and 2B, the lift mechanism includes two leg assemblies 112, 114. The head end leg assembly 112 may be connected at the head end of the patient support 100 and the foot end leg assembly 114 may be connected at the foot end of the patient support 100. The leg assemblies 112, 114 may be connected to one or more actuators in a manner whereby the actuators may raise and lower the upper frame 102. Articulation of the patient support deck 104 relative to support upper frame 102 may be controlled by actuators 201, 202 (e.g., FIG. 7) that adjust the tilt of the head deck 105 of the patient support deck 104 as well as the height of a knee deck section 107 of the patient support deck 104. Optionally, the deck may also include a CPR release, for example, which may be released by handle 124 (FIGS. 13 and 14), such as described in the above referenced application.

The lower ends of the leg assemblies 112, 114 may be connected to the lower frame 132. The lower frame 132 may be large enough so that when the upper frame 102 is at its lowest position, the upper frame 102 may be nested within the lower frame 132. The lower frame 132 may be nested within and suspended by a caster frame 142, with the lower frame comprising four load cells (not shown) resting on the caster frame 142.

Connected to the caster frame 142 at each of the foot end and head end may be two caster assemblies 118, each assembly comprising two casters 119 that allow the patient support 100 to be moved to different locations. Brake pedals 117 may be provided at the head end and foot end (the head end one not shown), which permit locking the foot end, head end or both the foot end and head end casters in full stop or tracking straight positions, in addition to permitting the casters to rotate and travel freely when needed.

Optionally, control system 3300 may be configured to provide electric control over the braking or unbraking of the casters and, further, so that the caster brake status may be detected (and optionally used as input to control system 3300) and/or changed in response to detecting a change in status of one of the monitored adjustable patient support components, more fully described below. For an example of an electrically controlled brake caster system, reference is made to U.S. Pat. No. 8,701,229, owned by Stryker Corporation of Kalamazoo, Michigan, which is incorporated by reference in its entirety herein.

In one embodiment, the patient support 100 may also incorporate a drive mechanism to power the bed movement. For example, patient support 100 may incorporate a ZOOM® drive system, available from Stryker Corporation of Kalamazoo, Michigan, which is controlled by control system 3300. Optionally, control system 3300 may prohibit the use of the drive system when any one of the adjustable components, such as the patient support deck, the headboard 106, or the base, are widened and/or in an unacceptable configuration.

In one embodiment, when the deck width expansion is motorized, the adjustment of the deck width may be prohibited by the control system 3300 based on specific conditions, such as the side rails not being raised, the deck not being flat, the casters not being locked, or a patient is detected on the bed, for example, via load cells on the bed, or other weight sensors.

The patient support 100 may further include control circuitry and an caregiver's control panel 120 located, for example, at the footboard 108, which is in communication with control system 3300. The caregiver's control panel 120 may, among other things, control the width and height of the upper frame 102, the width and/or length of the base, the width of the headboard, and width and/or length of the patient support deck 104, as well as the articulation of the patient support deck 104. To allow for similar adjustment, an occupant's control panel may be provided, for example, on a side rail.

Control panels may include user interfaces, for example, buttons and/or a display. The buttons may be keypad style buttons that operate as momentary contact switches (also known as "hold-to-run" switches). Buttons may be provided to raise and lower the upper frame 102, articulate the patient support deck 104, set/pause/reset an exit alarm, zero an occupant weight reading, lockout controls, and to enable other functions. The control panels may have different sets of buttons for different sets of functions, with the caregiver's control panel 120 typically having a wider array of functions available than any occupant's control panel that may be provided on the patient support. For example, the caregiver's control panel may include a display, including a touchscreen display, which can display the alerts and prompts described below, and also provide a user interface and have touch screen areas that that form buttons. Other styles of user interface and buttons are also suitable. The user interface of the control panels may include indicators, such as printed graphics or graphics on the display, for describing the functions of the buttons or other interface and as well as indicating data related to the patient support 100, including the alerts and prompts noted below.

Figure 3:
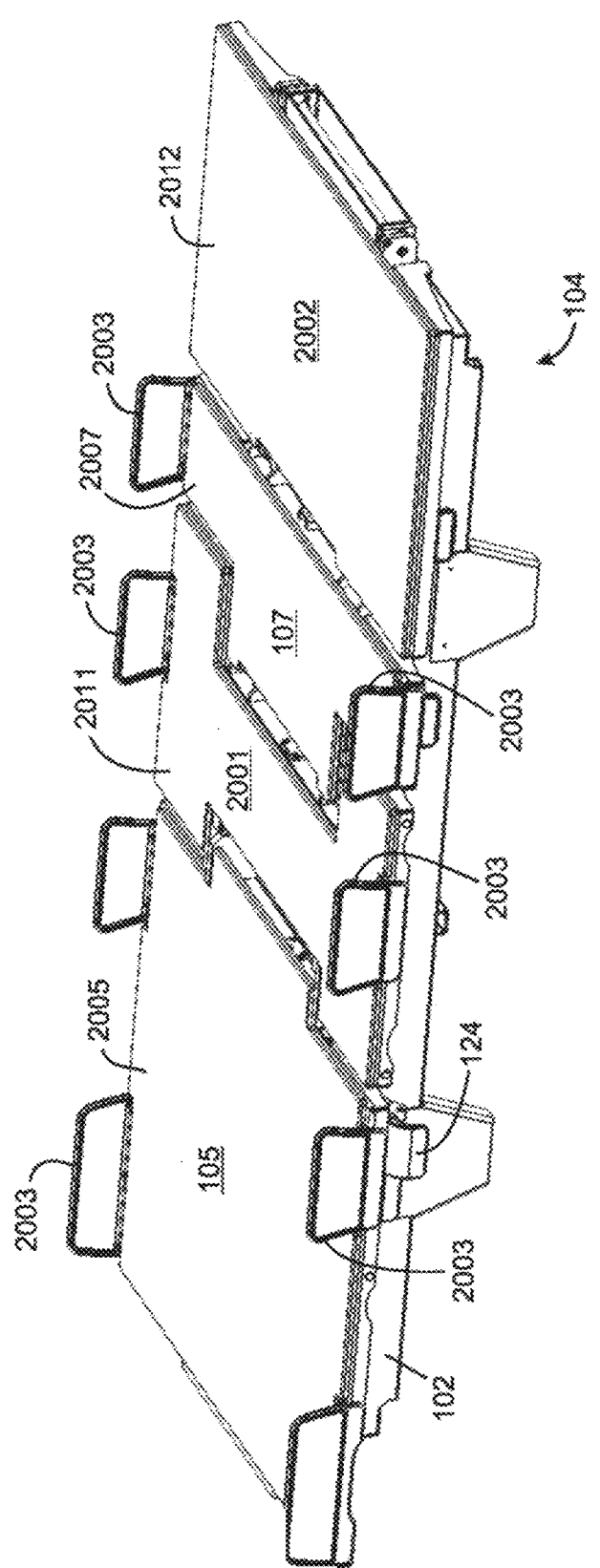
FIG. 3 is a perspective view of an adjustable patient support deck of the patient support of FIG. 1A shown in a horizontal prone position.
Figure 4:
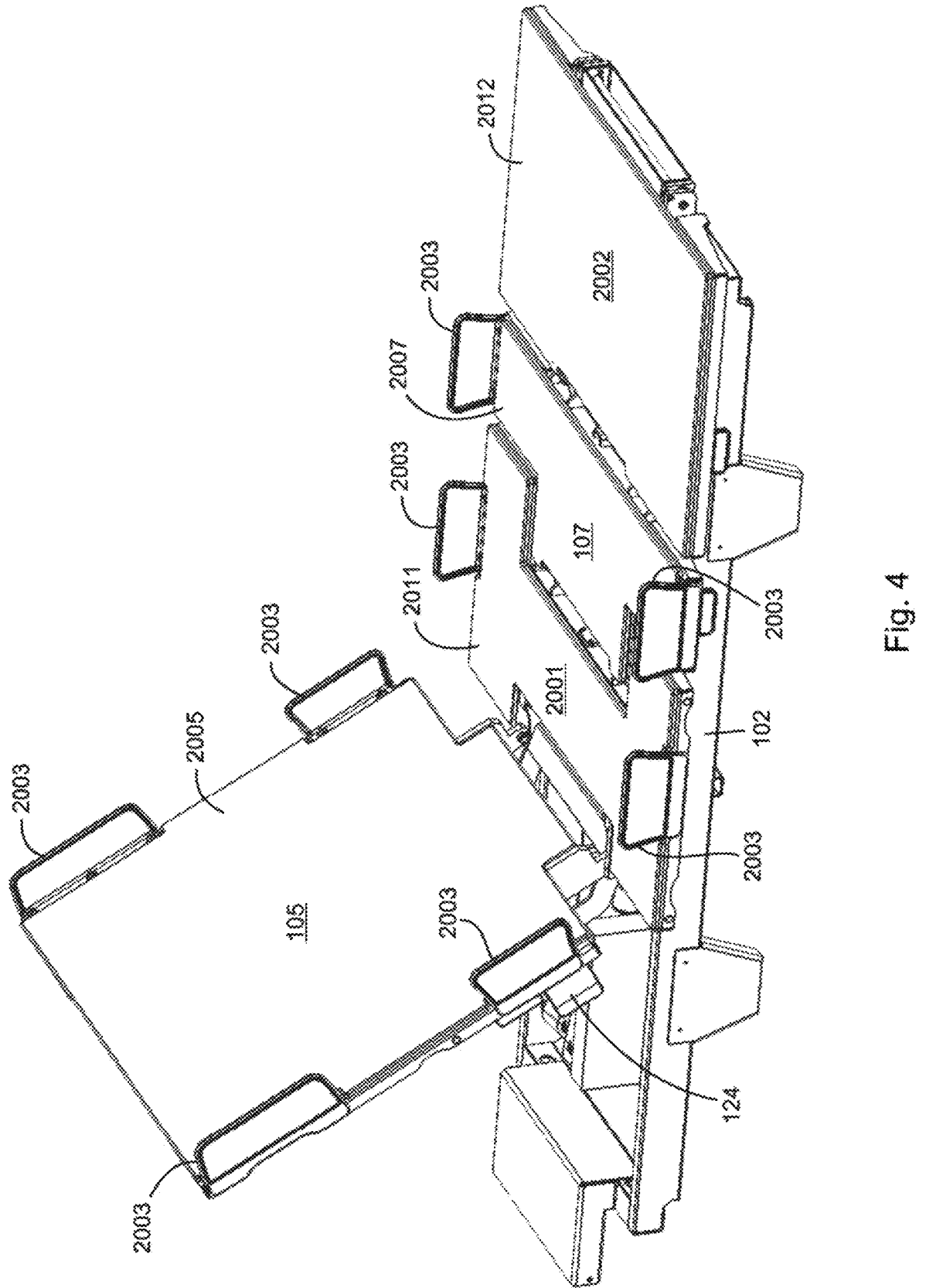
FIG. 4 is a perspective view of an adjustable patient support deck of the patient support of FIG. 1A shown in an articulating position with a head deck section tilted up to form a backrest.
Figure 5:
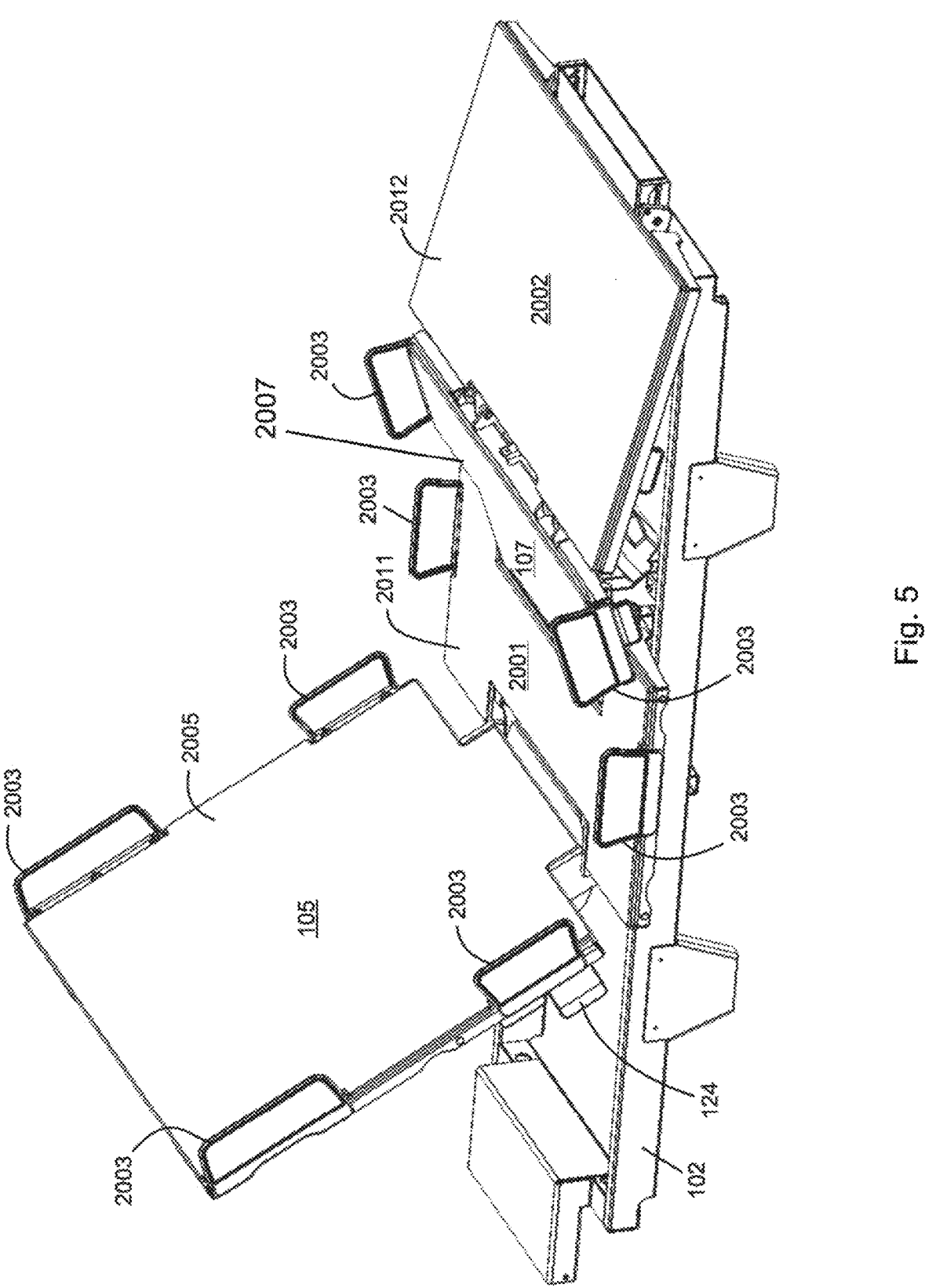
FIG. 5 is a perspective view of an adjustable patient support deck of the patient support of FIG. 1A shown in a position with a head deck section tilted up to form a backrest and a knee deck section raised to form a knee support.
Figure 6:
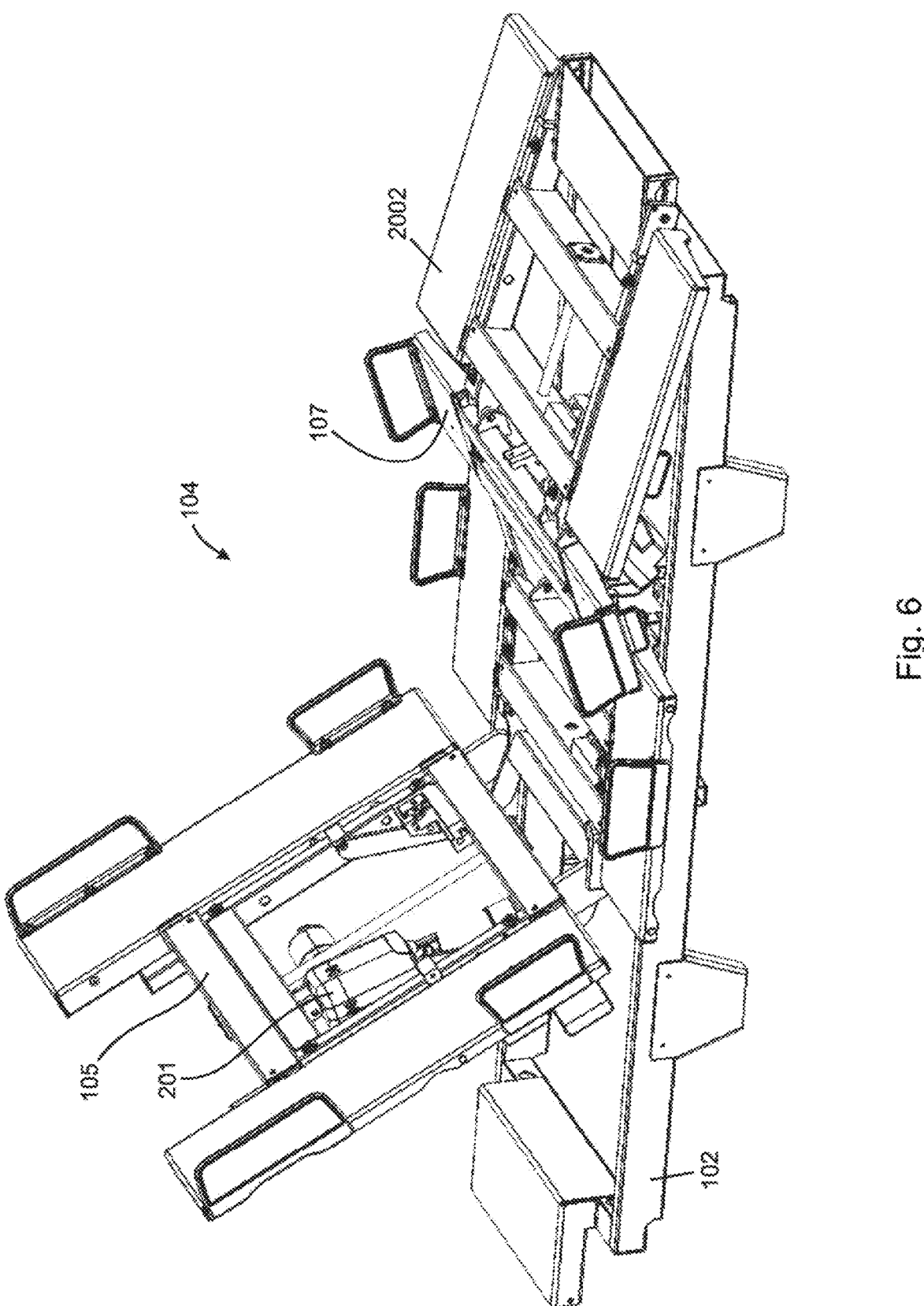
FIG. 6 is a view of the adjustable patient support deck of FIG. 5 without deck panels.

To provide flexibility in patient care and comfort, patient supports should be able to support patients in a number of different positions. The patient support described herein has such capability and may include multiple deck sections, namely the head deck section 105, the knee deck section 107, a seat deck section 2001, and a foot deck section 2002. Referring to FIG. 3, the patient support deck 104 may be in a horizontal prone position. Referring to FIG. 4, the patient support deck 104 may be in an articulating position, with the head deck section 105 tilted up relative to the upper frame 102 to form a backrest while the other portions remain horizontal. Referring to FIG. 5, the patient support deck 104 may be in a head-up, knees-up position with the head deck section 105 tilted up relative to the upper frame 102 to form a backrest and the knee deck section 107 and foot deck section 2002 tilted up relative to the upper frame 102 to form an inverted "V". The patient support deck 104 may also be in a vascular configuration with the head deck section 105 tilted up relative to the upper frame 102 to form a backrest, the knee deck section 107 tilted up relative to the upper frame 102 at the foot end to raise the knees, and the foot deck section 2002 raised, but horizontal. In all of the aforementioned positions, the seat deck section 2001 remains horizontal. The deck 104 may also be moved to the Trendelenburg position (head lower than foot) or the reverse Trendelenburg position (head higher than foot).

Most patient supports are designed to accommodate patients of average size and weight. For bariatric patients, normal patient supports are generally too small and lack sufficient structural strength to withstand the load of the patient. The patient support disclosed herein is structurally strong enough to accommodate greatly overweight patients and comprises features for extending the width and/or length of the caster frame, deck, headboard, and footboard to suitably accommodate both average-sized patients and bariatric patients. The width may be adjusted sideways in any increments, for example, between a first width such as for a standard patient support, a second intermediate width, and a third more expanded width for large bariatric patients. Commonly, a standard width is a 36″ width, with an intermediate width corresponding to a 42″ width, and a third more expanded width corresponding to a 48″ width, for example. As noted above other widths may be used.

Figure 9:
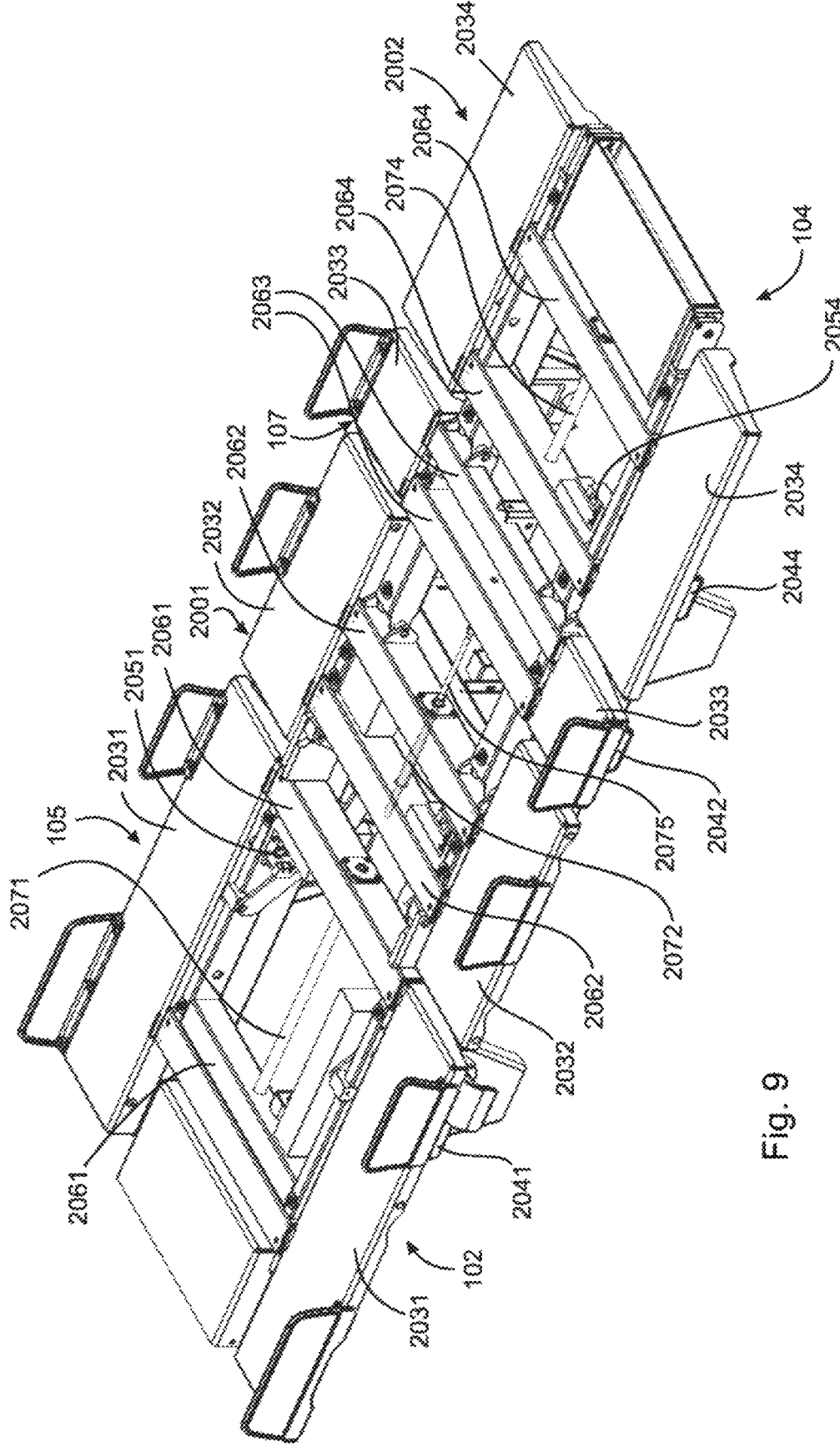
FIG. 9 is a perspective view of an adjustable patient support deck of the patient support of FIG. 1A shown in a horizontal prone position without deck panels at a standard first width.
Figure 10:
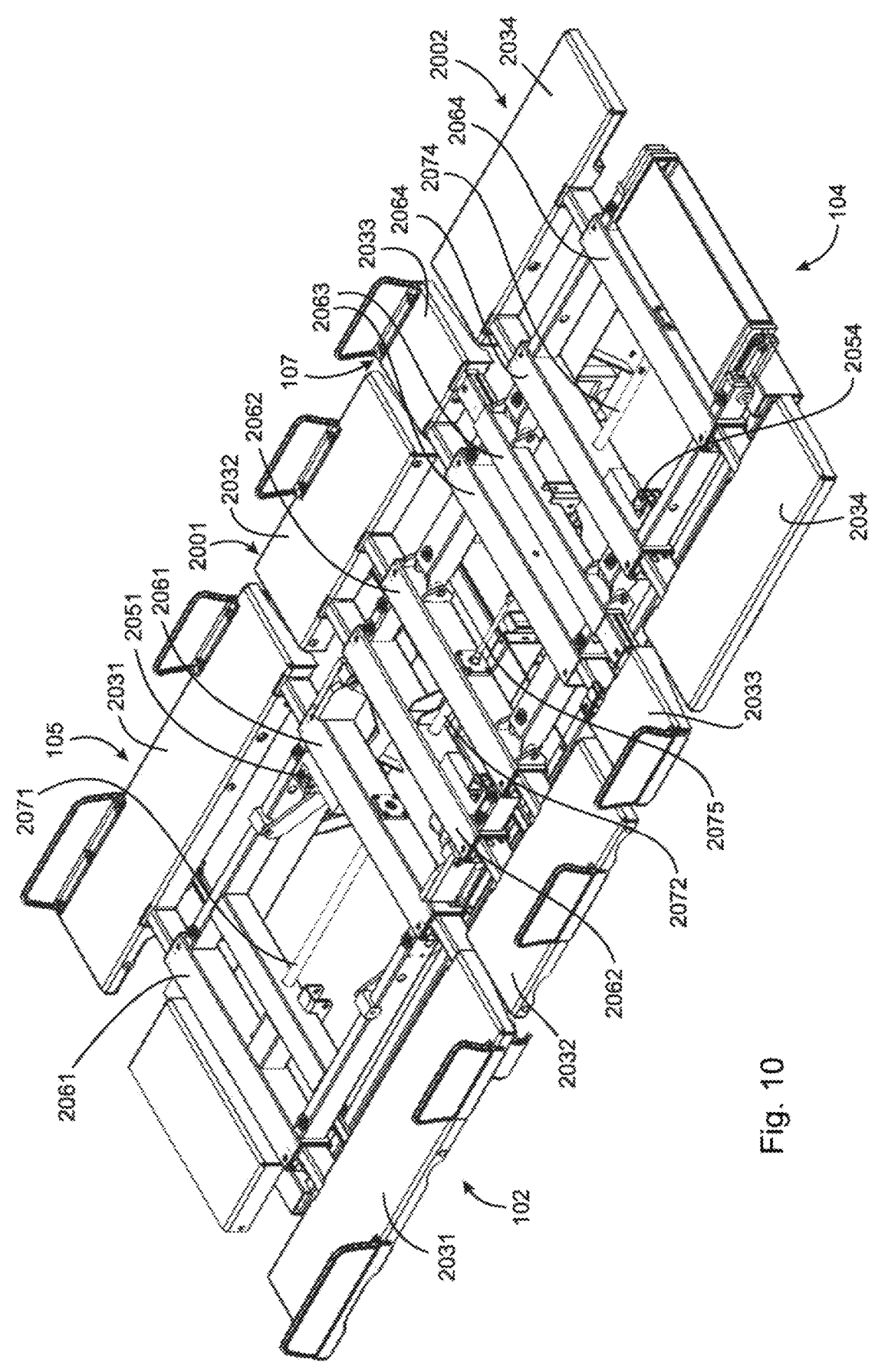
FIG. 10 shows the patient support deck of FIG. 9 expanded to a second intermediate width.
Figure 11:
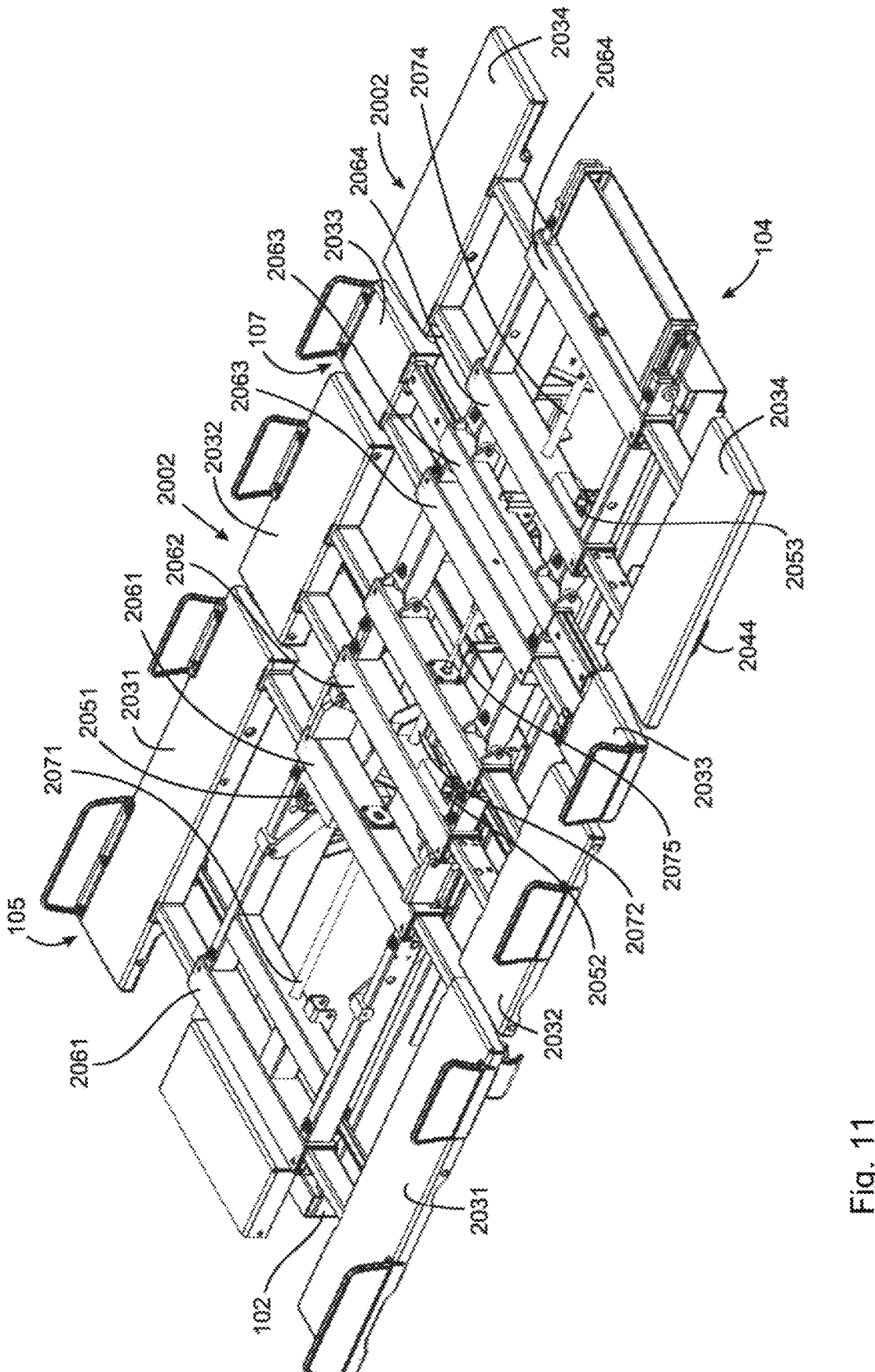
FIG. 11 shows the patient support deck of FIG. 9 expanded to a more expanded third width.

Referring to FIGS. 9-11, the patient support deck 104 is shown in a horizontal prone position with the deck sections adjusted to a standard first width, an intermediate second width, and a more expanded third width. To adjust the width of each deck section, each deck section includes left and right extendible sections. In the illustrated embodiment, the extendible sections are formed from deck extension pans 2031, 2032, 2033, and 2034.

For example, the head deck section 105 includes a central head deck panel 2005 and two head deck section extension pans 2031 on either side of the deck 104, which are normally under the central head deck section panel when the deck 104 is at standard width. Similarly, the seat deck section 2001 includes a central seat deck panel 2011 and two seat deck section extension pans 2032 on either side of the deck 104, which are normally under the central seat deck section panel when the deck 104 is at standard width. And, the knee deck section 107 includes a central knee deck panel 2007 and two knee deck section extension pans 2033 on either side of the deck 104, which are normally under the central knee deck section panel 2007 when the deck 104 is at standard width. The foot deck section 2002 also includes a central foot deck panel 2012 and two foot deck section extension pans 2034 on either side of the deck 104, which are normally under the central foot deck section panel when the deck 104 is at standard width. The deck extension pans may be made as thin as possible to provide more space under the deck extension pans to tuck the guard structures.

As seen in FIGS. 10-11, when the deck 104 is expanded, the deck extension pans 2031, 2032, 2033, and 2034, which are supported on deck extension pan cross-members, may be manually pulled laterally away to provide a wider surface. The deck extension pans that are normally under the deck panels may now be exposed to provide an extended surface on which a larger mattress may rest. The upper frame 102, which supports the deck 104, may or may not be configured to expand with the deck. In the illustrated embodiment, upper frame 102 has a fixed width and length.

As noted above, the width of head deck section 105 and foot deck section 2002 may be adjusted (expanded or contracted) independently. The seat deck section 2001 and knee deck section 107 may be adjusted together (or independently), but independently from the head and foot deck sections 105 and 2002. As noted, the deck extension pans may be moved manually or may be powered.

In a manual embodiment, handles may be provided on each side of the deck 104. For example, the deck 104 may include head deck section extension handles 2041, seat/knee deck section extension handles 2042, and/or foot deck section extension handles 2044. As described more fully below in reference to FIGS. 18 and 18A-18C, using these handles, the deck extension pans may be unlatched and then moved laterally by pulling or pushing. For example, the head deck section extension handles, seat/knee deck section extension handles, and foot deck section extension handles may be operationally connected to head deck section extension latch mechanism 2051, seat/knee deck section extension latch mechanism 2052 and 2053, and foot deck section extension latch mechanism 2054, respectively, via cables, such as push pull cables, which are coupled on one end to the handles and on their other end to the latch mechanisms. Each handle may be configured as a lever for pulling on the cable to thereby release the latch mechanisms. The latch mechanisms, also referred to as a deck lock, may immobilize the deck extension pans with a pin-in-hole structure where the latch pin extends into one of several holes provided on the movable section of the deck section to thereby lock the position of the movable portion of the deck section. When the cable is pulled by the handle, the cable pulls the latch pin out of the hole, but which then returns to its locked position when the handle is released by a spring which biases the latch pin in its locking position. Alternately, a push-pull cable configuration may be used, which can eliminate the need for the biasing spring and instead return the pin to its locked position under the force of the cable. In yet another embodiment, as noted below, the latch pin may be controlled by an actuator, such as solenoid (or a combination of a biasing spring and a solenoid) so that the latch mechanism may be controlled electrically and, further, wirelessly.

In the illustrated embodiment, the deck sections are manually adjusted and may be adjusted with a rack and pinion mechanism, as described below, that allows for bi-directional adjustment of the width of the patient support deck.

To expand the respective deck sections, one or more rack and pinion mechanisms in each deck section may be employed. The head deck section 105 may have two head rack and pinion mechanisms housed in head deck section rack and pinion mechanism housing tubes 2061. The two head rack and pinion mechanisms may be linked by a pinion gear shaft 2072 so that the two head rack and pinion mechanisms operate in unison to expand the head deck section 105 when a pulling force is applied to one of the deck section pans. The seat deck section 2001 and knee deck section 107 may have two rack and pinion mechanisms, each housed in seat and knee deck section rack and pinion mechanism housing tubes 2062, 2063, respectively. The seat and knee deck section rack and pinion mechanisms may be linked by pinion gear shafts 2072, 2073, respectively. The rack and pinion mechanisms of seat deck section 2001 may be linked by pinion gear shaft 2075 to the rack and pinion mechanisms of the knee deck section 107 so that the four rack and pinion mechanisms operate in unison to expand the seat-supporting and knee deck sections together when a manual force is applied to one of the deck section pans. In this because they are coupled together and they may, therefore, share a common latch and sensor.

In an alternative embodiment, one of the rack and pinion mechanisms of the deck section, such as in the knee deck section 107, may be replaced by a simple slide mechanism, for example a tube-in-tube arrangement. In this manner, the deck section may have a single rack and pinion mechanism.

The foot deck section 2002 may have two foot deck section rack and pinion mechanisms housed in foot deck section rack and pinion mechanism housing tubes 2064. The two foot deck section rack and pinion mechanisms may be linked by pinion gear shaft 2074 so that the two foot deck section rack and pinion mechanisms operate in unison to expand the foot deck section 2002.

To illustrate more clearly the operation of the rack and pinion mechanisms and the deck extension latch mechanisms, reference is made to FIGS. 13-17, which illustrate a rack and pinion mechanism 2065 and the deck extension latch mechanism 2051 of the head deck section 105. The rack and pinion mechanisms and the deck extension latch mechanisms of the other deck portions may be similar.

As discussed above, the head deck section 105 may comprise two head deck section extension pans 2031, one on each side of the head deck section, on which may be mounted mattress keepers 2003. The head deck section extension handles 2041 may be cabled or electronically connected to the head deck section extension latch mechanism 2051 so that pulling on the handle disengages the head deck section extension latch mechanism 2051 so that the head deck section 105 may be expanded.

Each rack and pinion mechanism 2065 may engage two extension cross-members for a total of four extension cross-members 2081, 2082, 2083, and 2084. Extension cross-members 2081 and 2083 may be fixed to and support the head deck section extension pan on one side of the head deck section, and extension cross-members 2082 and 2084 may be fixed to and support the head deck section extension pan on the other side of the head deck section. The extension cross-members may be configured so that the extension cross-members supporting one deck extension pan may be directly adjacent corresponding extension cross-members supporting the other deck extension pan. Thus, extension cross-member 2083 may be adjacent to and located to the inside of extension cross-member 2084, while extension cross-member 2081, which supports the same deck extension pan as extension cross-member 2083, may be beside and located to the outside of extension cross-member 2082. The extension cross-members may be slidably supported in head deck section rack and pinion mechanism housing tube 2061 attached to the head deck section 105, the head deck section rack and pinion mechanism housing tube 2061 comprising tube cap 2070.

The extension cross-members 2081, 2082, 2083, and 2084 may include toothed racks 2076, 2077, 2080, and 2089, respectively. The extension cross-members 2081, 2082, 2083, and 2084 may instead have a toothed profile as shown, which serves as the toothed racks, or toothed racks may be machined and attached to the extension cross-members 2081, 2082, 2083, and 2084. The elongated through-apertures and toothed racks on neighboring extension cross-members may be aligned in the same horizontal plane so that pinion gear 2068 can mesh with and rest on toothed tracks 2076 and 2077, simultaneously, and pinion gear 2069 can mesh with and rest on toothed tracks 2080 and 2089, simultaneously. Each of the pinion gears 2068 and 2069 may alternatively be two separate gears for a total of four pinion gears, each associated with one of the four toothed tracks. The pinion gears 2068, 2069 may be mounted on and fixedly connected to pinion gear shaft 2071, with the pinion gear shaft 2071 capable of rotating with the pinion gears. The pinion gears 2068, 2069 and pinion gear shaft 2071 may be secured by pinion retainers 2078, 2079. The pinion retainers 2078 and 2079 may be fixedly mounted on the deck (mount not shown) to prevent longitudinal and lateral motion of the pinion gear shaft 2071, thereby keeping the pinion gears 2068, 2069 captured in their respective toothed tracks and on the same longitudinal axis while the gears and pinion gear shaft rotate.

In operation, activating the latch release structure of one of the head deck section extension handles 2041 may disengage the head deck section extension latch mechanism 2051, which permits lateral movement of the extension cross-members 2081, 2082, 2083, and 2084 and hence the head deck section extension pans 2031. If the head deck section extension handle 2041 on the head deck section extension pan 2031 supported on extension cross-members 2082 and 2084 is pulled, the extension cross-members 2082 and 2084 will be pulled laterally.

The lateral motion of the extension cross-members 2082 and 2084 may cause the pinion gears 2068, 2069 to rotate due to the action of the teeth in toothed tracks 2077, 2089 with which the pinion gears 2068, 2069 are meshed. Because the pinion gears 2068, 2069 are restricted from moving laterally, rotation of the pinion gears 2068, 2069 also may cause the extension cross-members 2081, 2083 to begin lateral movement since the two pinion gears 2068, 2069 may also be meshed with the toothed tracks 2076, 2080 in extension cross-members 2083, 2081, respectively. The extension cross-members 2081 and 2083 will move in the opposite direction than the extension cross-members 2082 and 2084 because they are on opposite sides of the head deck section 105.

Because the two pinion gears 2068, 2069 may be fixedly connected to the pinion gear shaft 2071, the rotational speeds of both gears may be the same, which prevents the extension cross-members at one end of the head deck section 105 from getting ahead of or behind the extension cross-members at the other end of the head deck section. In this way, the head deck section 105 may expand bi-directionally and uniformly without jamming of the extension cross-members. Further, because the extension cross-members supporting the head deck section extension pan on one side may be linked through the pinion gears 2068, 2069 to the extension cross-members supporting the head deck section extension pan on the other side, it is only necessary for one operator to operate the expanding feature from one side of the patient support.

Once the head deck section extension pans 2031 and the extension cross-members 2081, 2082, 2083, 2084 have moved laterally to the desired position (e.g., second width or third width), the head deck section extension latch mechanism 2051 re-engages. To return the head deck section 105 to a narrower width, the latch release structure of one of the head deck section extension handles 2041 may be activated again and the extension cross-members, together with the head deck section extension pan 2031 on one side, pushed laterally back toward the middle.

Alternatively or additionally, rotation of the pinion gears 2068, 2069 may be motorized by connecting the pinion gear shaft 2071 to an actuator. For example, a suitable actuator may be bi-directional, including a multi-speed actuator.

Wheels 2085, 2086, 2087, 2088 protruding from upper surfaces of the extension cross-members 2081, 2082, 2083, 2084, respectively, may be provided to reduce friction between the extension cross-members and the tubes 2061 housing the extension cross-members. Corresponding wheels 2085', 2086', 2087', 2088' protruding from the bottom surfaces of the extension cross-members may provide the same function below the extension cross-members.

Figure 13:
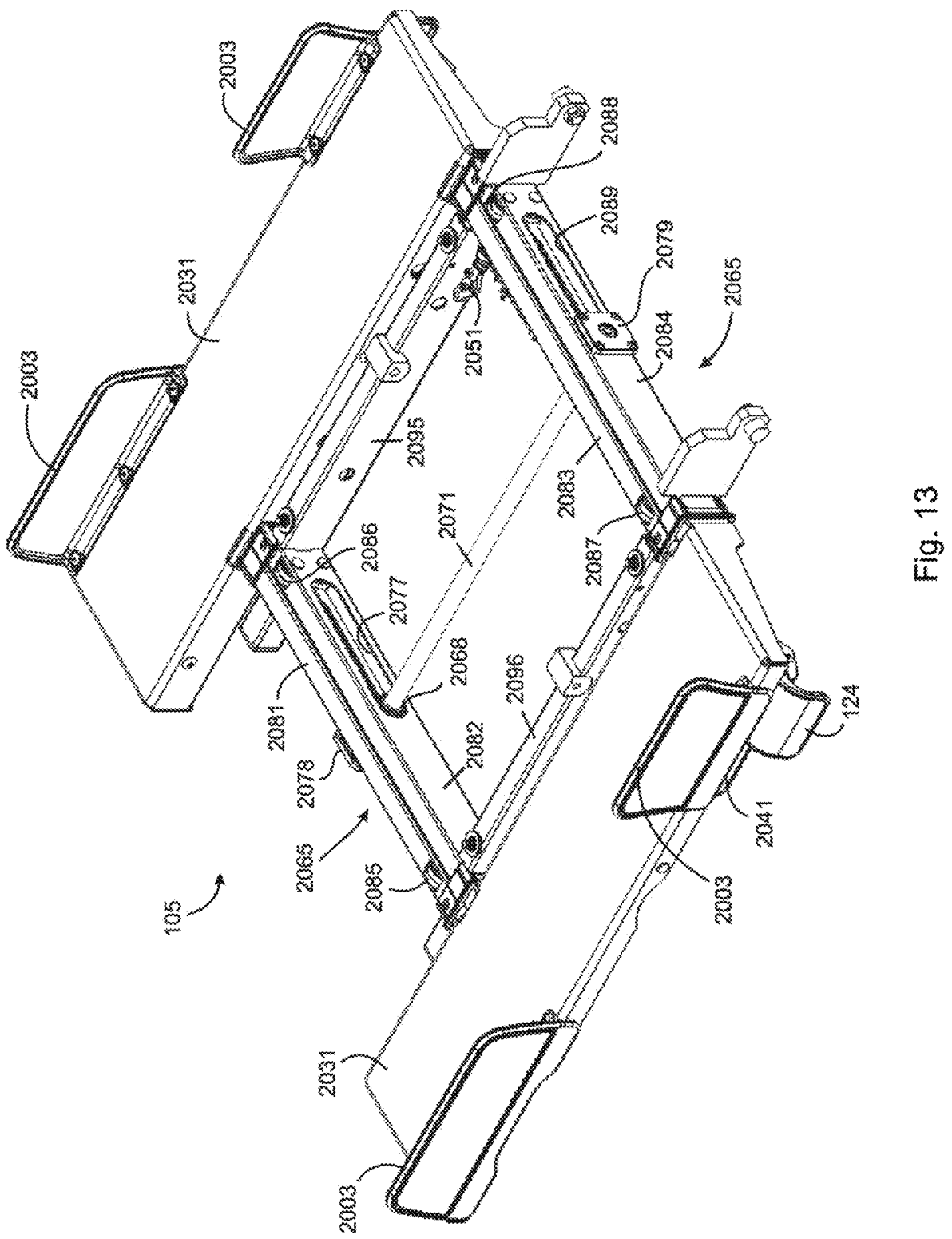
FIG. 13 is a plan perspective view of a head deck section of the patient support deck of FIG. 9 showing elements for expanding and latching the head deck section of the adjustable deck.
Figure 14:
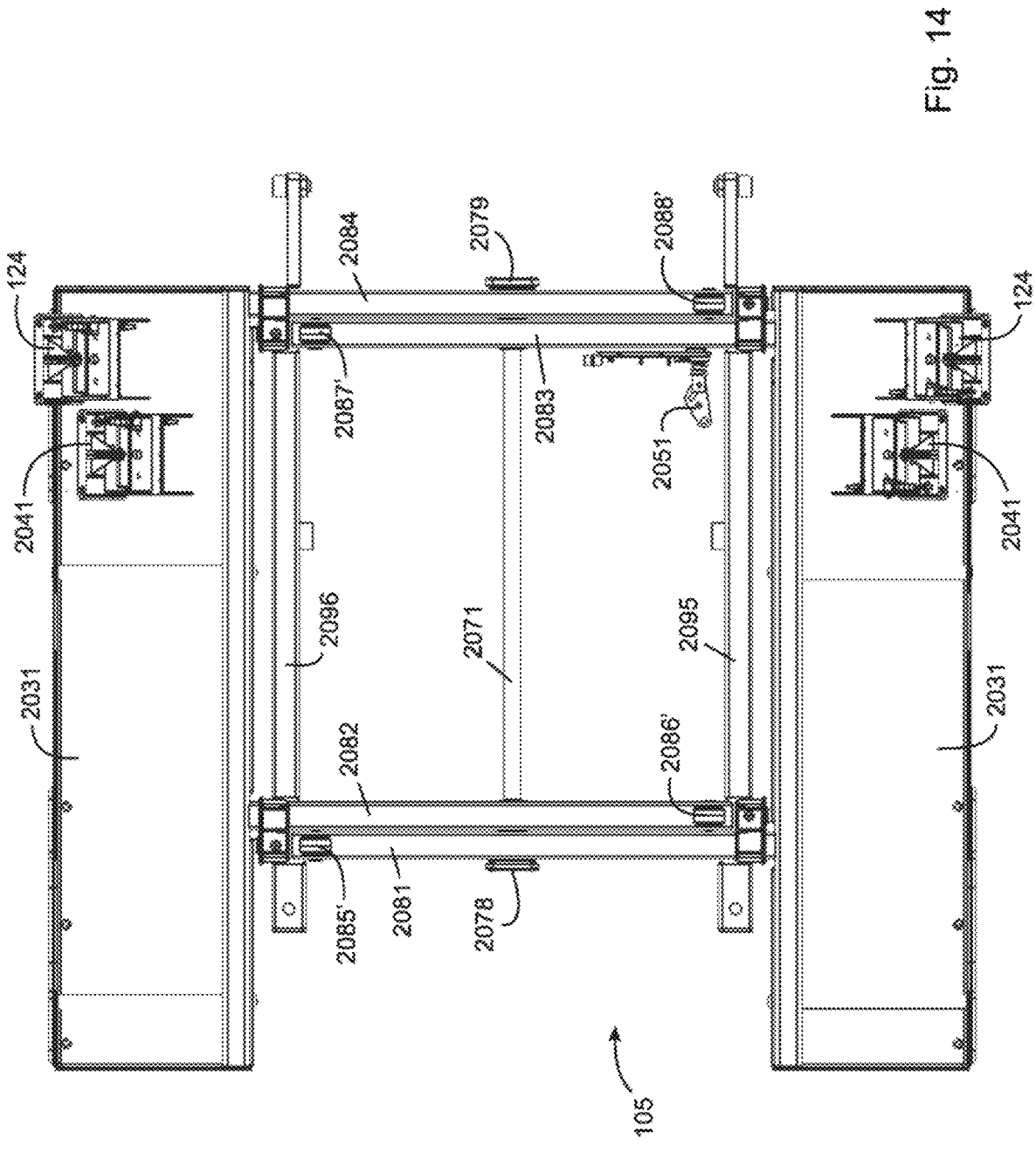
FIG. 14 is a bottom view of FIG. 13.
Figure 15:
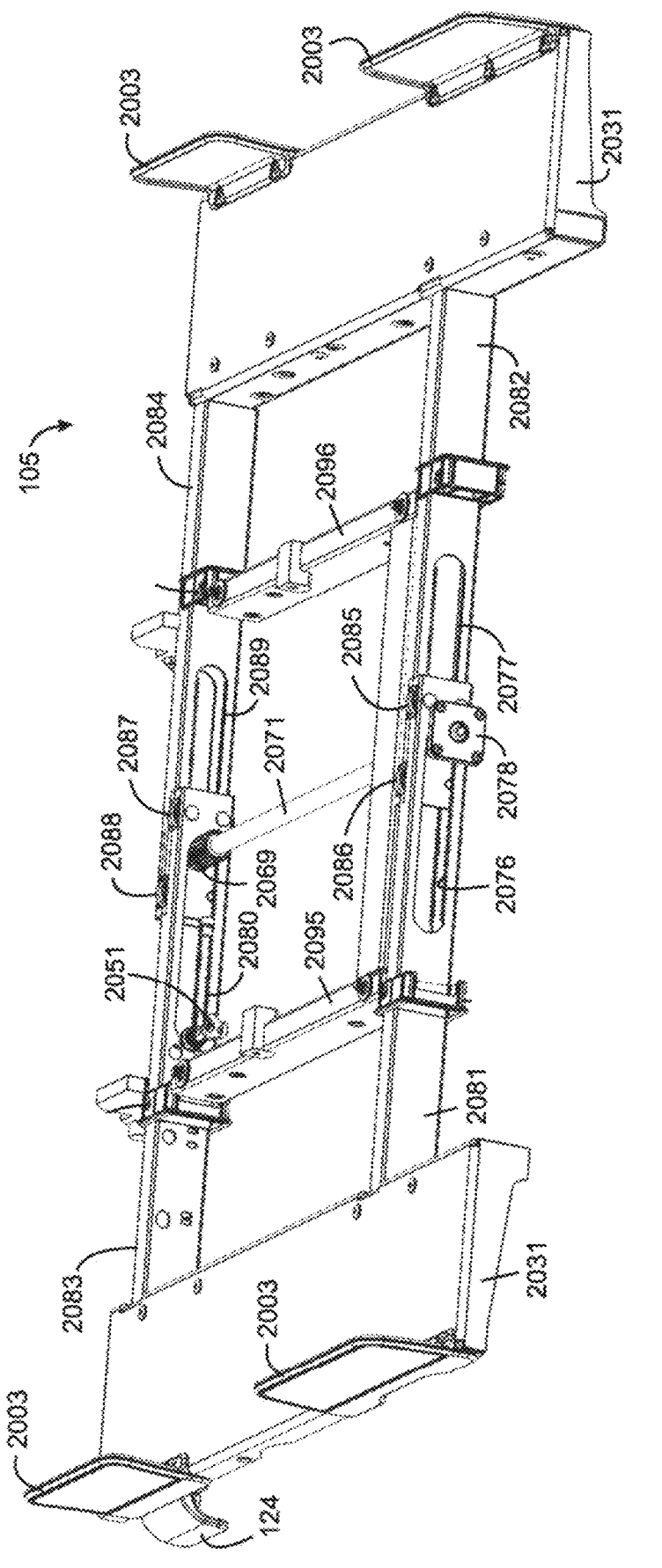
FIG. 15 shows the head deck section of FIG. 13 expanded to a more expanded third width.

Comparison of FIG. 13 to FIG. 15 illustrates the difference in configuration of the extension cross-members 2081, 2082, 2083, 2084 between the standard first width and the expanded third width of the head deck section 105. At the standard first width (FIG. 13), the through-apertures of adjacent extension cross-members may be nearly aligned laterally, whereas at the expanded third width (FIG. 15) the through-apertures may be substantially less aligned than at the standard first width.

Figure 16:
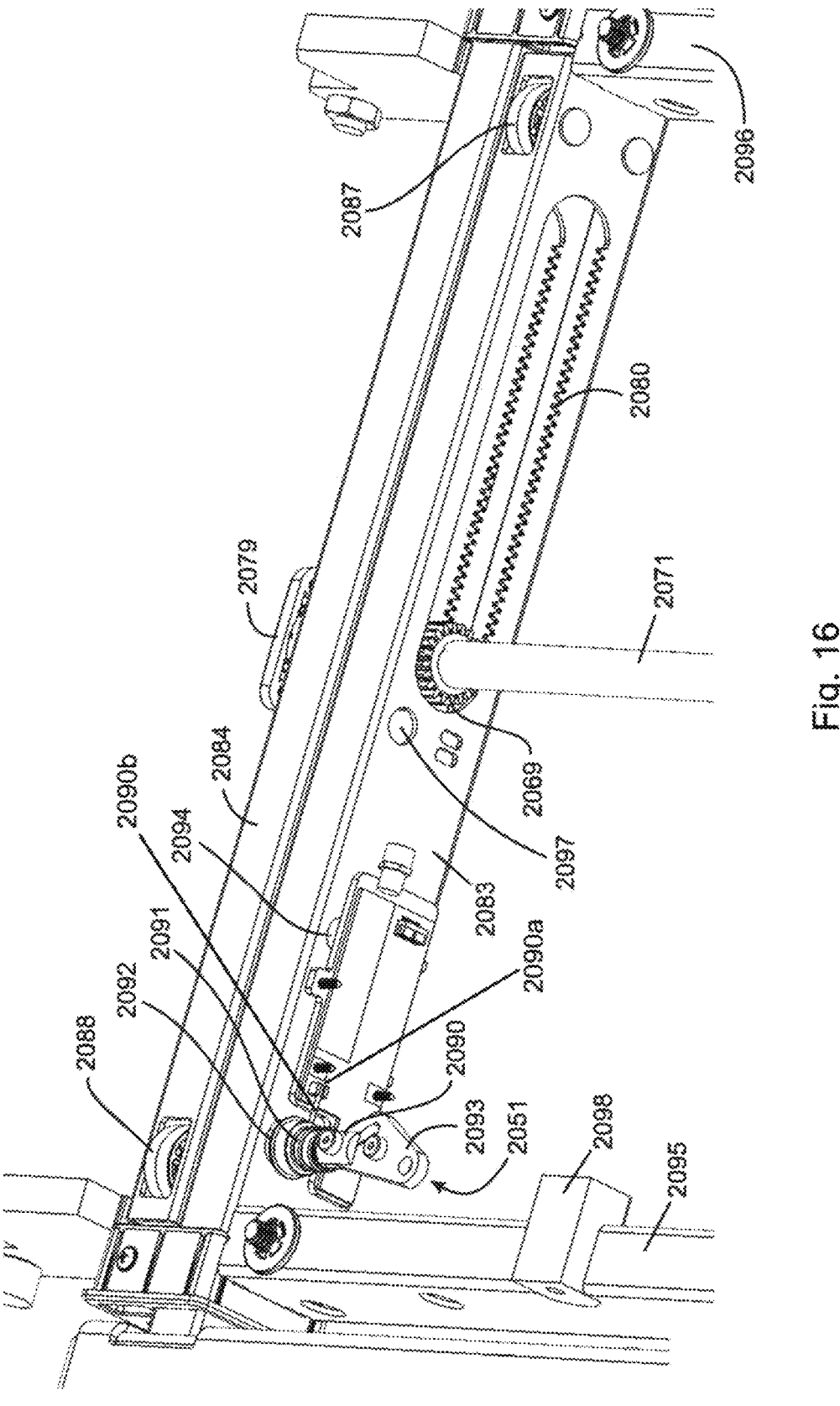
FIG. 16 is an enlarged view of a rack and pinion mechanism and latching mechanism for expanding the head deck section shown in FIG. 13.
Figure 17:
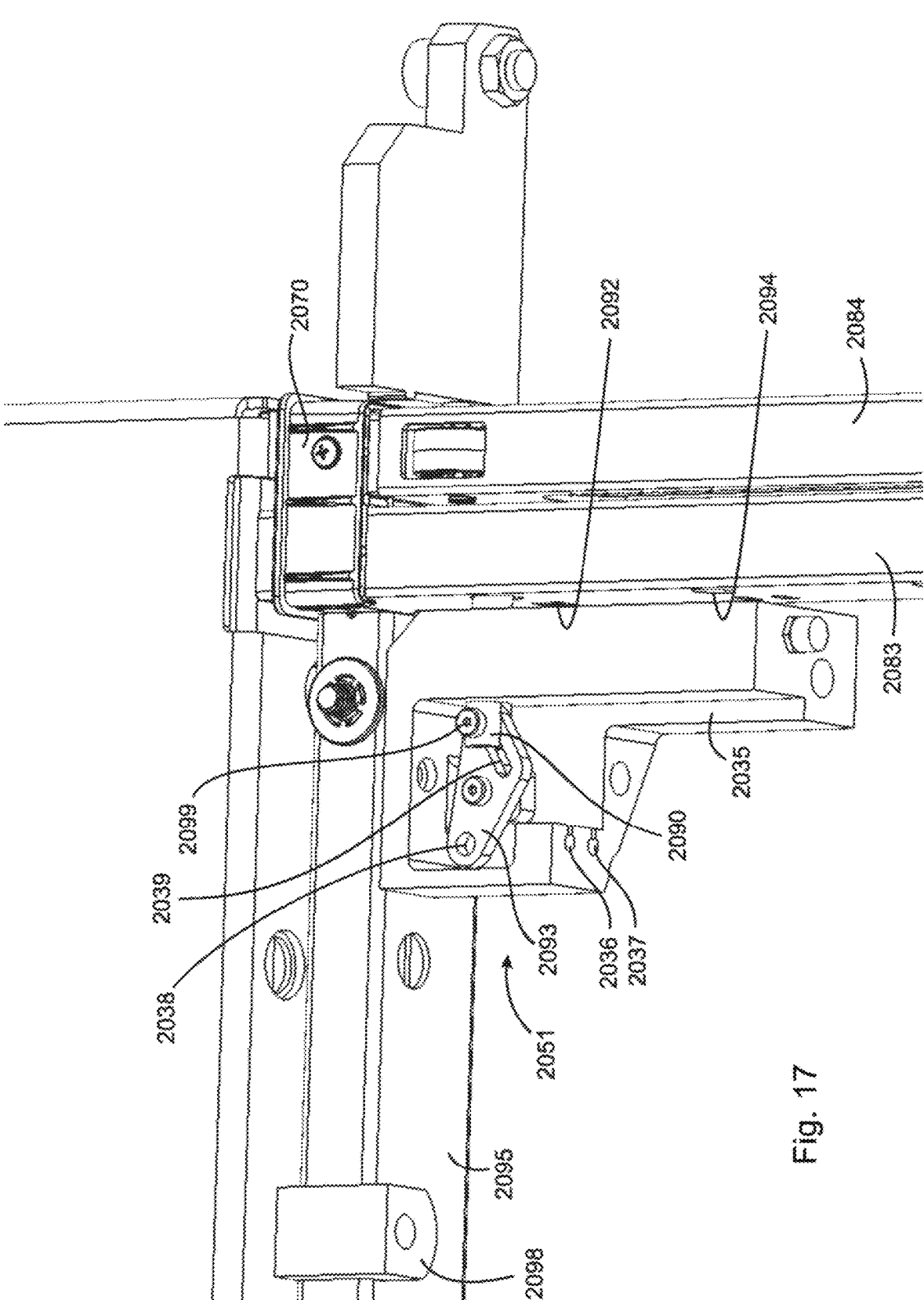
FIG. 17 is an enlarged view of the latching mechanism shown in FIG. 16 illustrating a latch mount for the latching mechanism.

FIG. 16 and FIG. 17 provide more detail of the head deck section extension latch mechanism 2051. The head deck section extension latch mechanism 2051 may comprise a spring-loaded pin 2090 loaded in a wrap spring 2091 housed in extension latch housing 2035, the pin 2090 biased by the spring 2091 toward the extension cross-member 2083 through an aperture (not shown) in the latch housing 2035. When the spring-loaded pin 2090 is aligned with an aperture 2092 in the extension cross-member 2083, the pin 2090 is forced into the aperture 2092 by the spring 2091. Because the latch housing 2035 may be fixedly mounted to housing tube 2061 as well as lateral support member 2061*a* (shown in FIG. 17), which do not move with the extension cross-member 2083, the extension cross-member 2083 may be prevented from moving when the pin 2090 is engaged in the aperture 2092.

The head deck section extension latch mechanism 2051 may further comprise a lever 2093 connected to the pin 2090 by a linking pin 2099 through an arcuate slot 2039 in the lever 2093. A cable (not shown) attached to aperture 2038 of the lever 2093 and threaded through cable groove 2036 and cable guide 2098 may be attached at the other end to the head deck section extension handle 2041. Another cable (not shown) also attached to the aperture 2038 of the lever 2093 may be threaded through cable groove 2037 and another cable guide on longitudinal supporting strut 2096 terminating at the head deck section extension handle on the other side of the head deck section.

Activating the latch release structure on the head deck section extension handle 2041 pulls the cable causing the lever 2093 to pivot, in turn pulling the spring-loaded pin 2090 out of the aperture 2092. The extension cross-member 2083 may now be permitted to move, and lateral movement of the extension cross-member 2083 brings the spring-loaded pin 2090 into alignment first with aperture 2094 in the extension cross-member 2083. Releasing the pin 2090 into the aperture 2094 locks the extension cross-member 2083 into place at the second width position.

If the extension cross-member 2083 was allowed to move until the spring-loaded pin 2090 aligned with aperture 2097, releasing the pin 2090 into the aperture 2097 locks the extension cross-member 2083 into place at the expanded third width position. Holding the deck extension handle 2041 keeps the spring-loaded pin 2090 retracted, while releasing the deck extension handle 2041 allows the spring 2091 to bias the pin 2090 toward the cross-member apertures 2092, 2094 or 2097.

Figure 18:
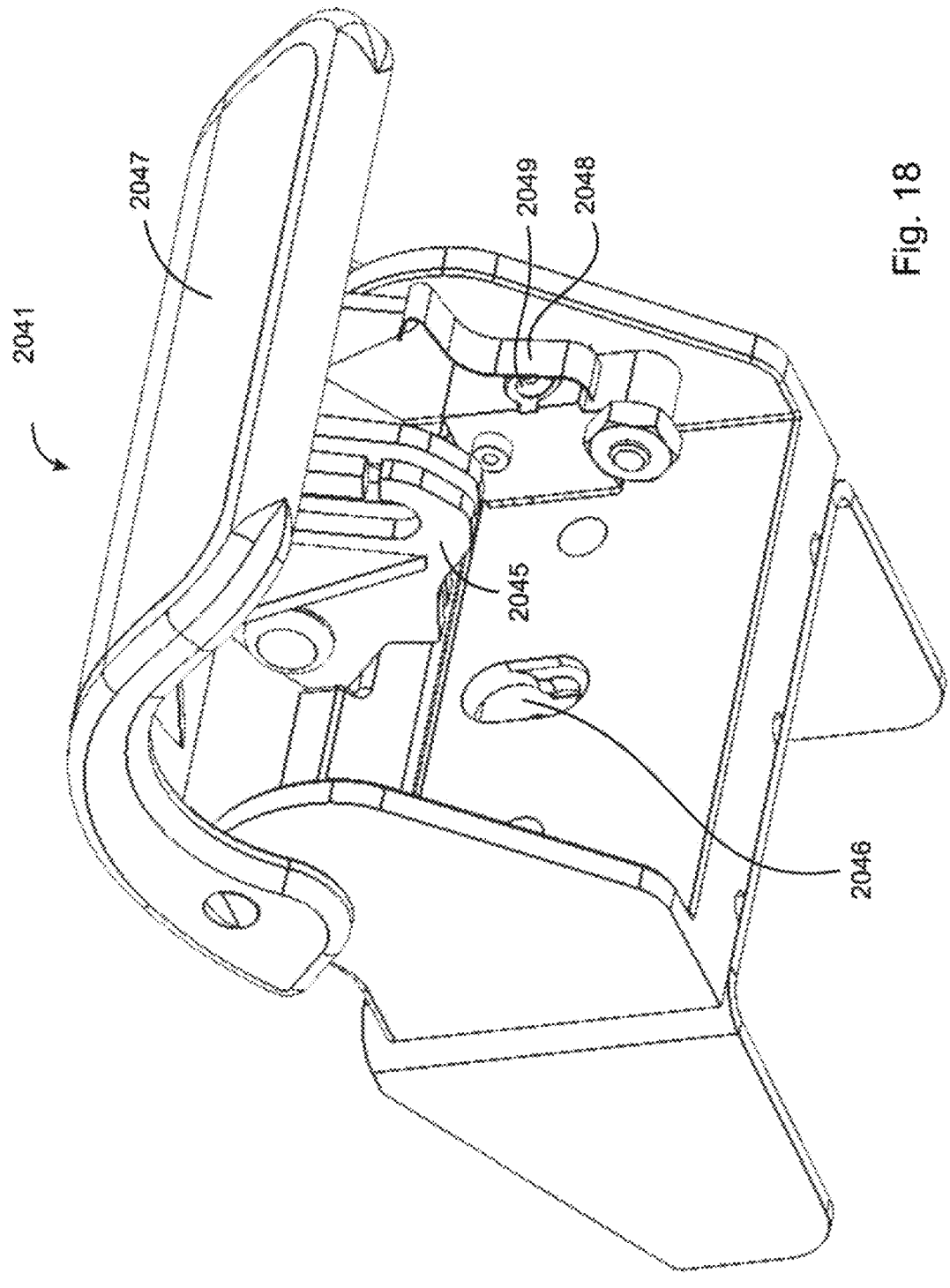
FIG. 18 is perspective view of a deck extension handle for releasing the latching mechanism shown in FIG. 17.

With reference to FIG. 18, the head deck section extension handle 2041 is shown comprising manual latch release structure 2045 having an aperture to which the cable (not shown) is connected, the cable being fed through aperture 2046 in the deck extension handle 2041. Pulling up on handle portion 2047 pulls the cable and releases the head deck section extension latch mechanism by pulling the spring-loaded pin out of the aperture in the extension cross-member.

To sense the state (unlocked or locked) of the latch mechanism, deck 104 includes a sensor 2090*a*, which is mounted adjacent pin 2090 to sense whether the pin is in its locked position (e.g., extended into the extension cross-member 2083 (fixed member)) or unlocked position. In the illustrated embodiment, the sensor 2090*a* comprises an optical sensor that detects the presence or absence of an arm 2090*b*, which is coupled to the pin 2090 and moves with the pin in and out of the sensor 2090*a*, which is more fully described and shown in reference to FIGS. 18A-18C below. Although illustrated as a PCB mounted sensor, sensor 2090*a* may comprise a stand-alone non-PCB mounted sensor.

Alternatively or additionally, the head deck section extension handle 2041 may provide an electric switch for electrically locking/unlocking the extension latch mechanism. The electric switch may comprise a spring-leaf electrical contact 2048 and a button electrical contact 2049. Pushing down on handle portion 2047 brings the spring-leaf electrical contact 2048 into electrical contact with the button electrical contact 2049, which completes a circuit and sends a signal to a solenoid associated with the spring-loaded pin to pull the pin out of the aperture in the extension cross-member. The signal may be sent through wires or wirelessly.

Referring to FIGS. 18A-18C, in another embodiment of a latch mechanism 3051, the latch pin 3090, while operating in a similar manner to pin 2090 of latch mechanism 2051, is moved by a cable assembly 3093 from its locked position to its unlocked position. Further, while in this embodiment, latch mechanism 3051 is illustrated in the context of the seat deck section 2001, similar to latch mechanism 2051, latch mechanism 3051 may be mounted in the other deck sections using the same or similar mounting arrangements.

In the illustrated embodiment, cable assembly 3093 may be an L-shaped cable assembly, including a push pull cable assembly, which supported by a pair of brackets on the fixed section of the deck section, in this illustration on seat deck section 2001.

Latch pin 3090 is also a spring-loaded pin, with a wrap spring 3091, and supported in a latch housing 3035 (shown in phantom in FIG. 18A and shown in cross-section in FIG. 18D). Spring 3091 biases the pin 3090 toward the extension cross-member 2083 through an aperture 3035*a* (FIG. 18D) in the latch housing 3035 and through an opening 3092*a* (FIG. 18D) in the fixed member, in this instance housing tube 2062. When the spring-loaded pin 3090 is aligned with an aperture 3092*b* in the extension cross-member 2083, the pin 3090 is forced into the aperture 3092*b* by the spring 3091. Because the latch housing 3035 is fixedly mounted to housing tube 2061 as well as lateral support member 2061*a* (shown in FIG. 18D), which do not move with the extension cross-member 2083, the extension cross-member 2083 may be prevented from moving when the pin 3090 is engaged in the aperture 3092.

As noted, above the latch pin 3090 is moved to its unlatched position by a cable assembly 3093. The brackets 3093*a* and 3093*b* supporting the cable assembly may be mounted by fasteners 3093*a'* and 3093*b'* to the fixed section by way of housing 3035, which is best seen in FIG. 18D, though the fastener for bracket 3093*a* is best seen in FIG. 18A. The head deck section extension latch mechanism 2051 may further comprise a lever 2093 connected to the pin 2090 by a linking pin 2099 through an arcuate slot 2039 in the lever 2093.

The cable 3094 of cable assembly 3083 is coupled to the end of pin 3090 by a coupler 3099*a* and pin 3099*b* (FIG. 18C). In this manner, when cable 3094 is pulled, pin 3090 will compress spring 3901 and move from its locked position to its unlocked position. The other end of cable 3094 includes a coupler 3094*a*, such as a loop or ring, to which another cable is coupled, which is coupled to the release handles 2042 of the seat deck section in a similar manner described in reference to latch mechanism 2051.

Activating the latch release structure on the seat deck section extension handle 2042 pulls the cable causing the cable 3094 to pull on the spring-loaded pin 2090 out of the aperture 3092*b*. The extension cross-member 2083 may now be permitted to move, and lateral movement of the extension cross-member 2083 brings the spring-loaded pin 3090 into alignment another opening or aperture, as described above.

To sense the state (unlocked or locked) of the latch mechanism 3051, deck 104 includes a similar sensor 2090*a*, which is mounted adjacent pin 3090 to sense whether the pin is in its locked position (e.g., extended into the extension cross-member 2083 (fixed member)) or unlocked position. In a similar manner, sensor 2090*a* detects the presence or absence of arm 2090*b*, which is coupled to the pin 3090 and moves with the pin in and out of the sensor 2090*a*. When in the sensor, arm 2090*a* blocks transmission of light from one side of the sensor to the other side, but when removed allows light to transmit from one side of the sensor to the other side of the sensor. Thus, the presence or absence of the arm in sensor 2090*a* may be used by the control system 3300 to detect when the latch pin in locked or unlocked. Although illustrated as a PCB mounted sensor, which board is coupled to the control system 3300 by cable 2090*b*, sensor 2090*a* may comprise a stand-alone non-PCB mounted sensor.

Alternatively or additionally, similarly, the seat deck section extension handle 2042 may provide an electric switch for electrically locking/unlocking the extension latch mechanism. For an example of an electrical circuit that may be used, reference is made to latch mechanism 2051.

In addition, similar to the latch mechanism described below, pin 3090 may have a variable profile that limits its extension into the openings in the movable member to also indicate the width of the deck section to the control system 3300.

Figures 19A, 19B:
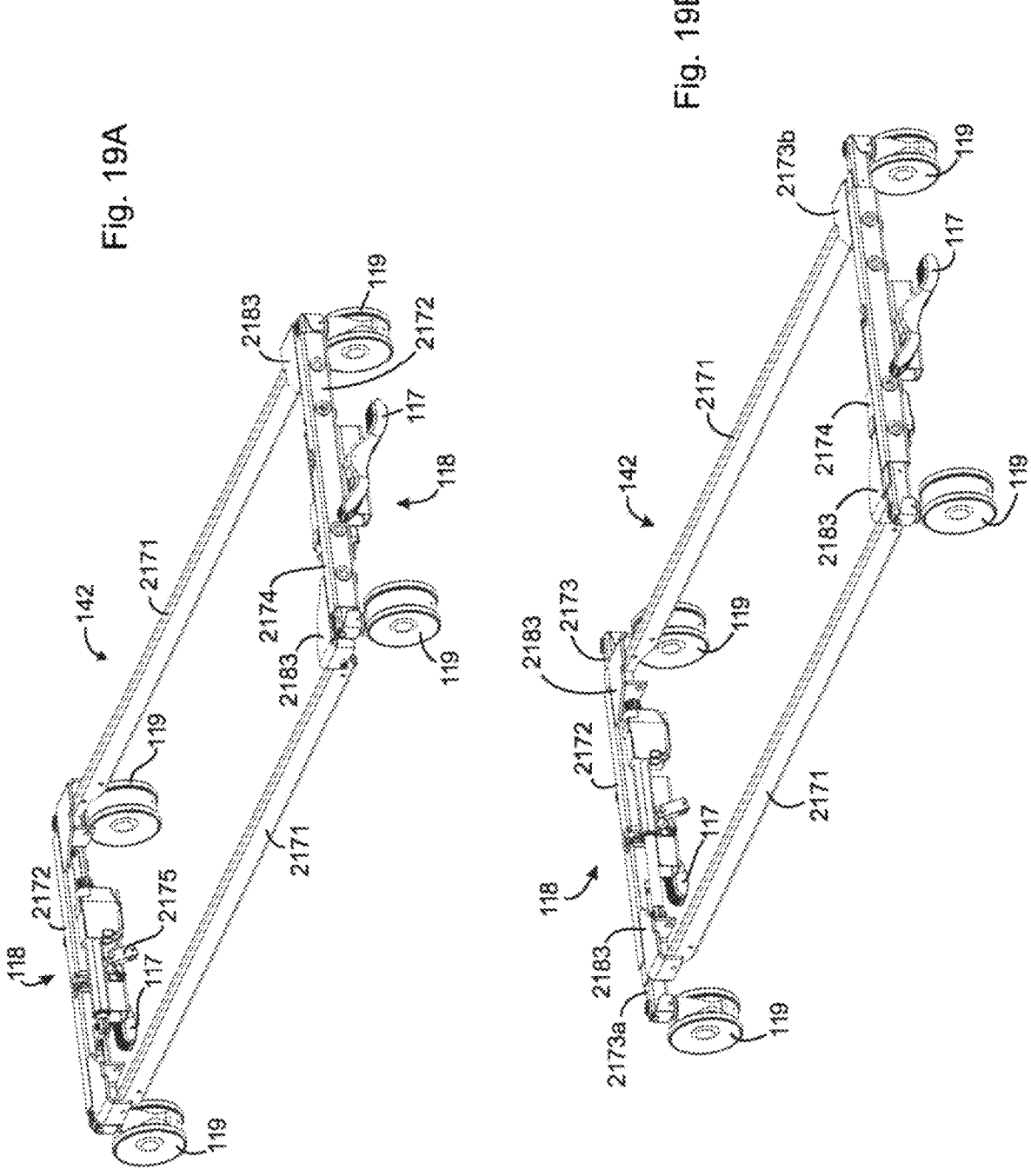
FIG. 19A is a perspective view of a caster frame in a fully retracted position for a standard first width deck.
FIG. 19B is a perspective view of the caster frame of FIG. 17A in an expanded position.

As noted above, the base may also be adjusted in width and/or in length. Referring to FIGS. 19A and 19B, in order to accommodate the extending deck features and to distribute the patient load more evenly over the casters when the deck is in a wider position, caster frame 142 is configured to space the casters farther apart laterally, for example, when the deck is in wider positions. Referring to FIGS. 19A and 19B, perspective views of the caster frame 142 in a fully retracted position for a standard first width deck (FIG. 19A) and in an expanded position (FIG. 19B) are shown. The caster frame 142 may comprise caster frame main rails 2171 extending longitudinally between and linking two caster assemblies 118, which are joined with caster frame cross-members 2172 by brackets 2183. Caster frame cross-members 2172 may comprise rectangular tubes that house caster extension slide tubes 2173*a, b*, which are best seen in FIG. 19B, and which are slidable laterally within the caster frame cross-member 2172. Thus, at least caster frame cross-members 2172 represent the fixed portions of the base, while caster extension slide tubes 2173*a, b* represent the movable portion of the base.

Connecting the left and right caster extension slide tubes 2173*a, b* of each caster assembly 118 may be caster extension actuators 2174 to thereby adjust the spacing of the caster wheels and width of the caster frame 142. Actuators 2174 and optionally caster brake actuators are in communication with and controlled by control system 3300. Thus, lateral extension of the casters 119 of caster assembly 118 may be controlled by the caster extension actuator 2174 and control system 3300. Further, as noted below, the adjustment of the width (or length) of caster frame 142 may be monitored by control system 3300, using sensors, similar to or the same as described in reference to the deck sections, and optionally used as input into the control logic for taking action at patient support 100 and/or generating alerts or prompts to a user, such as a caregiver.

Optionally, the caster assemblies 118 may be equipped with manual brake pedals 117 to manually brake the caster wheel brakes. For example, brake pedals 117 may be connected to brake lever mechanisms 2175 that actuate brake control rods 2181 connecting the brake lever mechanisms 2175 to the casters 119 and the caster wheel brakes. For further optional details of caster frame 142, reference is made to the above incorporated applications.

Figure 20:
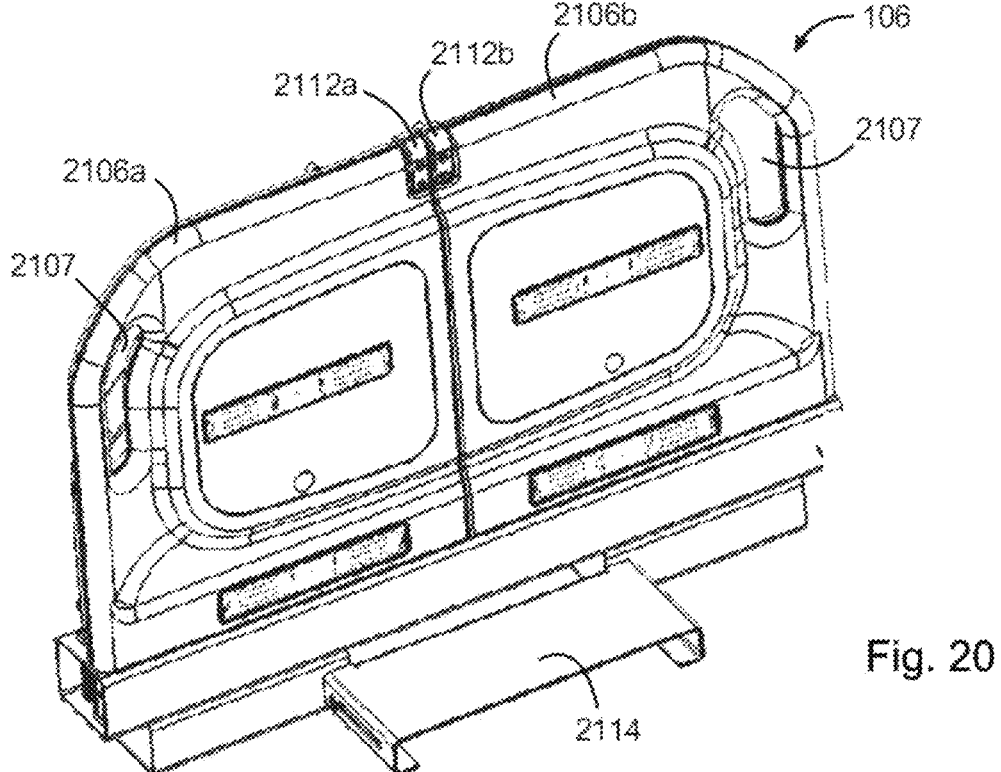
FIG. 20 is a foot end perspective view of an extendible headboard at a standard first width supported on a headboard mounting bracket.

As noted above, the headboard may also be adjusted in width. Referring to FIG. 20, a width adjustable headboard 106 is shown at a standard first width supported on a headboard mounting bracket 2101. The headboard mounting bracket 2101 may be supported on headboard insert 2114, which may be supported in the upper frame headboard mount on the upper frame (not shown) at the head end of the patient support. The headboard 106 may have two sections, a first headboard section 2106*a* and a second headboard section 2106*b*, which is slidably mounted to first headboard section 2106*a*.

In the illustrated embodiment, first headboard section 2106*a* includes a panel 2106*c* on which second headboard section 2106*b* is slidably mounted so that headboard is a two piece adjustable headboard. Each of the headboard sections may comprise headboard openings 2107, which may be used as handgrips for handling the headboard 106. First and second headboard support clips 2112*a*, 2112*b* may be employed to help secure the sections together at the top and a headboard lock knob 2113, and at the bottom may be used to lock the headboard sections 2106*a*, 2106*b* in place. In the illustrated embodiment, thus, first headboard section 2106*a* represents the fixed portion of the headboard, while the second headboard section 2106 represent the movable portion of the headboard. FIGS. 21A-21C illustrate the headboard 106 at three different widths: the first standard width (FIG. 21A); the second intermediate width (FIG. 21B); and the third more expanded width (FIG. 21C). For further of the construction and mounting details for the headboard, reference is made to the above incorporated applications.

Figure 22A:
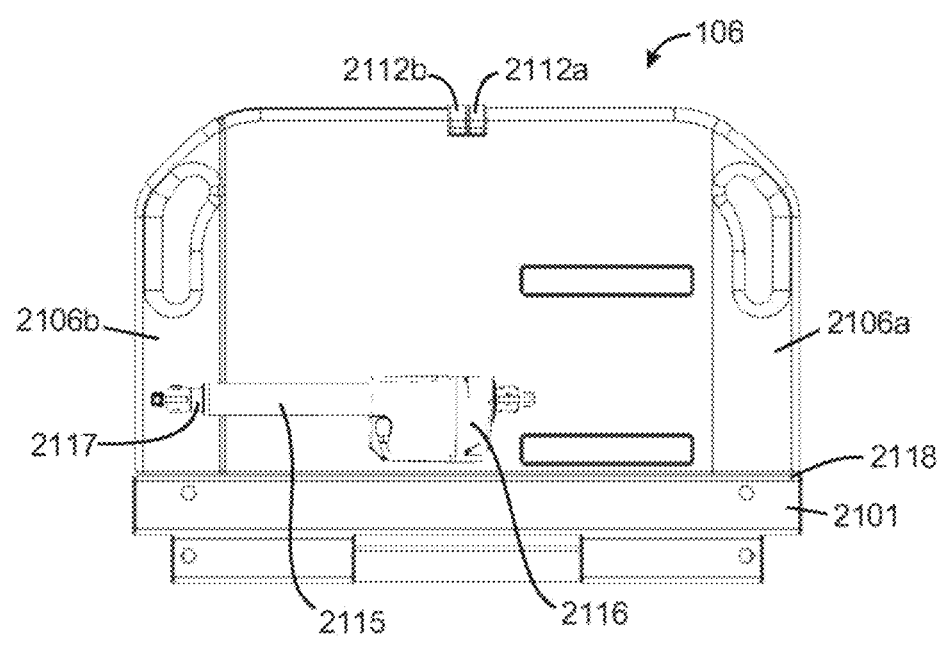
FIG. 22A is an end view of an alternate embodiment of an extendible headboard in which headboard extension is driven by an actuator, with the headboard at a standard first width.
Figure 22B:
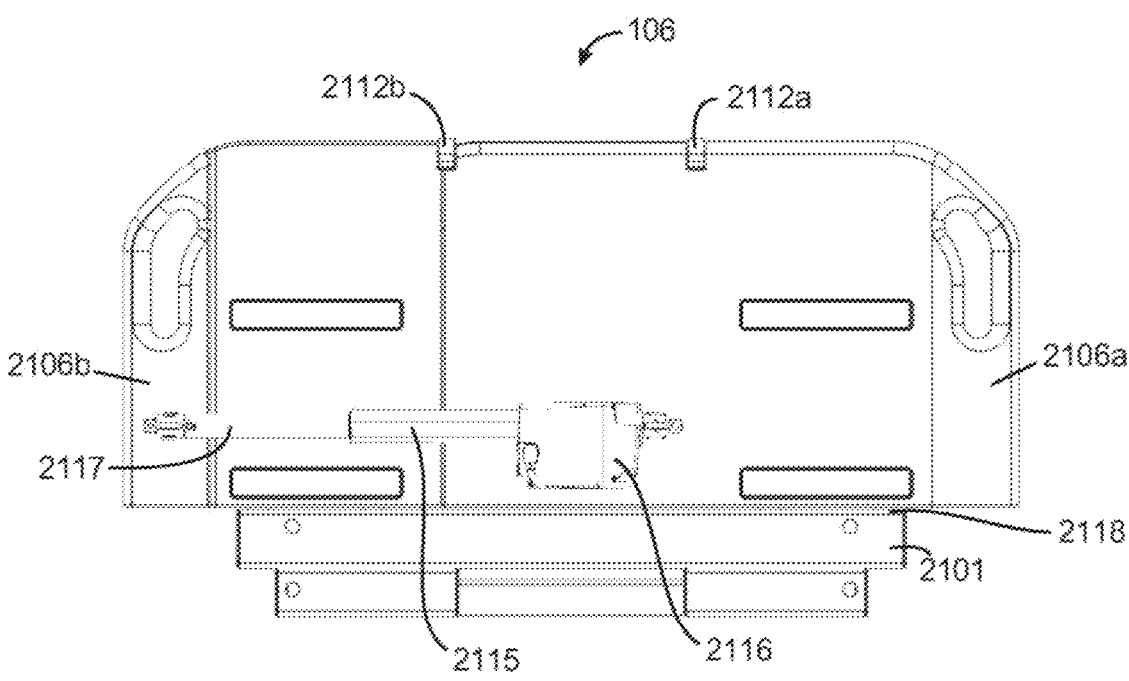
FIG. 22B is an end view of an alternate embodiment of an extendible headboard in which headboard extension is driven by an actuator, with the headboard at a more expanded width.
Figure 23:
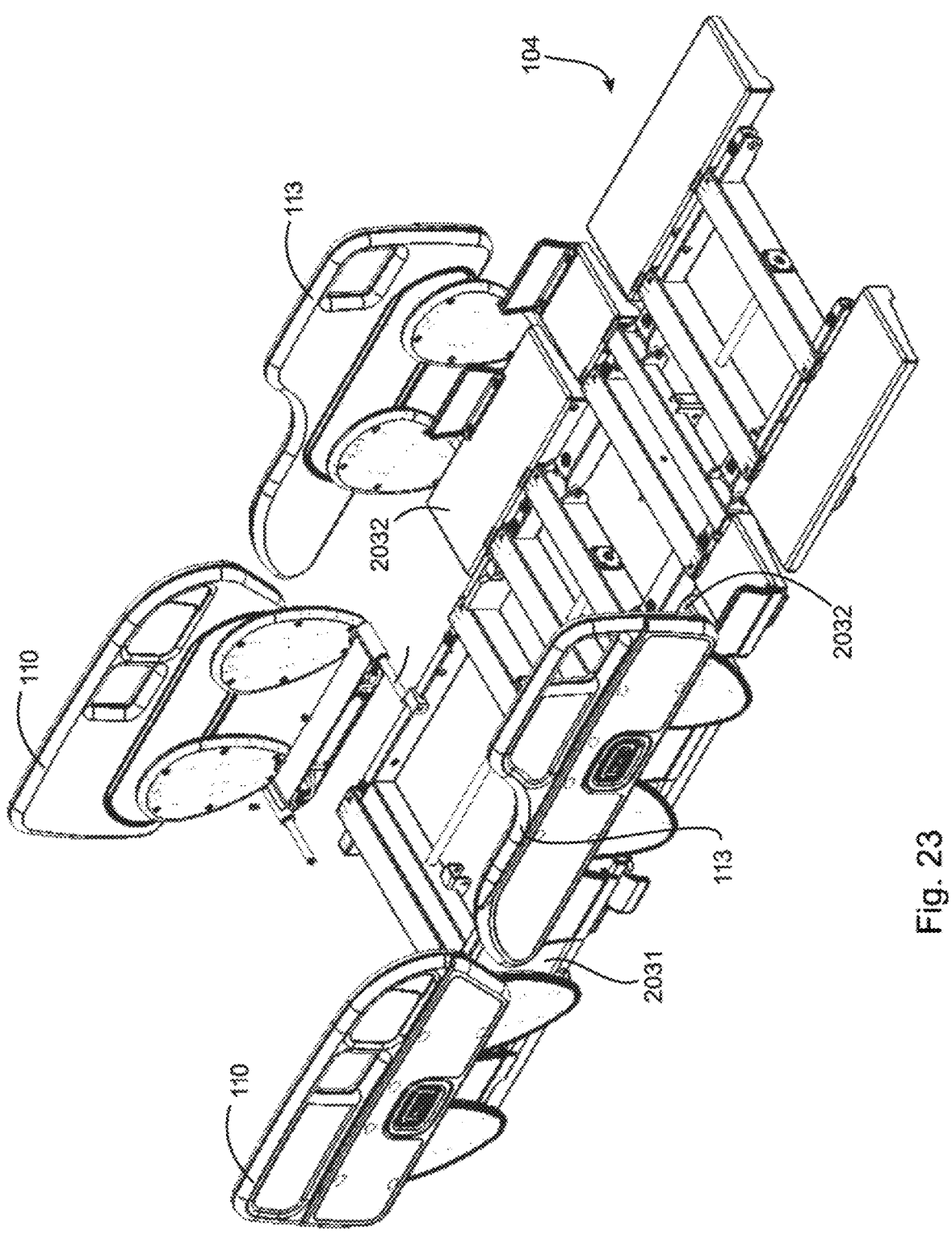
FIG. 23 is a perspective view of a patient support deck having guard structures mounted on deck extension pans thereof.

As described in the referenced and incorporated applications, the width of the headboard may be manually adjusted or may be adjusted by an actuator 2115, such as shown in FIG. 22A and FIG. 22B, which is in communication with and controlled by control system 3300. Thus, the first headboard section 2106*a* and the second headboard section 2106*b* may be driven apart or together by actuator 2115 under the control of control system 3300. Further, in addition or alternatively, as will be understood from the forgoing description, the adjustment of the width of headboard may be monitored by control system 3300 using sensors, similar to or the same as described in reference to the deck sections, and optionally used as input into the control logic for taking action at patient support 100 and/or generating alerts or prompts to a user, such as a caregiver, such as described below.

As described above, the patient support is configured to achieve different litter deck positions and articulations, and the deck sections may be independently and separately adjustable. When deck sections are not adjusted to the same width, however, a risk for increased pinch and entrapment conditions exists, and/or mechanical interference/damage to corresponding side rail structures and mattress keepers can occur. Similarly, when the headboard 106 or the base is expanded, there is a risk of interference when trying to move the patient support.

Additionally, as described more fully below, patient support height and side rail conditions and restrictions may be monitored and compared to the corresponding deck width positions to help prevent crush or other interference conditions. For example, when the deck width is in the standard 36" position and the side rails are in their low position, it may be desirable to restrict the low height of the patient support deck in order to prevent interference of the side rails with the lower frame. Optionally, it also may be desirable to detect and monitor the deck width of each of the primary deck sections, as well as detect and monitor the respective latch or locking conditions of each latch mechanism for each deck section.

Accordingly, in one embodiment, the deck sections that are adjusted to, and optionally locked at the same width relative to one another, are considered to be in an acceptable deck width configuration. In contrast, deck sections that are adjusted to, and optionally locked at different widths relative to one another, are considered to be in an unacceptable deck width configuration. Similarly, when the deck sections are unlocked, optionally regardless of the width of the deck sections, may be regarded as in an unacceptable deck configuration. Further, when the width of the deck is not known, it may be considered in an unknown state-which again may be undesirable.

As more fully described below, in reference to the deck sections, detecting status of the adjustable support components, such as the deck width of the deck sections, of the headboard, and/or of the base, may be achieved using sensors configured to detect and monitor changes in position, condition, or movement of the adjustable portion of the patient support component. Sensors may also be used to determine if the height and width of the patient support deck and the side rail position fall within the acceptable configuration as determined by the control circuit of the bed controls system. Further, the sensors may detect that a particular deck section is locked or unlocked. Other input that may be used to control system 3300 includes, as noted, the status of the drive system and/or the locked or unlocked status of the casters.

Referring again to FIG. 24, control system 3300 includes a control circuit with one or more controllers (often referred to as control board) 3302 (only one shown n FIG. 24), with each including a processor 3304 electrically coupled to an input/output interface 3306 and memory 3308 and which is in communication with one or more actuators on the patient support and one or more sensors for monitoring various functions at the patient support. The controller(s) 3302 may be situated in a control box that is attached or otherwise coupled to the patient support 100. Further, the controller(s) 3302 may be physically integrated with another component of the system 3300, such as the caregiver's control panel 120 (FIG. 1).

The processor 3304 may be a microprocessor, such as the kind commercially available from Freescale™ Semiconductor. The processor 3304 may be a single processor or a group of processors that cooperate. The processor 3304 may be a multicore processor. The processor 3304 is capable of executing instructions obtained from the memory 3308 and communicating with an input/output interface 3306.

The memory 3308 may include one or more of flash memory, dynamic random-access memory, read-only memory, and the like. In addition, the memory 3308 may include a hard drive. The memory 3308 is capable of storing data and instructions for the processor 3304. Examples of instructions include compiled program code, such as a binary executable, that is directly executable by the processor sor 3304 and interpreted program code, such as Java® bytecode, that is compiled by the processor 3304 into directly executable instructions. Instructions may take the form programmatic entities such as programs, routines, subroutines, classes, objects, modules, and the like, and such entities will be referred to herein as programs, for the sake of simplicity. The memory 3308 may retain at least some of the instructions stored therein without power.

The memory 3308 stores a program 3310 executable by the processor 3304 to control operations of the patient support 100. The controller 3302 comprising the processor 3304 executing the program 3310, which configures the processor 3304 to perform actions described with reference to the program 3310, may control, for example, the height of the upper frame 102, articulation of the patient support deck 104 (e.g., upper-body tilt and knee height), exit alarm settings, unlatching or latching of a side rail in the case of a side rail that is electromechanically controlled, and the like. The controller 3302 may also be configured to obtain operational data from the patient support 100, as will be discussed below. Operational data obtained by the controller 3302 may be used by the processor 3304 and program 3310 to determine control limits for the patient support 100.

The memory 3308 also stores data 3312 accessible by the processor 3304. The data 3312 may include data related to the execution of the program 3310, such as temporary working data. The data 3312 may additionally or alternatively include data related to properties of the patient support 100, such as a patient support serial number, model number, MAC address, IP address, feature set, current configuration, and the like. The data 3312 may additionally or alternatively include operational data obtained from components, such as sensors and actuators, of the patient support 100. As will be more fully described below, operational data may include the status (e.g., width, length, and/or locked or unlocked state) of any of the adjustable components of the patient support 100, including the patient support deck 104, the base (the caster frame 142), and/or the end boards, the height of the upper frame 102, an articulated state of the patient support deck 104, a status of the side rails 110, 113, an exit alarm setting or status, and an occupant weight.

As noted above, control system 3300 may include multiple controllers. Referring to FIG. 24, controller 3302 may include a main control unit (MCU) controller 3302a, an actuator controller 3302b, and a deck position module controller 3302c, each with their own processor 3304a, 3304b, and 3304c and memory 3308a, 3308b, and 3308c. For example, the actuator controller 3302c may include, as noted, a separate processor 3304c, and a sensor interface to couple to sensors S. Similarly, the deck position module controller 3302b may include, as noted, a separate processor 3304b, and a sensor interface to couple to sensors S. The main control unit 3302a may be a separate unit that monitors the signals and information from the actuator controller 3302c and deck positioning module 3302b, via communication channels, either hard wired channels or wireless channels, and then is configured to make decisions to generate alerts, prompts, or to take action, such as prevent motion. Because each controller has memory and software, the decision to generate alerts, prompts, or to take may made globally (at main control unit 3302a) and/or locally, e.g., at the actuator controller 3302c.

For further details of control system 3300, including other operational data that may be stored, tracked, or evaluated, and the interface between the control system and the various patient support components, reference is made to the above incorporated applications.

Figure 57:
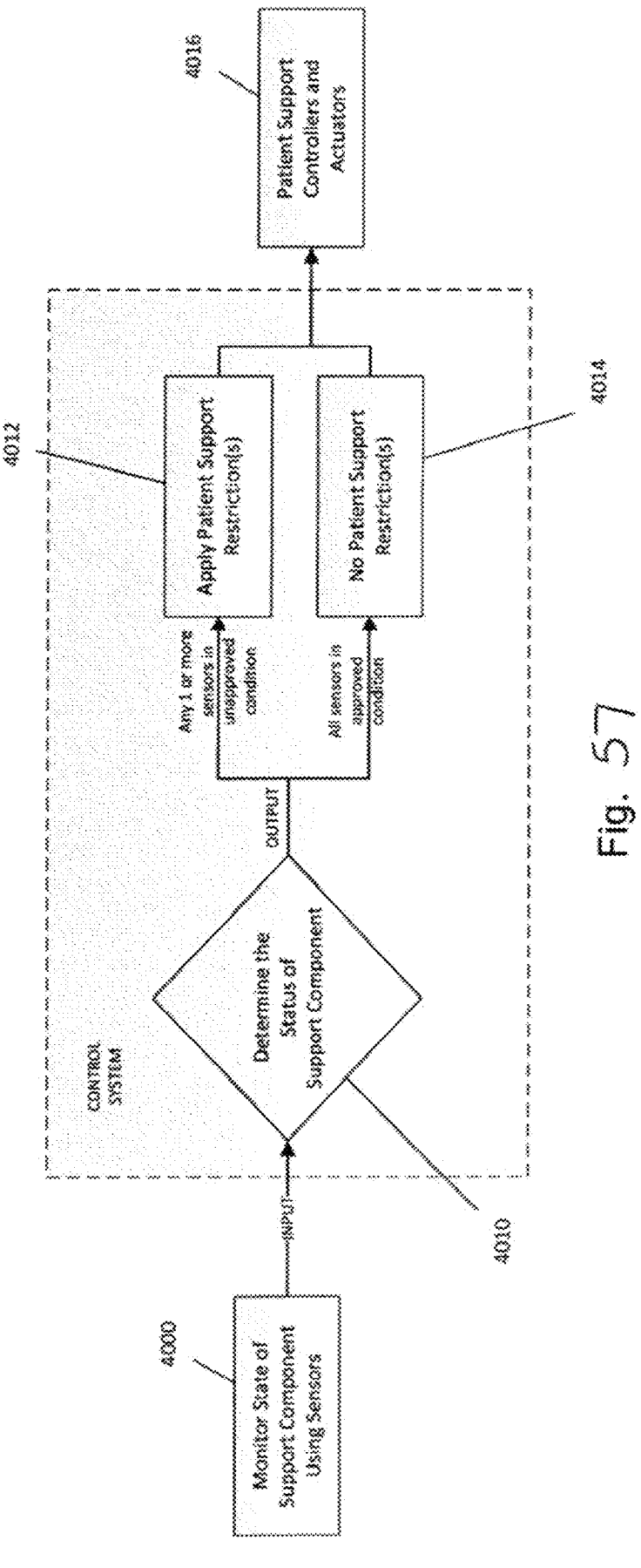
FIG. 57 depicts a block diagram of the a control system for controlling the patient support.

Referring to FIG. 57, controller 3302 (FIG. 24) monitors the state of one or more patient support components (4000). Based on the signal or signals from sensor or sensors S, controller 3302 will determine the status of the monitored support component 4010. In one embodiment, as noted, control system 3300 includes one or more sensors S (generically identified by the letter S in FIGS. 1, 9, 24, and 24A) adapted to detect a status of the patient support 100, such as the status of an adjustable component of the patient support 100, which are in communication with controller 3302. For example, the adjustable component may be the patient support deck 104, the headboard 106, and/or the base formed by caster frame 142. The status may include the width and/or length of the component or the locked or unlocked state of the component. If the sensor or one of the sensors detect an unacceptable state, the controller 3302 may apply restrictions on the patient support at 4012. The restriction may include limiting any one or the patient support controllers or actuators at the patient support 4016. For example, the software logic may be configured to prevent bed motion depending on the state of the sensor(s)—the conditions of the various sensors as monitored must meet the specific conditions established and set in the software logic in order to permit a particular bed motion capability. If the conditions as monitored are not met for a particular bed motion capability, the software logic will not permit the respective and associated bed motion(s).

When the sensor or all sensors indicate the monitored patient support component is an acceptable state, the controller may not apply any restrictions and allow the patient support controllers and actuators to function without any restrictions imposed as a result of an unacceptable state. The monitored state may include, for example, the height, length, and/or width of the patient support deck, the length and/or width of the base, and/or the width the headboard, and/or the locked or unlocked state thereof, as well as the position of the side rails.

In one embodiment, controller 3302 is configured to detect the status sensed by sensor or sensors S and to determine if the status of the patient support deck 104 is within (or at) an acceptable configuration. The controller 3302 may be configured to generate a signal based on the status detected by the sensor when the sensor detects that the patient support deck is in an acceptable configuration or when the patient support deck is in an unacceptable configuration or both. The status of the patient support deck 104 may be related to a number of electrical or physical characteristics of the patient support deck 104.

In some embodiments, the patient support deck 104 is width-adjustable. Accordingly, the sensor(s) may be adapted to sense the width of the patient support deck 104, and the controller 3302 is configured to determine if the patient support deck 104 is in an unacceptable width configuration based on the sensed deck support width. The control system 3300 may be adapted to issue an alert, such as visual or audible alert, or generated prompts to the caregiver to take action if the patient support deck 104 is determined to be in an unacceptable width configuration. The control system 3300 may alert or prompt the user or caregiver with audio and/or visual indicators, such as iconography, displayed text messages, dynamic icons or videos or animations, or audible alarms to communicate and alert the caregiver that the patient support deck 104 is unlocked and/or in an unacceptable width configuration and/or prompt the caregiver to take action. For example, as described below, control system 3300 may prompt the user or caregiver to adjust the width of the headboard or the width of the mattress.

In one embodiment, control system 3300, as noted, includes a plurality of sensors S for monitoring each of the deck section positions-namely, the positions of the head deck section 105, the seat deck section 2001, and the foot deck section 2002. When the deck sections are each locked and in one of the three "approved" deck widths, e.g., 36", 42", or 48", then the deck section sensors are each considered in a known state. Conversely, if any of the sensors S detect that the respective deck section is unlocked or outside the approved widths, then the sensors S is considered by the control system 3300 in an unknown state. When an unknown state is detected, control system 3300 may then generate an alert, a prompt, and/or takes an action to prohibit movement of the patient support apparatus or a component of the patient support apparatus described above.

In one aspect, for example, when one of the deck sections is in an expanded width and the control system senses that another deck section or both of the other deck sections are not, control system 3300 may issue a prompt to the caregiver to make sure that the other deck section or deck sections are also adjusted. As described above, control system 3300 may include a display at control panel 120 with a display screen 122 on which various messages, using text or icons, may be displayed. For example, referring to FIGS. 24A-D, control system 3300 may generate an alert, for example, in the form of text 122a, including, but not limited to, alerting the caregiver that there is a deck width alert, and further specify the relevant deck section. Further, the text may include specific instructions 122b to adjust the relevant deck section to a specified width or to match it with a specified section.

In addition, control system 3300 may generate an icon 122c that represents the deck and its deck sections and, further, may generate another icon 122d, such as an arrow, or other indication that a deck section needs to be adjusted. The other indication may include color coding of the deck sections, or just outlining the deck sections with a color and then varying the color to indicate which deck section needs to be adjusted. Thus, the icon may also be used to prompt the user to adjust the caregiver to adjust the headboard.

For example, referring to FIG. 24B, when the foot deck section is not adjusted to the same width as the head and mid sections, icon 122d may be located adjacent the foot deck section to indicate that the foot section needs to be adjusted and prompt the caregiver to make width adjustments to make the width of the three deck sections match.

Similarly referring to FIG. 24C, when the head deck section is not adjusted to the same width as the mid and foot sections, icon 122d may be located adjacent the head deck section to indicate that the head section needs to be adjusted. Referring to FIG. 24D, when the mid deck section is not adjusted to the same width as the head and foot sections, icon 122d may be located adjacent the mid deck section to indicate that the mid deck section needs to be adjusted. On the other hand, when none of the deck sections are in an approved width, control system 3300 may indicate at display 122 that all the sections must be adjusted to match (FIG. 24E).

Once the deck sections have all been changed to a new width, or after the bed is initially powered on, the control system 3300 may display one of the display screens shown in FIGS. 24F-H and discussed below in reference to the headboard, to provide prompts to the user to manually adjust the headboard and mattress width to match the corresponding width of the deck.

Referring to FIG. 9, the width-adjustable patient support deck 104 may include adjustable-width mechanisms, as described above. In the illustrated embodiment, as noted, the extendible sections are formed from deck extension pans 2031, 2032, 2033, 2034 and include rack and pinion mechanisms 2065. The rack and pinion mechanisms 2065 may be housed within fixed rack and pinion mechanism housing tubes 2061, 2062, 2063, and 2064. Each patient support deck section (head deck section 105, knee deck section 107, seat deck section 2001, and foot deck section 2002) may include two rack and pinion mechanisms 2065 and a total of four extension cross-members 2081, 2082, 2083, 2084 slidably supported in respective housing tubes. Each patient support deck section also includes a locking mechanism, for example, deck latch mechanisms 2051, 2052, and 2054, such as described in reference to FIG. 18 and FIGS. 18A-18C, which illustrate an alternate embodiment of the latch mechanism.

Accordingly, the upper frame 102, also referred to as a patient support deck frame, includes a fixed section with a plurality of fixed members, such as fixed rack and pinion mechanism housing tubes 2061, 2062, 2063, and 2064, and a movable section with a plurality of movable members, such as extension cross-members 2081, 2082, 2083, and 2084. It should be understood that the described adjustable width patient support deck is exemplary and should not be interpreted as limiting the present invention to that particular embodiment. The present invention may be executed in connection with any other suitable patient support deck frame comprising a fixed section and a movable extendible section.

To illustrate the structure and function of the adjustable-width patient support deck 104, reference is made to FIGS. 25-57, which illustrate one section of the patient support deck, in particular, the seat deck section 2001. The other deck sections—the head section 105, the knee deck section 107, and the foot deck section 2002—may be similar. The below embodiments refer to seat deck section rack and pinion mechanism housing tube(s) and the fixed member (e.g., fixed rack and pinion mechanism housing tube 2062) and movable member (e.g., extension cross-member 2083); however, the fixed member (e.g., fixed rack and pinion mechanism housing tube 2062) housing the sensors and switches described below has been removed in FIGS. 25-28 in order to view the interior components. Further although illustrated in reference to one of the deck sections, the same or similar sensor arrangements may be provided between the other deck sections and between the fixed portion of the headboard and movable portion of the headboard or between the fixed portion of the base and movable portion of the base.

Figure 12:
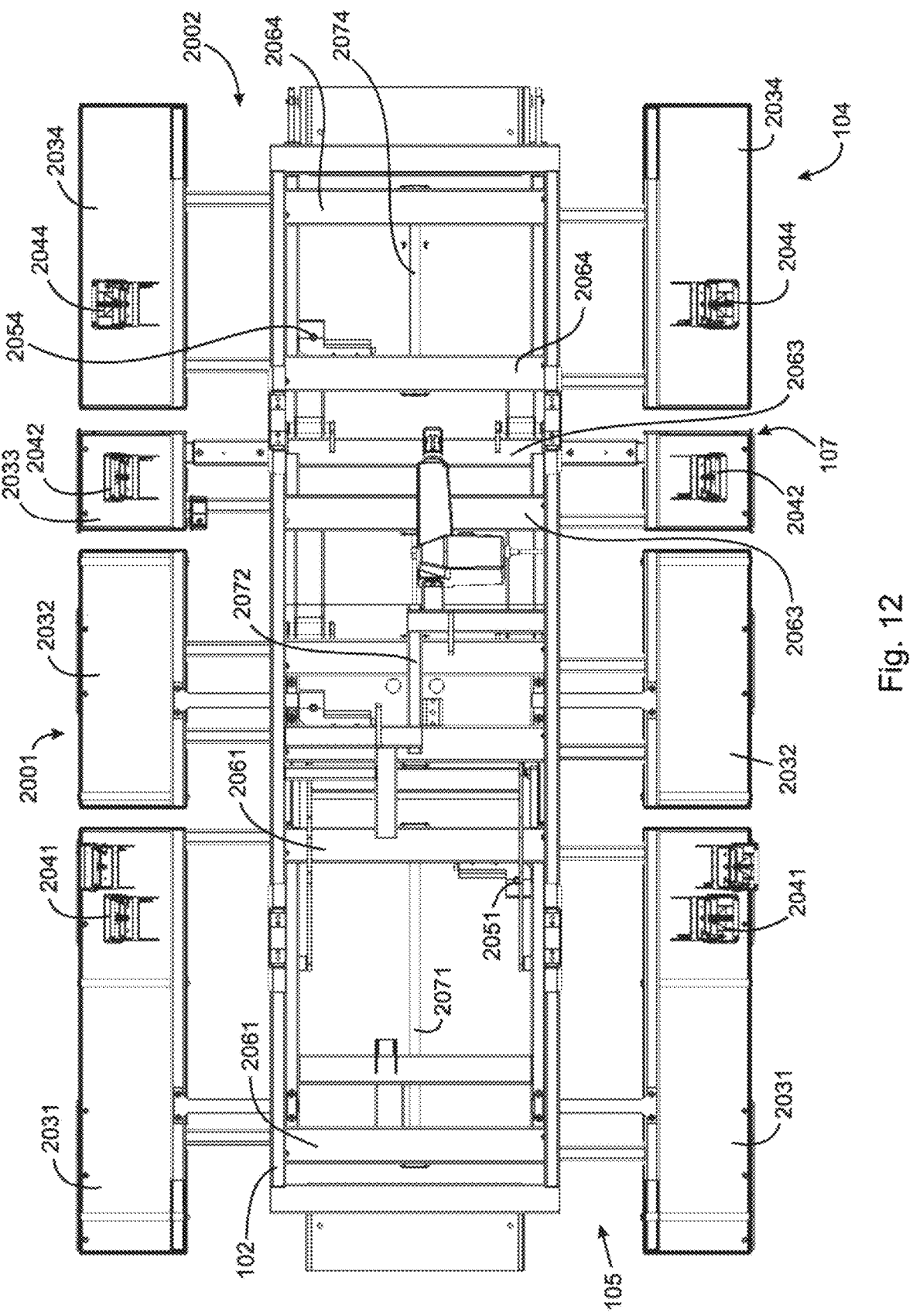
FIG. 12 shows a bottom view of the expanded patient support deck of FIG. 11.

As described below, control system 3300 is configured to monitor the width and locked status of each of the deck sections and, optionally, as well as of the headboard and base. To monitor the width and locked status, as noted control system 3300 includes various sensors S (FIGS. 1, 9, and 24) that may be used to detect the width (or length) of the deck (headboard and/or base) and the locked or unlocked status of the deck section latch mechanisms (e.g., 2051, 2052, 2054 (see FIG. 12)), including non-contact based sensors and contact-based sensors. For details of sensors S, reference is made to the detail description that follows. In any of the described sensors, it should be understood that the sensors may be PCB mounted sensors or a stand-alone non-PCB mounted sensors.

Further, the sensors may use discrete sensor signals or continuous signals. In some cases, the sensors may provide approximate widths of the deck sections and, hence, require another signal to provide the exact position. In other cases, the sensors provide the exact positions of the deck section extensions. Additionally, the sensors may use binary sensors that provide binary signals.

While the detailed illustration of the various sensors are made in reference to one of the deck sections, namely seat section 2001, it should be understood that the detailed description of the sensors below applies to the sensors mounted in the other deck sections, as well as the headboard and/or the base.

Referring to FIGS. 24-28, in one exemplary embodiment of a non-contact sensor, the patient support 100 and width-adjustable patient support deck 104 may include a sensor 3006 in the form of an optical sensor that is used in conjunction with a readable label or tag 3008, such as a reflective label described below. One example of an optical sensor includes a PCB mounted phototransistor and photo-diode, or, alternatively, a stand-alone non-PCB mounted sensor. In the illustrated embodiment, the sensor 3006 is mounted to one of the fixed members (e.g., fixed rack and pinion mechanism housing tube 2062) (removed for clarity) of the fixed section of the patient support deck frame 102. However, it should be understood that the position of the sensor and the tag 3008 (and light source described below) may be reversed—in other words, the sensor can be mounted to one of the movable member (e.g., extension cross-member 2083) and the tag mounted to the fixed member (e.g., fixed rack and pinion mechanism housing tube 2062).

In the illustrated embodiment, the readable label or tag 3008 comprises an adhesive backed reflective strip with multiple reflective gradient sections, which may be mounted to one of the movable members, for example, extension cross-member 2083, of the patient support deck frame 102.

A light source (not shown) may be mounted to the fixed member (e.g., fixed rack and pinion mechanism housing tubes 2062), which is directed and aligned (e.g., vertically) with the reflective strip. As the deck width is adjusted between the different deck width positions (i.e., 36", 42" and 48"), the reflective strip will move past the light source and sensor so that the sensor will receive reflections back from the reflective strip, with different signals being generated by the variations in the reflective gradient and received by the sensor as the extendible section of the deck is moved.

For example, in the illustrated embodiment, tag 3008 includes three different sections 3008a, 3008b, and 3008c, for example, three different reflective gradient sections. As a result, the amount of light from the light source that is reflected back from the reflective strip 3008 sensed by the sensor 3006 and communicated to the controller 3302 will vary as the extendible section of the deck is extended or retracted. Thus controller 3302, utilizing stored data, may determine the approximate patient support deck width (whether it is in the 36" range, 42" range or 48" range) based on the sensed amount of light. Because both extendible sections of the deck move in unison, a single optical sensor may be used to sense the width for both sides of the patient support deck.

However, in order to determine the exact width of the deck, controller 3302 will need additional input. As noted above controller 3302 receives signals from the sensor 2090a of the latch mechanism of the respective deck section. Thus, when controller 3302 receives signals from the sensor 2090a of the latch mechanism of the respective deck section that the latch pin is locked, controller 3302 can use that signal to confirm the exact width of the deck section when combined with the optical sensor signal of the width of the deck section.

For example, in the standard 36" deck width position, the reflective strip might reflect back 90% of the emitted light from the light source. Comparatively, in the expanded 48" deck width position, perhaps only about 5%-10% of the emitted light is reflected back and sensed by the optical sensor 3006. The amount of reflected light measured by the optical sensor 3006 may be converted into a corresponding electrical current output, which is used by the control system 3300 to interpolate and indicate the corresponding patient support deck width. Optical light methodologies may be used such as infrared light, UV light, laser, and color detection sensing.

Each deck section can include the described optical sensor 3006, light source, and the reflective strip, therefore the controller 3302 can determine the width of each individual deck section based on the readings of the reflective strip taken by the sensor and based on the latch sensor signals. The controller 3302 may then determine if the patient support deck 104 is in an unacceptable width configuration. An unacceptable width configuration may occur when one or more of the deck sections is not positioned at the same width, or if the width at which the patient support deck is positioned is determined to be incompatible with the height of the patient support 100 and/or the position of the side rails. The control system 3300 may issue an alert or a prompt if the patient support deck 104 is determined to be in an unacceptable width configuration.

Alternately, the reflective strip may include four reflective gradient sections, which are aligned so that the transitions between the different gradients align with a designated width, e.g., 36", 42", or 48", so that the controller 3302 may detect and use the change in the signal (which would have a step profile) as the indication of the width the deck section. In this manner, the optical sensor signal could be used alone without the latch sensor signal to indicate the exact width of the deck section.

In another embodiment, the sensor 3006 may be in the form of a color optical sensor that detects and differentiates between colors. The color sensor may be mounted to a fixed member (e.g., fixed rack and pinion mechanism housing tube 2062) of the patient support deck frame 102 and the readable label or tag 3008 may be in the form of a color strip, for example, a color strip with multiple-colored sections, similar to the reflective gradient sections described above. Similarly, the color strip may be mounted to one of the movable members, for example, extension cross-member 2083 of the patient support deck frame 102, while sensor 3006 is mounted to a fixed member, as noted above.

As the deck width is adjusted between the different deck width positions, one color on the color strip will align with and be sensed by the color sensor. Using color sensing, each corresponding deck width position could have a unique color associated with it that could be detected and monitored accordingly (i.e., 36"=green, 42"=blue, and 48"=red). The color may be communicated to the controller 3302, and then the controller 3302, utilizing stored data, may determine the exact or approximate patient support deck width based on the sensed color and then using the latch sensor signal to determine the exact width when only an approximate width can be determined. For example, an approximate width can be determined when using color sections that span a range of movement, and an exact width can be determined by using color bars that align exactly with each of the defined positions, or by using the transitions between the colors in a similar manner as noted above in reference to the reflective gradient sections.

Figure 28:
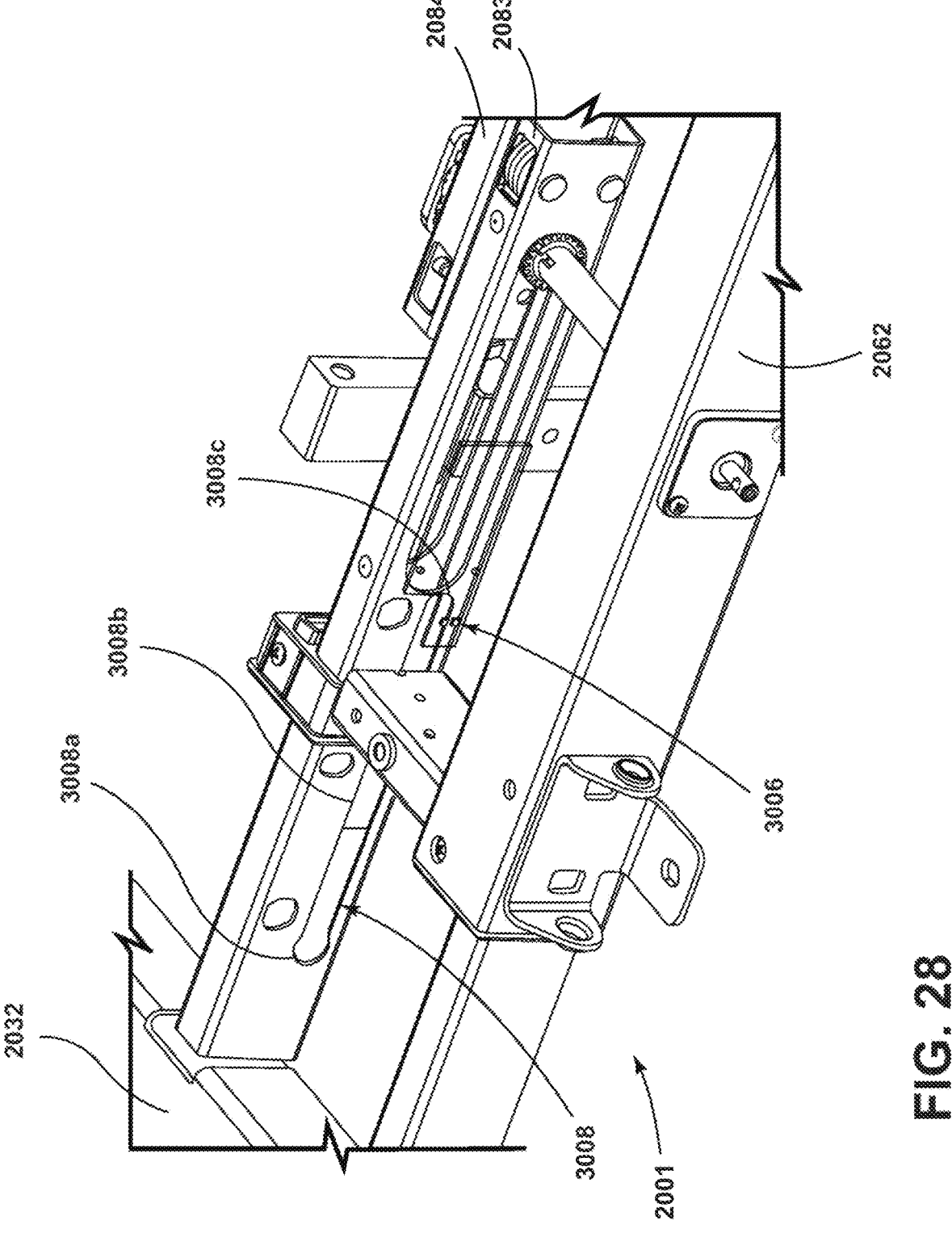
FIG. 28 is an enlarged view of the patient support deck of FIG. 25 at an expanded third width.
Figure 28A:
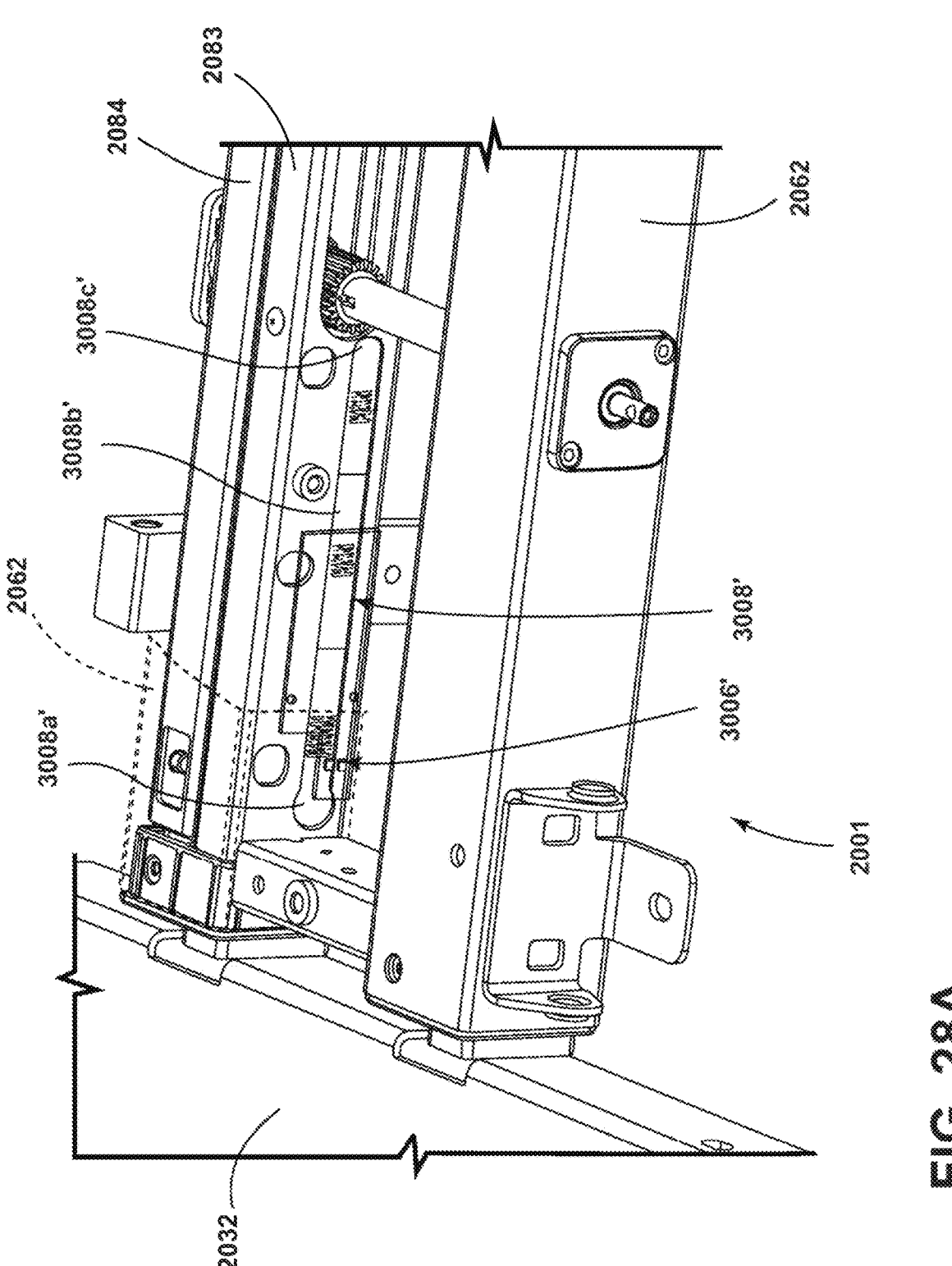
FIG. 28A is a perspective view of a seat deck section of the patient support deck of including an RFID tag and RFID reader for sensing the width of the seat deck section of the adjustable patient support deck.

According to yet another embodiment, referring to FIG. 28A, the sensor 3006' may be in the form of an RFID (radio frequency identification) reader or sensor and the readable label or tag 3008' may comprise an RFID tag, including a passive or active RFID tag. Sensor 3006' may be a PCB mounted RFID reader (as shown) or, alternatively, a stand-alone non-PCB mounted sensor. In the illustrated embodiment, the sensor 3006' is mounted to the fixed member (e.g., fixed rack and pinion mechanism housing tube 2062) of the patient support deck frame 102. However, it should be understood that the position of the sensor and the tag 3008' may be reversed—in other words, the sensor can be mounted to a movable member and the tag mounted to a fixed member.

In the illustrated embodiment, tag 3008 includes three RFID tags 3008a', 3008b', and 3008c' encoded with digital data that corresponds to specific deck width positions may be mounted to the movable member (e.g., extension cross-member 2083) of the patient support deck frame 102 in the correlating deck width locations. As noted, sensor 3006' is mounted to the fixed member (e.g., fixed rack and pinion mechanism housing tubes 2062), which is removed for clarity to show the tag 3008' and movable member, namely extension cross-member 2083.

For example, sensor 3006' may be mounted on the outside surface of the fixed member (e.g., fixed rack and pinion mechanism housing tube 2062), which includes a viewing opening there through aligned with the sensor to allow the sensor to read the RFID tags as they move passed the viewing opening. Alternately, the sensor may be mounted on the inside surface of the fixed member (e.g., fixed rack and pinion mechanism housing tube 2062) if sufficient gaps are provided between the movable member and fixed member.

As the deck width is adjusted between the different deck width positions, the RFID reader senses or reads the encoded digital data of the adjacent RFID tag and communicates the RFID tag reading to the controller 3302. Utilizing stored data, the controller 3302 may determine the patient support deck width based on the RFID tag reading. An output voltage corresponding to the RFID tag reading may be used by the control system 3300 to interpolate and indicate a current deck width position. Optionally, the RFID tag may be a wireless emitter or reader tag.

Alternatively, the reader may instead be a bar code reader, such as a QR code reader, and the readable labels or tag may comprise bar code labels, such as QR code labels, and the controller 3302 can determine the corresponding width of the patient support deck 104 based on the bar code reading. It is contemplated that the RFID tag or bar code may be configured as alternate readable code, such as barcodes. The term "barcode" is used broadly to include one dimensional and two-dimensional barcodes, such as barcodes formed from a plurality of lines (or bars) or barcodes formed from a plurality of shapes, such QR codes, Qcodes, DotCodes, EZcodes, or the like, as well as color barcodes.

Figure 29:
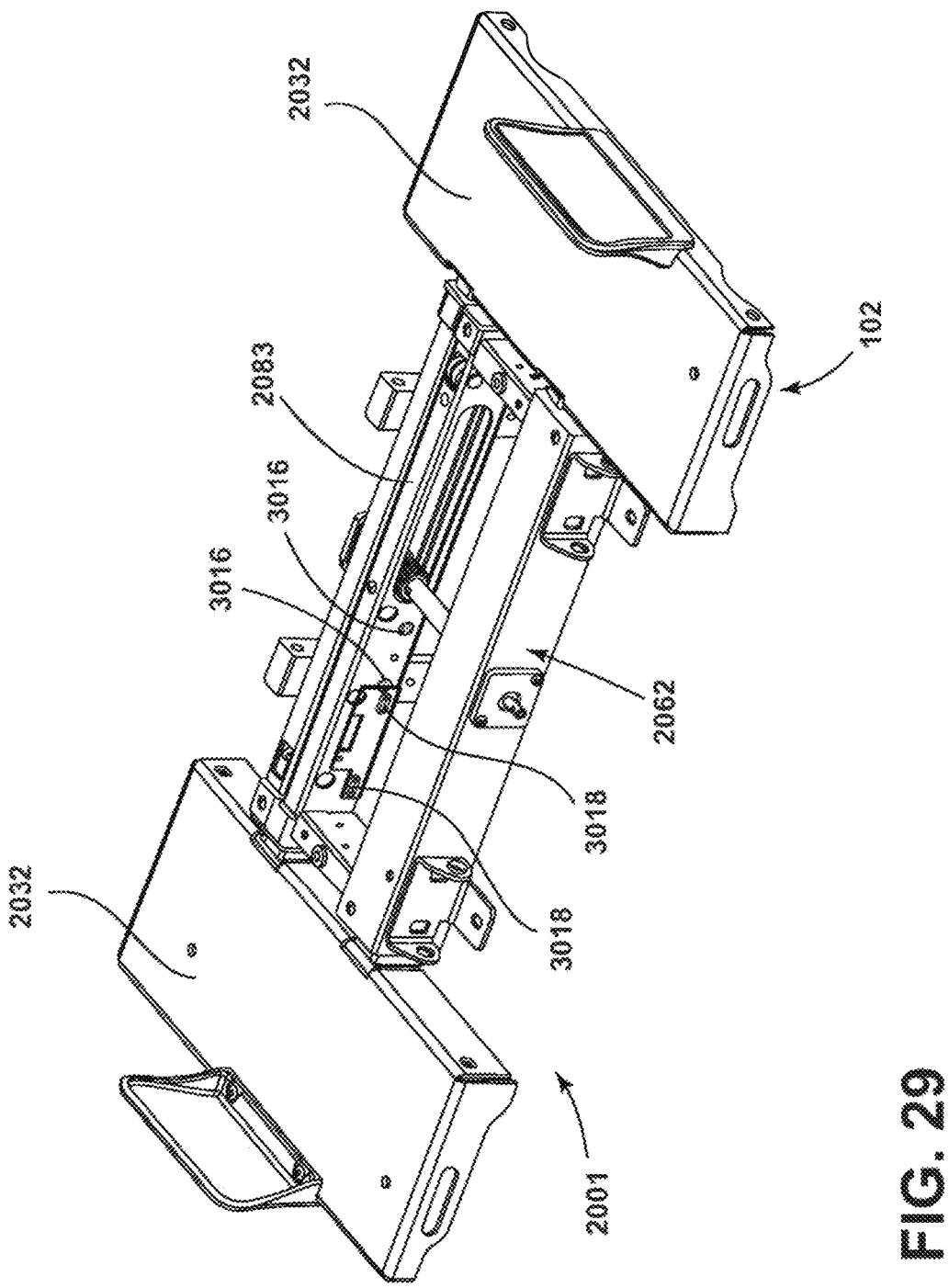
FIG. 29 is a perspective view of a seat deck section of the patient support deck including a hall effect sensor for sensing the width of the seat deck section of the adjustable patient support deck.
Figure 30:
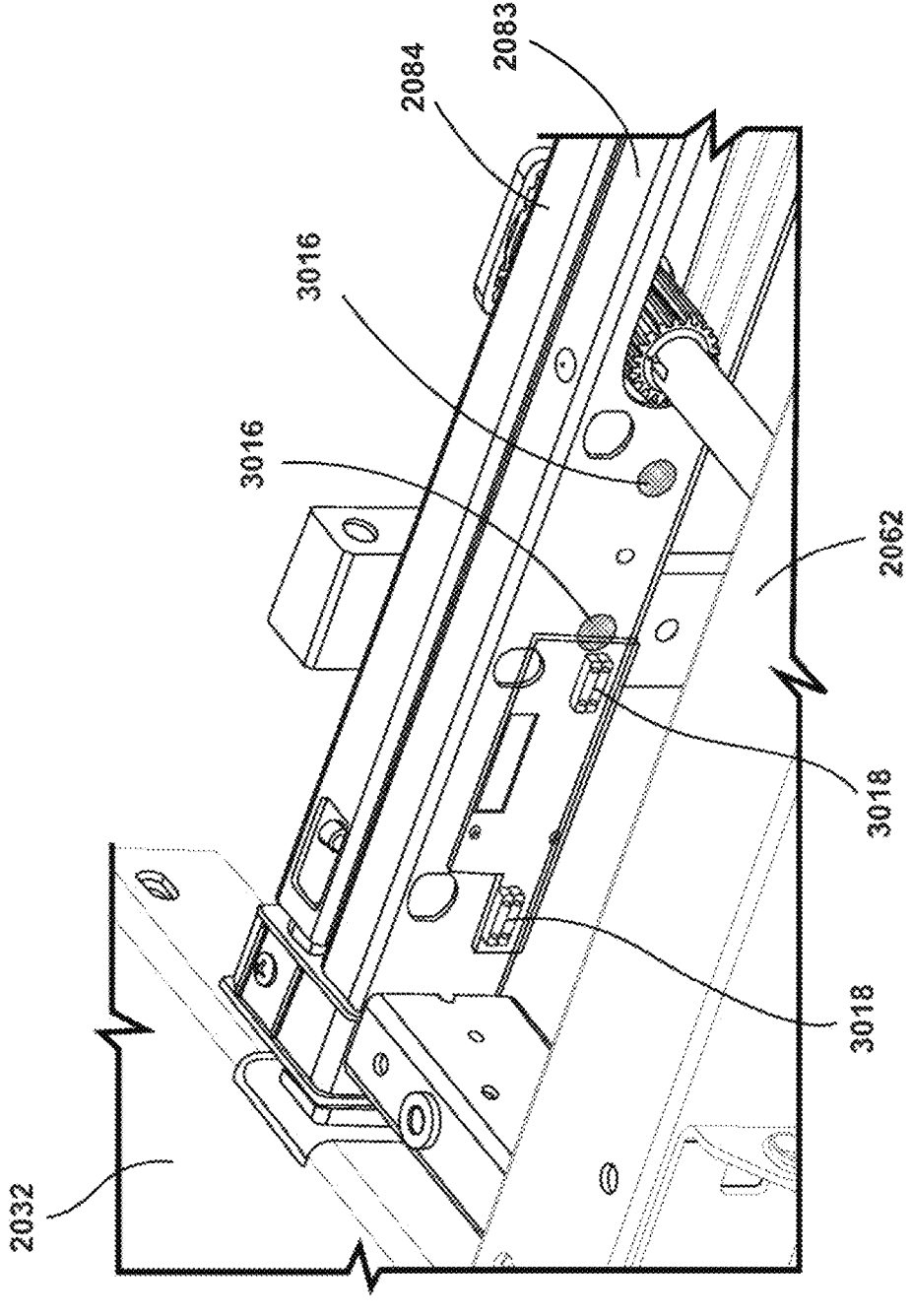
FIG. 30 is an enlarged view of the patient support deck of FIG. 29 at a standard first width.
Figure 31:
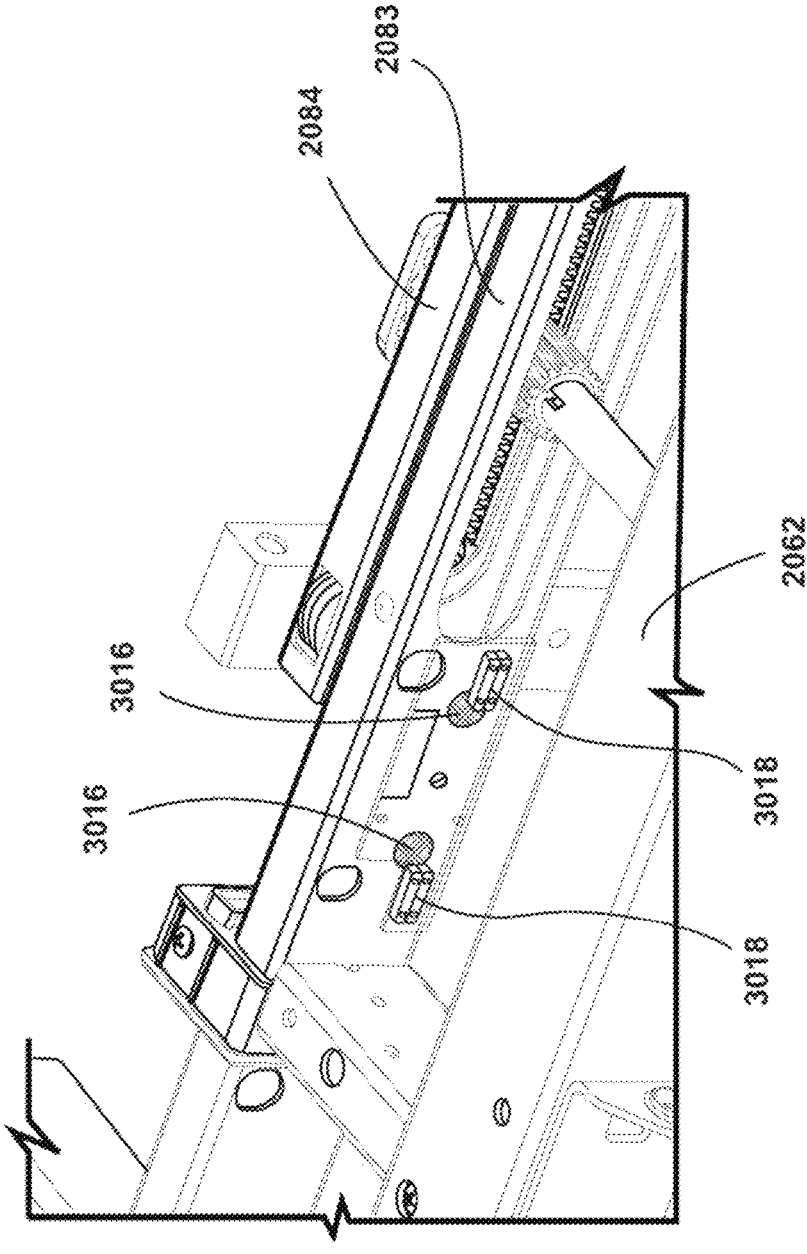
FIG. 31 is an enlarged view of the patient support deck of FIG. 29 at an intermediate second width.
Figure 32:
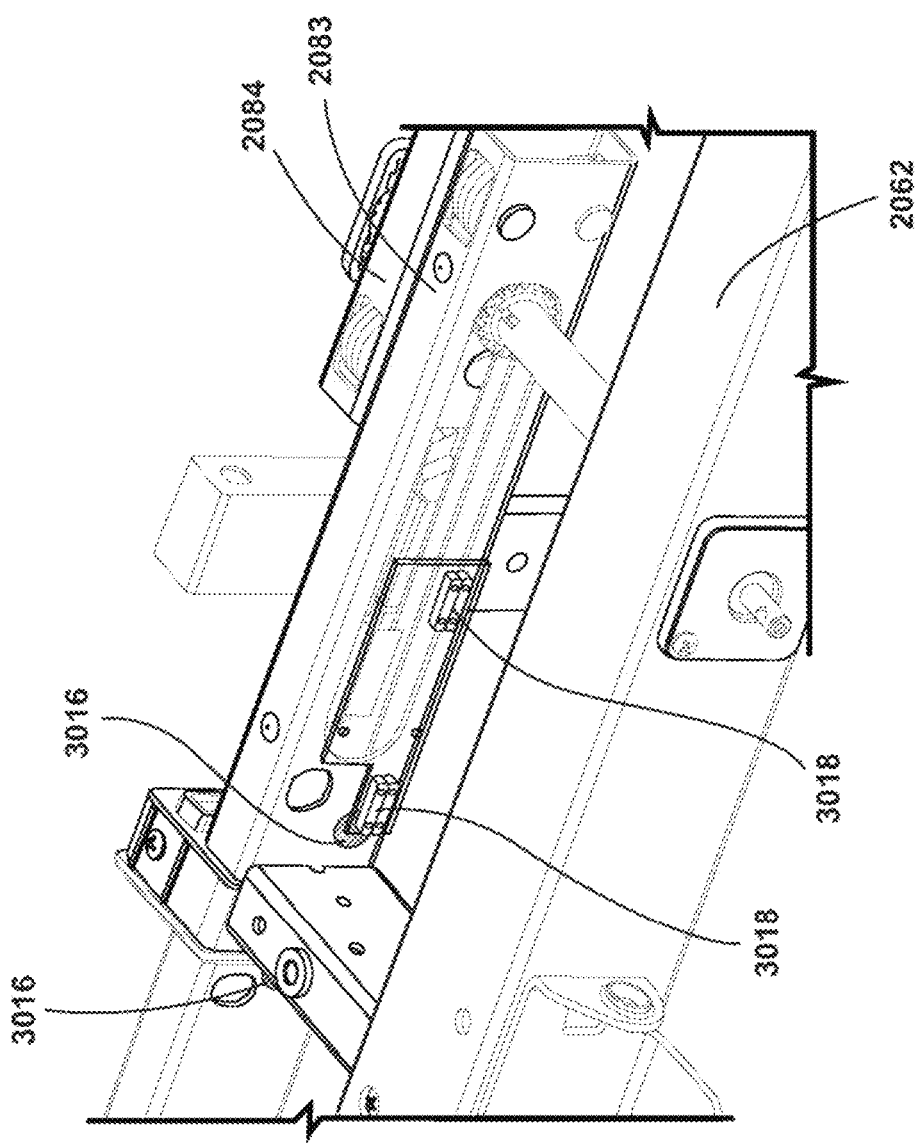
FIG. 32 is an enlarged view of the patient support deck of FIG. 29 at an expanded third width.
Figure 33:
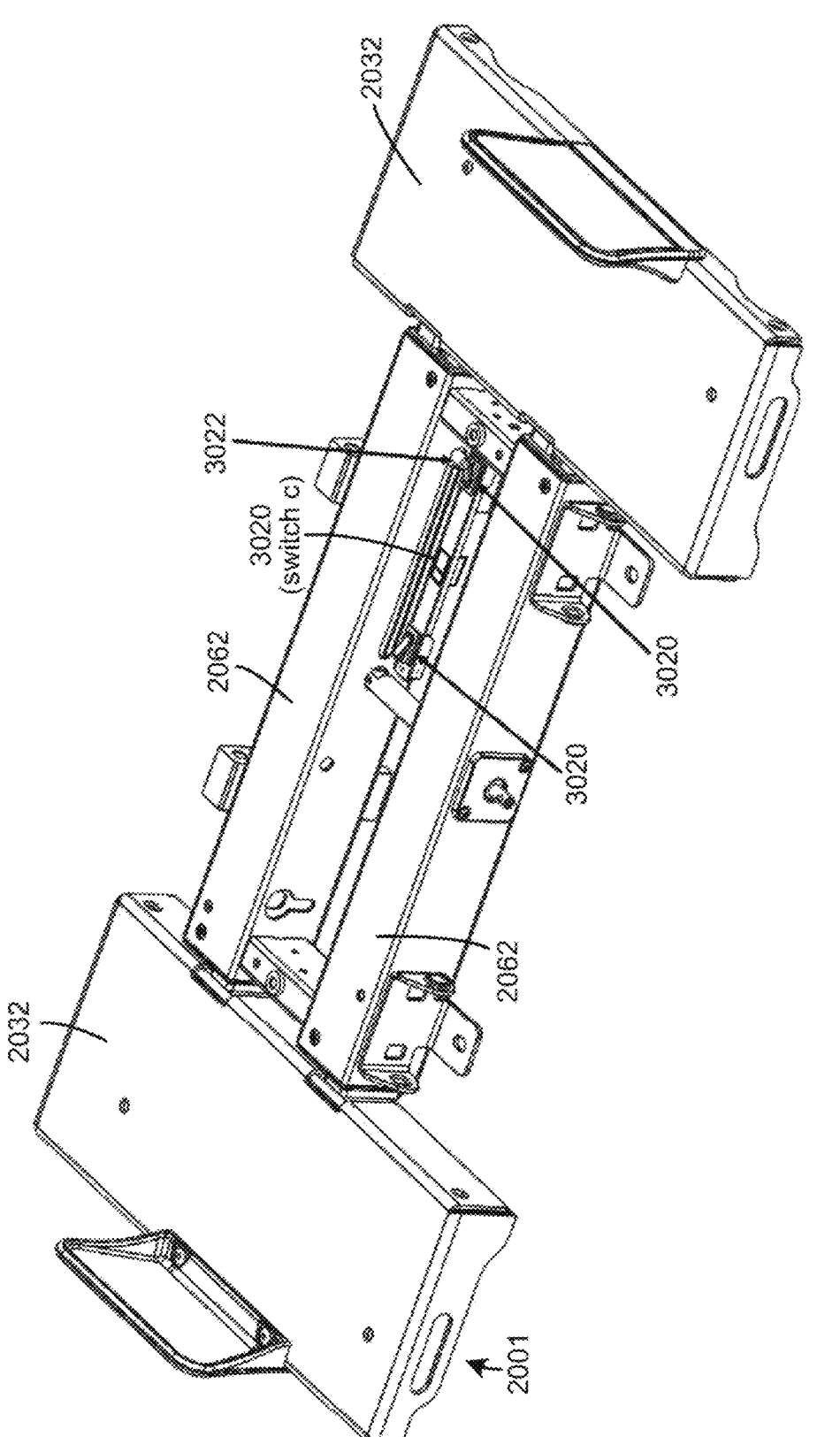
FIG. 33 is a perspective view of a seat deck section of the patient support deck including discrete switches for sensing the width of the seat deck section of the adjustable patient support deck.
Figure 34:
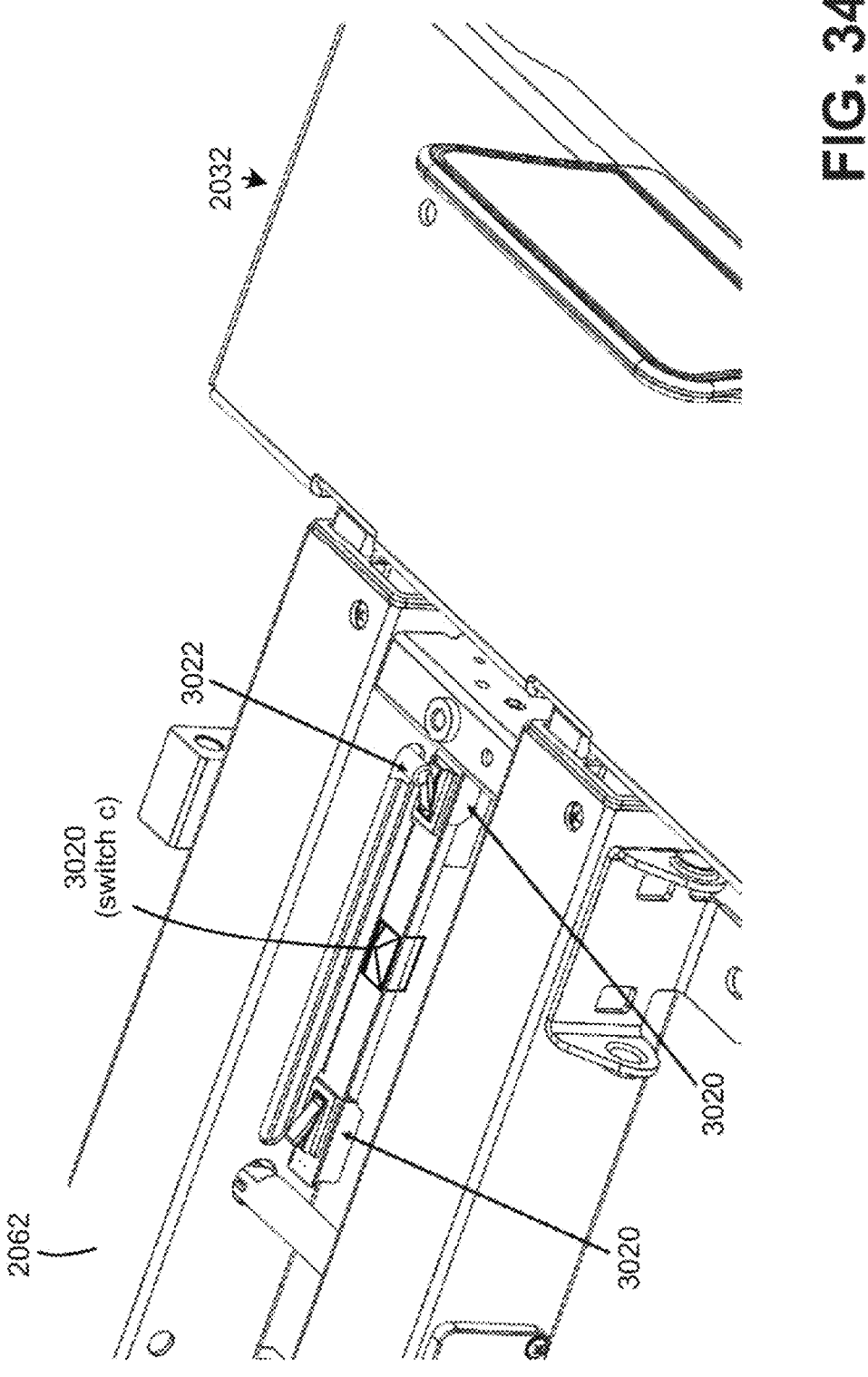
FIG. 34 is an enlarged view of the patient support deck of FIG. 33 at a standard first width.
Figure 35:
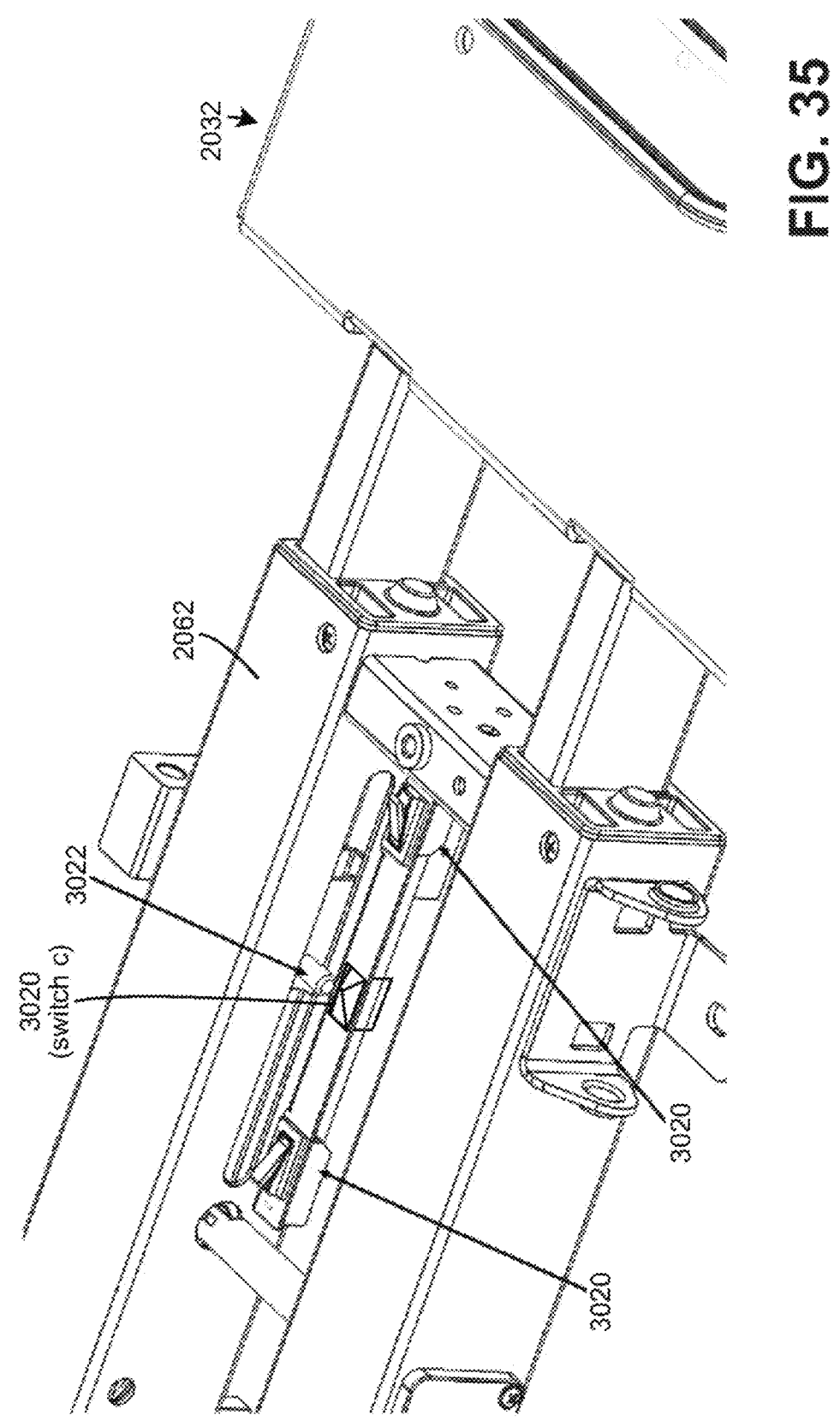
FIG. 35 is an enlarged view of the patient support deck of FIG. 33 at an intermediate second width.
Figure 36:
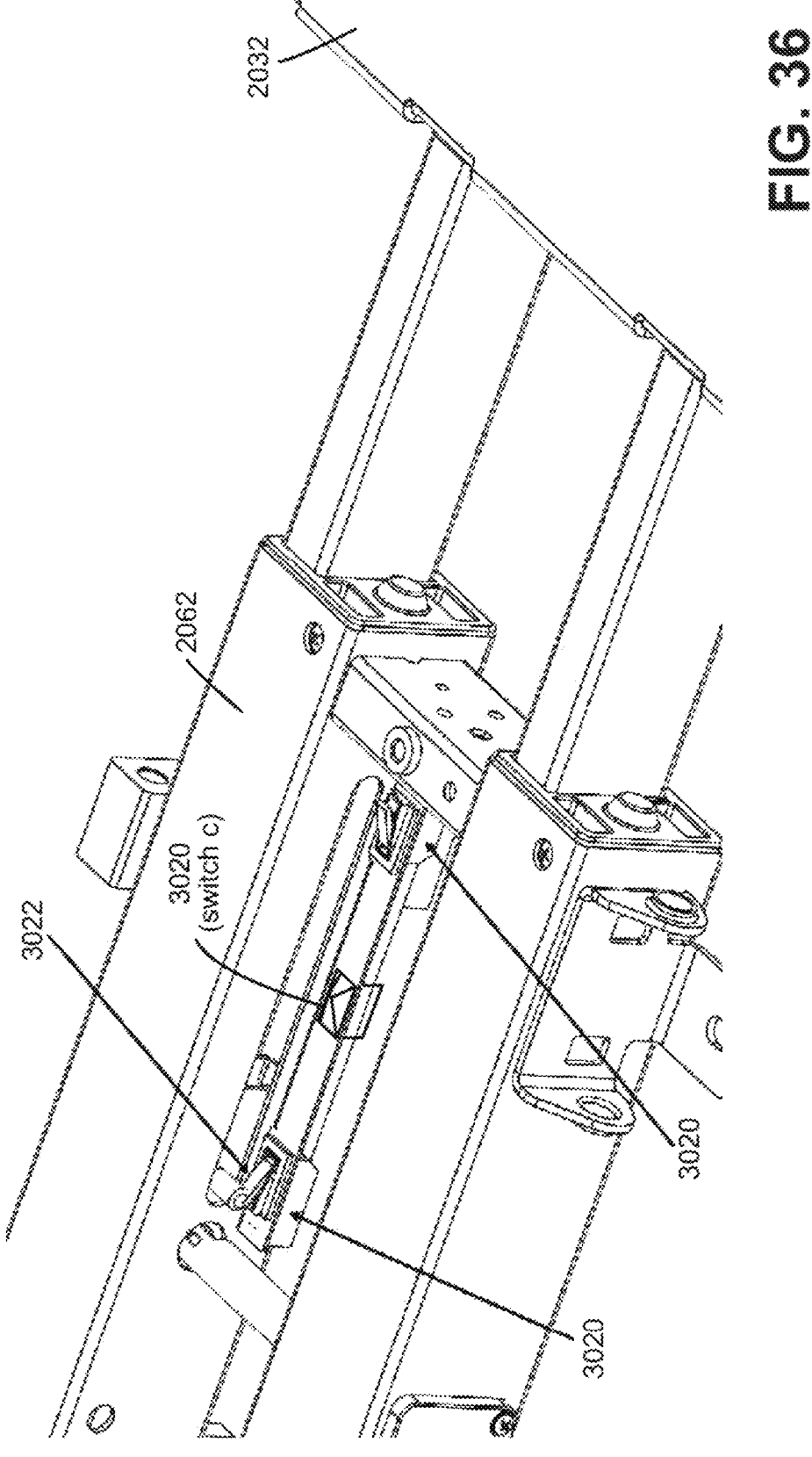
FIG. 36 is an enlarged view of the patient support deck of FIG. 33 at an expanded third width.
Figure 37:
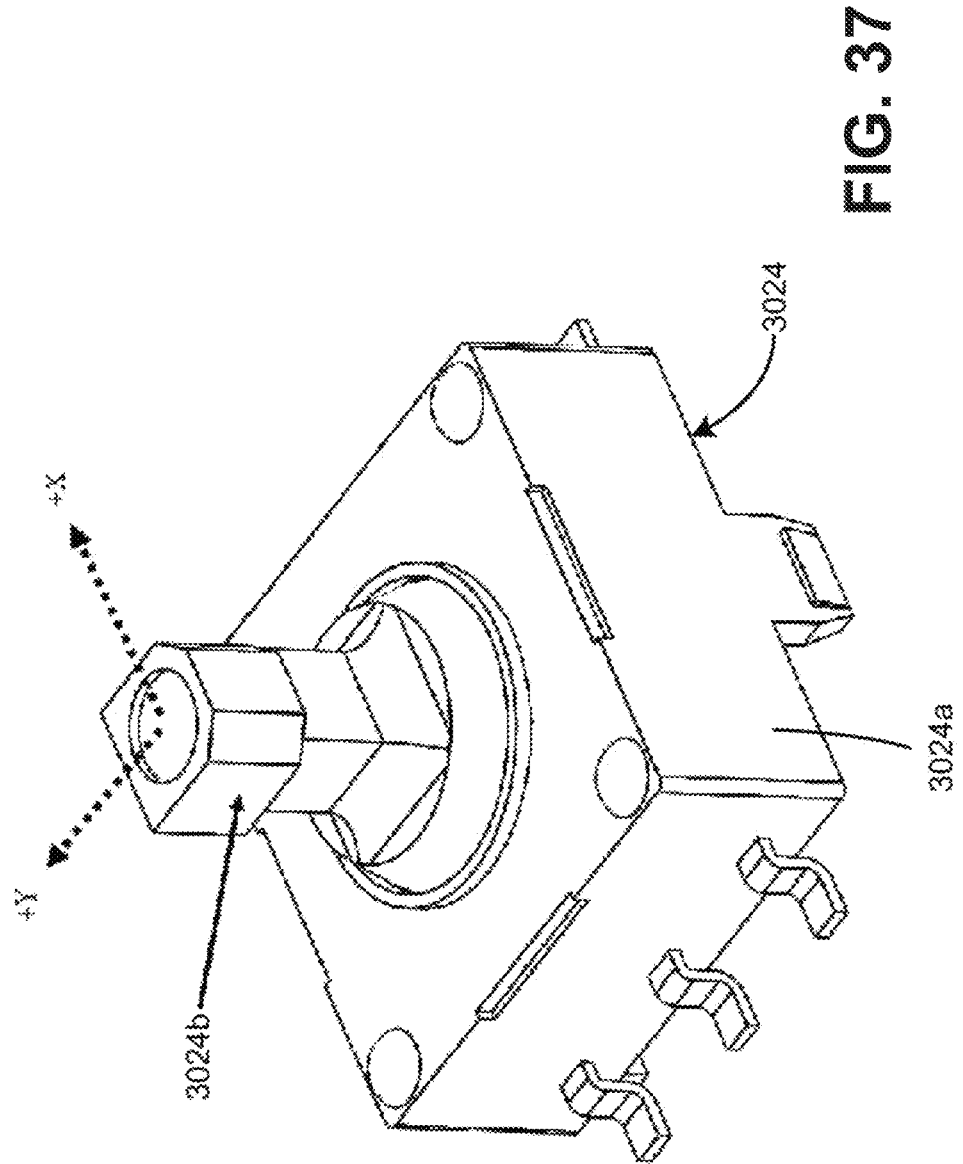
FIG. 37 is a perspective view of a multi-axis switch.
Figure 38:
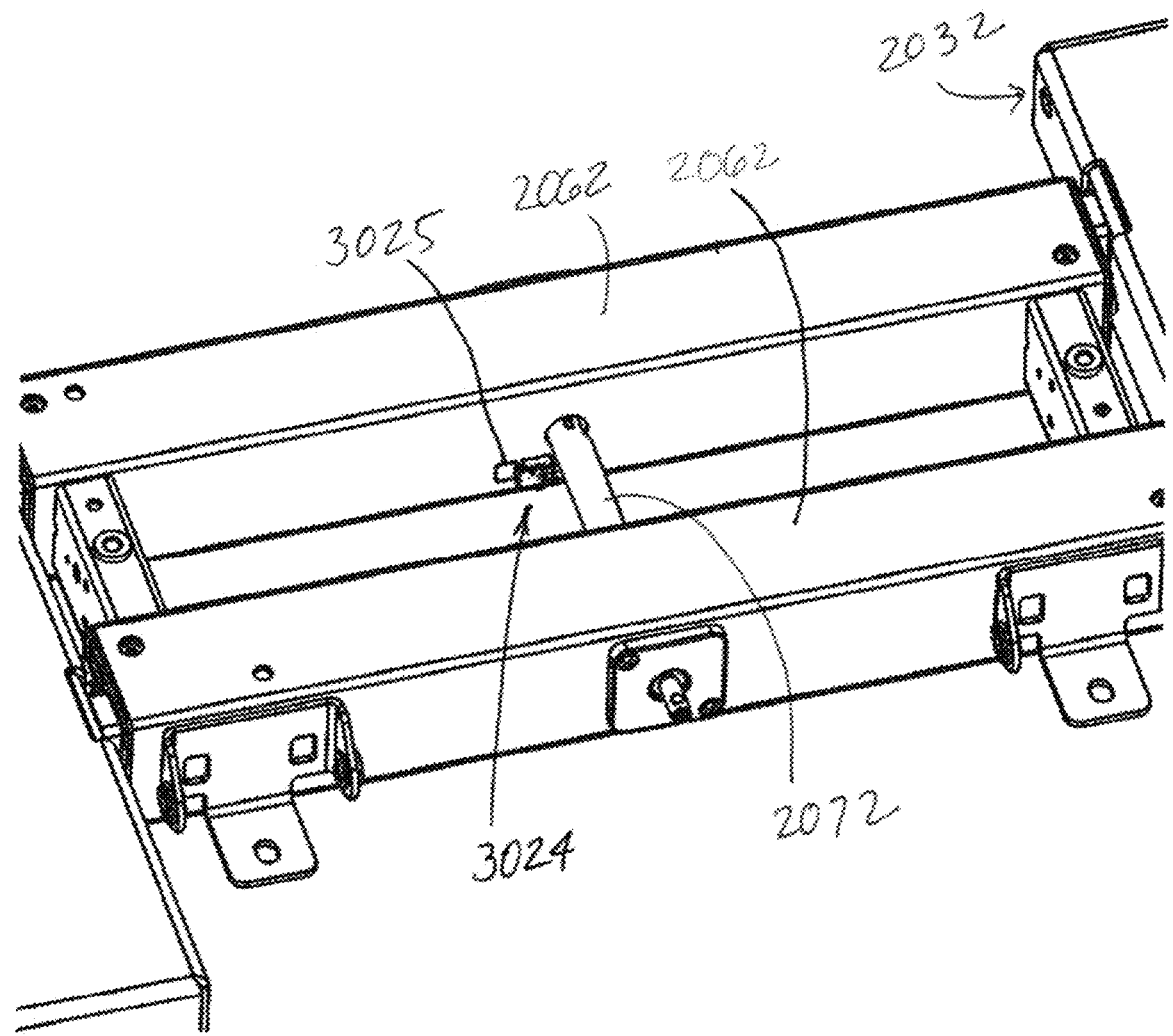
FIG. 38 is a perspective view of a seat deck section of the patient support deck including the multi-axis switch of FIG. 37 for sensing the width of the seat deck section of the adjustable patient support deck.
Figure 38A:
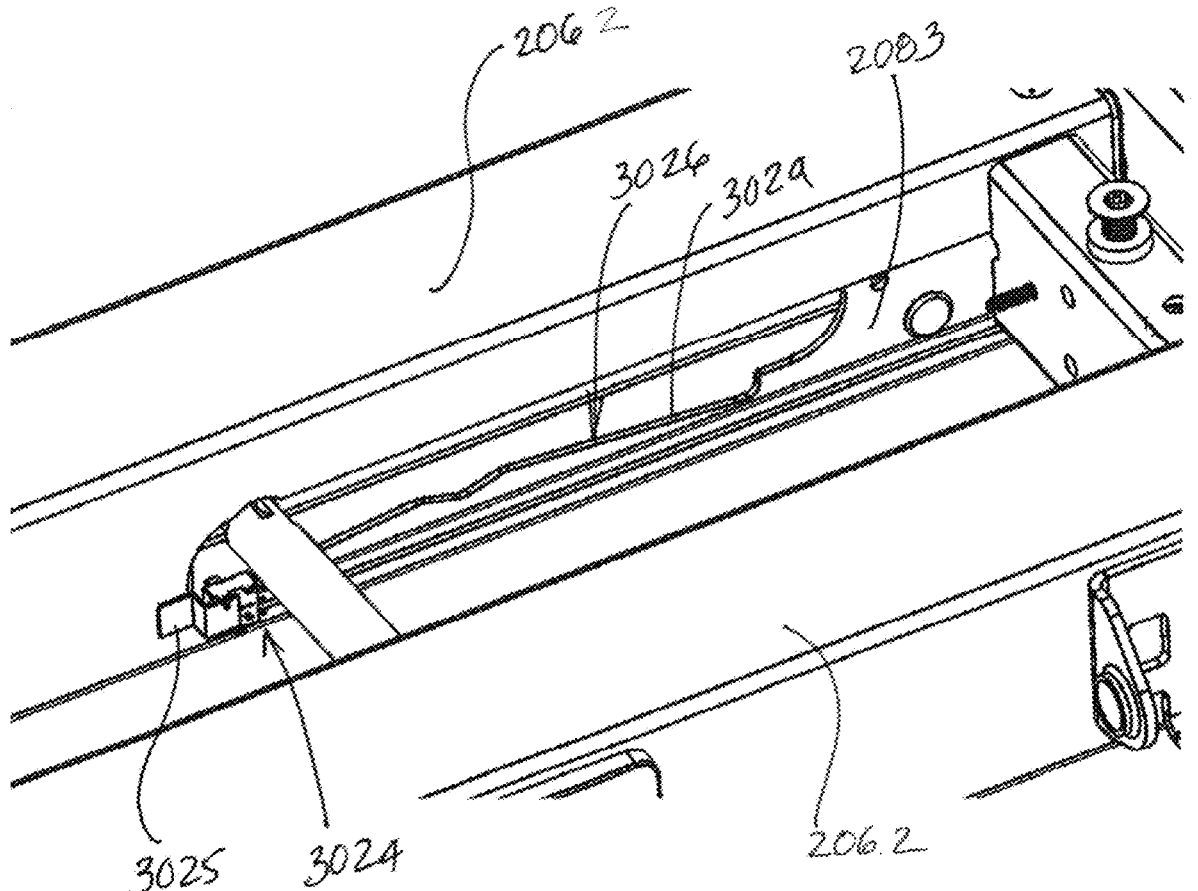
FIG. 38A is a similar view to FIG. 38 with the outer fixed tube removed to show the movable portion of the deck section.
Figure 38B:
FIG. 38B is a similar view to FIG. 38 with a portion of the outer fixed tube removed to show the movable portion of the deck section.
Figure 39:
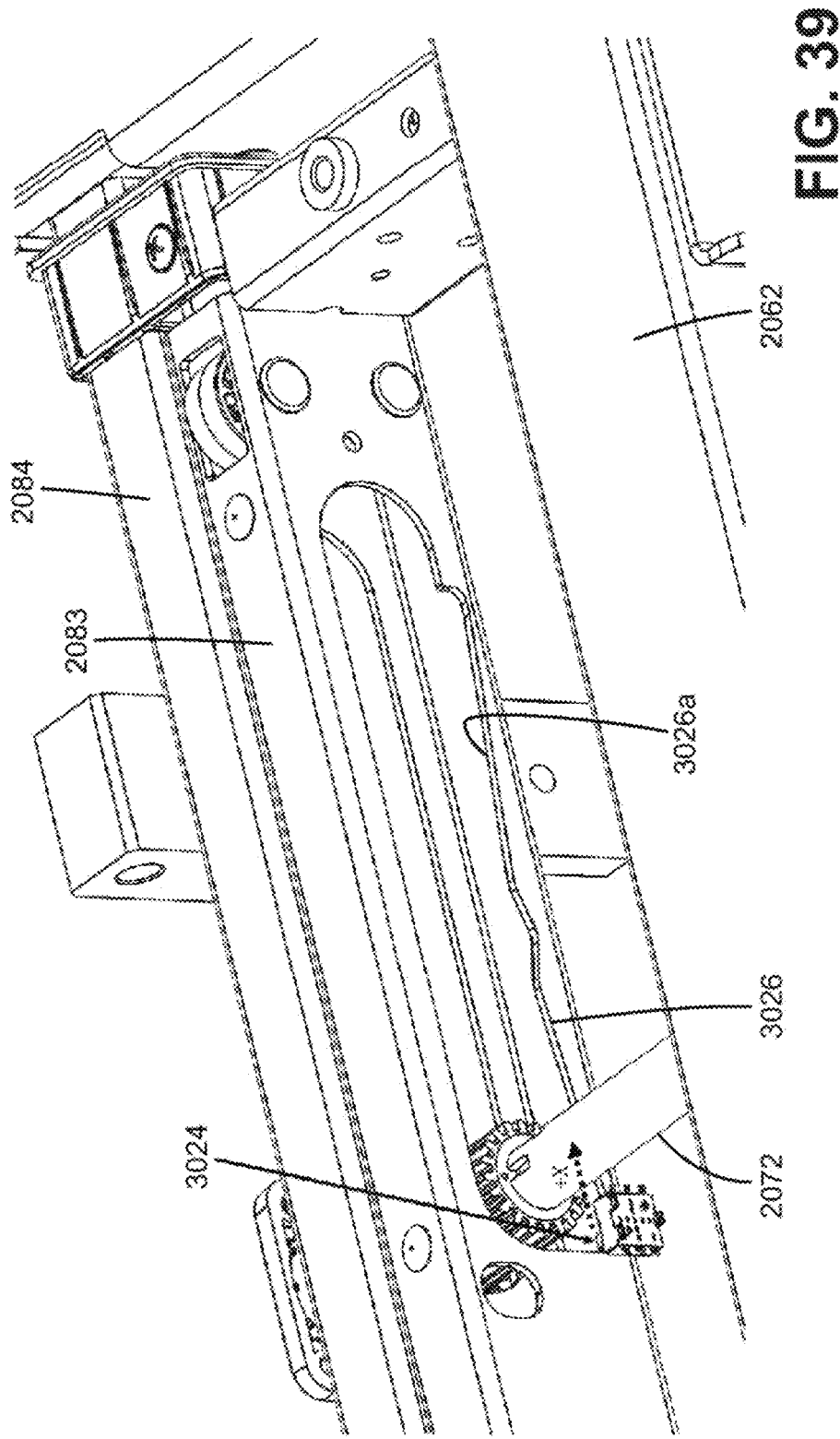
FIG. 39 is an enlarged view of the patient support deck of FIG. 38A at a standard first width.
Figure 40:
FIG. 40 is an enlarged view of the patient support deck of FIG. 38A at an intermediate second width.
Figure 41:
FIG. 41 is an enlarged view of the patient support deck of FIG. 38 at an expanded third width.

Referring to FIGS. 29-32, according to another embodiment, the sensor may be in the form of a magnetic field sensor 3018, which senses magnets placed on the movable portion of the deck. Again, the placement of the sensor and magnets can be reversed. Referring to FIG. 29, in the illustrated embodiment, two or more permanent magnets 3016 may be installed at different positions on the movable member (e.g., extension cross-member 2083) of the patient support deck frame 102. Using two sensors 3018 and two magnets 3016, the sensors can detect the three respective deck width positions. The magnetic field sensors may be stand-alone or PCBA mounted and may be mounted to the fixed member (e.g., fixed rack and pinion mechanism housing tube 2062) of the patient support deck frame 102.

The sensors 3018 can detect the corresponding magnetic flux fields of each of the permanent magnets 3016. In one embodiment, the magnetic field sensors 3018 comprise switches that will open or close in response to the presence or absence of the magnets 3016 as the deck width is adjusted between the different deck width positions so thereby provide a binary-type deck width sensing. The open or closed state of the switches is communicated to the controller 3302, and then the controller 3302, utilizing stored data, may determine the patient support deck width based on the open or closed state of each of the switches.

In one example, the sensors comprise reed switches to detect either the presence or absence of a magnetic field from the magnets 3016 at each of the positions. When a magnetic field is detected, the reed switches are 'made' (closed), and when magnetic field is no longer detected switches are 'break' (open). In this arrangement, the reed switches may be used for binary type deck width position sensing where the three deck positions may be detected, but deck width positions between the three deck width positions may not be detectable. An example using two magnets and two switches using the open/break and closed/made status of each switch is illustrated in the Table 1 below.

TABLE 1

| DECK WIDTH POSITION | STATE OF SWITCHES (2 SWITCH ARRAY) | |
| | REED SWITCH 1 (B) | REED SWITCH 2 (A) |
| --- | --- | --- |
| UNKNOWN | OPEN | OPEN |
| 36" | CLOSED | OPEN |
| 42" | CLOSED | CLOSED |
| 48" | OPEN | CLOSED |

In another embodiment, the magnetic field sensor 3018 may be in the form of a hall effect sensor. Similar to the previous embodiment, two magnets 3016 having varying magnetic field strength may be installed on the movable member (e.g., extension cross-member 2083) of the patient support deck frame 102. The hall effect sensor can detect the corresponding intensity of the magnetic field of each of the magnets 3016. As the deck width is adjusted between the different deck width positions, the hall effect sensor activates a voltage output that correlates to the magnetic field strength of the aligned magnet 3016. The voltage output of the hall effect sensor is communicated to the controller 3302, and the controller 3302, utilizing stored data, may determine the patient support deck width based on the voltage output of the hall effect sensor. An output voltage that is directly proportional to the magnetic field output may be used by the control system 3300 to interpolate and indicate a current deck width position, using the same logic shown above in Table 1.

In an alternate embodiment, three magnets and one magnetic sensor may be used, with each magnet being located to correspond to the three different width positions of the extendible section of the deck section.

Referring to FIGS. 33-36, in still another embodiment, the sensor may be in the form of two or more discrete mechanical switches 3020. For example, the switches 3020 (lever, plunger, etc.) can be positioned in specific or strategic positional arrangements or arrays, which mechanically interface and interact with the movable member (e.g., extension cross-member 2083) to generate signals used by the control system to determine the width of the deck section. The 'open' or 'closed' state of the switches can be used by the control system 3300 and software to interpolate and determine the specific deck width position. Like magnetic reed switches, discreet switches can be used for binary type deck width position sensing where the acceptable locked and latched deck width positions can be detected, but positions in-between approved deck width positions cannot (which in the table are referred to as "unknown").

In this embodiment, an arm 3022 may be mounted on the movable member (e.g., extension cross-member 2083), which extends through a slotted opening formed in fixed member (e.g., fixed rack and pinion mechanism housing tube 2062) (removed for clarity) of the patient support deck frame 102. As the expandible section of the deck section moves, so too does the arm. The switches are arranged along the path of the arm so that they correspond to a specific width of the deck section and when activated by the arm, therefore, can be used to provide feedback to the controller about the width of the deck section.

The switches 3020 may open or close in response to contact with the arm 3022 when the movable member (e.g., extension cross-member 2083) of the patient support deck frame 102 moves. The controller 3302, utilizing stored data, is configured to determine the patient support deck width based on the open or closed state of discrete switches 3020.

In one embodiment, a switch is located at each width position—in other words for a deck section that has three widths, three switches can be used, Using the state of each switch, the controller can determine the width of the deck section, using the logic in the Table 2 below. For example, each switch may have a normally open state. As the arm moves over each switch, the state of the switch changes from open to closed. When the arm moves passed the switch, then the switch returns to its normally open state. Thus, when one switch is closed, the controller can determine the width of the deck section, but the positions in-between approved deck width positions cannot (which in the table are referred to as "unknown").

TABLE 2

| DECK WIDTH POSITION | STATE OF SWITCHES (3 SWITCH ARRAY) | | |
| | SWITCH B | SWITCH C | SWITCH A |
| --- | --- | --- | --- |
| UNKNOWN | OPEN | OPEN | OPEN |
| 36" | CLOSED | OPEN | OPEN |
| 42" | OPEN | CLOSED | OPEN |
| 48" | OPEN | OPEN | CLOSED |

In another embodiment, two switches may be used. When using two switches, a second input is needed depending on where the switches are located. For example, using a similar arrangement to the arrangement similar to that shown in FIG. 33, using only switches labeled A and C, the signals from the switches may be used along with the locked status signal from the sensor 2090a (described above), which detects the status of the latch mechanism. The logic that may be used is show in Table 3 below:

TABLE 3

| DECK WIDTH POSITION | STATE OF WIDTH DETECT SWITCHES (2 SWITCH ARRAY) | | Deck Latch/Lock Sensor/Switch |
|---|---|---|---|
| | SWITCH 1 (A) | SWITCH 2 (B) | SWITCH 3 (C) |
| UNKNOWN | OPEN or CLOSED | OPEN or CLOSED | *OPEN (not locked) |
| 36" | OPEN | CLOSED | CLOSED (locked) |
| 42" | OPEN | OPEN | CLOSED (locked) |
| 48" | CLOSED | OPEN | CLOSED (locked) |

Alternatively, the switches could be arranged along a center rotating camshaft included on the rack and pinion deck adjustment mechanism so that as the shaft rotates the switches will be compressed by a structure or structures formed or provided on the fixed member (e.g., fixed rack and pinion mechanism housing tube 2062) of the deck section. The switches could interface with and engage the various cams in the same manner that a traditional camshaft engages with piston valves, or as with a music box player. As the deck sections are positioned, the cams affect the respective switches with a specific open or closed configuration unique to that deck position. Examples using two or three switches, using the open/break and closed/made status of each switch are illustrated in Tables 4 and 5 below.

TABLE 4

| DECK WIDTH POSITION | STATE OF SWITCHES (3 SWITCH ARRAY) | | |
|---|---|---|---|
| | SWITCH 1 | SWITCH 2 | SWITCH 3 |
| UNKNOWN | OPEN | OPEN | OPEN |
| 36" | CLOSED | OPEN | OPEN |
| 42" | OPEN | CLOSED | OPEN |
| 48" | OPEN | OPEN | CLOSED |

TABLE 5

| DECK WIDTH POSITION | STATE OF SWITCHES (2 SWITCH ARRAY) | |
|---|---|---|
| | SWITCH 1 | SWITCH 2 |
| UNKNOWN | OPEN | OPEN |
| 36" | CLOSED | OPEN |
| 42" | OPEN | CLOSED |
| 48" | CLOSED | CLOSED |

Referring to FIGS. 37-41, in one exemplary embodiment, the sensor may be in the form of another mechanical switch, such as a multi-axis switch 3024, often referred to as a joystick switch, which includes a fixed base portion 3024*a* and a protruding portion 3024*b*. In the illustrated embodiment, fixed base portion 3024*a* of the multi-axis switch 3024 is mounted to the fixed member (e.g., fixed rack and pinion mechanism housing tube 2062) of the patient support deck frame 102 via a mounting bracket 3025 with the protruding portion 3024*b* extending through an opening provided in the fixed member so that it can be moved by the movable member (e.g., extension cross-member 2083) of the deck section in a manner so that the switch generates different signals based on the position of the movable member of the deck section.

In the illustrated embodiment, the movable member (e.g., extension cross-member 2083) of the patient support deck section includes a cam shaped feature 3026 provided by a cutout whose edge 3026*a*, which forms the cam surface, guides the protruding "joystick" portion 3024*b* in a X, Y, and/or Z direction (up and down and also laterally (at the opposed ends)) to indicate the width of the deck section. In other words, the cam feature 3026 is sized and shaped to force the joystick portion 3024*b* of the multi-axis switch 3024 to move in a X, Y, and/or Z direction in response to contact with the cam feature 3026 when the movable member (e.g., extension cross-member 2083) and cam feature 3026 moves.

The direction in which the multi-axis switch 3024 is forced in response to the change of the deck section width is communicated to the controller 3302. Using stored data, the controller 3302 may determine the patient support deck width based on the direction. The direction, which the joystick portion 3024*b* is forced results in a correlating output of the multi-axis switch 3024 that may be used by the control system 3300 and software to interpolate and indicate specific deck width position. An example using a multi-axis switch, and detecting the +X, −X, +Y, and −Y axis direction status of the switch is illustrated in the Table 6 below.

TABLE 6

| DECK WIDTH POSITION | STATE OF SENSOR/SWITCH | | | |
|---|---|---|---|---|
| | X+ Axis | X− Axis | Y+ Axis | Y− Axis |
| UNKNOWN | 0 | 0 | 0 | 0 |
| 36" | 1 | 0 | 0 | 0 |
| 42" | 0 | 0 | 1 | 0 |
| 48" | 0 | 1 | 0 | 0 |

Figure 42:
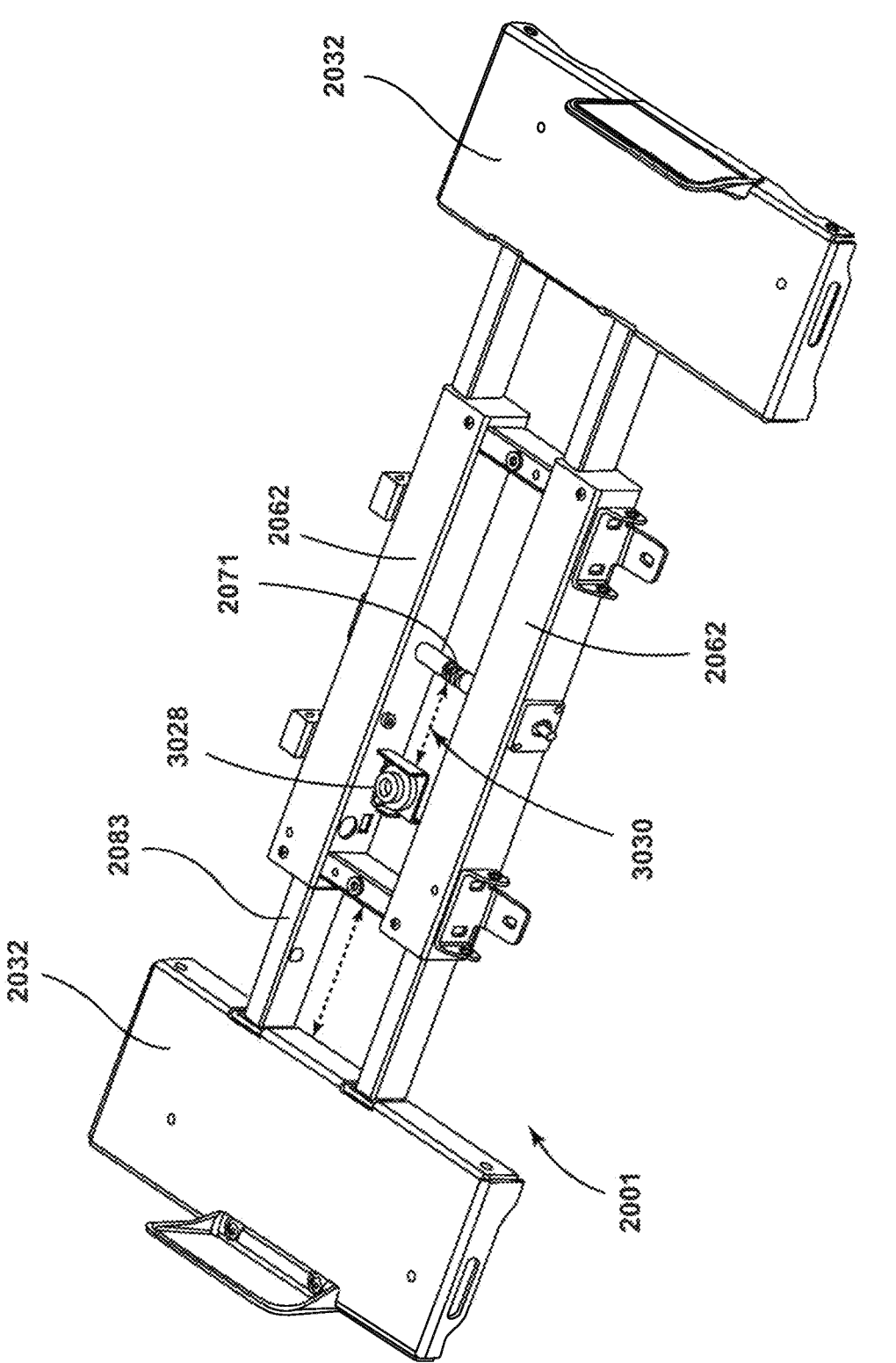
FIG. 42 is a perspective view of a seat deck section of the patient support deck including a potentiometer for sensing the width of the seat deck section of the adjustable patient support deck.

Referring to FIG. 42, in one exemplary embodiment, the sensor may be in the form of a potentiometer 3028. In the illustrated embodiment, the potentiometer is a string potentiometer with a rotating spool and a measuring cable or string 3030. The measuring cable 3030 is coupled on end to the spool (wound around the spool), which is biased to recoil the measuring cable 3030 about the spool. The potentiometer 3028 may be mounted to the fixed member (e.g., fixed rack and pinion mechanism housing tube 2062) of the patient support deck frame 102, with other end of the measuring cable 3030 coupled to the movable member (e.g., extension cross-member 2083) about, for example, about the rack and pinion shaft 2072. As the deck width is adjusted, shaft 2072 rotates to wind (pull) or unwind the cable from shaft 2072. Therefore, as the movable member (e.g., extension cross-member 2083) moves, the measuring cable 3030 is either reeled in or reeled out about the spool, and the potentiometer 3028 measures the movement of the movable member (e.g., extension cross-member 2083) based on the rotation and output voltage of the spool.

The measured movement is communicated to the controller 3302 and, utilizing stored data, the controller 3302 may determine the corresponding patient support deck width based on the measured movement. The corresponding rotation and output of the potentiometer 3028 may be used by the control system 3300 (and software stored therein) to interpolate and indicate the specific deck width position.

Optionally or additionally, as the potentiometer spool rotates in a particular direction and/or speed, both the pull velocity and direction of the movable member (e.g., extension cross-member 2083) of the corresponding deck section may be interpolated and determined.

Figure 42A:
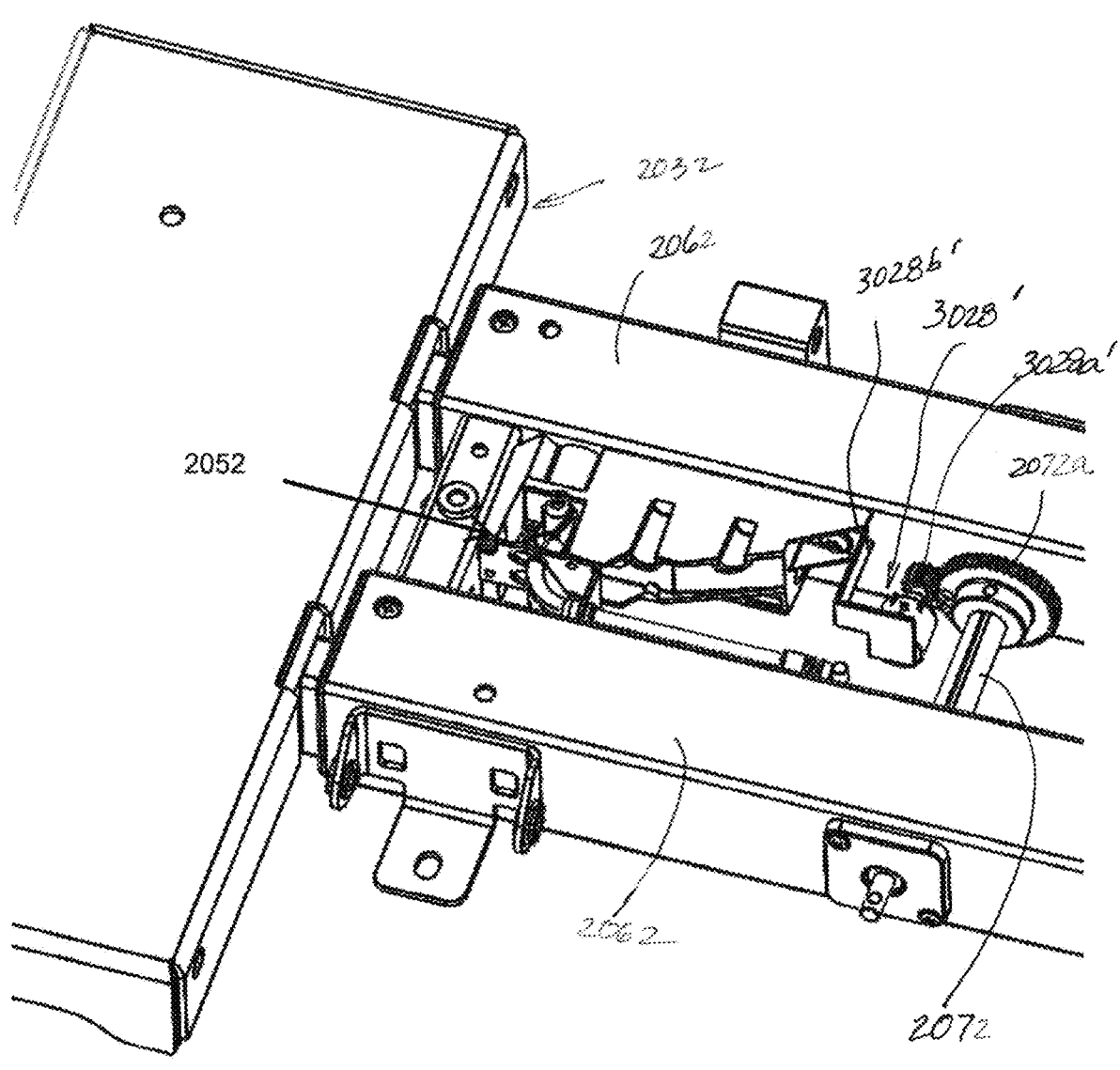
FIG. 42A is perspective view of the seat deck section illustrating the rotary potentiometer using a gear to sense the width of the seat deck section.

Referring to FIG. 42A, in another embodiment, a rotary potentiometer 3028' with a gear 3028*a'* may be used to sense the width of the deck section. For example, rotary potentiometer 3028' may be oriented so that its gear 3028a' engages a gear 2072a mounted to the rotating shaft 2072 of the rack and pinion width adjust mechanism. Thus, as the shaft rotates to change the width of the deck section, gear 2072a will rotate gear 3028a', whose position may be used to monitor the width of the deck section. This embodiment provides a continuous signal, which may be used by controller 3302 (using stored data and software stored therein) to interpolate and indicate the specific deck width position. In addition to monitoring the deck section width, similar to the string potentiometer, velocity and pull direction may also be monitored using the described configuration.

Figure 43:
FIG. 43 is a perspective view of a seat deck section of the patient support deck including a slide potentiometer for sensing the width of the seat deck section of the adjustable patient support deck.
Figure 43A:
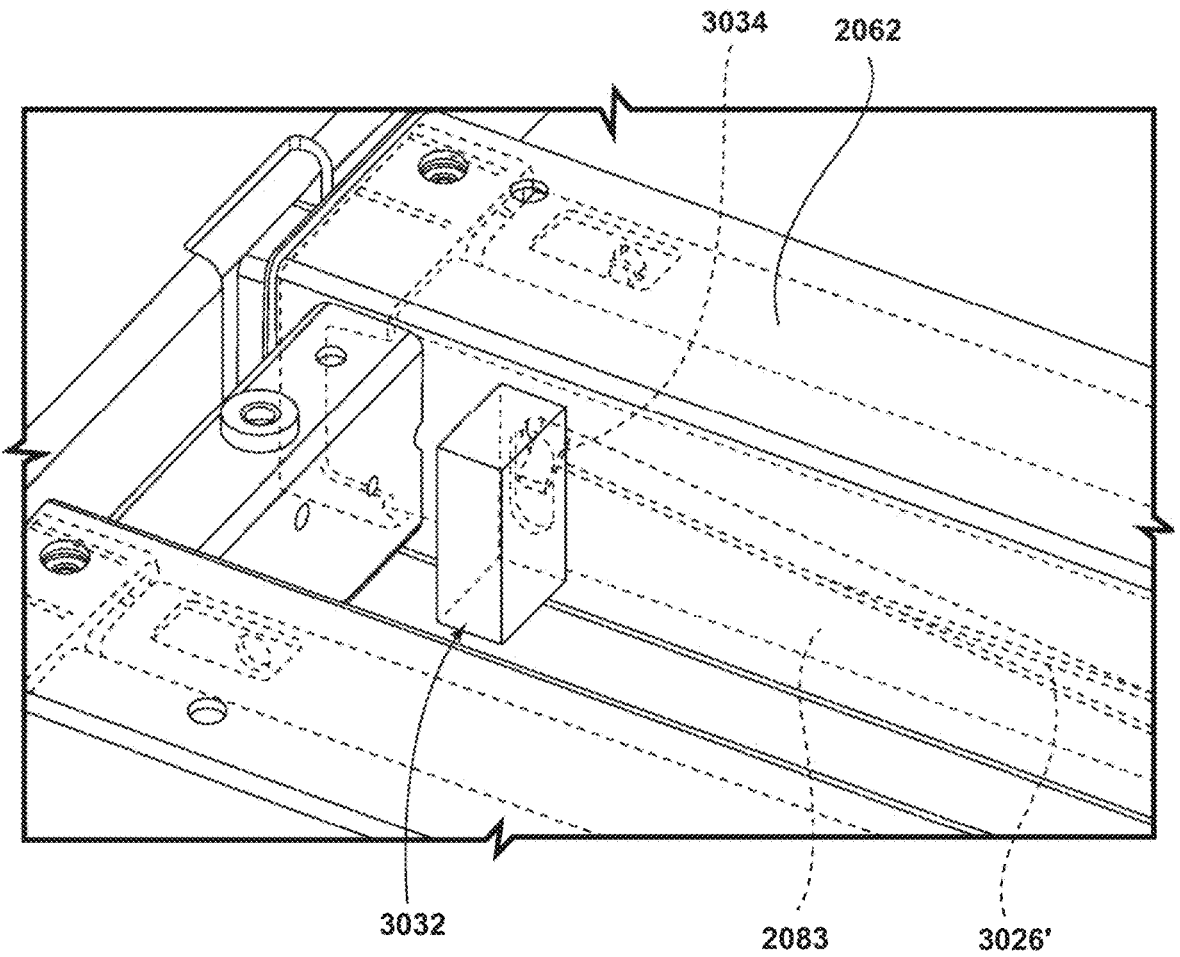
FIG. 43A is a perspective transparent view of the seat deck section of FIG. 43 illustrating the slide potentiometer sensing the width of the seat deck section.
Figure 43B:
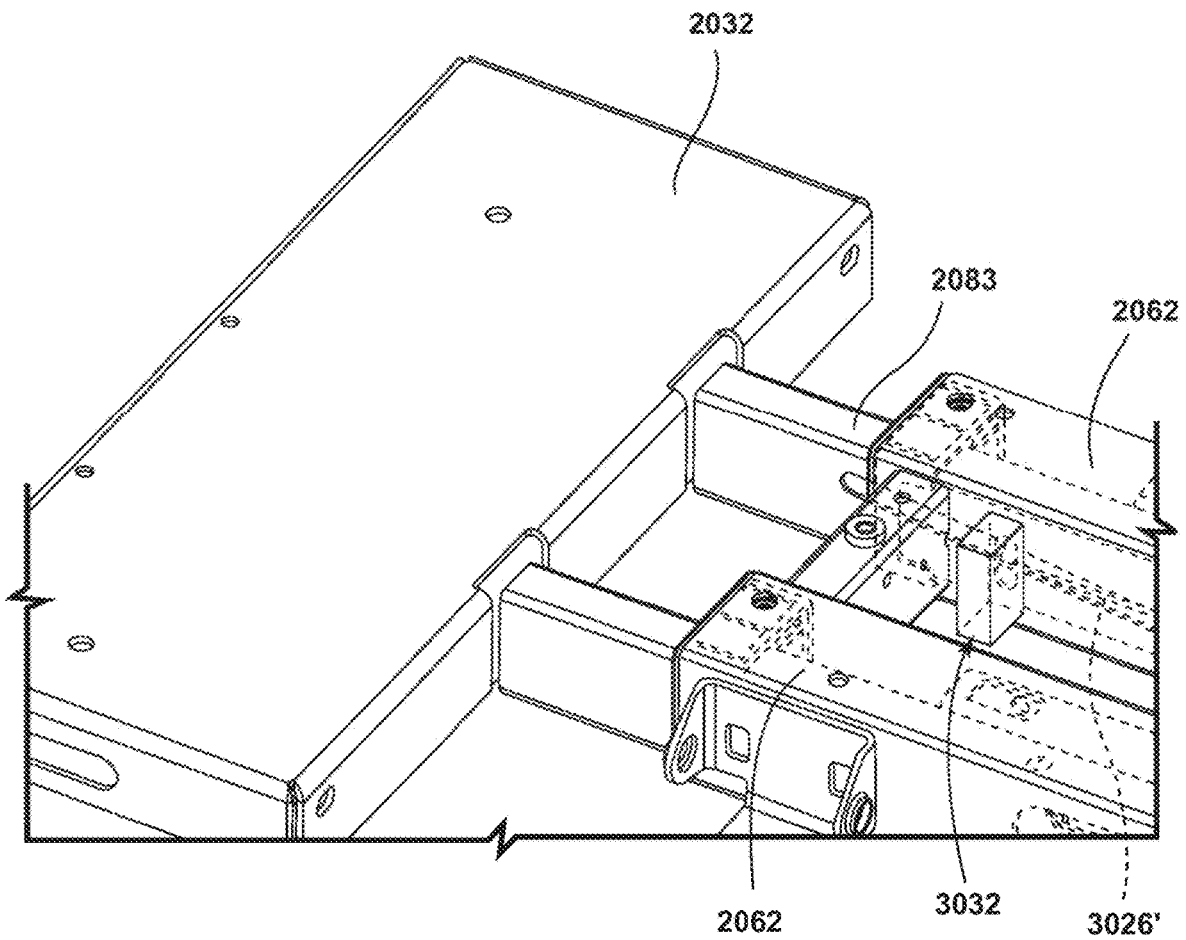
FIG. 43B is a perspective transparent view of the seat deck section of FIG. 43 illustrating the slide potentiometer sensing the width of the seat deck section.
Figure 43C:
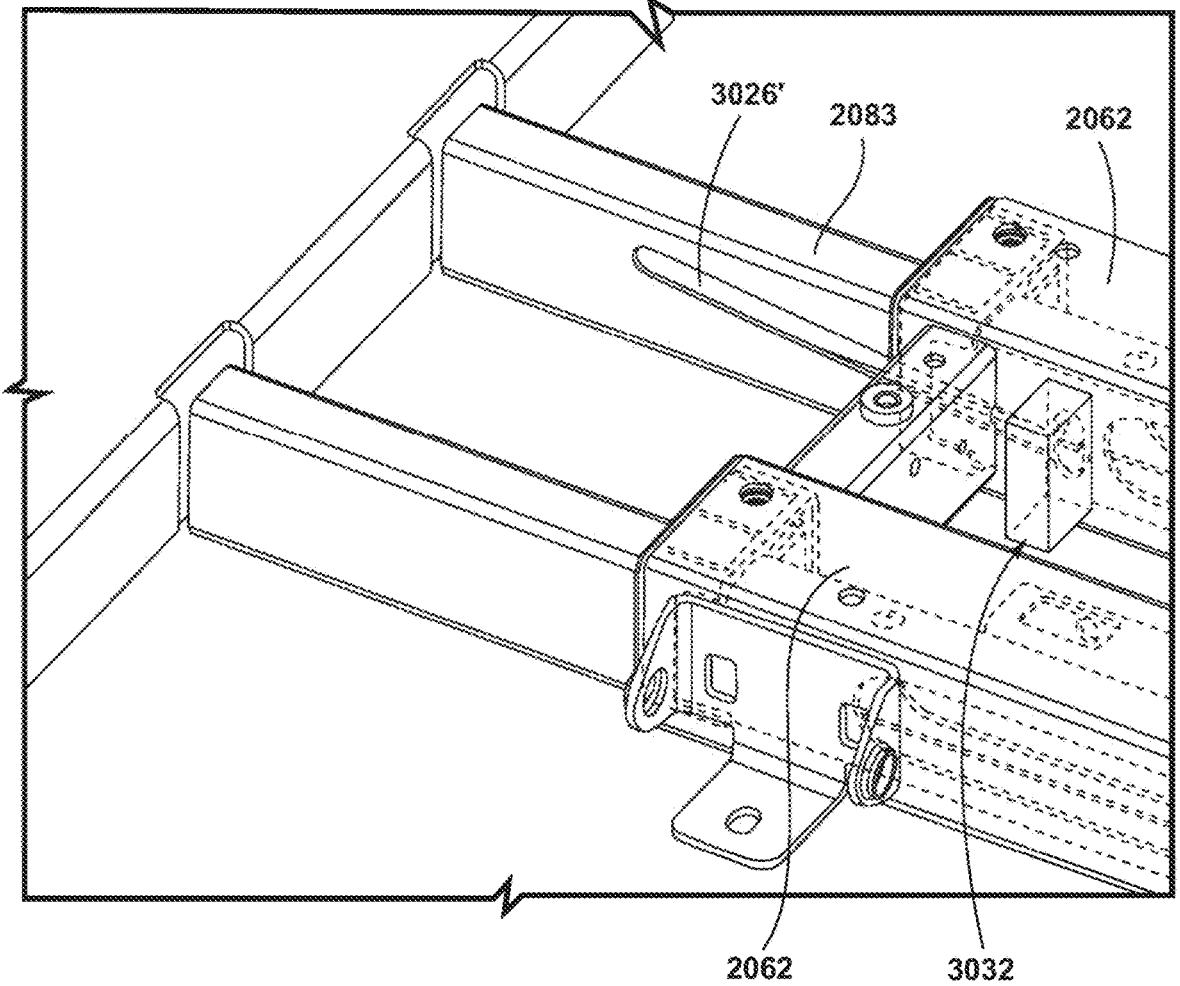
FIG. 43C is a perspective transparent view of the seat deck section of FIG. 43 illustrating the slide potentiometer sensing the width of the seat deck section.
Figure 44:
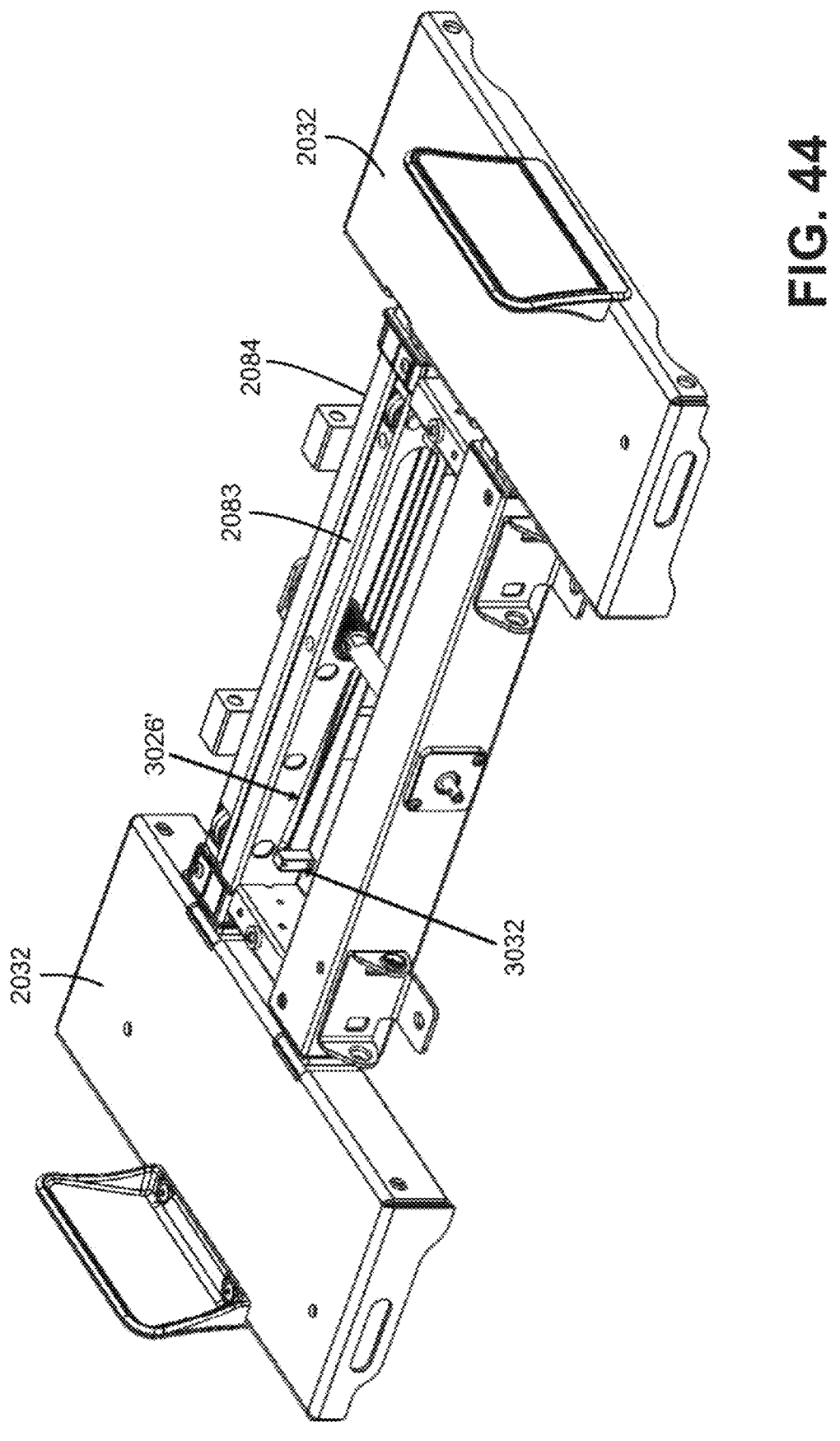
FIG. 44 is a perspective view of the seat deck section of FIG. 43 with a fixed rack and pinion mechanism housing tube removed.
Figure 44A:
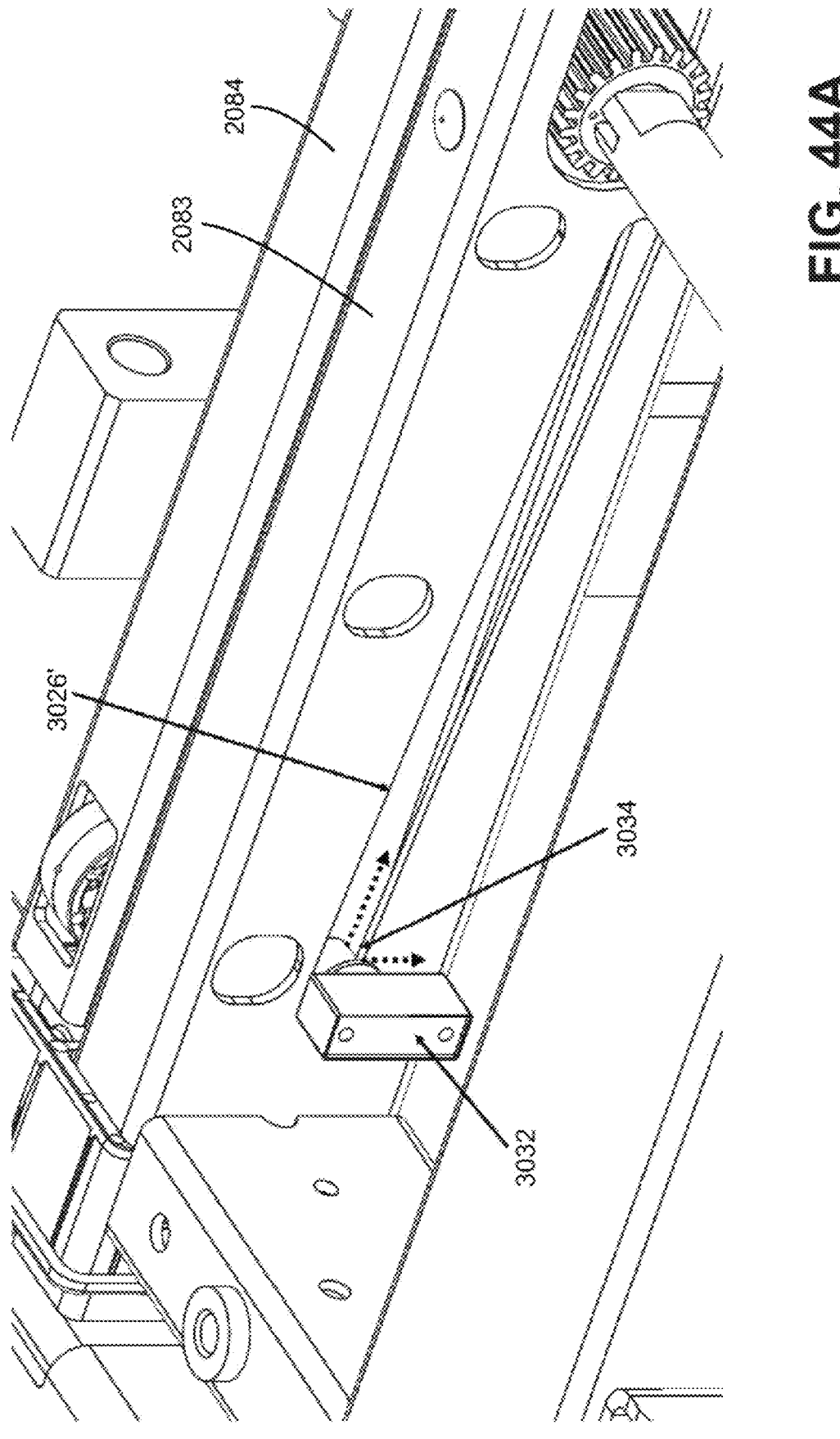
FIG. 44A is an enlarged view of the patient support deck of FIG. 44 at a standard first width.
Figure 45:
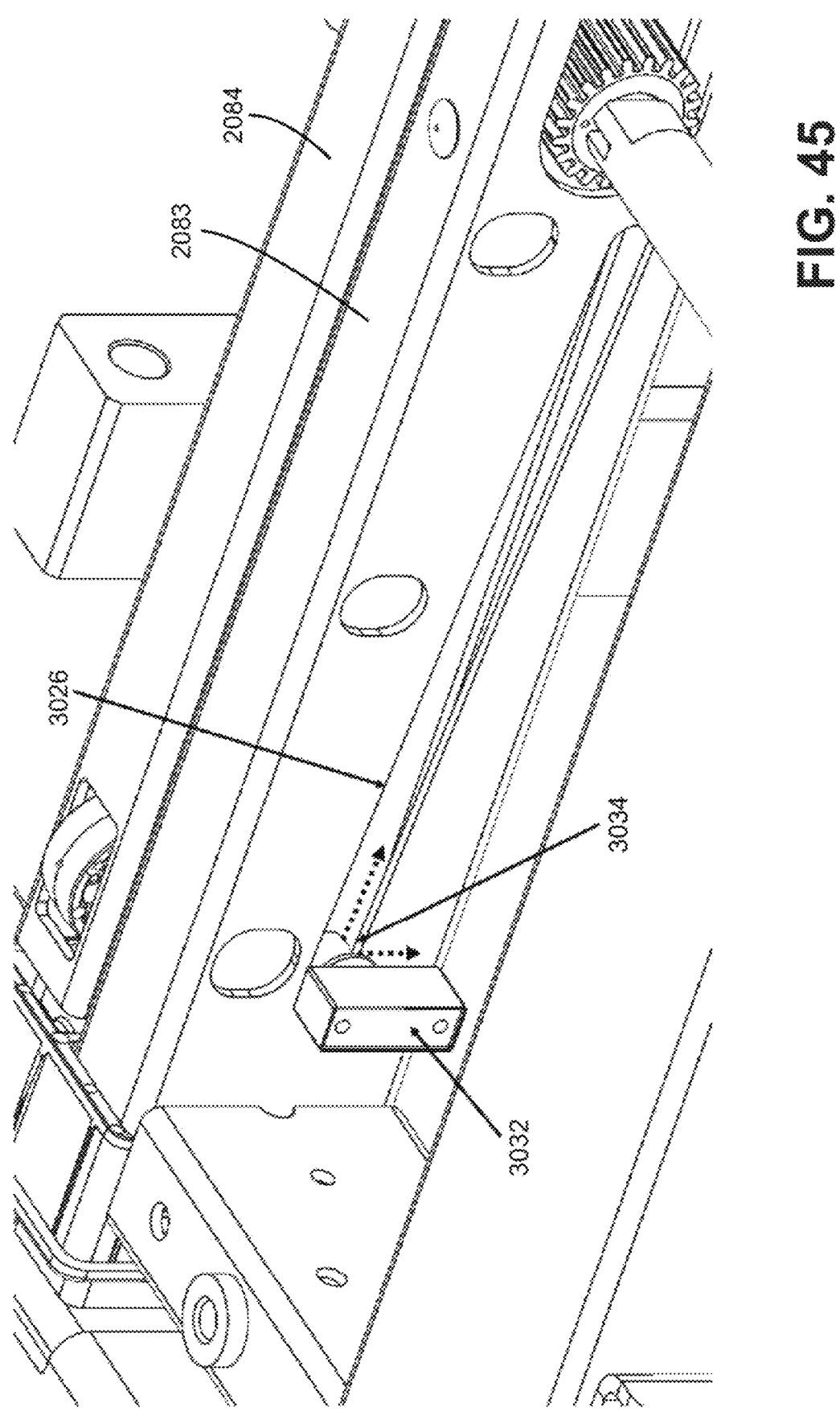
FIG. 45 is a perspective view of a linear potentiometer sensor for sensing the width of the seat deck section.

Referring to FIGS. 43-45, in another exemplary embodiment, the potentiometer may be a linear slide potentiometer 3032 having a slider 3034. The body of the slide potentiometer 3032 may be mounted to the fixed member (e.g., fixed rack and pinion mechanism housing tube 2062) of the patient support deck frame 102. A cam shaped feature 3026' may be provided on the movable member (e.g., extension cross-member 2083) of the patient support deck frame 102 and the slide potentiometer 3032 may be positioned such that the protruding slider 3034 engages and is guided by the cam shaped feature 3026', similar to the previous embodiment.

In the illustrated embodiment, the cam shaped feature 3026' is formed by a linear cutout. The linear cutout forms a ramp that is angled to move the slider 3034 in the Y direction as the movable member (e.g., extension cross-member 2083), and hence cam shaped feature 3026 moves. The slide potentiometer 3032 measures the movement of the slider 3034 and communicates the measurement to the controller 3302. Using stored data, the controller 3302 may determine the corresponding patient support deck width based on the measured movement of the slider 3034. The slider 3034 moves into a position that provides a correlating output voltage that may be used by the control system 3300 and software to interpolate and indicate the specific deck width position.

Alternatively, the potentiometer could be a three-position toggle or slide switch where the corresponding switch position is controlled and determined by the deck width position as the switch travels inside the cam shaped feature.

Figure 45A:
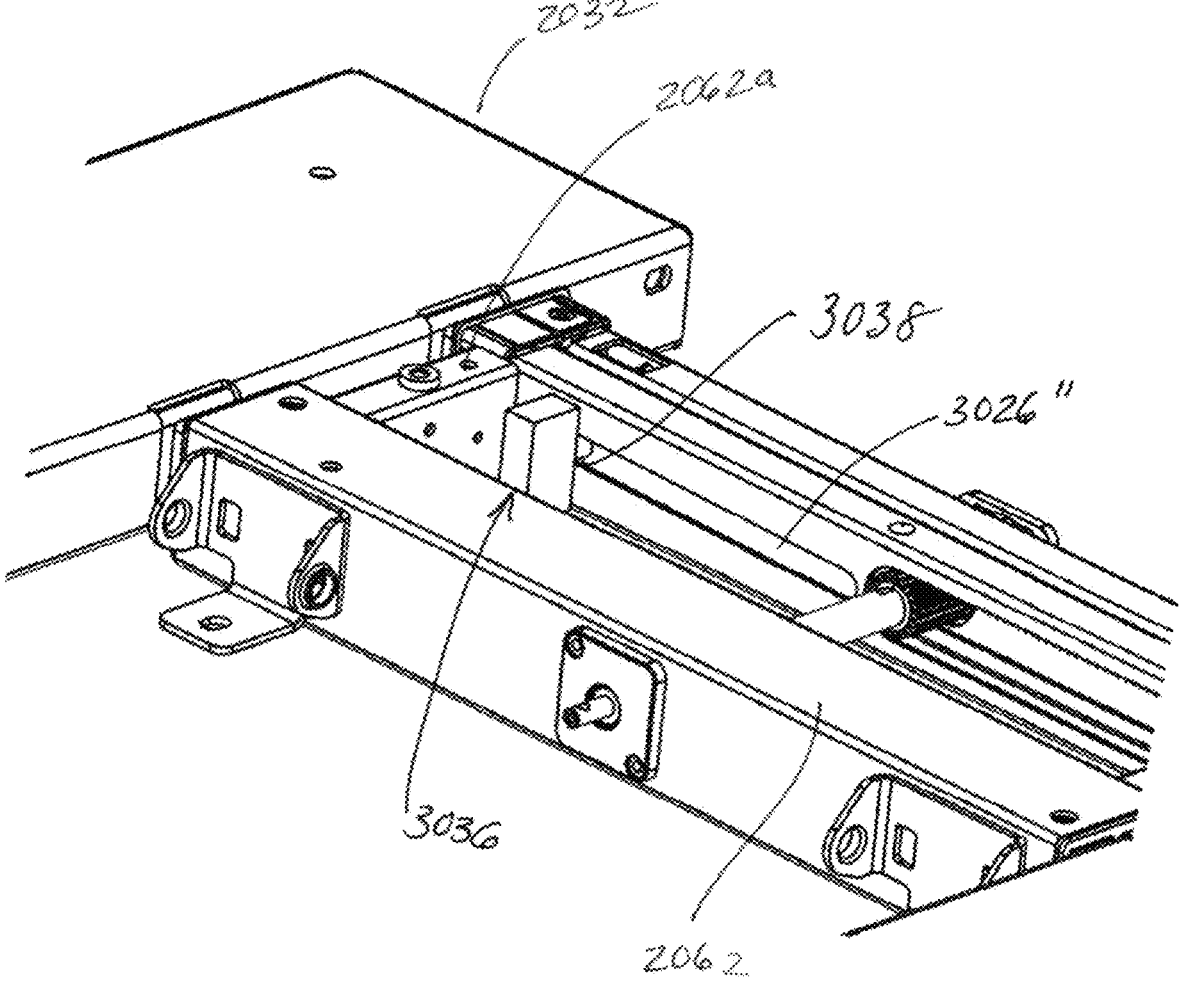
FIG. 45A is a perspective view of a piezoelectric sensor for sensing the width of the seat deck section.

Referring to FIG. 45A, according to another embodiment, the sensor may be in the form of a piezoelectric strain gauge sensor 3036. The piezoelectric sensor 3036 may be mounted to the fixed member (e.g., fixed rack and pinion mechanism housing tube 2062) similar to the linear potentiometer described, with a projecting pin or other structure 3038 that engages the movable member. In the illustrated embodiment, similar to the previous embodiments, the movable member (e.g., extension cross-member 2083) includes a cutout 3026", such as a channel, with a ramped edge 3026a" that is engaged by the projecting pin. As the movable member (e.g., extension cross-member 2083) of the deck section is moved, the force on the projecting pin increases or decreases depending of the slope of the ramped edge.

As the deck width position is adjusted, therefore, a force/load applied to the piezoelectric sensor 3036. The sensor provides an output voltage that is directly proportional to the amount of load/force on the projecting pin of the piezoelectric sensor 3036. The force applied to the sensor 3036 may be then communicated to the controller 3302 in the form of an output voltage. This output voltage may be used by the control system 3300 and software to interpolate and determine the deck width position.

Figure 45B:
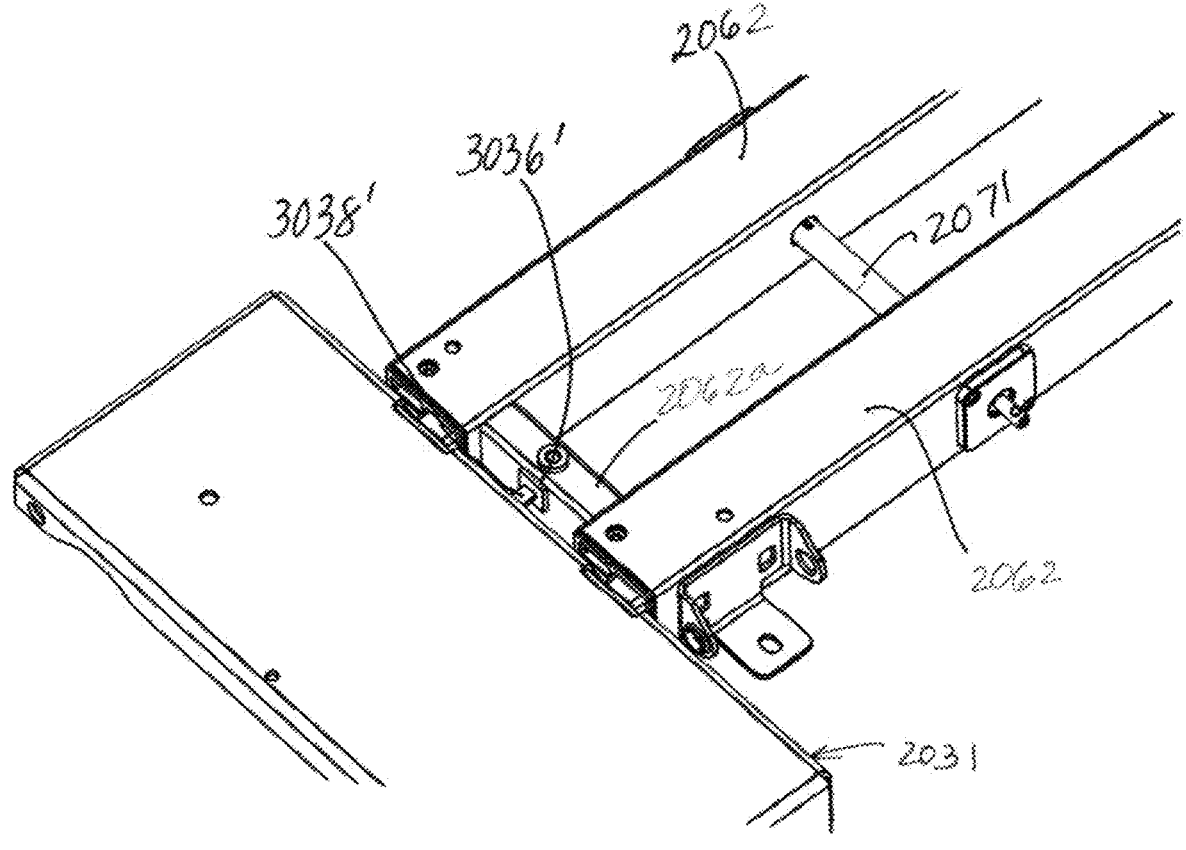
FIG. 45B is a perspective view of another embodiment of a piezoelectric sensor for sensing the width of the seat deck section.
Figure 45C:
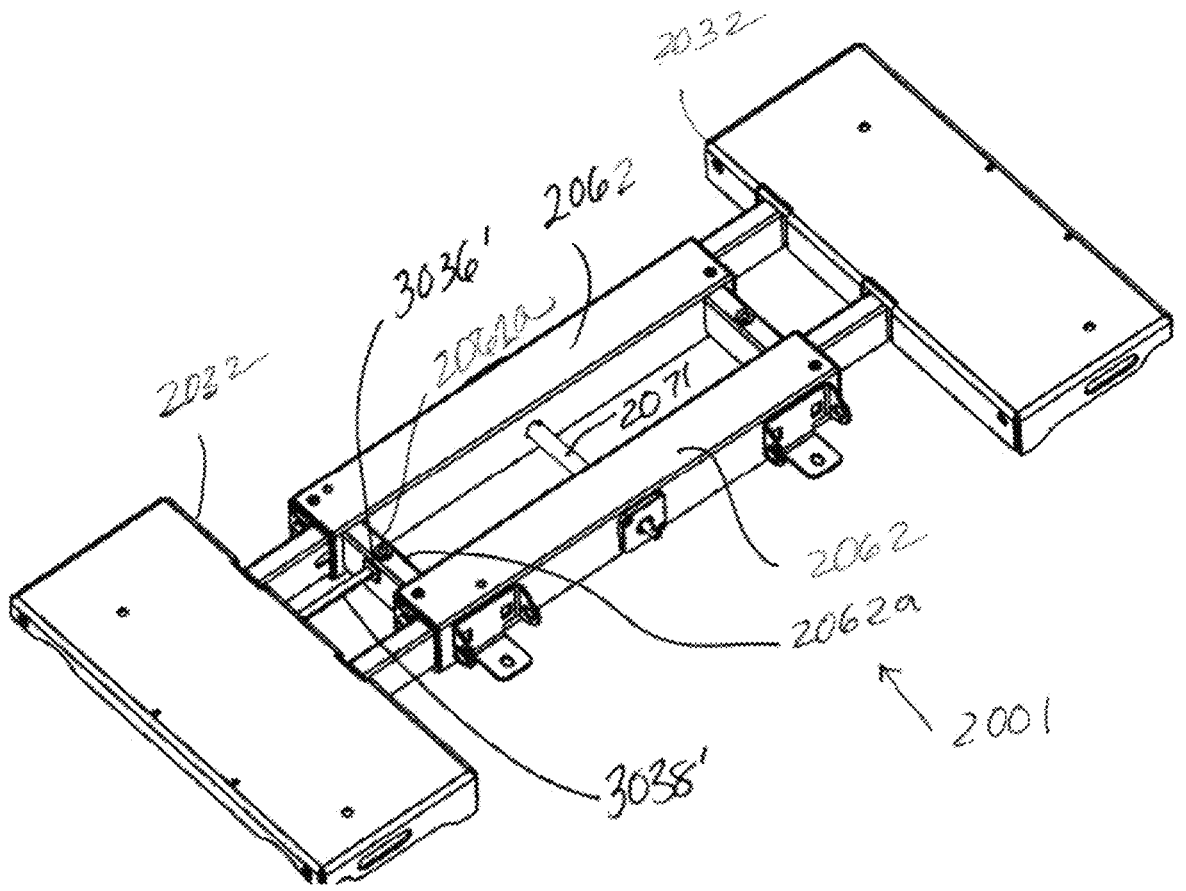
FIG. 45C is a similar view to FIG. 45B.
Figure 45D:
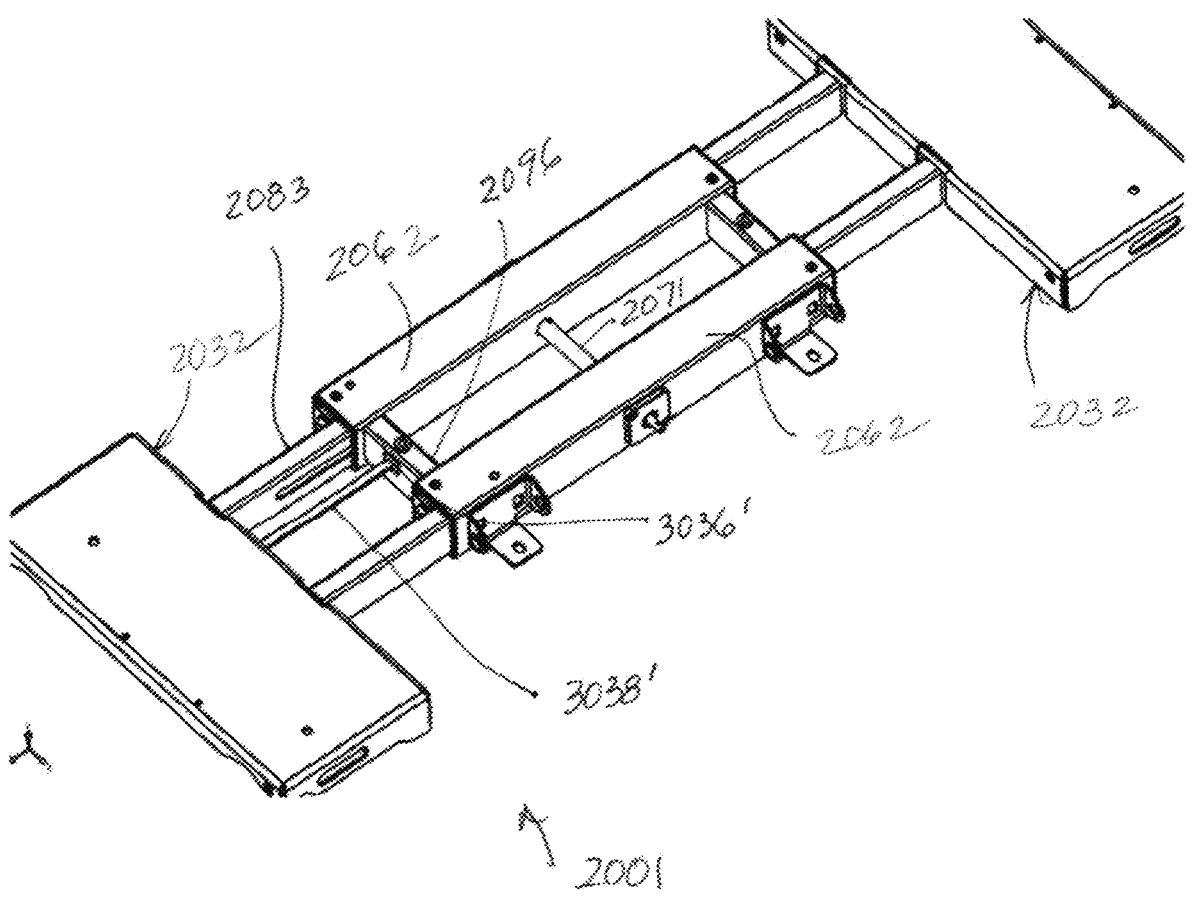
FIG. 45D is a similar view to FIG. 45B.

Referring to FIGS. 45B-45D, in another embodiment, a piezoelectric sensor 3036' can be mounted on a fixed member of the deck section, such as lateral support member 2062a, and coupled to one end of a tether 3038', such as an elastic member, that spans or bridges between the fixed member (e.g., lateral support member 2062a) and a movable member, such as deck extension pan 2032, of the corresponding deck section. As the deck extension pan 2032 extends, tether 3038' is pulled and generates a force on the piezoelectric sensor 3036'. As a result, as the deck position is adjusted and changed, there is a correlating change in the tension on the piezoelectric sensor 3036'. The piezoelectric sensor 3036' may therefore provide a correlating output voltage that may be used by the control system 3300 and software to interpolate and indicate the specific deck width position.

Figure 46:
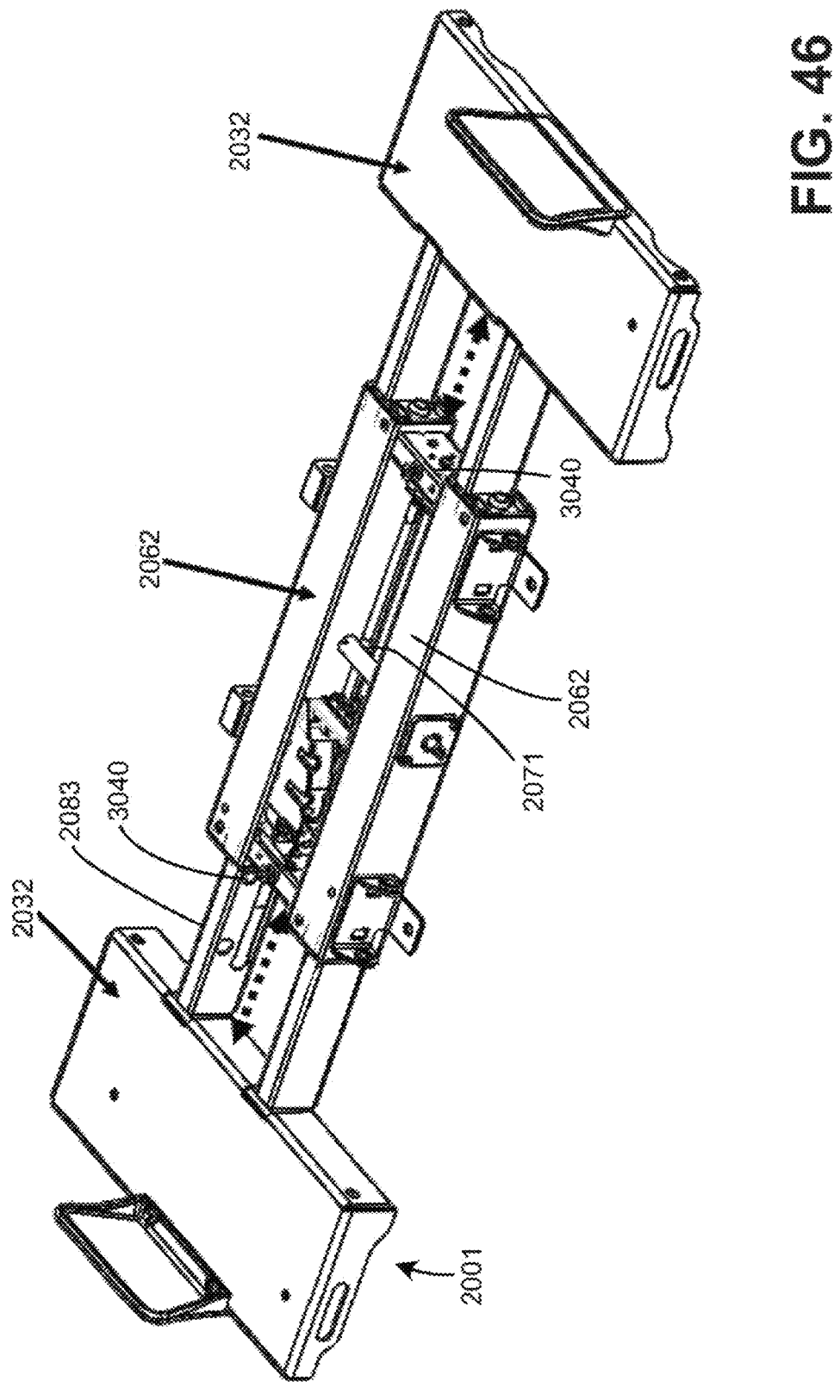
FIG. 46 is a perspective view of a seat deck section of the patient support deck including a proximity sensor for sensing the width of the seat deck section of the adjustable patient support deck.
Figure 47:
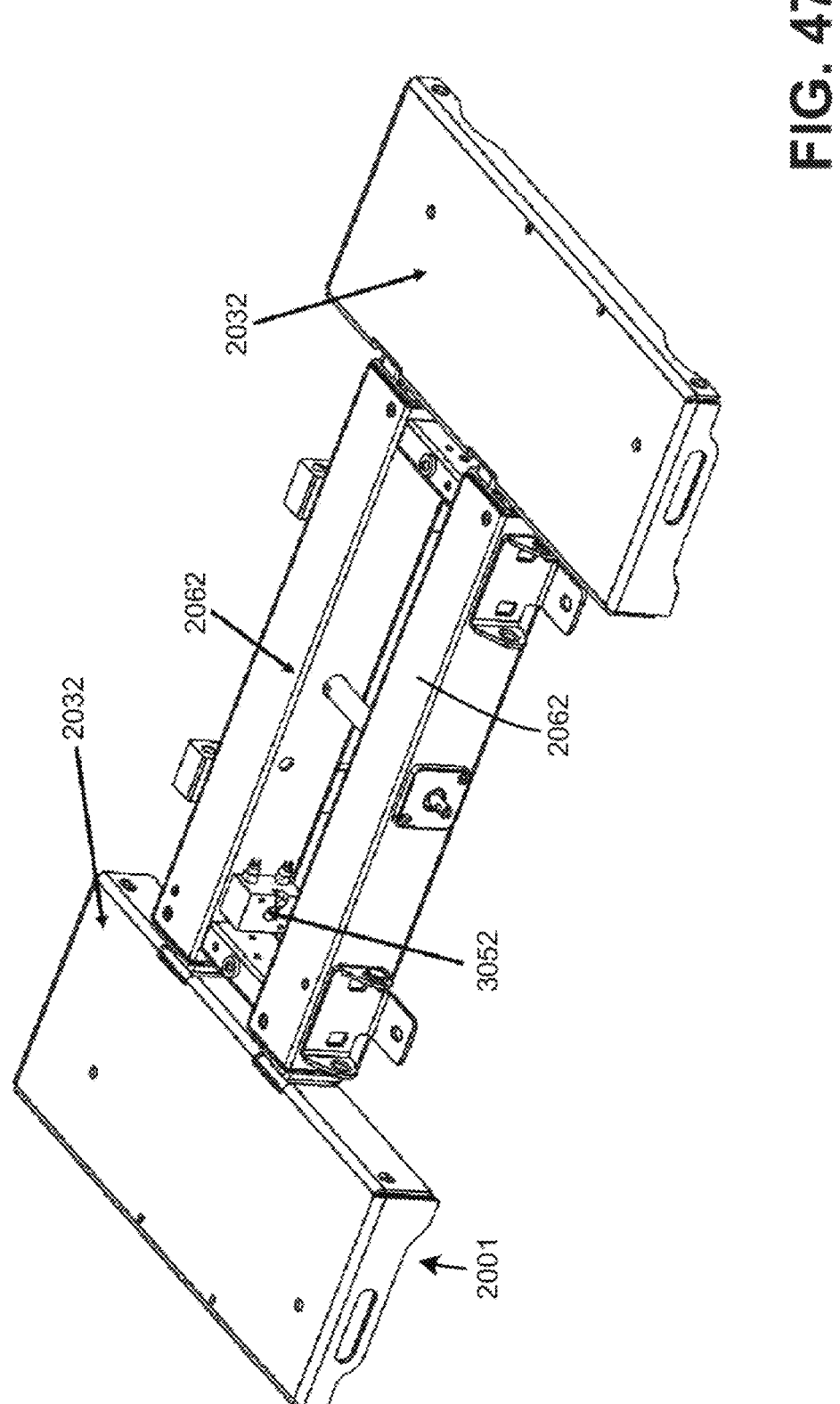
FIG. 47 is a perspective view of a seat deck section of the patient support deck including two latch pins used for sensing the width of the seat deck section of the adjustable patient support deck.
Figure 48:
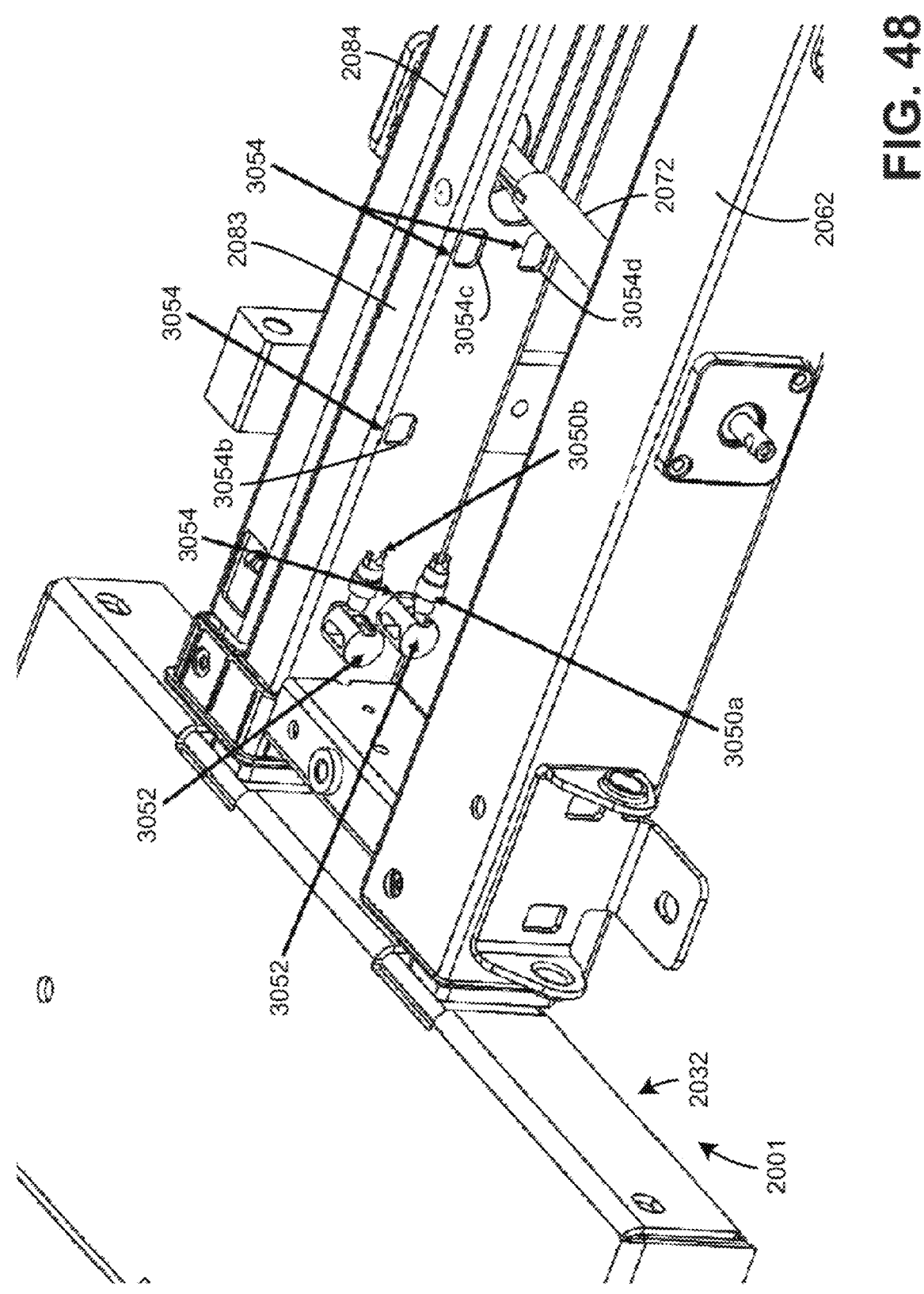
FIG. 48 is an enlarged view of the patient support deck of FIG. 47 at a standard first width and with the fixed rack and pinion mechanism housing tube removed.
Figure 49:
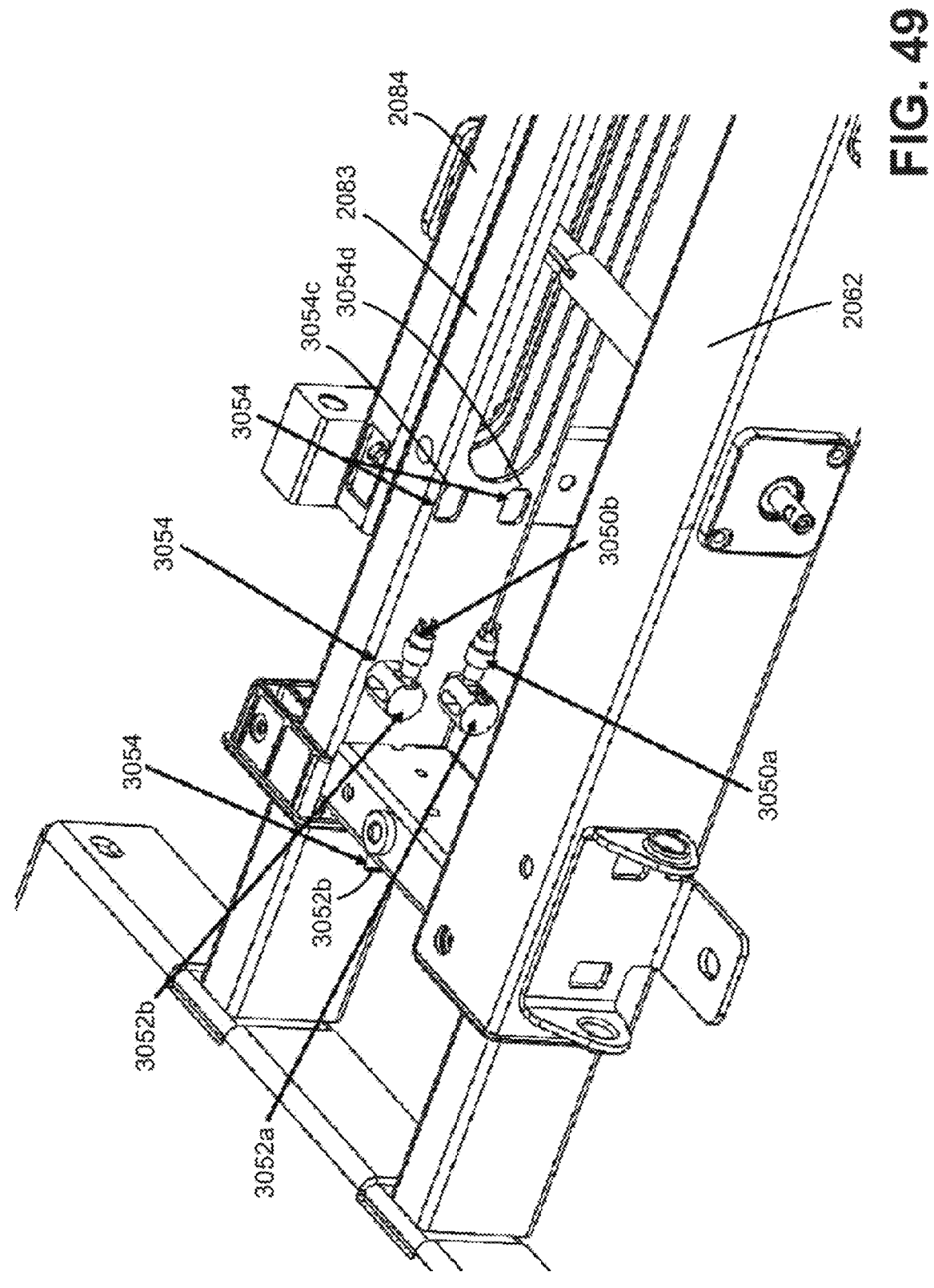
FIG. 49 is an enlarged view of the patient support deck of FIG. 47 at an intermediate second width and with the fixed rack and pinion mechanism housing tube removed.

Referring to FIG. 46, in another exemplary embodiment, the sensor may be in the form of a proximity sensor 3040, for example, a laser or ultrasonic proximity sensor. The proximity sensor 3040 may be mounted to either the fixed member (e.g., lateral support member 2062a) or the movable member, such as deck extension pan 2032, of the corresponding deck section and can measure or sense the distance between the moveable member and the fixed member. The measured distance may be communicated to the controller 3302 and, utilizing stored data, the controller 3302 may determine the corresponding patient support deck width based on the measured distance. The corresponding distance and output voltage from the proximity sensor 3040 may be used by the control system 3300 and software to interpolate and indicate the specific deck width position.

Referring to FIGS. 47-50, in yet another embodiment, sensors 3050a and 3050b may comprise plunger switches that sense two latch pins 3052a, 3052b. The latch pins 3052a, 3052b may be mounted to a fixed member (e.g., fixed rack and pinion mechanism housing tube 2062) of the patient support deck frame 102. Four latch pin cutouts 3054 (FIG. 50) may be positioned in a predetermined geometric orientation or arrangement (i.e., vertically stacked or concentrically aligned) in the movable member (e.g., extension cross-member 2083) of the patient support deck frame 102. Depending on the position of the movable member (e.g., extension cross-member 2083), the latch pin(s) 3052a, 3052b may be received in one or more of the cutout(s) 3054. For example, in the illustrated embodiment, the latch pins 3052a, 3052b are vertically stacked, and the cutouts 3054 include: a lower single cutout 3054a that aligns with and receives the lower latch pin 3052a when the movable member (e.g., extension cross-member 2083) is in the 36" width position; a single middle, upper cutout 3054b that aligns with and receives the upper latch pin 3052b when the movable member (e.g., extension cross-member 2083) is in the 42" width position; and a pair of vertically stacked cutouts 3054c, 3054d align with and receives the upper and lower latch pins 3052b, 3052a when the movable member (e.g., extension cross-member 2083) is in the 48" width position.

Thus, sensors 3050a, 3050b can provide a binary output capable of detecting four different conditions using only two pins (and four cutouts). As the moveable member (e.g., 2083) moves, one or both of the latch pins 3052a, 3052b may extend into the respective aligned cutouts 3054 and the status of each pin may be either in/locked or out/unlocked. The status and identification of which of the latch pins 3052a, 3052b are received in the cutouts 3054 can be communicated to the controller 3302. The controller 3302 may then be configured to determine a corresponding width of the patient support deck 104 based on which latch pin 3052*a*, 3052*b* is received in which lock pin cutout or cutouts 3054 (3054*a*, 3054*b*, or 3054*c* and 3054*d*).

In addition, the controller 3302 may determine if the deck sections are locked or unlocked based on the sensed locked or unlocked status of latch pins 3052*a*, 3052*b*. An example using a simple two pin arrangement capable of detecting four different deck width conditions is illustrated in the Table 7 below.

TABLE 7

| | STATE OF LATCH PIN | |
|---|---|---|
| DECK WIDTH POSITION | LATCH PIN A PLUNGER SWITCH A | LATCH PIN B PLUNGER SWITCH B |
| UNKNOWN | OUT/UNLOCKED (BREAK) | OUT/UNLOCKED (BREAK) |
| 36" | IN/LOCKED (MADE) | OUT/UNLOCKED (BREAK) |
| 42" | OUT/UNLOCKED (BREAK) | IN/LOCKED (MADE) |
| 48" | IN/LOCKED (MADE) | IN/LOCKED (MADE) |

According to another exemplary embodiment, latching/ locking of each deck section may be monitored and detected independently of deck width position sensing or combined with the deck width sensing. For example, the sensor may comprise deck lock sensor 2090*a* that is configured to sense the locked or unlocked state of the deck section. In this embodiment, the deck lock sensor 2090*a* is positioned and configured to sense the position of the latch or lock pin 2090 (described above) when it is its locked position. Further, pin 2090 may be used to also sense the width of the deck. For example, as described below, the latch pin may have a stepped diameter.

Figure 50:
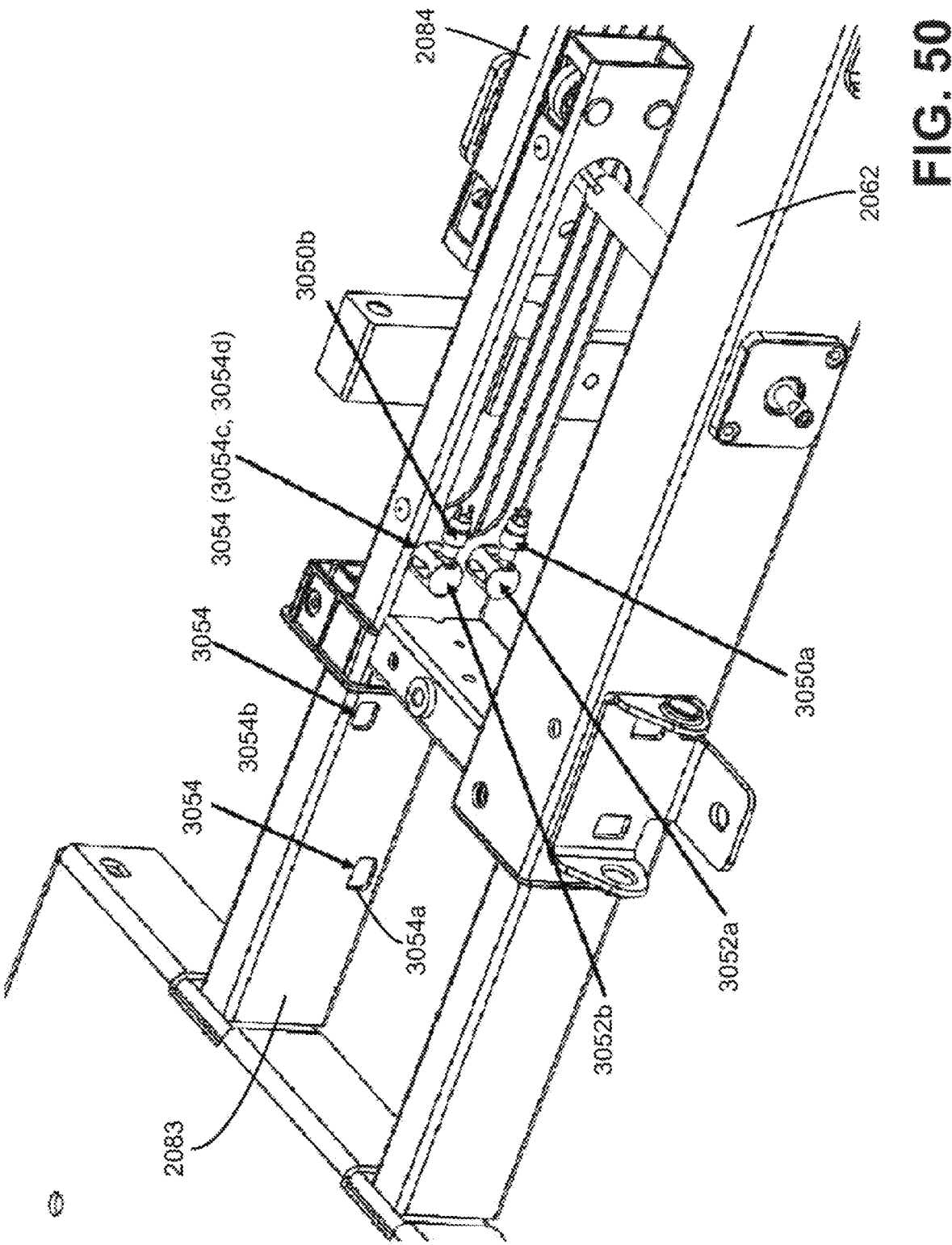
FIG. 50 is an enlarged view of the patient support deck of FIG. 47 at an expanded third width and with the fixed rack and pinion mechanism housing tube removed.
Figure 50A:
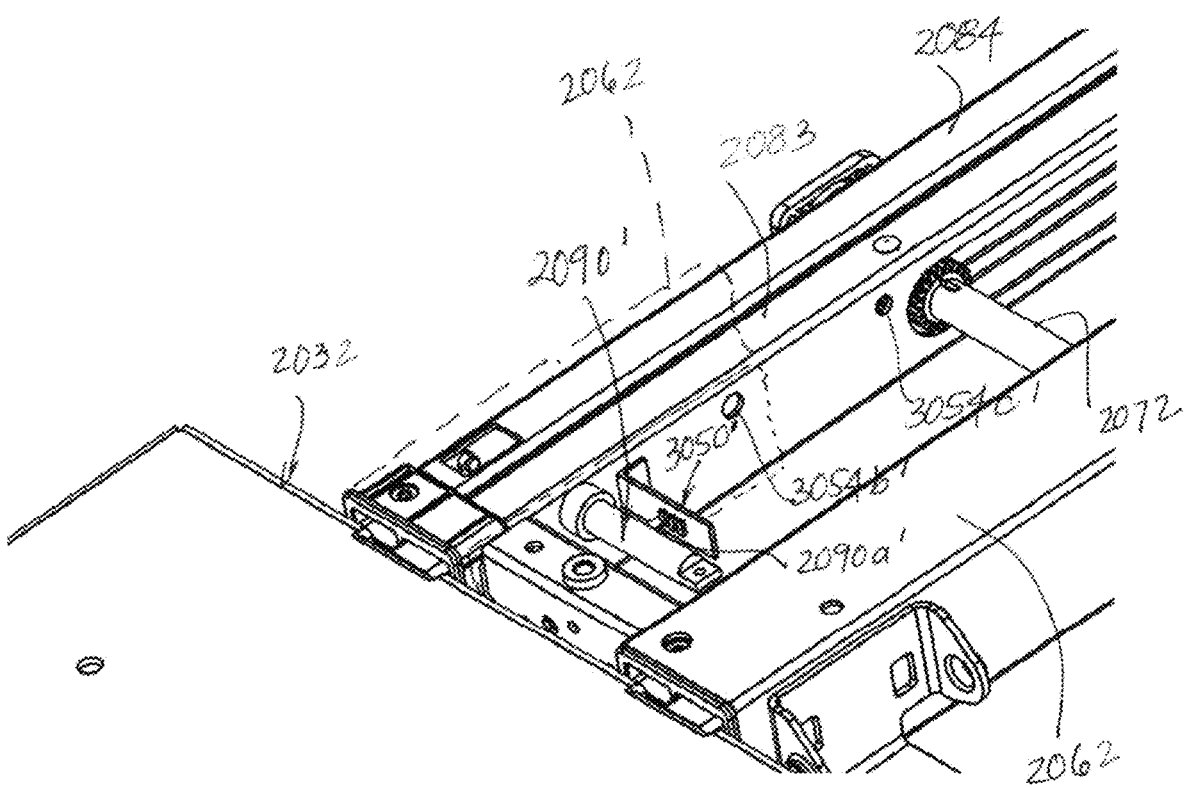
FIG. 50A is a perspective view of a sensor employing a stepped pin for sensing the width of the seat deck section.
Figure 50B:
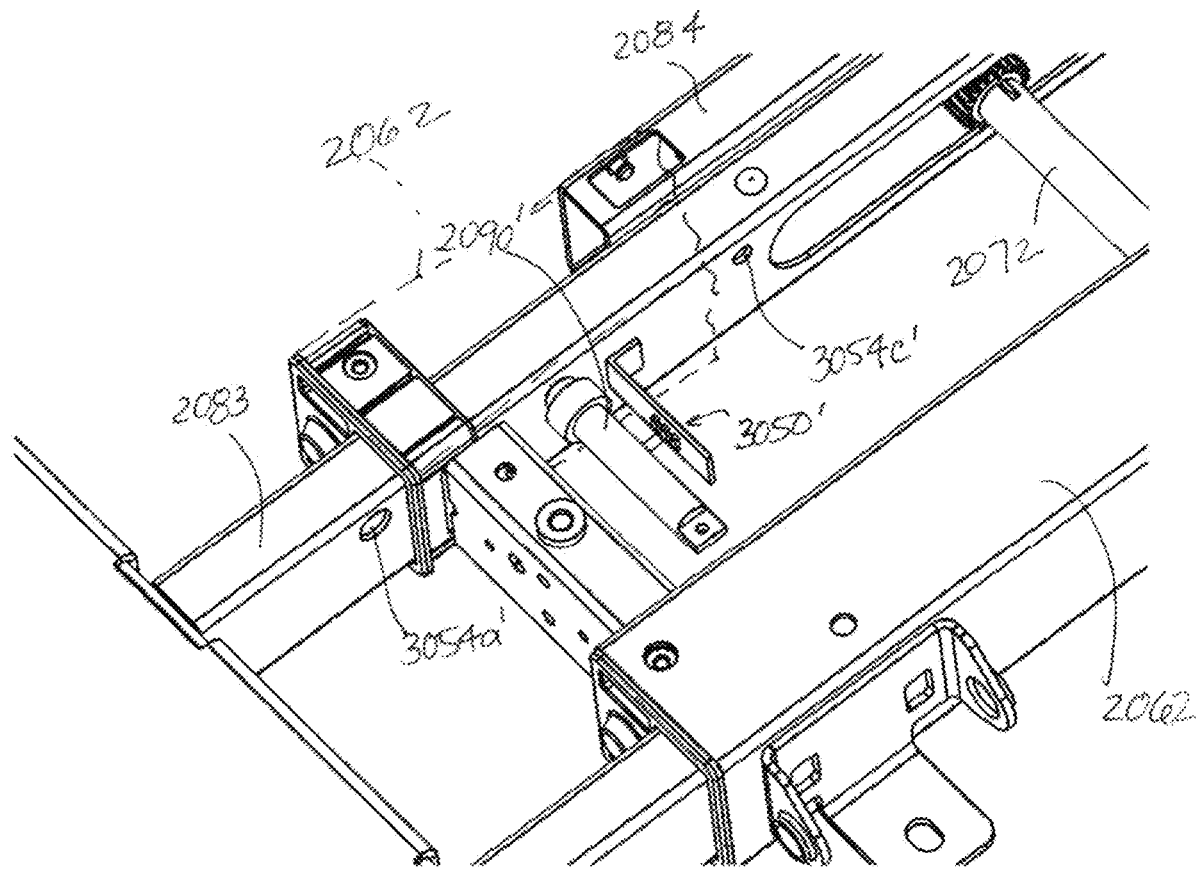
FIG. 50B is similar view to FIG. 50A.
Figure 50C:
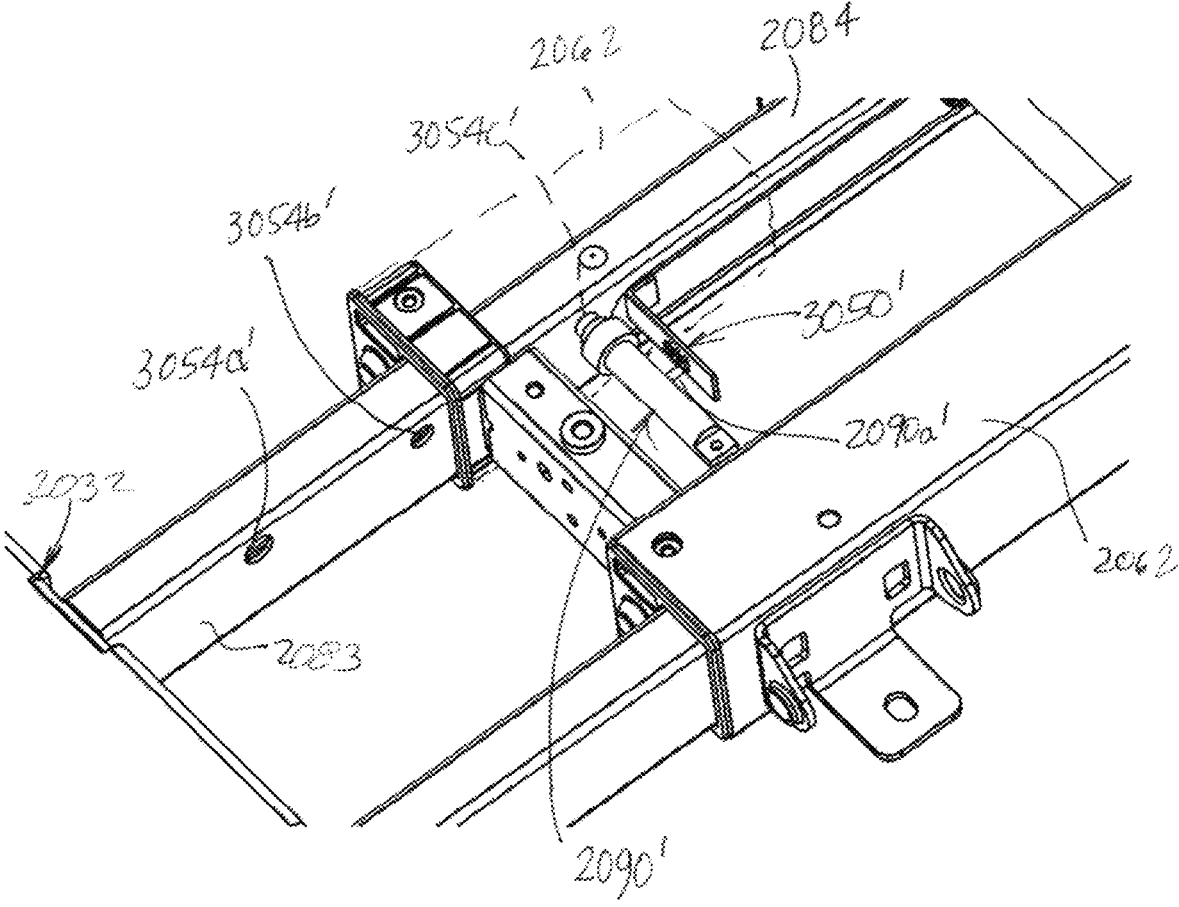
FIG. 50C is similar view to FIG. 50A.
Figure 50D:
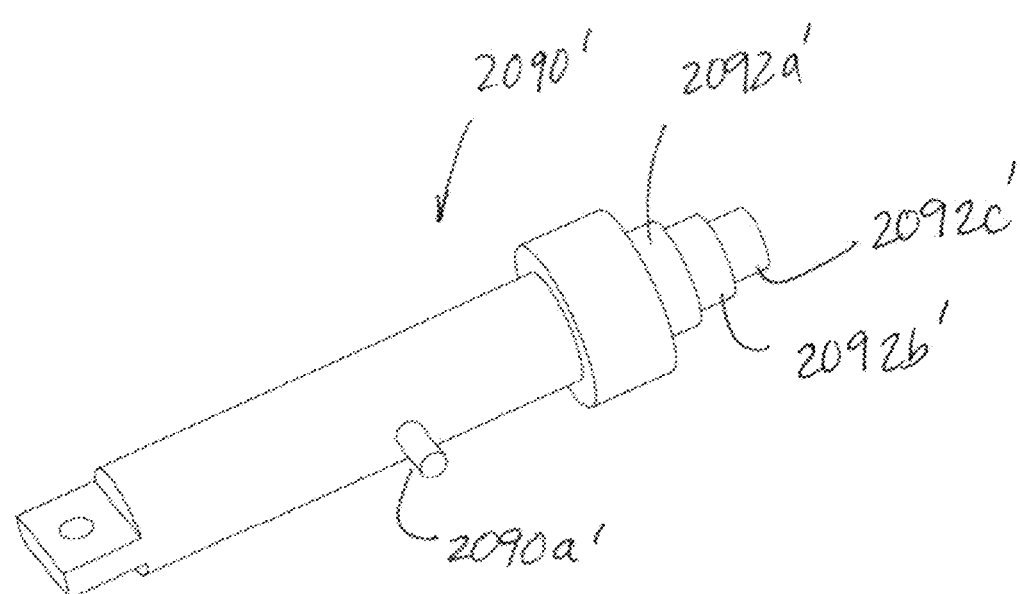
FIG. 50D is an enlarged perspective view of the stepped pin of FIGS. 50A-50C.

Referring to FIGS. 50A-50C, latching mechanism latch pin 2090' has a stepped profile so that it can be used to indicate the width of the deck in addition to the locked status of the deck section. For ease of illustration, pin 2090' is illustrated without any of the pin mounting or actuator details shown. For mounting and actuator details, reference is made to FIGS. 28 and 28A and their corresponding details above.

Pin 2090' is supported relative to the fixed member (e.g., fixed rack and pinion mechanism housing tube 2062) (shown only in dashed lines) by a bracket (not shown) and may be spring loaded toward the fixed member 2061 and into a corresponding opening formed on the movable member, in this case 2083, to thereby lock the position of the movable member (e.g., deck pan 2032) when the pin 2090' aligned with the opening.

As would be understood the movable member 2083 may include an opening 3054*a'*, 3054*b'*, or 3054*c'* for each of the defined widths of the deck section, e.g., for the 36" width, the 42" width, and the 48" width. Pin 2090', as noted, includes a stepped profile at its end in the form of concentrically reducing diameters 2092*a'*, 2092*b'*, and 2092*c'*. In addition, each opening 3054*a'*, 3054*b'*, and 3054*c'* may vary in size so that, for example, the largest diameter step 2092*a'* will extend into only the largest opening 3054*a'*, and the middle step 2092*b'* will extend into only two of the openings (3054*a'* and 3054*b'*), and the smallest diameter step 2092*c'* will extend into all three openings 3054*a'*, 3054*b'*, and 3054*c'*.

In the illustrated embodiment, the smallest opening 3054*c'* is in the position corresponding to the 48" width position of the movable member (e.g., 2083). In this manner, only the smallest step 2092*c'* will be able to extend into the opening (3054*c'*) allowing pin 2090' only to engage at a first controlled depth, which depth is sensed by a sensor 3050', described below. The middle-sized opening is located at the 42" width position so that only the smallest and medium size steps 2092*c'* and 2092*b'* will be able to insert into the middle opening. Again, this means that when in the 42" width position, pin 2090' is only engaged at a second controlled depth, which depth is sensed by a sensor 3050'. Lastly, the largest opening 3054*a'*, which is in the 48" width position, will allow pin 2090' to full extend into the opening, which depth is then sensed by sensor 3050'.

Sensor 3050' is mounted to the fixed member (e.g., 2061) adjacent pin 2090' and senses the depth of the pin either by contact or non-contact sensing. In the illustrated embodiment, sensor 3050' uses contact sensing. To that end, pin 2090' includes a projecting arm 2090*a'* that makes contact with the sensor to indicate the depth of the pin's engagement. For example, the sensor may be a linear potentiometer or a switch, or an array of switches, with each switch corresponding to the depths of the pin 2090'. For examples of non-contact sensing of the depth of the pin 2090' using, for example, a reflective strip, a color strip, magnets, a RFID tag, or the like, mounted to the pin 2090' reference is made to the above embodiments.

Therefore, as the moveable section (e.g., 2032) moves, the pin 2090' may only extend into the aligned opening to the depth allowed by the relative sizing of the stepped diameter of the pin 2090'. The controller 3302 then determines a corresponding width of the patient support deck 104 based on the sensed depth of the pin 2090'. Accordingly, both the lock condition and deck width can be determined using the depth of engagement of the pin 2090'. An example using a stepped lock pin and openings is illustrated in the Table 8 chart below.

TABLE 8

| | STATE OF LATCH PIN | | |
|---|---|---|---|
| DECK WIDTH POSITION | LATCH PIN STEP 1 SMALL DIA. | LATCH PIN STEP 2 MID DIA. | LATCH PIN STEP 3 LARGE DIA. |
| UNKNOWN | RETRACTED | RETRACTED | RETRACTED |
| 36" | ENGAGED | ENGAGED | ENGAGED |
| 42" | ENGAGED | ENGAGED | RETRACTED |
| 48" | ENGAGED | RETRACTED | RETRACTED |

Referring to FIGS. 51-56, in still another embodiment, a sensor may be in the form of an air pressure sensor 3038, including a vacuum sensor. Sensor 3038 detects air pressure (or a vacuum) in a chamber, such as a cylinder 3040 with a movable plunger 3042 and piston (not show) that varies the pressure in the chamber as the plunger and piston are moved in and out of the cylinder. The end of the plunder 3042 is coupled to a movable member, such as extension cross-member 2083, by a pin 3044, and the cylinder 3040 is mounted to a fixed member, such as fixed rack and pinion mechanism housing tube 2062, by a pair of supports 3040*a*. Fixed rack and pinion mechanism housing tube 2062 includes an elongate slot 3046, which allows pin 3044 to couple to the movable member, extension cross-member 2083, through fixed rack and pinion mechanism housing tube 2062 and move with the movable member to move the plunger. Thus, as the movable member moves, the pressure will vary in the chamber.

As the deck width is adjusted between the different deck width positions, the air pressure sensor 3038 can detect the increase or decrease in the air pressure (including vacuum pressure). The sensed air pressure may be communicated to the controller 3302, and then the controller 3302, utilizing stored data, may determine the patient support deck width based on the sensed air pressure. The air pressure sensor 3038 can provide a correlating output voltage that may be used by the control system 3300 and software to interpolate and indicate the specific deck width position.

Figure 51:
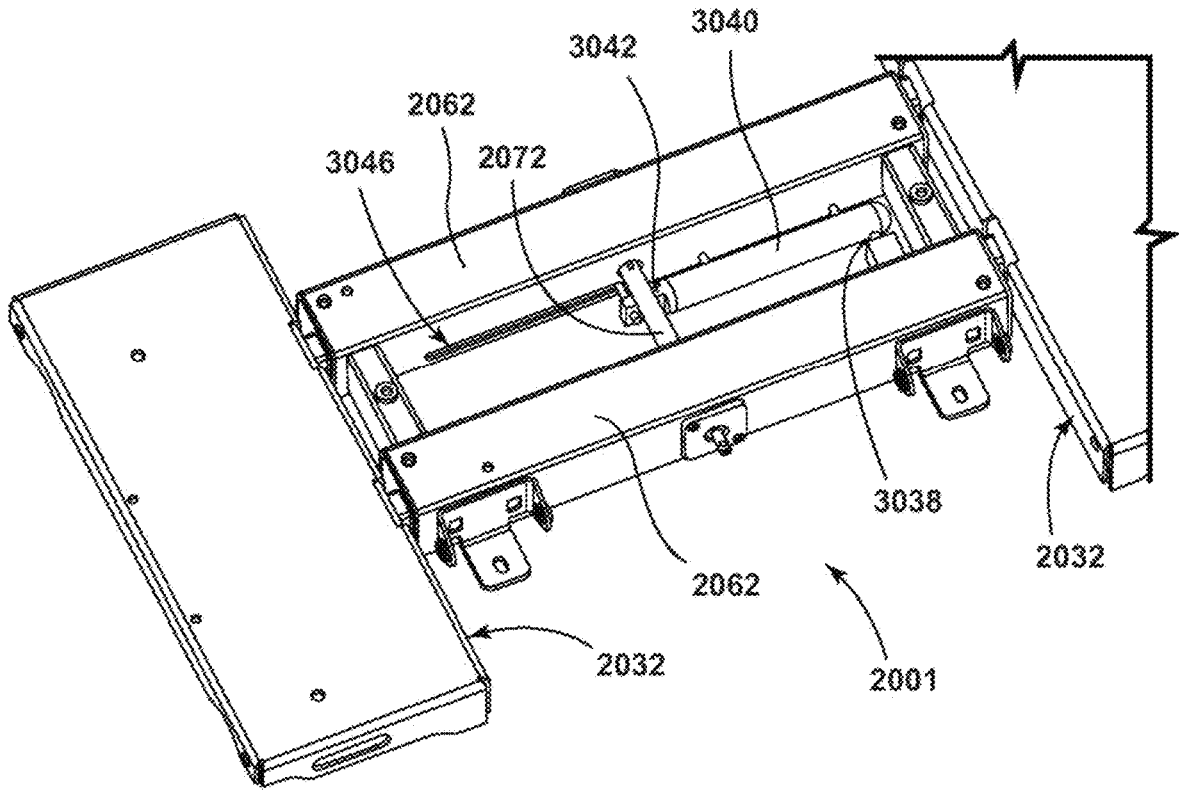
FIG. 51 is a perspective view of a pneumatic sensor for sensing the width of the seat deck section.
Figure 52:
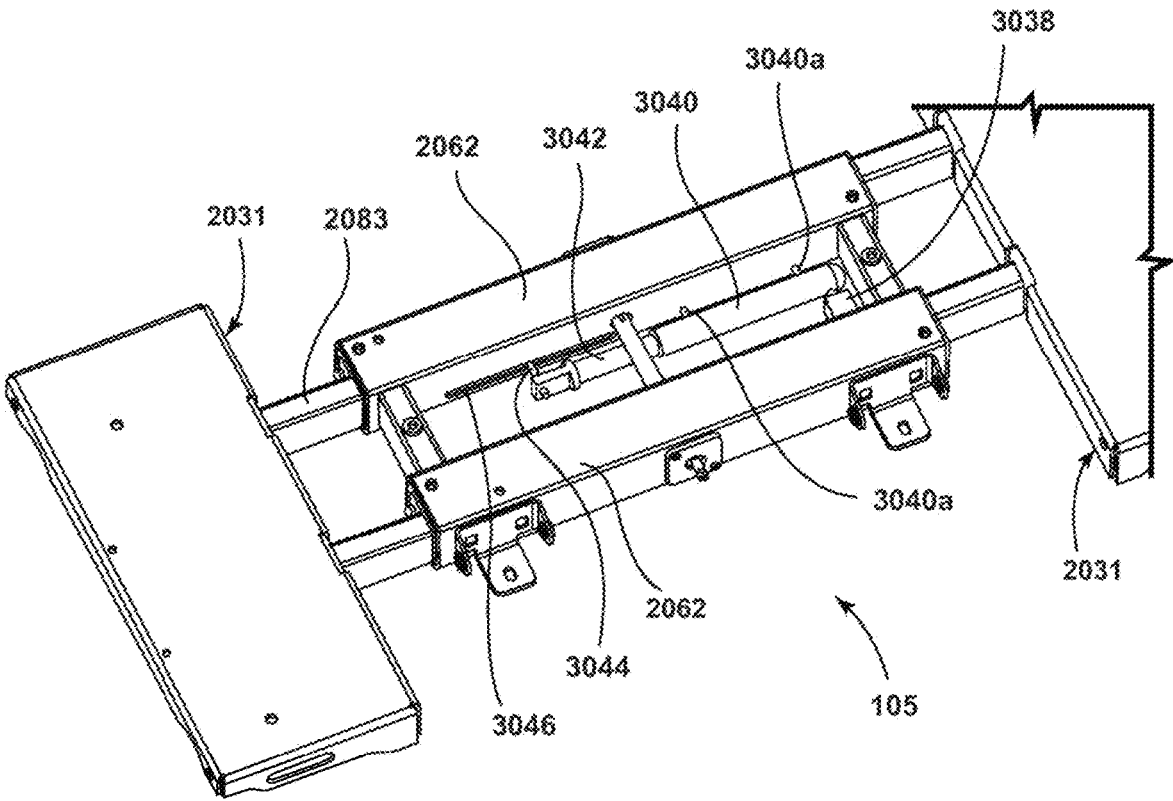
FIG. 52 is another perspective view of a pneumatic sensor for sensing the width of the seat deck section.
Figure 53:
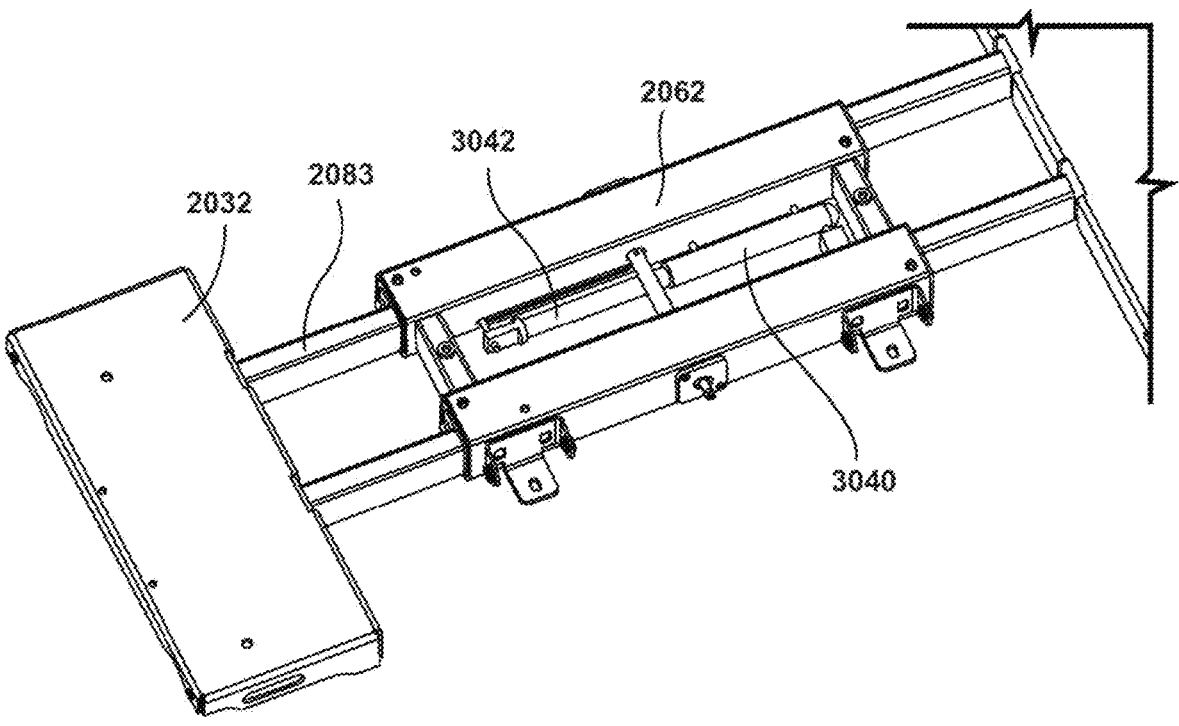
FIG. 53 is another perspective view of a pneumatic sensor for sensing the width of the seat deck section.

Referring to FIGS. 51-53, in this embodiment, plunger 3044 is fully extended into cylinder 304 when the movable section of the deck section is in its 36" width positon. Thus, when the moveable section is extended, as shown in FIGS. 52 and 53, the pressure in the cylinder will reduce and create a vacuum. The sensed vacuum may be communicated to the controller 3302, and then the controller 3302, utilizing stored data, may determine the patient support deck width based on the sensed air vacuum. The air pressure sensor 3038, therefore, can provide a correlating output voltage that may be used by the control system 3300 and software to interpolate and indicate the specific deck width position.

Figure 54:
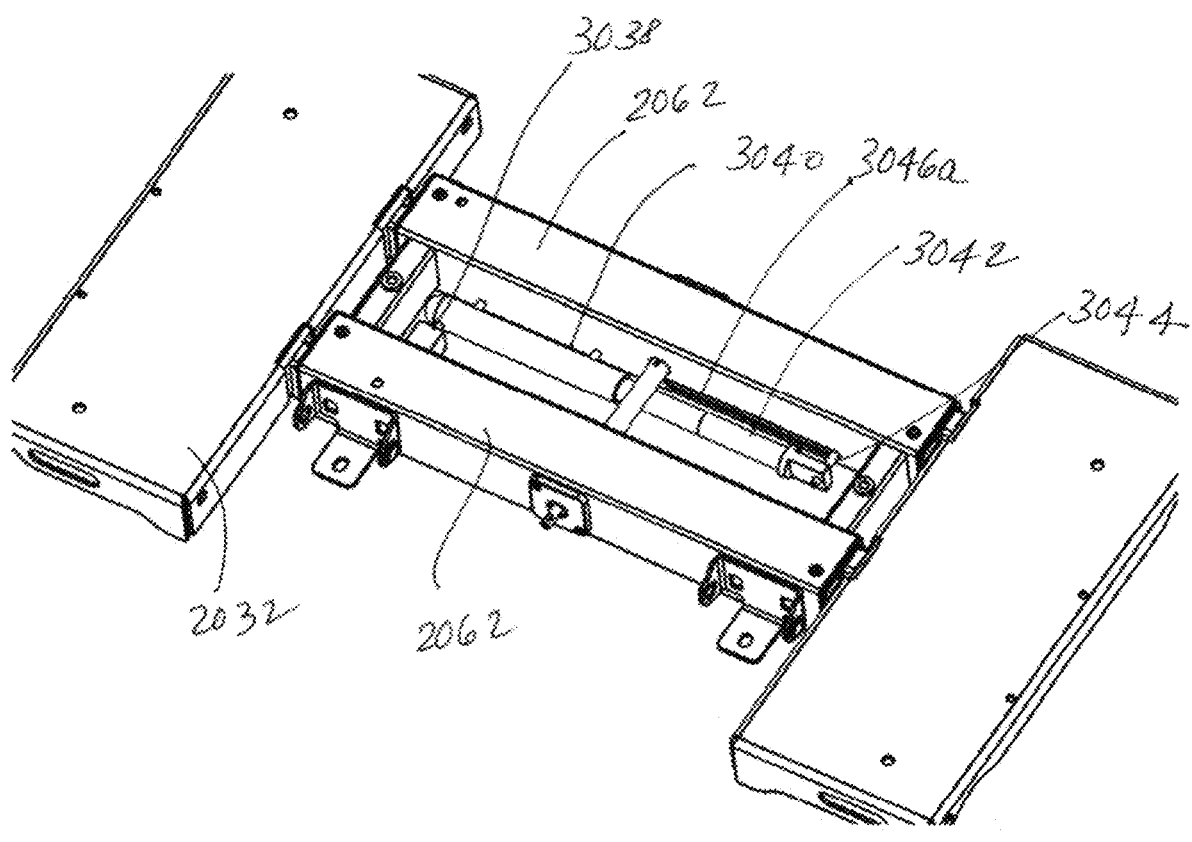
FIG. 54 is a perspective view of another embodiment of a pneumatic sensor for sensing the width of the seat deck section.
Figure 55:
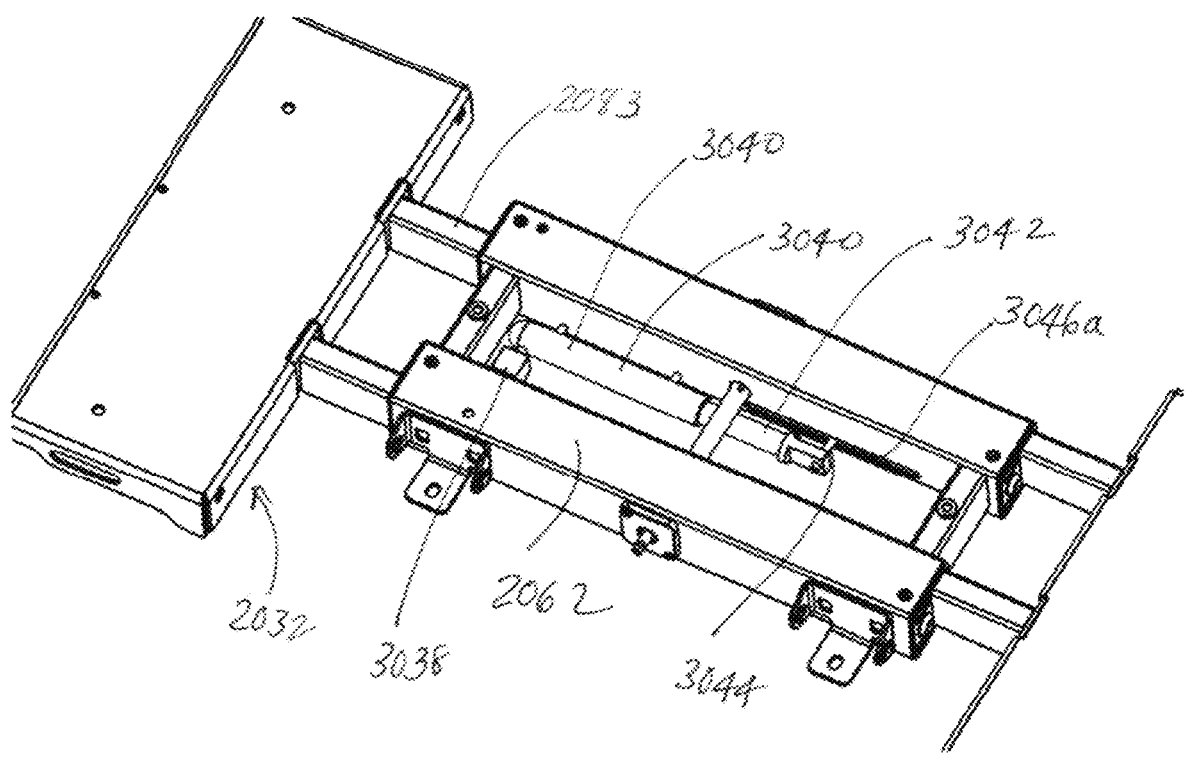
FIG. 55 is similar view to FIG. 54.
Figure 56:
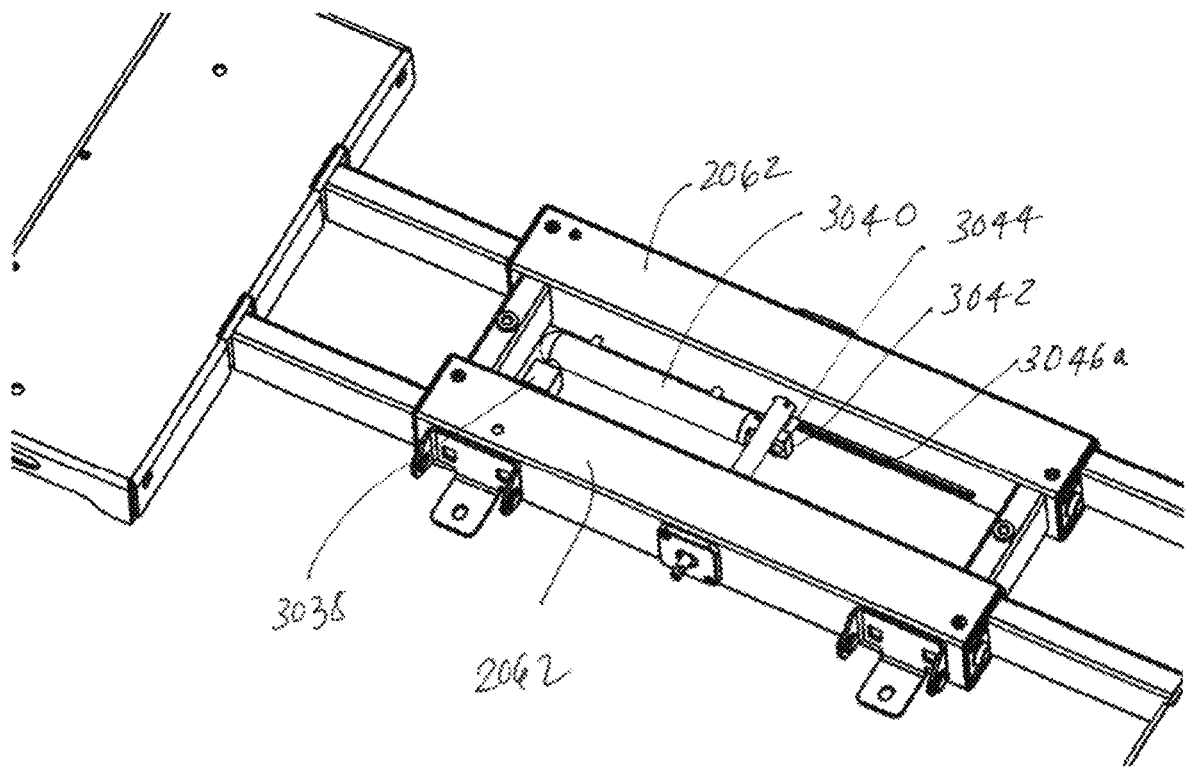
FIG. 56 is similar view to FIG. 54.

Referring to FIGS. 54-56, in this embodiment, cylinder 3040 and plunger 3042 are rotated 180 degrees, with slot 3046*a* provided on the other end of fixed rack and pinion mechanism housing tube 2062 to receive pin 3044. In this embodiment, member plunger 3044 is fully extended from cylinder 304 when the movable section of the deck section is in its 36" width position. Thus, when the moveable section is extended, as shown in FIGS. 55 and 56, the pressure in the cylinder will increase. The sensed pressure may be communicated to the controller 3302, and then the controller 3302, utilizing stored data, may determine the patient support deck width based on the sensed increased air pressure. Again, the air pressure sensor 3038, therefore, can provide a correlating output voltage that may be used by the control system 3300 and software to interpolate and indicate the specific deck width position.

For several of the above embodiments, two or more sensors may be arranged and used to provide a binary output capable of detecting multiple different conditions. In the example illustrated in the chart below, a simple two switch/sensor arrangement is capable of detecting four different deck width conditions.

| DECK WIDTH | STATE OF SENSOR/SWITCH | |
| --- | --- | --- |
| POSITION | SENSOR 1 | SENSOR 2 |
| UNKNOWN | 0 | 0 |
| 36" | 1 | 0 |
| 42" | 0 | 1 |
| 48" | 1 | 1 |

In each of the above-mentioned embodiments, the latching or locking of each deck section may be detected and monitored independently of the deck width position sensing as described in the embodiments above. In some cases, a separate and/or additional deck lock switch or sensor may be utilized to detect the locked or unlocked state of the latch mechanism 2051, 2052, and 2054. Additionally, it may be possible to detect both the deck width position and the locked/unlocked status of the latch mechanism by monitoring the state of the deck lock latch pin 2090. However, as described above, it is possible to detect both deck width position and deck locked state simply by monitoring the state of the deck lock sensor latch pin. This concept may be integrated into the existing sensors mentioned in the above implementation.

In any of the above-mentioned embodiments, the patient support 100 may include multiples of any one or more of the sensors, switches, readers, and their associated components described herein. For example, each of the sensors, switches, and/or readers may be arranged in pairs with redundant sensors, switches, and/or readers to help ensure that in the event of a failure or malfunction, there is a redundant and backup sensor, switch, and/or reader. The associated components, such as the passive elements and parts that act upon the sensors, switches, and readers (i.e., magnets, labels, RFID tags, etc.) may also be duplicated accordingly.

Referring to FIG. 57, for any of the embodiments described herein, movement or adjustment of the patient support 100 may be prevented or restricted if any one of the latch mechanisms 2051, 2052, 2054 is sensed or determined to be unlocked or if the patient support deck 104 is sensed or determined to be in an unacceptable width condition. The control system 3300 may be configured to prevent bed motion depending upon the state of the sensor(s). The state, status, or condition of the various sensors as monitored can meet the specific predetermined conditions stored in the control system 3300 to permit a particular bed motion. As noted above, for example, the software logic may be configured to prevent bed motion depending on the state of the sensor(s)—the conditions of the various sensors as monitored must meet the specific conditions established and set in the software logic in order to permit a particular bed motion capability. If the conditions as monitored are not met for a particular bed motion capability, the software logic will not permit the respective and associated bed motion(s).

In the case that the conditions as monitored are not met for a particular bed motion, the control system 3300 will not permit the respective bed motion(s). For example, the bed motions that may be prohibited may include the bed being moved from its location (e.g., prohibit operation of the bed drive system, such as a ZOOM® drive system, prevent unlocking of casters, or lock the casters) or may include movement of the bed components, such as side rails, the lift mechanism, sections of the deck, such as the head deck section (the "Fowler").

In the case that the control system 3300 determines that movement of the patient support 100 should be prevented, the control system 3300 may also be configured to issue a corresponding warning and/or alerts either through iconography, displayed text messages, or audible alarms that communicate and alert that respective decks sections are either unlocked or at the incorrect width(s).

For example, as generally noted above, exemplary bed motions that may be controlled by the control system 3300 include: the lowering or raising of the deck sections; the lowering or raising of the patient support deck 104; the lowering or raising of the side rails 113 (when equipped with electro-mechanical actuators ad/or locking mechanisms); adjustment or changing of the deck configuration or positioning; motorized movement/driving of the patient support 100; and locking or unlocking of the casters. For any of these bed motions, the control system 3300 could prevent the motion or adjustment of the components if predetermined conditions stored in the control system 3300 are not met. Examples of the predetermined conditions include: the patient support deck being too high or too low; the patient support deck section not being locked; the side rails not being raised; the patient support deck sections not being arranged flat; and others. Additionally, brakes included on the patient support 100 could be locked by the control system 3300 if predetermined conditions stored in the control system 3300 are met, such as the bed being detected as stationary for a predetermined period of time, the side rail 113 is lowered, etc.

In some aspects, if respective deck sections are detected to be unlocked or are detected to be in an unacceptable configuration, the control system 3300 may prevent or restrict bed motion, including specific bed motion(s) that might adversely impact patient safety, introduce risk, or damage the bed.

In one aspect, the control system 3300 monitors the width of the deck, and when the deck is in an expanded width, may issue a prompt to the caregiver to make sure that the expandable headboard 110 has been adjusted so that headboard 110 width correctly aligns with the patient support deck width to help ensure all pinch or entrapment zones may be maintained and kept within compliance. Similarly, when the deck is in an expanded width, control system 3300 may issue a prompt to the caregiver to make sure that the expandable mattress has been adjusted so that mattress width is increased to help ensure all pinch or entrapment zones may be maintained and kept within compliance.

In one embodiment, the control system 3300 may prompt input from the caregiver acknowledging that the headboard and/or mattress has been adjusted. Additionally, control system 3300 may only allow the prompt to be cleared after the caregiver had entered the acknowledgment.

As described above, control system 3300 may include a display at control panel 120 with a display screen 122 on which various messages, using text or icons, may be displayed. For example, referring to FIGS. 24E-G, control system 3300 may generate an alert, for example, in the form of text 124, including, but not limited to, alerting the caregiver that the headboard is not adjusted. Further, the text may include specific instructions to adjust the headboard and/or mattress to a specified width and, further, provide the caregiver a selection of "ADJUSTED" or "NOT ADJUSTED" so that the caregiver can indicate to the control system 3300 whether they have adjusted or not adjusted the headboard. Additionally, the alert may include an alert regarding the width of any one of the deck sections. For example, text may indicate that the midsection (e.g., the seat and leg sections) deck needs to be adjusted.

In addition, control system 3300 may generate an icon 126 that represents the headboard and, further, the headboard shown in the desired width. Thus, the icon may also be used to prompt the user to adjust the caregiver to adjust the headboard. For example, referring to FIG. 24F, when the deck is adjusted to a 36" width, the icon 126 may be illustrated with two headboard sections 126*a*, 126*b* (which represents the headboard in a 36" with configuration) to illustrate how the headboard should look when adjusted to the 36" width. Similarly referring to FIG. 24G, when the deck is adjusted to a 42" width, icon 126 may be illustrated with three headboard sections 126*a*, 126*b*, and 126*c* (which represents the headboard in a 42" with configuration), and a text prompt to instruct the caregiver to adjust the width of the headboard to 42 inches. Referring to FIG. 24H, when the deck is adjusted to a 48" width, icon 126 may be illustrated with four headboard sections 126*a*, 126*b*, 126*c*, and 126*d* (which represents the headboard in a 48" with configuration) and a text prompt to instruct the caregiver to adjust the width of the headboard to 48 inches.

Other text messages may also be generated at display 122 including an error message and instructions to call service (FIGS. 24G-H). Additionally, the control system 3300 may generate text prompting the caregiver to indicate when the headboard (and optionally the mattress) is adjusted. For example, as noted, control system 3300 may provide the caregiver a selection of "ADJUSTED" or "NOT ADJUSTED" and may generate a touch screen area or button associated with each of the two selections (ADJUSTED or NOT ADJUSTED) as well as a touch screen area or button 128 (e.g., a checkmark) to be pressed by a caregiver to indicate when the headboard is adjusted. Until the caregiver selects one of the two options presented on the display and presses the checkmark on the control panel, any movement restrictions (e.g., deck movement, or movement of other components, or the patient support apparatus movement itself) may remain in place. The "ADJUSTED" option confirms that the manual adjustment of the width of the headboard and mattress to the appropriate width is complete. The "NOT ADJUSTED" option acknowledges the manual adjustment of the width of the headboard and mattress has not been completed, but confirms that the temporary movement restriction should be lifted nevertheless. Accordingly, once the user either (1) presses the check mark while the "ADJUSTED" option is selected; or (2) presses the check mark while the "NOT ADJUSTED" option is selected, the control system 3300 lifts the movement restriction.

In other aspects, as noted, the control system 3300 may apply restrictions to the patient support 100 height, depending on the predetermined positions relative to the width of patient support deck 104 in an effort to mitigate concerns of tip-over as a result of too high center of gravity. For example, if the patient support deck 104 is detected to be at the expanded 48" width, the control system 3300 may limit the patient support 100 height to ensure that the center of gravity is not in a location where tip-over may occur due to patient ingress or egress. The control system 3300 may allow the patient support 100 to auto-adjust its height if the center of gravity is detected to be too high and in an unsafe height with respect to the corresponding patient support deck 104 width.

Other aspects include storing information and data from the sensors. The data may be timestamped and collected to track patient preferred patient support deck width configurations and patient support 100 usage with respect to patient weight, biometrics, service requirements, etc. The sensor information and data may be used to send preemptive warnings and information about the patient support 100 during transport of the patient. For example, if the patient support 100 is configured and positioned at the intermediate 42" patient support deck width, or the expanded 48" patient support deck width, once the brake is released and the patient support 100 is detected to be ready for patient transport, the patient support 100 may display information and/or warnings to alert the operator or caregiver regarding specific concerns or conditions to avoid. Warnings or alerts may be issued to remind or inform staff regarding: ensuring that a minimum of two or more people are present to help transport and move the patient and patient support safely; watching for narrow door jambs and passageways; determining that the patient support is in approved patient support deck width configuration for patient transport; adjusting the mattress width accordingly and filling in respective gaps; and checking for under-deck obstructions such as bedside tables, chairs, and equipment or hoses that may be exposed to damage or interference as a result of adjusting to wider patient support deck widths. Additionally, when the patient support 100 is equipped with geo-tracking or position/location sensing, the operator or caregiver may be informed if a particular patient support deck width is restricted or required for use in a particular ward or section of the care facility. For example, if the patient support is located in a hallway, the operator or caregiver may be informed or reminded that the patient support should be adjusted to the standard 36" patient support deck width position.

For any of the embodiments described herein, the deck width position sensing may be used by the control system to generate a prompt to take action, such as prompt manual adjustment of the expandable headboard 106, mattress, and/or footboard 108 to ensure that their width correctly aligns with the deck width. This may help to ensure that pinch and entrapment zones are maintained and remain within compliance conditions.

For example, the prompt may include any one or more of the following meant to provide a prompt to the caregiver instructing or reminding the caregiver to adjust one of the above described adjustable components: visual and/or audible instructions, an icon, a video, an animation, displayed wording, or an audible message recording.

In any of the above-described embodiments, the sensor and the component or element that it is sensing may be mounted to the opposite patient support deck frame section-fixed or movable members—as described above.

As noted above all of the deck sections may be independently adjusted or two of the deck sections, such as the seat and knee deck sections, may be coupled together so that their widths can be adjusted together. Thus, when all four deck sections are independently adjustable, the patient support could have four latches and four single inputs (could be one handle or a pair of handles so that access is provided from both sides of the patient support, or as noted may be independent from the handle or handles, using a button or switch) to release the latch mechanisms. Optionally, a different combination of two deck sections may be coupled together—for example, the leg and knee deck sections, or the seat and head decks sections.

Figure 59:
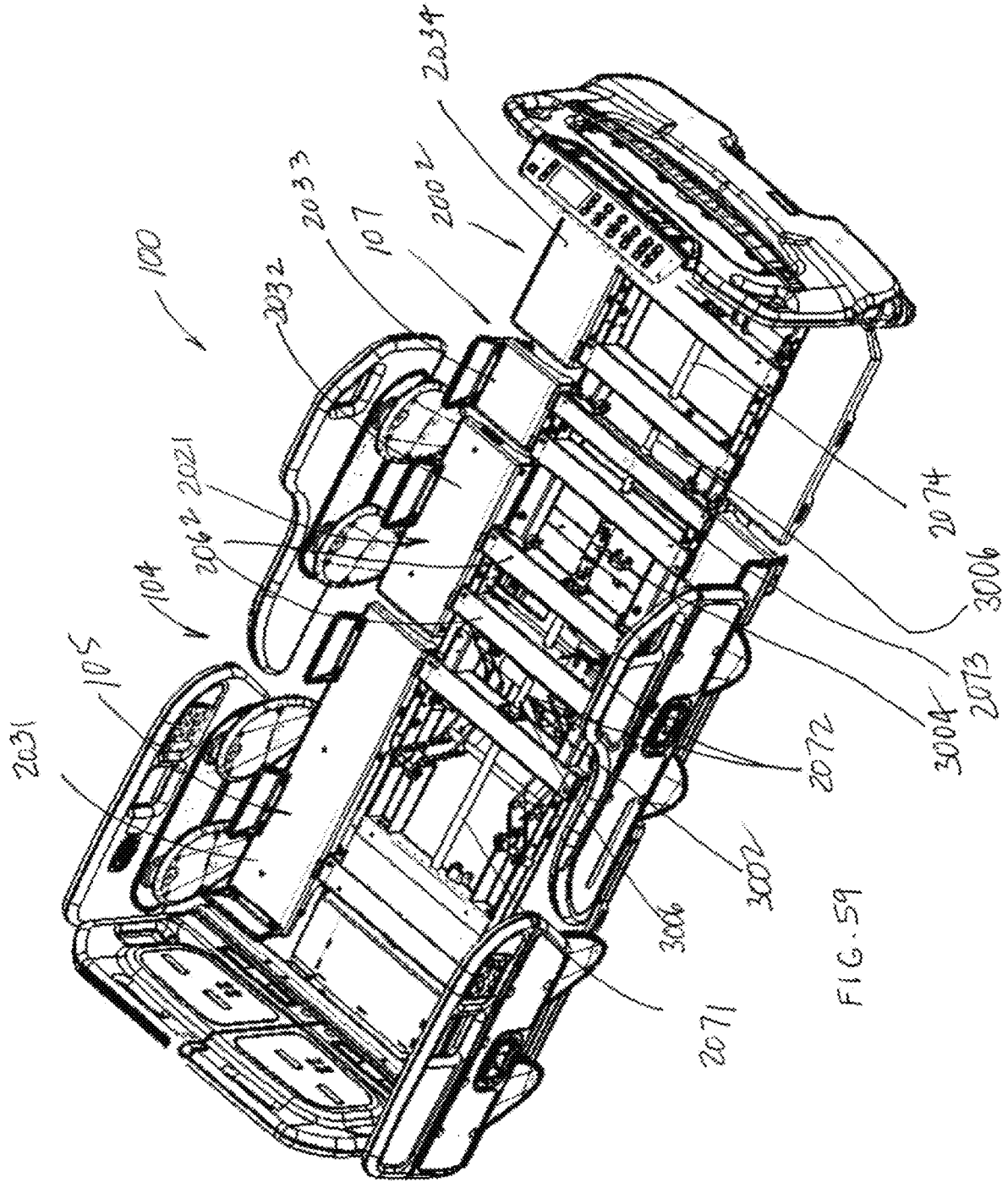
FIG. 59 is a perspective view of another embodiment of a patient support with three or more deck sections coupled together.
Figure 60:
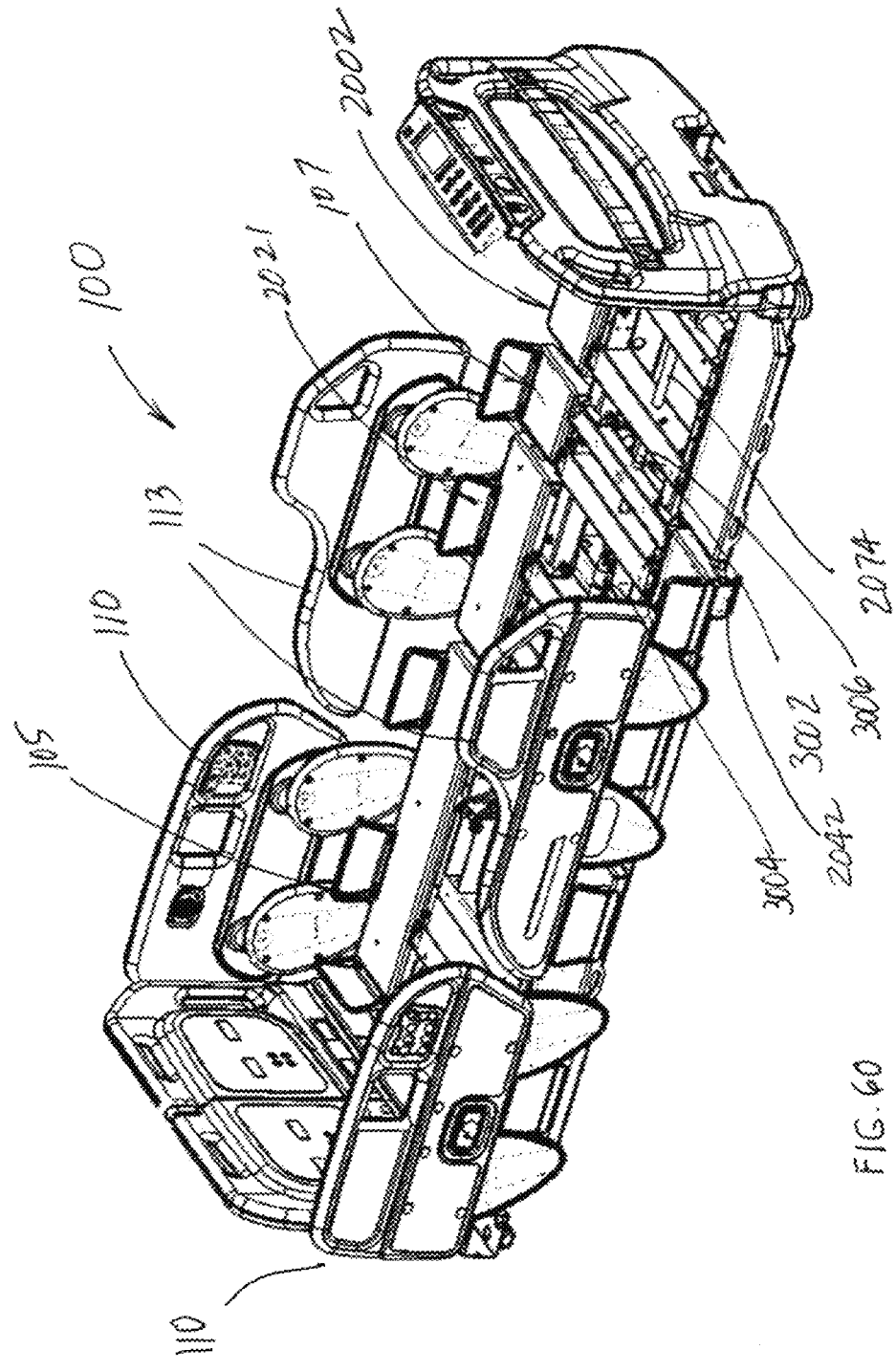
FIG. 60 is a perspective view of the patient support of FIG. 59.
Figure 61:
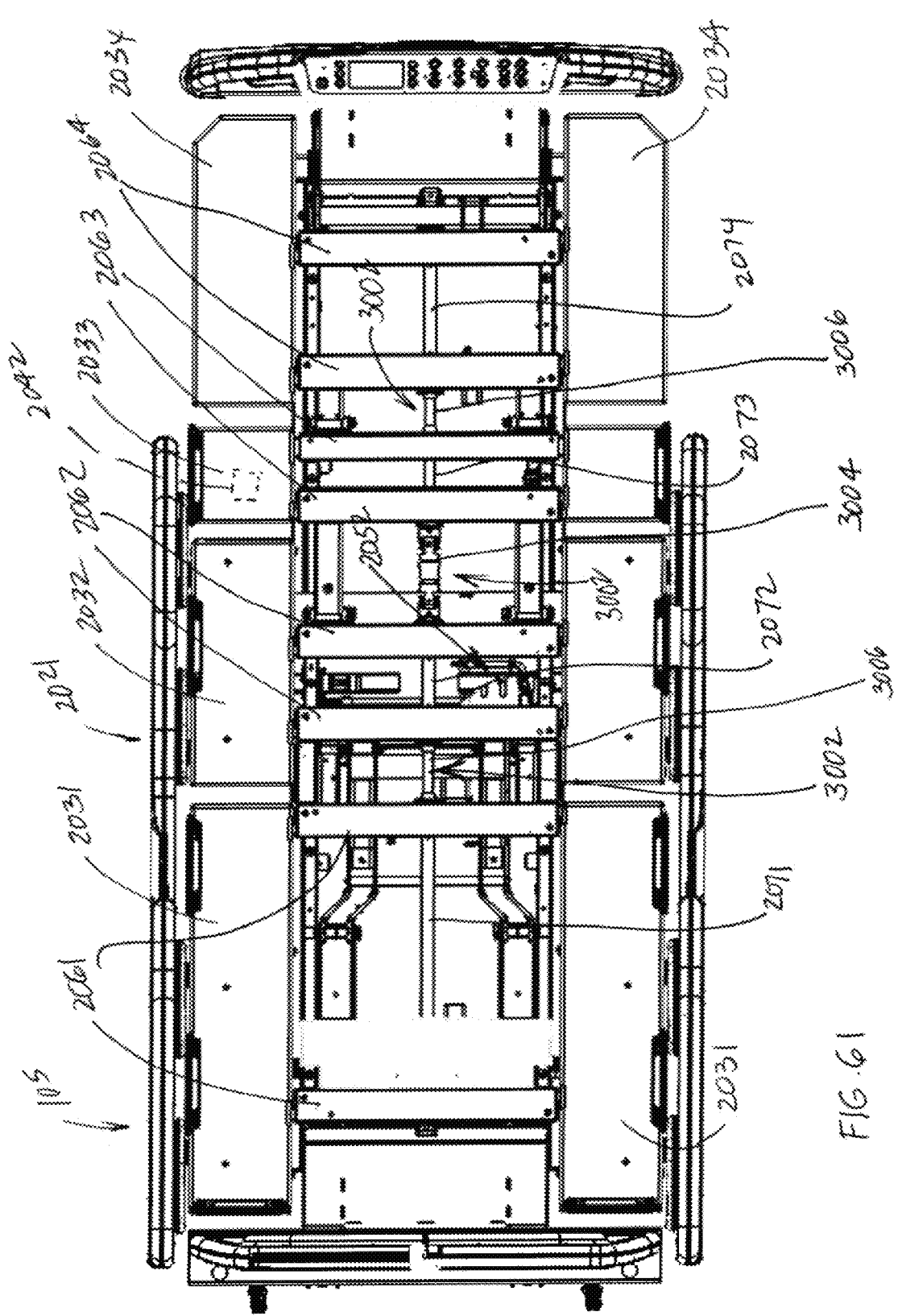
FIG. 61 is a plan view of the patient support of FIG. 59.

Referring to FIGS. 59-61, three or more, including all four, decks sections may be coupled together so that they may expand or contract together from a single input at a single location (and may be locked using a single latch mechanism), though it should be understood that the single input may be provided at several locations. For example, the head, seat, and knee deck sections may be coupled together, or the leg, knee and seat deck sections may be coupled together. The single input may be provided on any of the coupled deck sections. Similarly, the latch mechanism may be mounted in or on any one of the coupled deck sections, though as noted, centrally locating the single input and/or the latch mechanism may reduce the play in the components.

Referring to FIGS. 59-61, the pinion gear shafts 2071, 2072, 2073, and 2074 of three or more of the head deck section 105, seat deck section 2021, deck section 107, and foot deck section 2002 of patient support 100, respectively, may be coupled together for rotational movement by flexible torque transmitting devices 3002. For example, suitable flexible torque transmitting devices 3002 may include U-joints 3004 (FIGS. 61, 63) or flex shafts 3006 (FIGS. 61, 64) or a combination of both (FIG. 61). In this manner, each of the pinion shafts 2071, 2072, 2073, and 2074 may be driven to rotate in unison to pull or push on the respective deck pans 2031, 2032, 2033, and 2034 so that the width of each of the decks may be adjusted by pulling or pushing by a single input, optionally provide at a single location or multiple locations. For example, a single input may be provided, for example, via handle 2042 mounted to knee deck section 107 (FIG. 60) using the rack and pinion gear set arrangements described above. Optionally, one or more of the rack and pinion gear sets may be omitted. Further, the knee deck section 107 may include a handle on each side of the deck, with each providing a single input.

Further a single latch mechanism 2052 and corresponding deck extension handle 2042 (or pair) may be provided to lock or unlock the deck sections in their expanded or contracted positions-though it should be understood that more than one latch mechanism may still be used and more than one handle may be used. For details of the construction of latch mechanism 2052 and handle 2042 reference is made to latch mechanism 2051 (shown FIGS. 16 and 17) and handle 241 (FIG. 18) and their accompanying descriptions above.

When multiple handles are provided, each operating as a single input, and a single latch mechanism is used, all the handles may be then coupled, either mechanically or electrically, to the single latch mechanism. For example, when mechanically coupled, each handle may be coupled using a cable or cables. When multiple latch mechanisms are used, each of the single input (e.g., each handle) may then be cabled to all of the latch mechanisms so that all the latch mechanisms are released together from a single input (any one of the handles). As more fully described below, the handles may be used just to simply pull on the deck section, with the release of the latch being controlled from a separate remote input (e.g., at the caregiver control panel) wherein the handle is not coupled to the latch mechanism. Alternately, the handles may have an electrical input device, such as a button or switch-either mounted on the handle or adjacent the handle-so that the handle is simply used to pull on the deck section, with the latch mechanism released by a signal from the electrical input device. For example, in one embodiment, the electrical input device may be a wireless device to eliminate the need for cabling and/or wiring. Further, in one embodiment, the handle or pair of handles may be eliminated provided the deck section or sections have a grab point or region along at least one side and, optionally, along their opposed sides.

Similarly, a single sensor may be used to detect the width and/or locked state of the deck sections. Again, multiple sensors may be used-especially when more than one latch mechanism is used. For details of the latch mechanisms and sensors, racks, and pinions gears, as well as the overall construction of the patient support deck, reference is made to the above description and referenced patent application.

In the illustrated embodiment, a single latch mechanism, such as latch mechanism 2052 (FIG. 61) of the seat deck section 2021, and a single handle, such as handle 2042 (FIG. 12) mounted to knee deck section 107, may be used to lock and unlock three or all four deck sections. Thus, a single input may be used to lock and unlock, and further push or pull all the decks sections in unison.

The location of the latch mechanism and or handle may be varied. But to maintain the current configurations of the deck sections and rack and pinion assemblies, centering and locating the latch mechanism and the handle on the seat deck section or knee deck section (i.e., centrally located on the patient support) will reduce the impact of any play in the movement of the deck sections and, therefore, provide a tighter control over the locking and unlocking, and expansion and contraction, of the deck sections.

Figure 62:
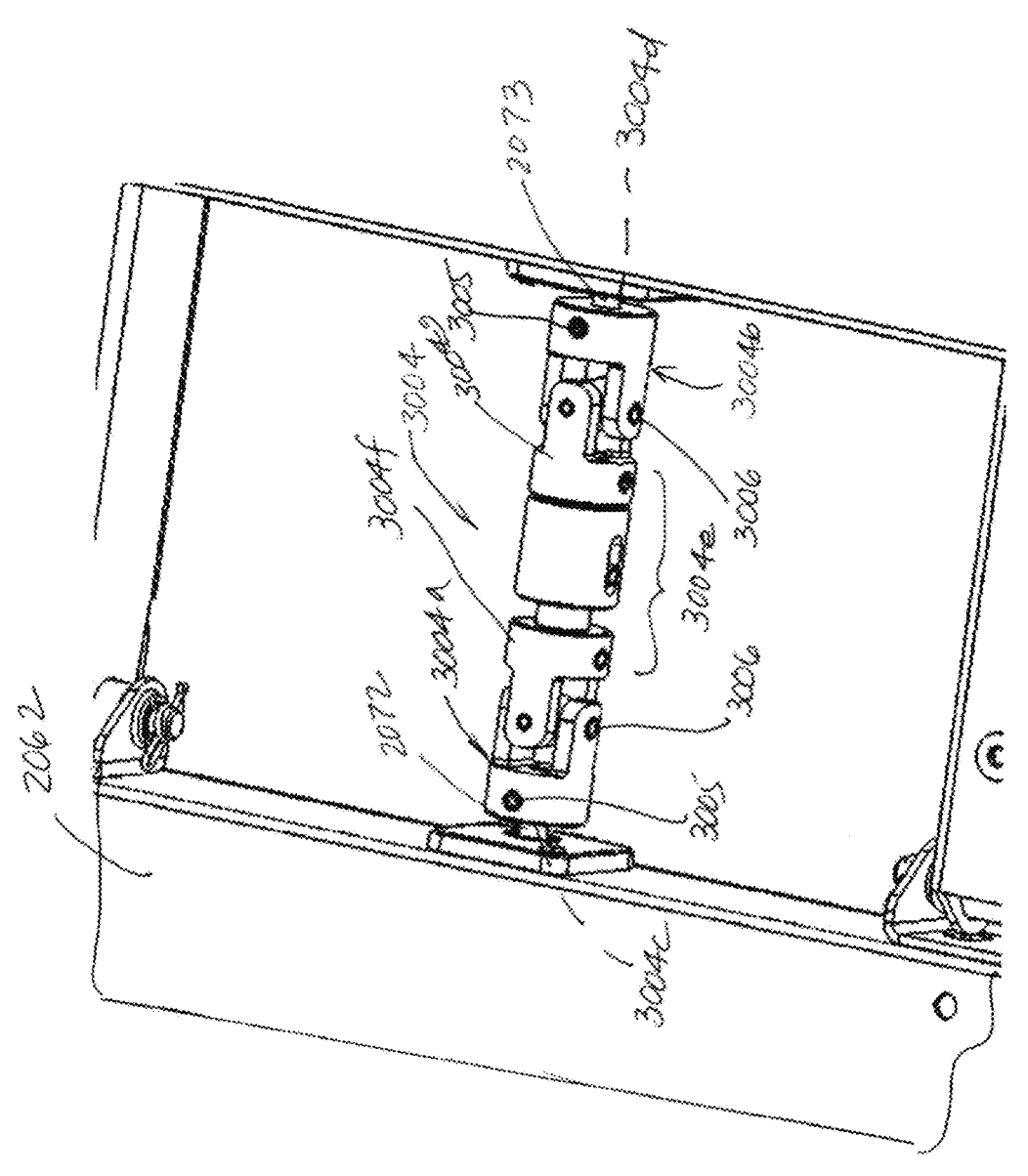
FIG. 62 is an enlarged perspective view of the coupler coupling the respective coupled deck sections drive shafts.
Figure 63:
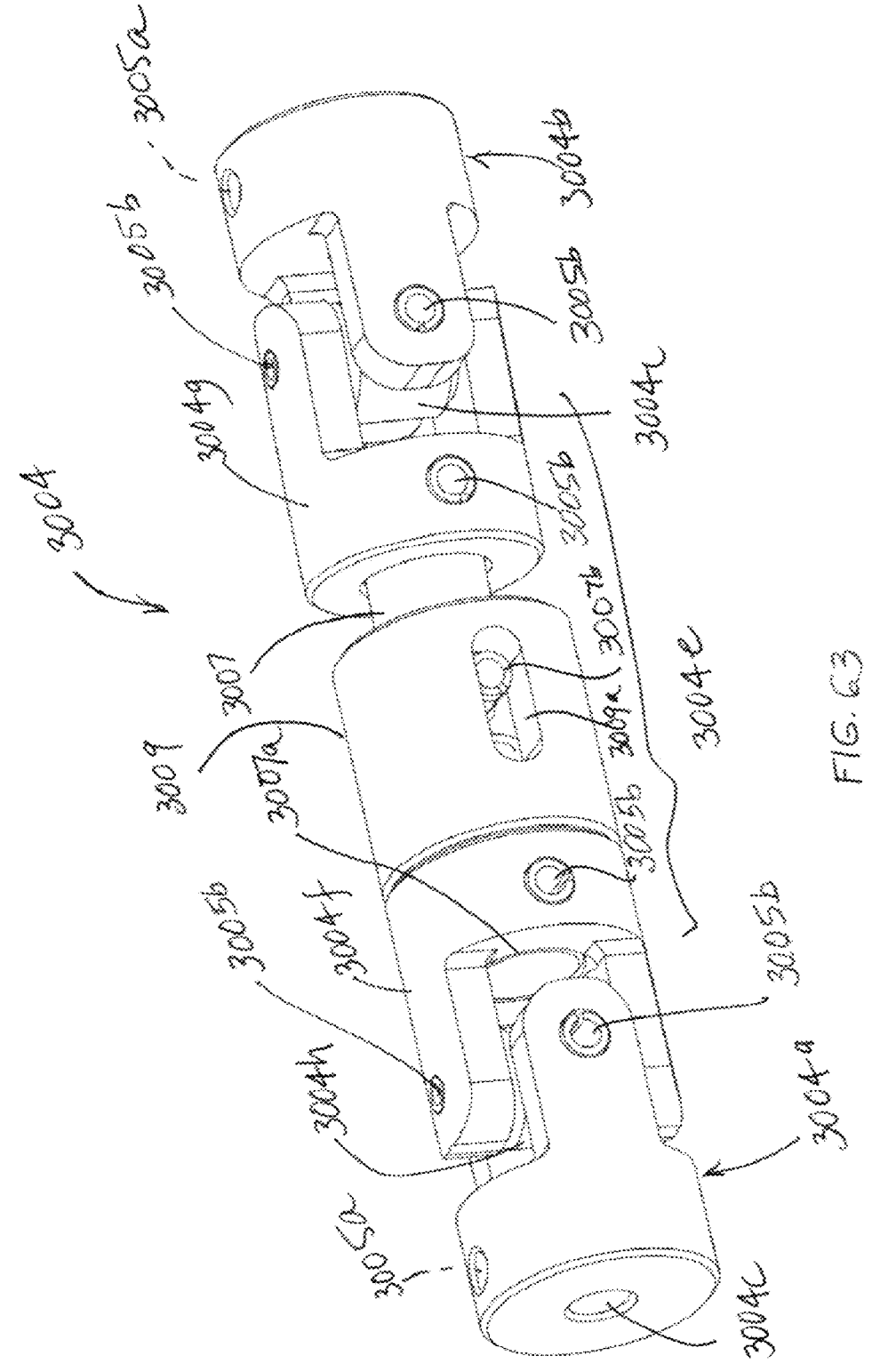
FIG. 63 is an enlarged perspective view of the coupler of FIG. 62.

As noted above, the pinion drive shafts may be coupled together by flexible torque transmitting devices. This allows the decks sections to remain independently articulatable while rotationally coupling the pinion gear shafts of the deck sections together. In the illustrated embodiment, the torque transmitting device connecting the seat deck section pinion gear shaft 2072 to the knee seat section pinion gear shaft 2073 comprises a U-joint 3004, such as shown in FIGS. 62 and 63.

U-joint 3004 is a conventional a double U-joint and includes first and second yokes 30004, 3004b, which receive and couple to the respective pinion shafts 2072 and 2073 in bores 3004c, 3004d formed in the hubs of the yokes and which are secured therein by set screws 3005. Extending between yokes 3004a, 3004b is a central yoke assembly 3004e, which is coupled to yokes 3004a, 3004b via pivot members 3004h and 3004i and pins 3006. In this manner, pinion shafts 2072 and 2073 are rotationally coupled together but are free to articulate relative to each other.

Central yoke assembly 3004e may be a one-piece body formed with two yokes 3004f and 3004g at each end. Alternately, central yoke assembly 3004e may comprise a telescoping central yoke assembly with two shafts 3007 and 3007a. Yoke 3004g is secured to shaft 3007 via a pin 3005b, while yoke 3004f is attached to shaft 3007a by a pin 3005b, but slidably connected to shaft 3007 via a pin 3007b. In the illustrated embodiment yoke 3004f includes a hollow extension tube 3009 (which receives therein shaft 3007) with slotted openings 3009a on opposed sides of tube 3009 to receive pin 3007b to thereby allow yoke 3004f to move linearly with respect to yoke 3004g, while still being rotationally coupled to yoke 3004g.

Figure 64:
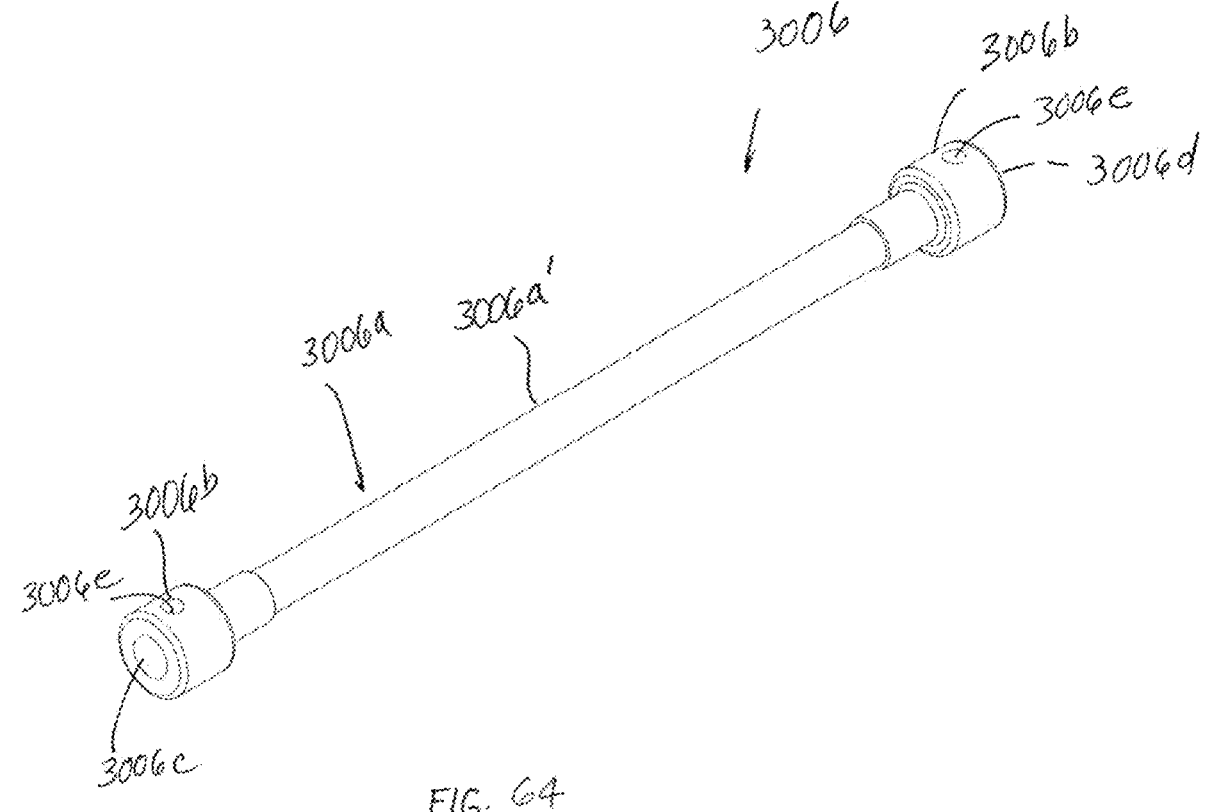
FIG. 64 is an enlarged perspective view of a second embodiment of a suitable coupler for coupling the respective coupled deck sections.
Figure 65:
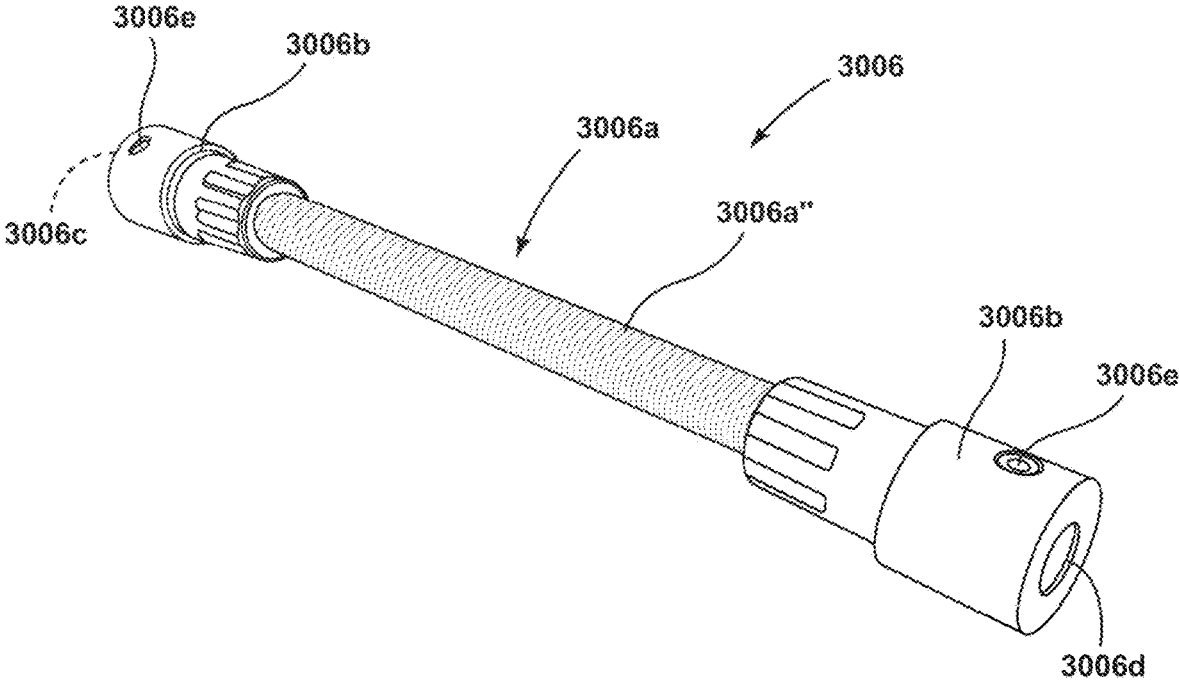
FIG. 65 is an enlarged perspective view of a third embodiment of a suitable coupler for coupling the respective coupled deck sections.

In the illustrated embodiment, each of the torque transmitting devices that connect the head deck section pinion gear shaft 2071 to the seat section pinion gear shaft 2072 and connect the foot deck section pinion shaft 2074 to the knee deck section pinion gear shaft 2073, comprises a flexible shaft 3006, such as shown in FIGS. 64-65. Flexible shaft 3006 includes a flexible central torque transmitting member 3006a, such as rubber bar or hose 3006a' (FIG. 64) or metal or fiber wire rope or coil (e.g., spring) 3006a'', and connectors 3006b at both ends of the member 3006a for rigidly coupling to the respective pinion gear shafts. Each connector 3006b includes a bore 3006c, 3006d for receiving the respective pinion shaft and one or more setscrews 3006e for securing the shafts therein. In this manner, when one of the pinion gear shafts rotates, the pinion gear shaft coupled via flexible shaft 3006 will also rotate. The member 3006a is sufficiently flexible to allow the two pinion gear shafts to flex about the member and relative to each other but have sufficient torsional stiffness to transmit torque between the respective pinion gear shafts.

Optionally, one or more of the flexible torque transmitting devices may comprise a spring or other strands, such as a fiber rope, which are sufficiently flexible to allow the pinion shafts to bend relative but have sufficient torsional stiffness to transmit torque between the respective pinion gear shafts.

Figure 66:
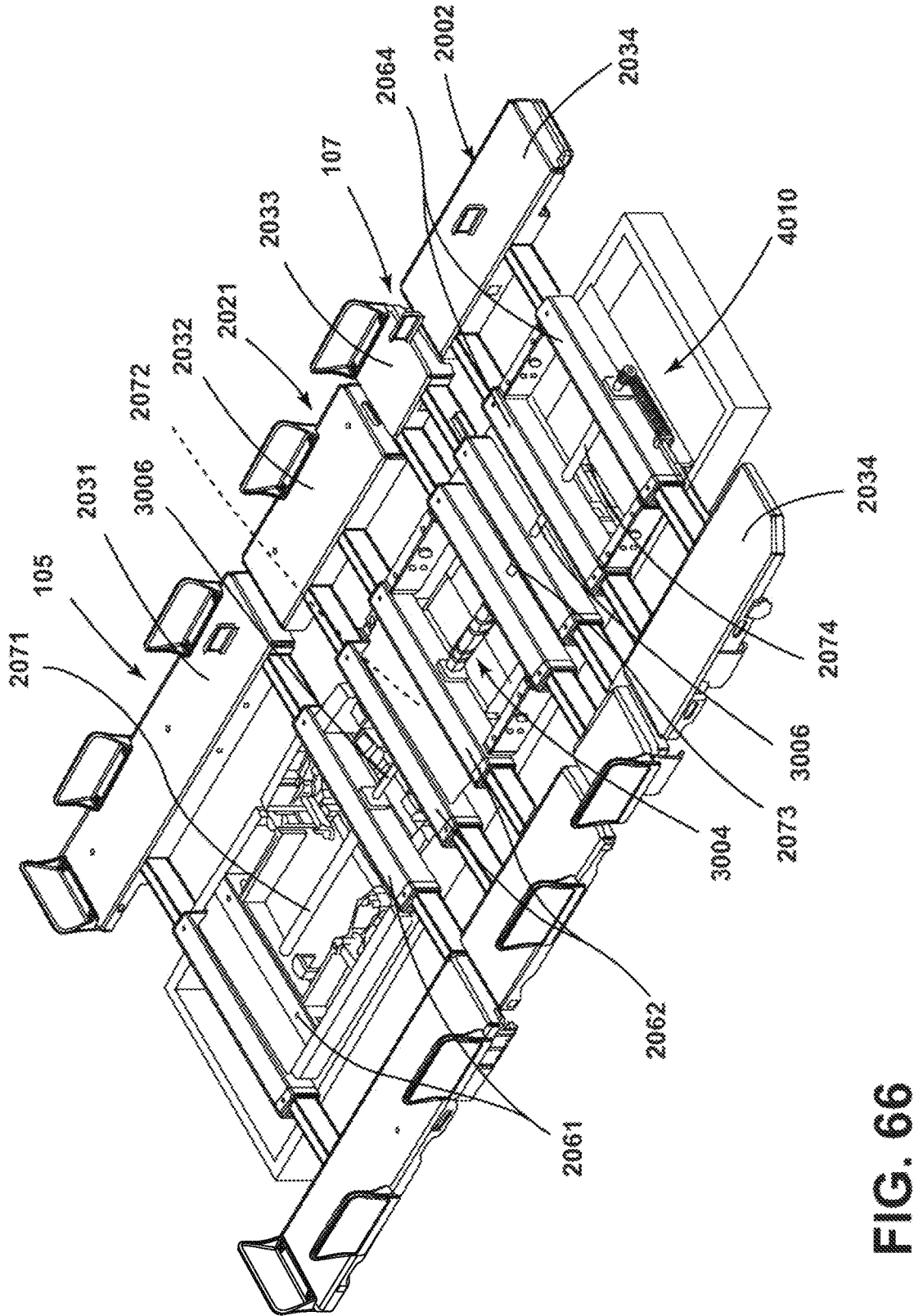
FIG. 66 is a perspective view of another embodiment of a patient support with three or more deck sections coupled together with another embodiment of the width adjustment assembly.
Figure 67:
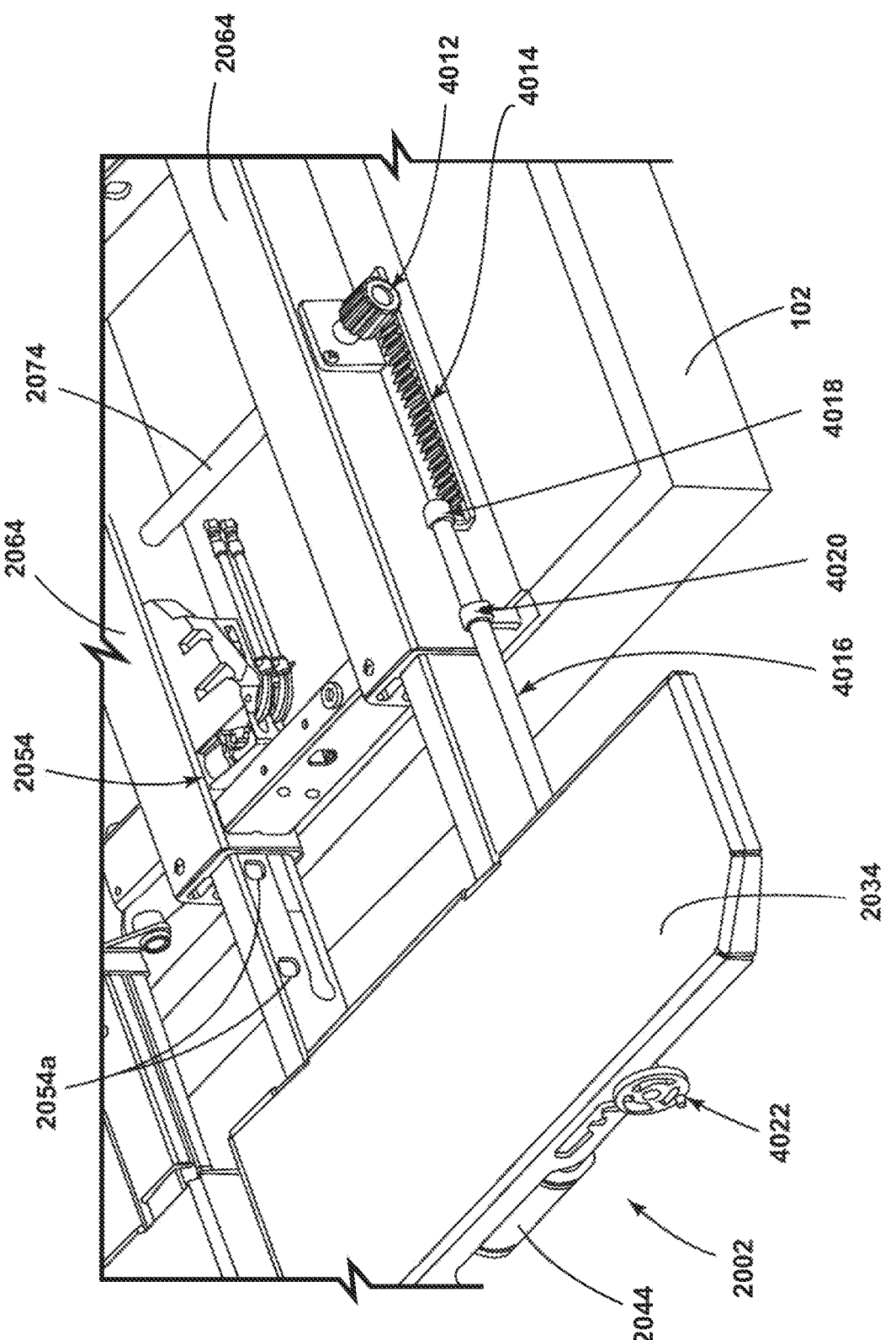
FIG. 67 is an enlarged fragmentary view of the width adjustment assembly of FIG. 66.

As described above, the movement of the deck sections may also be achieved through one or more powered or mechanical actuators. Referring to FIGS. 66 and 67, pinion shaft 2074 may extended beyond pinion mechanism housing tube 2064 for engagement by a actuator 4010 so that all the pinion shafts may be driven from location, such as the end of the deck.

In the illustrated embodiment, the actuator 4010 comprises a mechanical actuator in the form of a driven rack and pinion assembly. Referring to FIG. 67, driven rack and pinion assembly 4010 includes a pinion gear 4012, which is mounted to the end of pinion shaft 2074 for rotation with the shaft, and a rack 4014, which is engaged by pinion gear 4012. Rack 4104 is then coupled to lead screw 4016, which is coupled to rack 4012 via a lead screw mount 4018 and supported on upper frame 102 (which supports deck 104).

Lead screw 4016 may be driven by a powered device, such as a motor, or a mechanical device, such a hand wheel or crank. In the illustrated embodiment, lead screw 4106 is mechanically driven by a hand wheel 4022, which is mounted to one of the deck pans 2034.

As noted above, by rotatably coupling all the pinions together, a single latch mechanism, a single release handle, a single input, and a single sensor may be used-though it should be understood that multiple latch mechanisms, release handles, multiple inputs, and/or sensors may be used as described above.

In one embodiment, when a single latch and a single or single pair of release handles is used, it may be desirable to locate them near the driver of the actuator 4010 so that a user can easily unlatch and then widen the deck 104 with both hands without having to reach far. So for example, foot section 2002 may include latch mechanism 2054, which, as noted, locks the width of the deck by a pin-in-hole arrangement via holes 2054a provided in the cross-extension member of the foot deck section 2002. Latch mechanism 2054 is released by handle 2044, which is mounted to foot deck extension pan 2034, and optionally adjacent hand wheel 4022 for easy access.

As noted above, and referring to FIG. 24I, the latch mechanism or mechanisms may include an actuator 5008, such as a solenoid, a cylinder (e.g., air or hydraulic cylinder) or the like, to move the latch pin between its locked and unlocked positions. The actuator may be in communication (either wired or wirelessly) with the controller 3302 of the control system 3300, which includes an input (e.g., at the caregiver control panel or at the handle noted below) to trigger the controller to control the actuator and, hence, the position of the latch pin. Alternately, the control system may include a locally mounted communication device (such as at the handle 2041, 2042, 2044 or at the caregiver control panel 120), such as a wireless transmitter control circuit, to control the actuator.

For example, in one embodiment, controller 3302 may have a wireless transmitter 5010 mounted to the control board of controller 3302, which is actuated to generate a control signal to the actuator 5008 based on input, for example, at the caregiver control panel 120 or at the handles via an input device 5012, such as switch or button, which can either be mounted to the panel or handle or adjacent the handle. The actuator 5008, therefore, optionally includes a receiver circuit so that the actuator 5008 may be wirelessly and remotely controlled.

In this manner, the handle itself may no longer transmit the mechanical input to the latch mechanism and, instead, may be simply used to pull on the deck section. Further, optionally, a separate handle structure may be eliminated and, instead, be provided by a grabbing structure or region formed on the deck section.

Alternately, the input device may be configured to generate a signal based on movement of the handle. For example, a switch or button may be located so that it is pressed when the handle is moved (lifted and/or lowered), which generates the signal to the actuator to unlatch the latch pin. When the handle is released, the switch or button may generate another signal to cause the actuator to move the latch pin to its locked position.

In one embodiment, the communication device, e.g., wireless transmitter, may be located on the handle along with the input device 5012 and, optionally, incorporated into the input device, so that in effect the handle transmits an electrical signal and communicates with the actuator at the latch mechanism when the user presses the switch or button (or moves the handle) (versus the handle mechanically transmitting the unlatch or latch signal to the latch mechanism). It should be understood that when multiple latch mechanisms are used, each handle or input device may communicate with all the latch mechanisms.

While described in reference to embodiments where the width of the patient support is adjusted, it should be understood that the patient support may also include length-adjustment capability and sensing utilizing the embodiments described herein relative to the length of the patient support instead or in addition to the adjustment of the width of the patient support. Extending the length of the patient support is described in more detail in U.S. application Ser. No. 15/394,111, filed Dec. 29, 2016, entitled "Patient Support Usable with Bariatric Patients," the entire content of which is herein incorporated by reference.

As used herein, the term "patient support" refers to an apparatus for supporting a patient in an elevated position relative to a support surface for the apparatus, such as a floor. One embodiment of a patient support includes beds, for example, hospital beds for use in supporting patients in a hospital environment. Other embodiments may be conceived by those skilled in the art. The exemplary term "hospital bed" or simply "bed" may be used interchangeably with "patient support" herein without limiting the generality of the disclosure.

As used herein, the term "guard structure" refers to an apparatus mountable to or integral with a patient support that prevents or interferes with egress of an occupant of the patient support from the patient support, particularly egress in an unintended manner. Guard structures are often movable to selectively permit egress of an occupant of the patient support and are usually located about the periphery of the patient support, for example, on a side of the patient support. One embodiment of a guard structure includes side rails, mountable to a side of a patient support, such as a hospital bed. Other embodiments may be conceived by those skilled in the art. The exemplary terms "guard rail", "side rail", or "rail structure" may be used interchangeably with "guard structure" herein without limiting the generality of the disclosure.

As used herein, the term "longitudinal" refers to a direction parallel to an axis between a head end of the patient support and a foot end of the patient support, where a head-to-foot distance is parallel to a longitudinal axis and is referred to as the length of the patient support. The terms "transverse" or "lateral" refer to a direction perpendicular to the longitudinal direction and parallel to a surface on which the patient support rests, where a side-to-side distance is parallel to a transverse or lateral axis and is referred to as the width of the patient support. In general, directional terms, such as "vertical," "horizontal," "top," "bottom," "upper," "lower," "inner," "inwardly," "outer" and "outwardly," are used to assist in describing the invention based on the orientation of the embodiments shown in the illustrations. The use of directional terms should not be interpreted to limit the invention to any specific orientation(s).

As used herein, the term "control circuit" refers to an analog or digital electronic circuit with inputs corresponding to a patient support status or sensed condition and outputs effective to cause changes in the patient support status or a patient support condition. For example, a control circuit may comprise an input comprising an actuator position sensor and an output effective to change actuator position. One embodiment of a control circuit may comprise a programmable digital controller, optionally comprising or interfaced with an electronic memory module and an input/output (I/O)

interface. Other embodiments may be conceived by those skilled in the art. The exemplary terms, such as "control system", "control structure" and the like may be used interchangeably with "control circuit" herein without limiting the generality of the disclosure.

As used herein, the term "actuator" refers to a device for moving or controlling a mechanism or system and may be frequently used to introduce motion, or to clamp an object so as to prevent motion. Actuators include, for example, motors, hydraulic actuators, pneumatic actuators, electric actuators (e.g., linear actuators), mechanical actuators, electromechanical actuators, and solenoids.

Novel features will become apparent to those of skill in the art upon examination of the detailed description. It should be understood, however, that the scope of the claims should not be limited by the preferred embodiments set forth in the examples, but should be given the broadest interpretation consistent with the specification as a whole.

The above description is that of current embodiments of the invention. Various alterations and changes can be made without departing from the spirit and broader aspects of the invention as defined in the appended claims, which are to be interpreted in accordance with the principles of patent law including the doctrine of equivalents. This disclosure is presented for illustrative purposes and should not be interpreted as an exhaustive description of all embodiments of the invention or to limit the scope of the claims to the specific elements illustrated or described in connection with these embodiments. For example, and without limitation, any individual element(s) of the described invention may be replaced by alternative elements that provide substantially similar functionality or otherwise provide adequate operation. This includes, for example, presently known alternative elements, such as those that might be currently known to one skilled in the art, and alternative elements that may be developed in the future, such as those that one skilled in the art might, upon development, recognize as an alternative. Further, the disclosed embodiments include a plurality of features that are described in concert and that might cooperatively provide a collection of benefits. The present invention is not limited to only those embodiments that include all of these features or that provide all of the stated benefits, except to the extent otherwise expressly set forth in the issued claims. Any reference to claim elements in the singular, for example, using the articles "a," "an," "the" or "said," is not to be construed as limiting the element to the singular. Any reference to claim elements as "at least one of X, Y and Z" is meant to include any one of X, Y or Z individually, and any combination of X, Y and Z, for example, X, Y, Z; X, Y; X, Z; and Y, Z.

The embodiments of the invention in which an exclusive property or privilege is claimed are defined as follows:

1. A patient support comprising:

a patient support component, the patient support component being an adjustable width component having an adjustable width relative to a longitudinal axis of the patient support such that a change in the width of the adjustable width component changes an overall width of the patient support, said adjustable width component including a latch mechanism to lock the width of the adjustable width component;

a control system comprising:

a sensor adapted to detect a locked status of the latch mechanism indicative of the latch mechanism of the adjustable width component being locked at a current width of the adjustable width component and at a corresponding overall width of the patient support, the sensor being adapted to detect the width status of the adjustable width component, the sensor being adapted to generate a signal based on the locked status and the width status; and a controller in communication with the sensor and configured to receive the signal, the controller configured to determine, based on the signal, whether the latch mechanism is locked or unlocked for the adjustable width component.

2. The patient support of claim 1 wherein the controller is configured to determine the width of the patient support component based on the signal from the sensor.

3. The patient support of claim 1, wherein the patient support component includes a plurality of deck sections, each of said deck sections having an adjustable width, and said latch mechanism comprising a latch mechanism for each deck section.

4. The patient support of claim 3, wherein the widths of the deck section are independently adjustable.

5. The patient support of claim 1, wherein the sensor is adapted to detect the width status of the patient support component based on a characteristic of the latch mechanism.

6. The patient support of claim 4, further comprising a patient support deck frame having a fixed section and a movable section, and two or more latch pin cutouts in either the fixed section or the movable section of the patient support deck frame, the latch pin cutouts having varying dimensions, the latch pin having a stepped diameter and being mounted to the other of the fixed section or the movable section, wherein the latch pin is receivable by a respective latch pin cutout of the two or more latch pin cutouts when the movable section of the patient support deck frame moves to a position corresponding to a designated width of the patient support component, and the latch pin being adapted to extend into the respective latch pin cutout to a depth as allowed by the stepped diameter of the latch pin and the dimension of the respective latch pin cutout.

7. The patient support of claim 3, wherein the characteristic of the latch pin is the profile of the latch pin.

8. The patient support of claim 1, wherein the latch mechanism includes a latch pin, wherein the characteristic is a characteristic of the latch pin.

9. The patient support of claim 8, wherein the controller is configured to sense if the latch pin is extended into a respective latch pin cutout to thereby sense the locked condition or the unlocked condition of the latch pin and to determine a corresponding width of the patient support component based on the sensed depth at which the latch pin extends into the respective latch pin cutout.

10. The patient support of claim 1, wherein the control system comprises:

a second sensor adapted to sense a width of the patient support component; and the controller being in communication with the second sensor, the controller configured to determine if the patient support component is in an unacceptable width configuration based on the sensed width of the patient support component and adapted to generate a signal to issue an alert or a prompt to a caregiver to take action, if the patient support component is determined to be in an unacceptable width configuration.

11. The patient support of claim 10, comprising a sensor system including the second sensor and adapted to sense multiple acceptable discrete widths of the patient support component, the second sensor being an optical sensor configured to sense light reflected from the reflective surface, wherein each of the multiple acceptable discrete widths is associated with one of the multiple different sections of the reflective surface such that each of the multiple acceptable discrete widths is associated with a different reflectivity of the reflective surface; and wherein the controller is configured to sense a width of the patient support component corresponding to one of the multiple acceptable discrete widths based on the light reflected from the reflective surface and sensed by the optical sensor, the controller configured to determine if the patient support component is in an acceptable width configuration based on a sensed width of the patient support component corresponding to one of the multiple acceptable discrete widths.

12. The patient support of claim 1, wherein the patient support component is a patient support deck.

13. A control system for a patient support, the patient support including a patient support component being an adjustable width component having an adjustable width relative to a longitudinal axis of the patient support such that a change in the width of the adjustable width component changes an overall width of the patient support, the adjustable width component including a latch mechanism operable to lock the width of the patient support component, the control system comprising:

a sensor system adapted to detect a status of the latch mechanism indicative of the latch mechanism of the adjustable width component being locked at a current width of the adjustable width component and at a corresponding overall width of the patient support, said sensor system adapted to detect a component status of the adjustable width component, the sensor system operable to generate a signal based on at least one of the status and the component status; and a controller in communication with the sensor system and configured to receive the signal, the controller configured to determine, based on the signal, whether the latch mechanism is locked or unlocked for the adjustable width component.

14. The control system of claim 13 wherein the status of the latch mechanism corresponds to a lock status of the latch mechanism, and wherein the component status of the patient support component corresponds to a width status of the patient support component.

15. The control system of claim 13 wherein the controller is configured to determine the width of the patient support component.

16. The control system of claim 13 wherein the sensor system is configured to detect the status of the patient support component based on a characteristic of the latch mechanism.

17. The control system of claim 13 wherein the latch mechanism includes a latch pin, and wherein the sensor system is configured to determine the status of the latch mechanism based on a characteristic of the latch pin.

18. The control system of claim 17, wherein the characteristic of the latch pin is the profile of the latch pin.

19. The control system of claim 17, wherein the sensor system is configured to sense if the latch pin is extended into a respective latch pin cutout to thereby sense a locked condition or an unlocked condition of the latch pin, wherein the status of the latch mechanism is based on whether the latch pin is in the locked condition or the unlocked condition.

20. The control system of claim 19, wherein the controller is configured to determine a corresponding width of the patient support component based on a sensed depth at which the latch pin extends into the respective latch pin cutout.

* * * * *